US012737289B2

(12) United States Patent
Bae et al.

(10) Patent No.: US 12,737,289 B2
(45) **Date of Patent: *Sep. 15, 2026**

(54) STORAGE DEVICE INCLUDING NONVOLATILE MEMORY DEVICE AND OPERATING METHOD OF STORAGE DEVICE

(71) Applicant: SAMSUNG ELECTRONICS CO., LTD., Suwon-si (KR)

(72) Inventors: Joon-Whan Bae, Suwon-si (KR); Junyeong Han, Suwon-si (KR); Kui-Yon Mun, Suwon-si (KR); Heetak Shin, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 49 days.

This patent is subject to a terminal disclaimer.

(21) Appl. No.: 18/999,874

(22) Filed: Dec. 23, 2024

(65) Prior Publication Data

US 2025/0190344 A1 Jun. 12, 2025

Related U.S. Application Data

(63) Continuation of application No. 18/237,806, filed on Aug. 24, 2023, now Pat. No. 12,298,902.

(30) Foreign Application Priority Data

Aug. 31, 2022 (KR) ........................ 10-2022-0109942
Nov. 10, 2022 (KR) ........................ 10-2022-0149964
(Continued)

(51) Int. Cl.
*G06F 12/00* (2006.01)
*G06F 3/06* (2006.01)
(Continued)

(52) U.S. Cl.
CPC ........ *G06F 12/0292* (2013.01); *G06F 3/0604* (2013.01); *G06F 3/0619* (2013.01);
(Continued)

(58) Field of Classification Search
CPC .. G06F 12/0292; G06F 3/0604; G06F 3/0619; G06F 3/0631; G06F 3/064;
(Continued)

(56) References Cited

U.S. PATENT DOCUMENTS 6,816,946 B2 11/2004 Magoshi
7,392,436 B2 6/2008 Keays
(Continued)

FOREIGN PATENT DOCUMENTS

CN 102929792 A 2/2013
CN 107743617 A 2/2018
(Continued)

OTHER PUBLICATIONS

Feng Chen et al., CAFTL: A Content-Aware Flash Translation Layer Enhancing the Lifespan of Flash Memory based Solid State Drives, Proceedings of the 9th USENIX Conference on File and Storage Technologies (FAST'11), USENIX Association, Feb. 15, 2011, pp. 77-90 (14 pages total).
(Continued)

*Primary Examiner* — Shawn X Gu
(74) *Attorney, Agent, or Firm* — Sughrue Mion, PLLC

(57) ABSTRACT

A storage device, including: a nonvolatile memory device including a plurality of memory cells; and a controller configured to, based on receiving an open zone command from an external host device: based on a number of free erase units from among a plurality of erase units included in the plurality of memory cells being greater than a threshold value, allocate at least two free erase units to a first-type zone, and based on the number of the free erase units being
(Continued)

smaller than or equal to the threshold value, allocate the at least two free erase units to a second-type zone, wherein the controller is further configured to permit a random write based on a random logical address received from the external host device for the first-type zone, and to permit a zone write based on a sequential logical address received from the external host device for the second-type zone.

20 Claims, 98 Drawing Sheets

(30) Foreign Application Priority Data

Jan. 12, 2023 (KR) ........................ 10-2023-0004966
Jan. 12, 2023 (KR) ........................ 10-2023-0004994
Jan. 12, 2023 (KR) ........................ 10-2023-0005013
Jan. 12, 2023 (KR) ........................ 10-2023-0005033
Jan. 12, 2023 (KR) ........................ 10-2023-0005041
Jan. 12, 2023 (KR) ........................ 10-2023-0005043
Jan. 12, 2023 (KR) ........................ 10-2023-0005044
Jan. 12, 2023 (KR) ........................ 10-2023-0005046
Jan. 12, 2023 (KR) ........................ 10-2023-0005048
Jan. 12, 2023 (KR) ........................ 10-2023-0005050
Jan. 12, 2023 (KR) ........................ 10-2023-0005053

(51) Int. Cl.
*G06F 11/10* (2006.01)
*G06F 11/1446* (2026.01)
*G06F 12/02* (2006.01)

(52) U.S. Cl.
CPC ............ *G06F 3/0631* (2013.01); *G06F 3/064* (2013.01); *G06F 3/0647* (2013.01); *G06F 3/0652* (2013.01); *G06F 3/0656* (2013.01); *G06F 3/0679* (2013.01); *G06F 11/1068* (2013.01); *G06F 11/1451* (2013.01); *G06F 12/023* (2013.01); *G06F 2212/1016* (2013.01)

(58) Field of Classification Search
CPC .... G06F 3/0647; G06F 3/0652; G06F 3/0656; G06F 3/0679; G06F 11/1068; G06F 11/1451; G06F 12/023; G06F 2212/1016; G06F 3/061; G06F 3/0644; G06F 3/068; G06F 2212/7204; G06F 12/0246; G11C 2211/5641; G11C 11/5621; G11C 16/102; G11C 16/0425
See application file for complete search history.

(56) References Cited

U.S. PATENT DOCUMENTS 8,132,045 B2 3/2012 Avila et al.
8,234,466 B2 7/2012 Yeh
8,407,397 B2 3/2013 Chu
8,612,669 B1 12/2013 Syu et al.
8,694,719 B2 4/2014 Lassa et al.
8,949,568 B2 2/2015 Wei et al.
9,158,671 B2 10/2015 Ryu et al.
9,189,386 B2 11/2015 Wakrat et al.
9,312,026 B2 4/2016 Kochar et al.
9,384,845 B2 7/2016 Yang et al.
9,430,376 B2 8/2016 Horn
9,449,698 B1 9/2016 Paudel et al.
9,563,549 B2 2/2017 Ahn et al.
9,652,164 B2 5/2017 Rose
9,804,787 B2 10/2017 Pinto et al.
9,817,761 B2 11/2017 Ben-Shemesh et al.
9,898,200 B2 2/2018 Yang et al.
9,996,271 B2 6/2018 Jung et al.
10,049,039 B2 8/2018 Byun
10,055,130 B2 8/2018 Kanno
10,223,257 B2 3/2019 Frazier et al.
10,339,005 B2 7/2019 McGlaughlin et al.
10,528,469 B2 1/2020 Koo et al.
10,726,865 B2 7/2020 Gerhart et al.
10,761,771 B2 9/2020 Kanno et al.
10,884,947 B2 1/2021 Bhatia et al.
10,915,394 B1 2/2021 Shappir et al.
10,990,526 B1 4/2021 Lam et al.
11,036,628 B2 6/2021 Hashimoto
11,100,006 B1 8/2021 Lercari et al.
11,137,920 B1 10/2021 Bert
11,182,077 B1 11/2021 Chatterjee et al.
11,200,162 B2 12/2021 Helmick et al.
11,204,886 B2 12/2021 Roy et al.
11,232,041 B2 1/2022 Haswell
11,237,732 B2 2/2022 Natarajan et al.
11,237,769 B2 2/2022 Kanno
11,237,979 B2 2/2022 Shin et al.
11,243,709 B2 * 2/2022 Noh .................... G06F 12/0804
11,249,896 B2 2/2022 Subbarao et al.
11,294,827 B2 4/2022 Bennett et al.
11,321,231 B2 5/2022 Kanno et al.
11,327,681 B2 5/2022 Shin et al.
11,334,266 B2 5/2022 Kanno
11,341,039 B2 5/2022 Wang et al.
11,372,543 B2 6/2022 Benisty et al.
11,372,762 B2 6/2022 Narsale
11,409,459 B2 8/2022 Grayson et al.
11,467,758 B2 * 10/2022 Yang ..................... G06F 3/0679
12,360,892 B2 7/2025 Park et al.
2005/0286300 A1 12/2005 Roohparvar
2009/0193184 A1 7/2009 Yu et al.
2009/0327598 A1 12/2009 Tamura et al.
2010/0008140 A1 1/2010 Lee
2010/0042900 A1 2/2010 Khmelnitsky et al.
2010/0082890 A1 4/2010 Heo et al.
2011/0271041 A1 11/2011 Lee et al.
2012/0246388 A1 9/2012 Hashimoto
2013/0326119 A1 12/2013 Lee et al.
2013/0336072 A1 12/2013 Wood et al.
2014/0071753 A1 3/2014 Shin
2014/0351628 A1 11/2014 Higeta et al.
2015/0039825 A1 2/2015 Anderson
2015/0074337 A1 3/2015 Jo et al.
2015/0186058 A1 7/2015 Yeh
2015/0193299 A1 7/2015 Hyun et al.
2016/0070470 A1 3/2016 Uchida
2017/0003889 A1 1/2017 Kim et al.
2017/0031626 A1 2/2017 Kim et al.
2017/0123928 A1 5/2017 Smith et al.
2018/0121133 A1 5/2018 Bakke et al.
2018/0150255 A1 5/2018 Woo et al.
2019/0369912 A1 12/2019 Steinmetz
2020/0089407 A1 3/2020 Baca et al.
2020/0089410 A1 3/2020 Park et al.
2020/0310987 A1 10/2020 Choi
2020/0327061 A1 10/2020 Tan et al.
2021/0056023 A1 2/2021 Jin et al.
2021/0064263 A1 3/2021 Shin et al.
2021/0089217 A1 3/2021 Bjorling et al.
2021/0103517 A1 4/2021 Kim et al.
2021/0132827 A1 5/2021 Helmick et al.
2021/0141559 A1 5/2021 Kim et al.
2021/0165581 A1 6/2021 Kwon
2021/0182152 A1 6/2021 Shin et al.
2021/0182166 A1 6/2021 Hahn et al.
2021/0223962 A1 7/2021 Esaka et al.
2021/0318801 A1 10/2021 Benisty et al.
2021/0318820 A1 10/2021 Jin et al.
2021/0326048 A1 10/2021 Karr
2021/0365202 A1 11/2021 Shin et al.
2021/0373809 A1 12/2021 Benisty
2021/0406185 A1 12/2021 Guda et al.
2022/0027064 A1 1/2022 Botes et al.
2022/0075716 A1 3/2022 Tikoo et al.
2022/0083256 A1 3/2022 Muthiah
2022/0100419 A1 3/2022 Jang

(56) References Cited

U.S. PATENT DOCUMENTS

| | | | |
|---|---|---|---|
| 2022/0113885 | A1 | 4/2022 | Jeon |
| 2022/0137817 | A1 | 5/2022 | Kwak et al. |
| 2022/0137858 | A1 | 5/2022 | Lee et al. |
| 2022/0138099 | A1 | 5/2022 | Kang |
| 2022/0147261 | A1 | 5/2022 | Kim et al. |
| 2022/0155957 | A1 | 5/2022 | Byun |
| 2022/0156000 | A1 | 5/2022 | Inbar et al. |
| 2022/0156087 | A1 | 5/2022 | Karr et al. |
| 2022/0188020 | A1 | 6/2022 | Ishiguro |
| 2022/0214808 | A1 | 7/2022 | Lin |
| 2022/0214831 | A1 | 7/2022 | Kim |
| 2022/0214833 | A1 | 7/2022 | Zhang et al. |
| 2022/0229574 | A1 | 7/2022 | Tanpairoj et al. |
| 2022/0244869 | A1 | 8/2022 | Kanteti |
| 2022/0405017 | A1 | 12/2022 | Yang |
| 2022/0413866 | A1 | 12/2022 | Nathella et al. |
| 2023/0135020 | A1 | 5/2023 | Byun et al. |
| 2023/0168827 | A1 | 6/2023 | Lee et al. |
| 2023/0185471 | A1 | 6/2023 | Pahwa et al. |
| 2023/0266897 | A1 | 8/2023 | Bert |
| 2023/0289080 | A1 | 9/2023 | Matsuda et al. |
| 2023/0325090 | A1 | 10/2023 | Feld et al. |
| 2023/0367486 | A1 | 11/2023 | Vijendra Kumar Lakshmi et al. |
| 2023/0376206 | A1 | 11/2023 | Wang et al. |
| 2024/0012460 | A1 | 1/2024 | McNutt |
| 2024/0069803 | A1 | 2/2024 | Yang et al. |
| 2024/0094903 | A1 | 3/2024 | Kavirayani et al. |

FOREIGN PATENT DOCUMENTS

| | | | |
|---|---|---|---|
| CN | 111949197 | A | 11/2020 |
| CN | 111949200 | A | 11/2020 |
| CN | 112463059 | A | 3/2021 |
| JP | 4719167 | B2 | 7/2011 |
| JP | 2016-206938 | A | 12/2016 |

OTHER PUBLICATIONS

Anonymous, “Backup”, Wikipedia, Apr. 15, 2020, XP093325865, Retrieved from the Internet: URL:https://en.wikipedia.org/w/index.php?itle=Backup&oldid=951191429. (15 pages total).

Hexware, “Multi-level cell”, May 18, 2022, Wikipedia (Year: 2022) pp. 1-6 (6 pages total).

Soojun Im et al., “ComboFTL: Improving performance and lifespan of MLC flash memory using SLC flash buffer”, Journal of Systems Architecture, Elsevier, vol. 56 (2010), Sep. 8, 2010, doi:10.1016/j.sysarc.201Q.09.005, pp. 641-653 (13 pages total).

Wang, Hongtao et al. “Efficient Data Placement for Zoned Namespaces (ZNS) SSDs.” Network and Parallel Computing, vol. 13615. Switzerland: Springer, Sep. 24, 2022, pp. 302-314, https://doi.org/10.1007/978-3-031-21395-3_28.

Office Action issued on Dec. 27, 2024 issued by the United States Patent Office in corresponding U.S. Appl. No. 18/238,819.

Sniavideo, Zoned Flash SSDs in Advanced Storage Systems (SDC 2019), Oct. 13, 2019, URL: https://www.youtube.com/watch?v=RxfRj5NSfbk, XP No. 93116356.

NVM Express, Zoned Namespace Command Set Specification, Revision 1.1a, Jul. 23, 2021, 46 pages.

U.S. Appl. No. 18/237,806, filed Aug. 24, 2023.

Communication dated Jun. 30, 2026, issued by the United States Patent and Trademark Office in U.S. Appl. No. 19/244,323.

* cited by examiner 100
110
Nonvolatile
Memory Device
SIGL1
SIGL2
120
Memory Controller
126
Memory
Manager
121
124
Processor
122
Host
Interface
127
ECC
123
Internal
Buffer
External
Host
Device

User Area
UA

Reserved Area
RVA

Meta Area
MA

LU (ZW) (HM)

LU (ZW) (HM)

LU (RW) (PM)

LU (RW) (PM)

LU (RW) (PM)

LU (RW) (PM)

Z1 (TLC) (Opened)

Z2 (TLC) (Opened)

Z3 (SLC) (Opened)

Z4 (TLC) (Closed)

User Area
UA

SWBB

Reserved Area
RVA

Meta Area
MA

LU (ZW) (HM)

LU (ZW) (HM)

LU (RW) (PM)

LU (RW) (PM)

LU (RW) (PM)

LU (RW) (PM)

SWBB

Z1 (TLC) (Opened)

Z2 (TLC) (Opened)

Z3 (SLC) (Opened)

Z4 (TLC) (Closed)

Figure 3C:
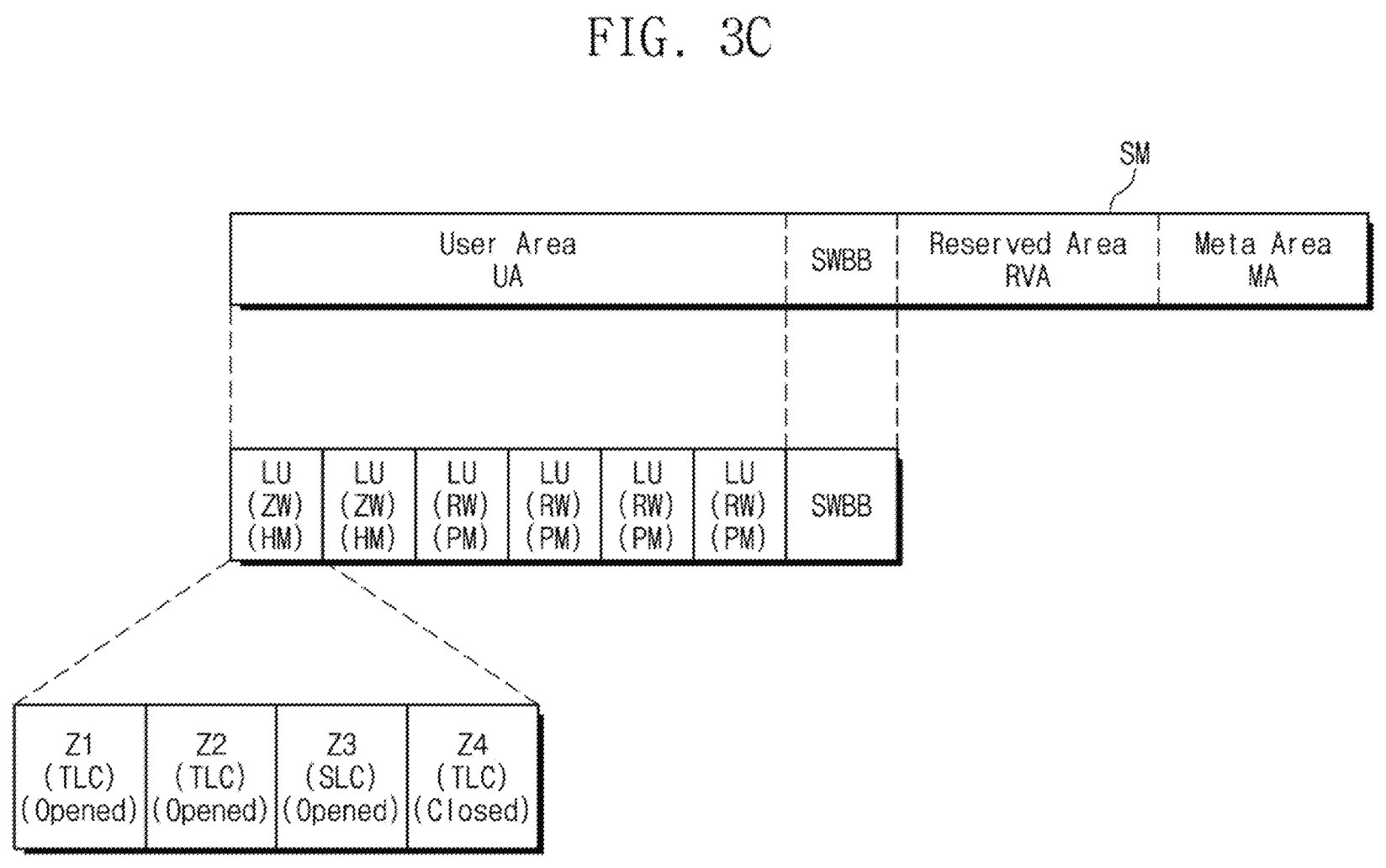

Meta Area MA

Reserved Area RVA

SWBB

User Area UA

SWBB

LU (RW) (PM)

LU (RW) (PM)

LU (RW) (PM)

LU (RW) (PM)

LU (ZW) (HM)

LU (ZW) (HM)

Z4 (TLC) (Closed)

Z3 (SLC) (Opened)

Z2 (TLC) (Opened)

Z1 (TLC) (Opened)

FIG. 6

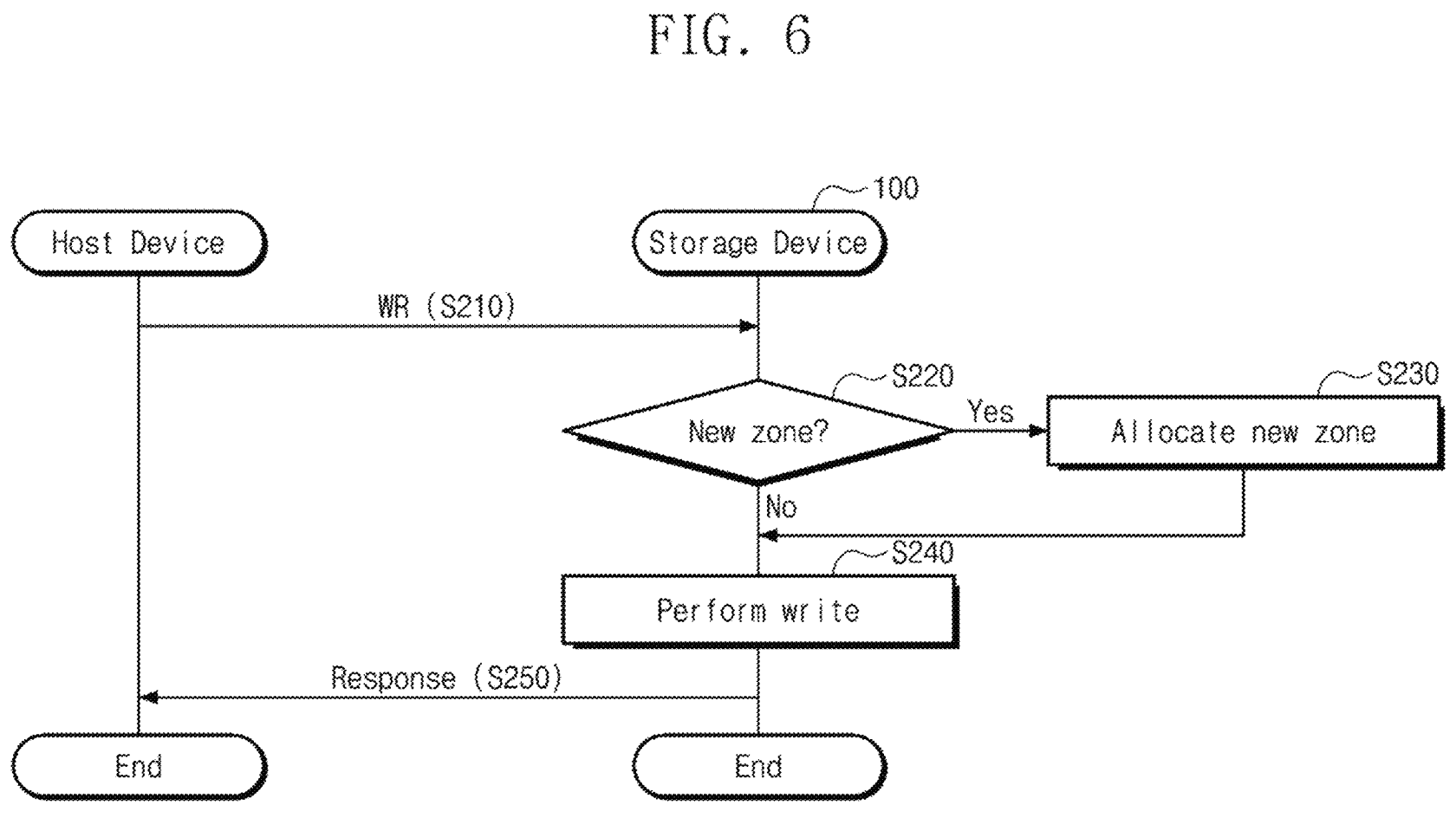

Host Device

Storage Device

100

WR (S210)

New zone?

S220

Yes

No

Allocate new zone

S230

Perform write

S240

Response (S250)

End

End

FIG. 10

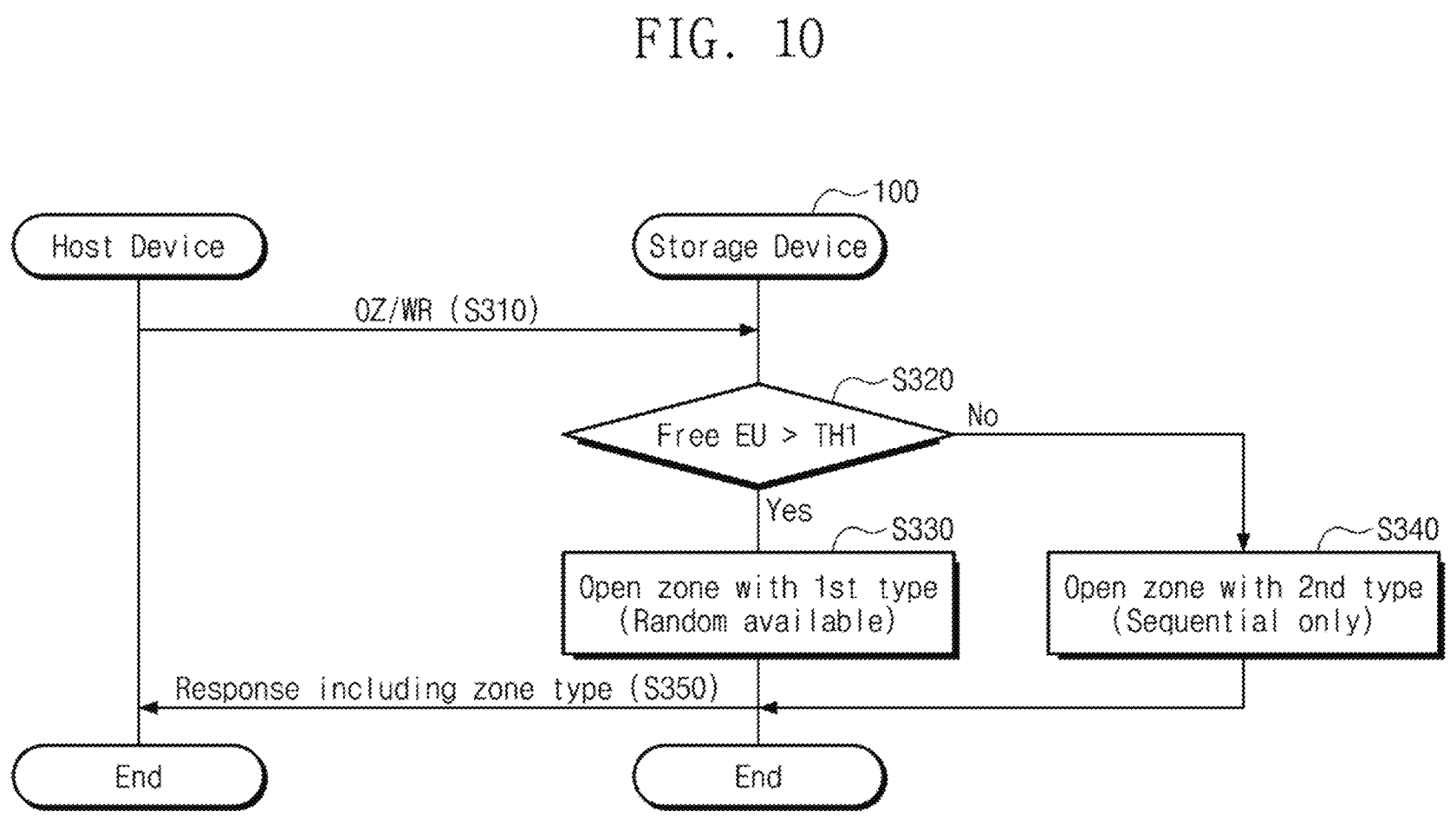

Host Device

Storage Device

100

OZ/WR (S310)

Free EU > TH1

S320

Yes

No

Open zone with 1st type (Random available)

S330

Open zone with 2nd type (Sequential only)

S340

Response including zone type (S350)

End

End

FIG. 11

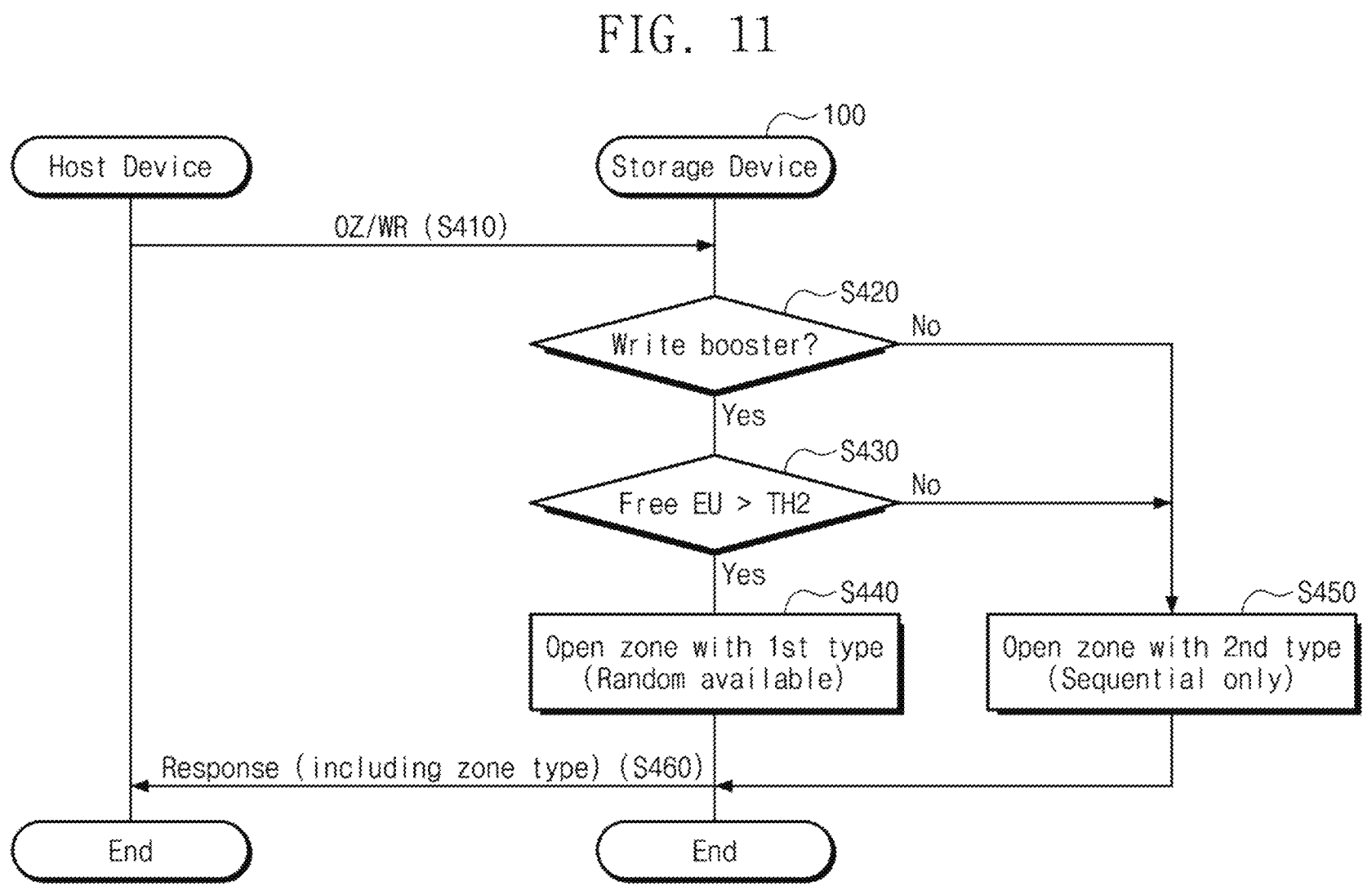

Host Device

Storage Device

100

OZ/WR (S410)

Write booster?

S420

Yes

No

Free EU > TH2

S430

Yes

No

Open zone with 1st type (Random available)

S440

Open zone with 2nd type (Sequential only)

S450

Response (including zone type) (S460)

End

End

FIG. 12

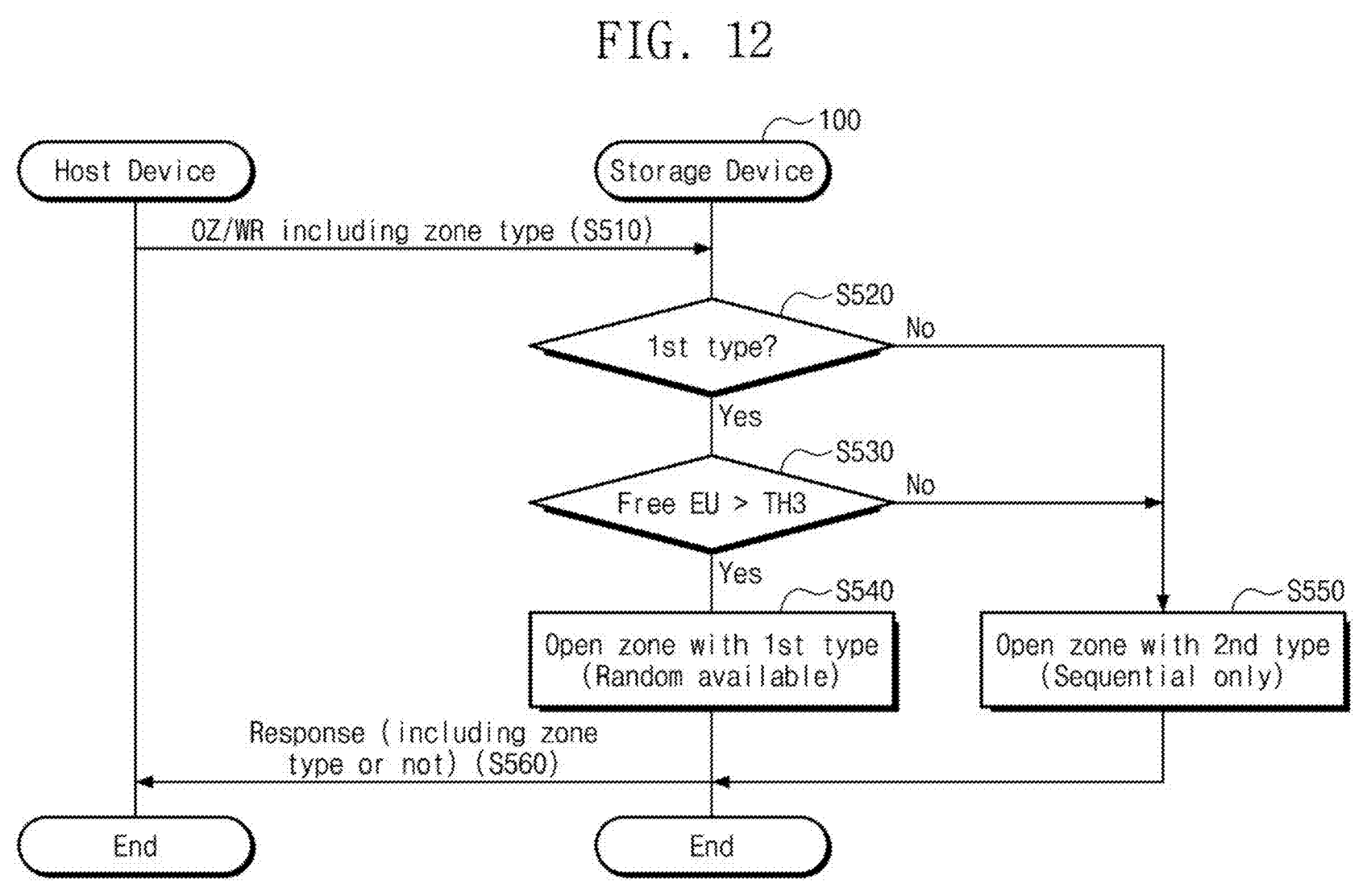

Host Device

Storage Device

100

OZ/WR including zone type (S510)

1st type?

S520

Yes

No

Free EU > TH3

S530

Yes

No

Open zone with 1st type (Random available)

S540

Open zone with 2nd type (Sequential only)

S550

Response (including zone type or not) (S560)

End

End

FIG. 13

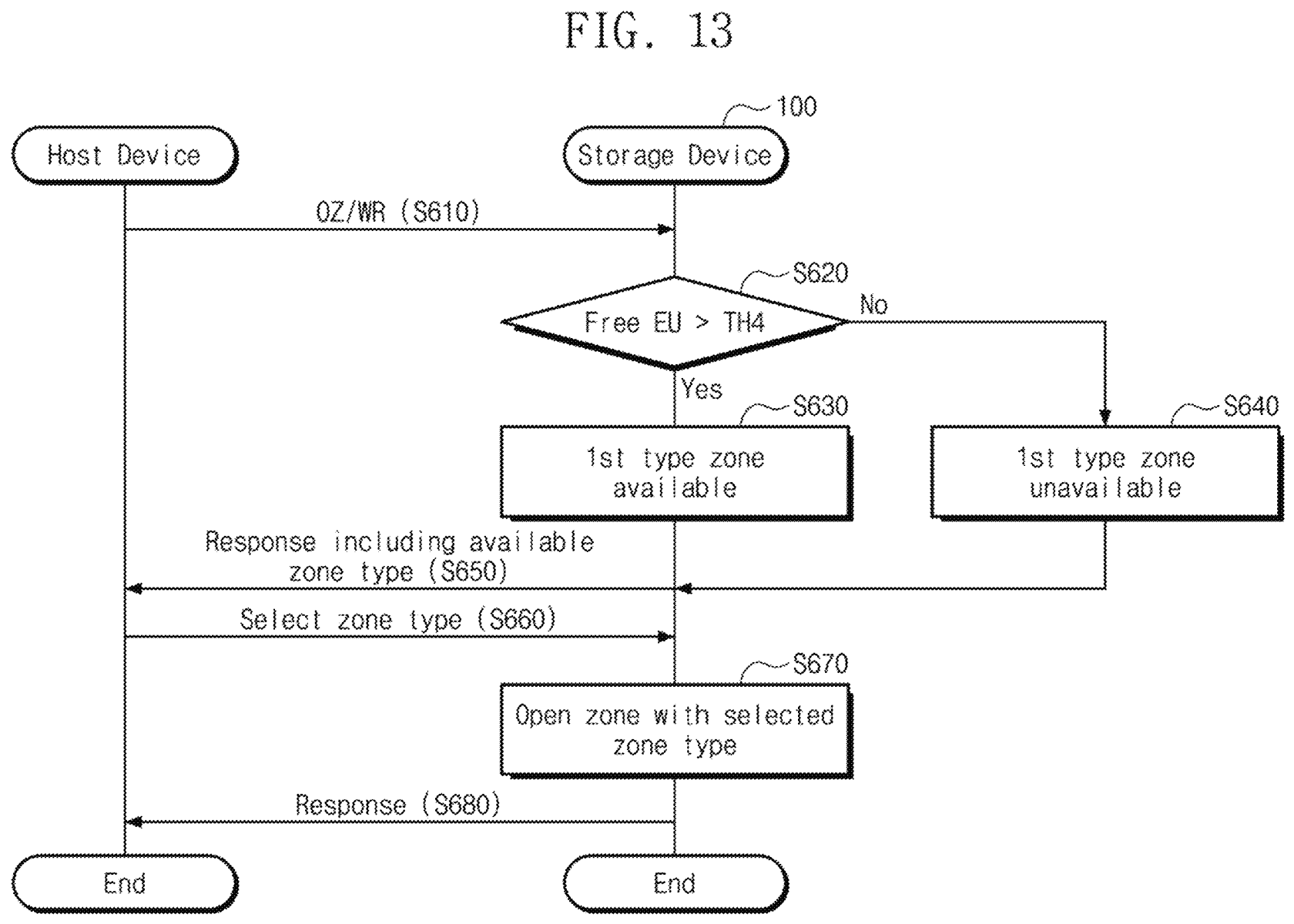

Host Device

Storage Device

100

OZ/WR (S610)

Free EU > TH4

S620

No

Yes

1st type zone available

S630

1st type zone unavailable

S640

Response including available zone type (S650)

Select zone type (S660)

Open zone with selected zone type

S670

Response (S680)

End

End

Host Device
Storage Device
OZ/WR including zone type (S810)
S820
1st type
No
Yes
S830
Select 2nd type zone
S840
Free EU > TH6
Yes
No
S850
Select 1st type zone
Response (including unavailable zone type) (S860)
Select 2nd type zone (S870)
S880
Open zone with selected zone type
Response (S890)
End
End

FIG. 17

123
Internal Buffer
MB
LBA
PBA
ZM
PM
RB
ZB
BA_Z5
BA_Z6
SDIN
Data
Data
Data
SWR
Data
110
Nonvolatile Memory Device
Z5 (TLC)
WL
Z6

Start

S1610
Target zone is closed?
No
Yes

S1620
Data are written in target zone?
No
Yes

S1650
Trigger migration

S1630
Activate zone map service

S1640
Flush page map table

End

FIG. 30

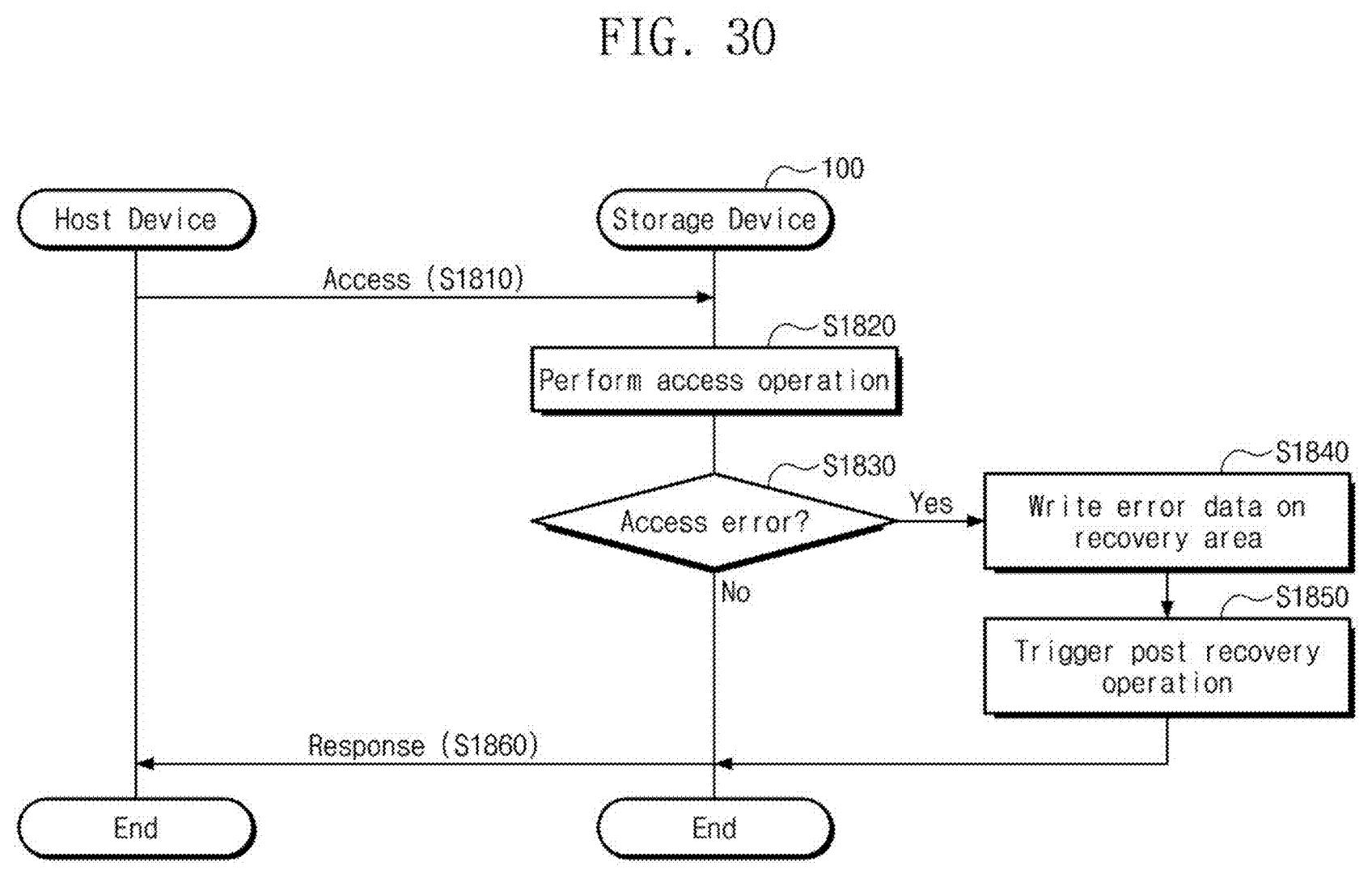

Host Device

Storage Device

100

Access (S1810)

S1820

Perform access operation

S1830

Access error?

Yes

No

S1840

Write error data on recovery area

S1850

Trigger post recovery operation

Response (S1860)

End

End

| Zone | Status | EU | VM |
|---|---|---|---|
| Z1 | Open | 5 | 0 |
| Z2 | Open | 4 | 0 |
| Z3 | Open | 7 | 0 |
| Z4 | Closed | 6 | 1 |
| Z5 | Open | 1 | 0 |
| Z6 | Open | 2 | 0 |
| Z7 | Open | 3 | 0 |
| Z8 | Open | 8 | 0 |

| Zone | Status | EU | VM |
|---|---|---|---|
| Z1 | Open | 5 | 0 |
| Z2 | Open | 4 | 0 |
| Z3 | Open | 7 | 0 |
| Z4 | Closed | 6 | 1 |
| Z5 | Open | 1 | 0 |
| Z6 | Open | 2 | 0 |
| Z7 | Open | Fail_1 | 0 |
| Z8 | Open | 8 | 0 |

FT

| Index | EU | EU_R | Fail Pointer | Next Entry | Migration |
|---|---|---|---|---|---|
| 1 | 3 | 9 | 300 | | |

| Index | EU | EU_R | Fail Pointer | Next Entry | Migration |
|---|---|---|---|---|---|
| 1 | 3 | 9 | 300 | 2 | |
| 2 | 9 | 10 | 500 | | |

SEQ
SEQ
WP0
WP299
WP300
WP499
EU10
WP500
WP799
EU9
WP300
WP500
EU3
WP300

| Index | EU | EU_R | Fail Pointer | Next Entry | Migration |
|---|---|---|---|---|---|
| 1 | 3 | 9 | 300 | 2 | |
| 2 | 9 | 10 | 100 | | |

123
Internal Buffer
MB
pPM
ZM
RB
ZB
BA_Z5
BA_Z6
SDIN
Data
Data
SWR
Data
110
Nonvolatile Memory Device
Z5 (TLC)
WU
Z6
EU (SLC)
EU (MLC)
Data

FIG. 55B

Source

| PBA | LBA |
|---|---|
| PBA1 | LBA1(S3311) |
| PBA2 | LBA3(S3312) |
| PBA3 | LBA4(S3313) |
| PBA4 | LBA6(S3314) |
| PBA5 | LBA7(S3315) |
| PBA6 | LBA9(S3316) |
| PBA7 | LBA10(S3317) |
| PBA8 | LBA12(S3318) |
| PBA9 | |
| PBA10 | |
| PBA11 | |
| PBA12 | |
| PBA13 | |
| PBA14 | |
| PBA15 | |
| PBA16 | |

MIG

Target Zone

| PBA | LBA |
|---|---|
| PBA1 | |
| PBA2 | |
| PBA3 | |
| PBA4 | |
| PBA5 | |
| PBA6 | |
| PBA7 | |
| PBA8 | |
| PBA9 | |
| PBA10 | |
| PBA11 | |
| PBA12 | |
| PBA13 | |
| PBA14 | |
| PBA15 | |
| PBA16 | |

FIG. 56

| WS | SWBB | VF |
|---|---|---|
| 1 | Z5 | I |
| 2 | Z5 | I |
| 3 | Z5 | I |
| 4 | Z6 | I |
| 5 | Z6 | I |
| 6 | Z5 | I |
| 7 | Z5 | V |
| 8 | Z6 | V |
| 9 | Z6 | V |
| 10 | Z6 | V |
| 11 | Z6 | V |
| 12 | Z5 | V |
| 13 | Z7 | V |
| 14 | Z7 | V |
| 15 | Z7 | V |
| 16 | Z5 | V |
| 17 | Z7 | V |
| 18 | Z6 | V |
| 19 | Z6 | V |
| 20 | Z5 | V |

FIG. 62A

110
Nonvolatile Memory Device
Z5
SR
PR
PR
Z6
Z7
EU (SLC)
EU (MLC)

123
Internal Buffer
MB
pPM
ZM
RB
ZB
BA_Z6
BA_Z5

FIG. 62B

110
Nonvolatile Memory Device
Z5
SR
PR
GZ
Z7
PR
EU (SLC)
EU (MLC)

123
Internal Buffer
MB
pPM
ZM
RB
ZB
BA_Z6
BA_Z5

FIG. 66A

| Byte \ Bit | 7 | 6 | 5 | 4 | 3 | 2 | 1 | 0 |
|---|---|---|---|---|---|---|---|---|
| 0 | Operation Code (A1h) | | | | | | | |
| 1 | WRPROTECT -000b | | | DPO | FUA | Reserved | FUA_NV -0b | Reserved |
| 2 | (MSB) | Logical Block Address | | | | | | |
| ... | | | | | | | | |
| 9 | | | | | | | | (LSB) |
| 10 | (MSB) | Transfer Length | | | | | | |
| ... | | | | | | | | |
| 13 | | | | | | | | (LSB) |
| 14 | Reserved | Reserved | | Group Number | | | | |
| 15 | Control-00h | | | | | | | |

FIG. 66B

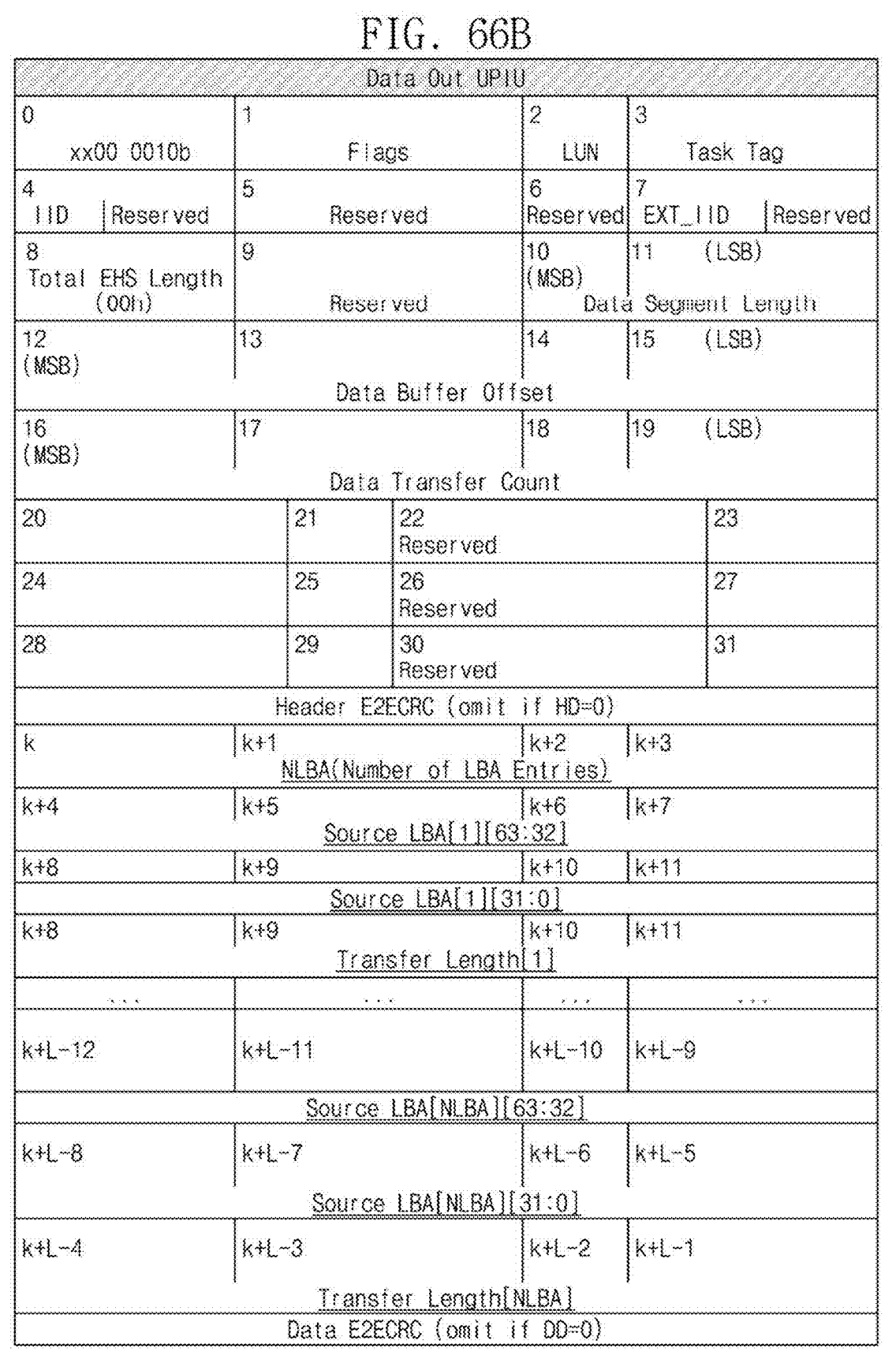

| Data Out UPIU | | | |
|---|---|---|---|
| 0<br>xx00 0010b | 1<br>Flags | 2<br>LUN | 3<br>Task Tag |
| 4<br>IID \| Reserved | 5<br>Reserved | 6<br>Reserved | 7<br>EXT_IID \| Reserved |
| 8<br>Total EHS Length (00h) | 9<br>Reserved | 10<br>(MSB)<br>Data Segment Length | 11 (LSB) |
| 12<br>(MSB)<br>Data Buffer Offset | 13 | 14 | 15 (LSB) |
| 16<br>(MSB)<br>Data Transfer Count | 17 | 18 | 19 (LSB) |
| 20 | 21 | 22<br>Reserved | 23 |
| 24 | 25 | 26<br>Reserved | 27 |
| 28 | 29 | 30<br>Reserved | 31 |
| Header E2ECRC (omit if HD=0) | | | |
| k<br>NLBA(Number of LBA Entries) | k+1 | k+2 | k+3 |
| k+4<br>Source LBA[1][63:32] | k+5 | k+6 | k+7 |
| k+8 | k+9 | k+10 | k+11 |
| Source LBA[1][31:0] | | | |
| k+8<br>Transfer Length[1] | k+9 | k+10 | k+11 |
| ... | ... | ... | ... |
| k+L-12 | k+L-11 | k+L-10 | k+L-9 |
| Source LBA[NLBA][63:32] | | | |
| k+L-8<br>Source LBA[NLBA][31:0] | k+L-7 | k+L-6 | k+L-5 |
| k+L-4<br>Transfer Length[NLBA] | k+L-3 | k+L-2 | k+L-1 |
| Data E2ECRC (omit if DD=0) | | | |

FIG. 70A

| Byte \ Bit | 7 | 6 | 5 | 4 | 3 | 2 | 1 | 0 |
|---|---|---|---|---|---|---|---|---|
| 0 | Operation Code (8Ah) | | | | | | | |
| 1 | WRPROTECT -000b | | | DPO | FUA | ZCC | FUA_NV -0b | Reserved |
| 2 | (MSB) | Logical Block Address | | | | | | |
| ... | | | | | | | | |
| 9 | | | | | | | | (LSB) |
| 10 | (MSB) | Transfer Length | | | | | | |
| ... | | | | | | | | |
| 13 | | | | | | | | (LSB) |
| 14 | Reserved | Reserved | | Group Number | | | | |
| 15 | Control-00h | | | | | | | |

FIG. 70B

| Dword \ Bit | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
| 0 | Signature (0x5950435A : ASCII "ZCPY") | | | | | | | | | | | | | | | | | | | | | | | | | | | | | | | |
| 1 | Header Size | | | | | | | | | | | | | | | | | | | | | | | | | | | | | | | |
| 2 | Valid Bitmap Size | | | | | | | | | | | | | | | | | | | | | | | | | | | | | | | |
| 3 | Source Zone ID | | | | | | | | | | | | | | | | | | | | | | | | | | | | | | | |
| 4 | | | | | | | | | | | | | | | | | | | | | | | | | | | | | | | | |
| 5 | Source Zone Write Pointer (LBA) | | | | | | | | | | | | | | | | | | | | | | | | | | | | | | | |
| 6 | | | | | | | | | | | | | | | | | | | | | | | | | | | | | | | | |
| 7 | Target Zone ID | | | | | | | | | | | | | | | | | | | | | | | | | | | | | | | |
| 8 | | | | | | | | | | | | | | | | | | | | | | | | | | | | | | | | |
| 9 | Target Zone Write Pointer (LBA) | | | | | | | | | | | | | | | | | | | | | | | | | | | | | | | |
| 10 | | | | | | | | | | | | | | | | | | | | | | | | | | | | | | | | |
| 11 | Zone copy Migration Ratio | | | | | | | | | | | | | | | | Zone copy User write Ratio | | | | | | | | | | | | | | | |
| 12 | Valid Block Count | | | | | | | | | | | | | | | | | | | | | | | | | | | | | | | |
| 13 | Request Block Count | | | | | | | | | | | | | | | | | | | | | | | | | | | | | | | |
| 14 | Reserved | | | | | | | | | | | | | | | | | | | | | | | | | | | | | | | |
| 15 | | | | | | | | | | | | | | | | | | | | | | | | | | | | | | | | |
| 16 | | | | | | | | | | | | | | | | | | | | | | | | | | | | | | | | |
| ... | | | | | | | | | | | | | | | | | | | | | | | | | | | | | | | | |
| 15 + Valid Bitmap Size | | | | | | | | | | | | | | | | | | | | | | | | | | | | | | | | |

STORAGE DEVICE INCLUDING NONVOLATILE MEMORY DEVICE AND OPERATING METHOD OF STORAGE DEVICE

CROSS-REFERENCE TO RELATED APPLICATIONS

This is a Continuation of U.S. application Ser. No. 18/237,806 filed Aug. 24, 2023, which claims priority under 35 U.S.C. § 119 to Korean Patent Application Nos. 10-2022-0109942 filed on Aug. 31, 2022, 10-2022-0149964 filed on Nov. 10, 2022, 10-2023-0005050 filed on Jan. 12, 2023, 10-2023-0005013 filed on Jan. 12, 2023, 10-2023-0004966 filed on Jan. 12, 2023, 10-2023-0005044 filed on Jan. 12, 2023, 10-2023-0005043 filed on Jan. 12, 2023, 10-2023-0005046 filed on Jan. 12, 2023, 10-2023-0005058 filed on Jan. 12, 2023, 10-2023-0005040 filed on Jan. 12, 2023, 10-2023-0005053 filed on Jan. 12, 2023, 10-2023-0005048 filed on Jan. 12, 2023, 10-2023-0005033 filed on Jan. 12, 2023, 10-2023-0005041 filed on Jan. 12, 2023, and 10-2023-0004994 filed on Jan. 12, 2023, in the Korean Intellectual Property Office, the disclosures of which are incorporated by reference herein in their entireties.

BACKGROUND

1. Field

The disclosure relates to an electronic device, and more particularly, relate to a storage device including a nonvolatile memory device and an operating method of the storage device.

2. Description of Related Art

A storage device may refer to a device which stores data under control of a host device such as a computer, a smartphone, or a smart pad. The storage device may include a device which stores data on a magnetic disk such as a hard disk drive (HDD), or a device which stores data in a semiconductor memory, for example a nonvolatile memory such as a solid state drive (SSD) or a memory card.

A nonvolatile memory may include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), etc.

The operating speed of the host device may be improved as semiconductor manufacturing technologies develop. Also, the size of content used in the storage device and the host device of the storage device. For at least these reasons, a storage device with improved operating speed may be beneficial.

SUMMARY

Provided is a storage device with an improved operating speed, and an operating method of the storage device.

Additional aspects will be set forth in part in the description which follows and, in part, will be apparent from the description, or may be learned by practice of the presented embodiments.

In accordance with an aspect of the disclosure, a storage device includes a nonvolatile memory device including a plurality of memory cells; and a controller configured to perform a write operation on at least one write unit included in the plurality of memory cells, and to perform an erase operation on at least one erase unit included in the plurality of memory cells, wherein, based on receiving an open zone command from an external host device, the controller is further configured to: based on a number of free erase units from among a plurality of erase units included in the plurality of memory cells being greater than a threshold value, allocate at least two free erase units from among the free erase units to a first-type zone, and based on the number of the free erase units being smaller than or equal to the threshold value, allocate the at least two free erase units to a second-type zone, wherein a number of bits per memory cell of the first-type zone is smaller than a number of bits per memory cell of the second-type zone, wherein the controller is further configured to permit a random write based on a random logical address received from the external host device for the first-type zone, and wherein the controller is further configured to permit a zone write based on a sequential logical address received from the external host device for the second-type zone.

In accordance with an aspect of the disclosure, a storage device includes a nonvolatile memory device including a plurality of memory cells; and a controller configured to perform a write operation on at least one write unit included in the plurality of memory cells, and to perform an erase operation on at least one erase unit included in the plurality of memory cells, wherein the controller is further configured to: allocate a plurality of zones to a storage space of the nonvolatile memory device based on a request received from an external host device, select two or more erase units from among a plurality of erase units of the plurality of memory cells to be allocated to each zone of the plurality of zones, fixedly and sequentially manage logical addresses of data to be written in the plurality of zones, receive a write request for a first zone from among the plurality of zones from the external host device, the write request corresponding to write data received from the external host device, and based on an amount of the write data exceeding a free capacity of the first zone, open a second zone which follows the first zone in the logical addresses based on a feature of the first zone and a feature of the second zone.

In accordance with an aspect of the disclosure, a storage device includes a nonvolatile memory device including a plurality of memory cells; and a controller configured to perform a write operation on at least one write unit included in the plurality of memory cells, and to perform an erase operation at least one erase unit included the plurality of memory cells, wherein, based on an open zone command received from an external host device, the controller is further configured to: based on a number of free erase units from among a plurality of erase units included in the plurality of memory cells being greater than a threshold value, allocate at least two free erase units from among the free erase units to a first-type zone, based on the number of the free erase units being smaller than or equal to the threshold value, allocate the at least two free erase units to a second-type zone, receive a write request for a first zone from the external host device, the write request corresponding to write data received from the external host device, and based on an amount of the write data exceeding a free capacity of the first zone, open a second zone based on a feature of the first zone and a feature of the second zone, wherein logical addresses corresponding to the second zone follow logical addresses corresponding to the first zone.

In accordance with an aspect of the disclosure, a storage device includes a nonvolatile memory device including a plurality of memory cells; and a controller configured to: based on receiving an open zone command from an external host device, determine a number of a plurality of free erase units from among a plurality of erase units included in the plurality of memory cells, and allocate a group of free erase units from among the plurality of free erase units to a zone having a zone type which is determined based on the number of the plurality of free erase units, wherein, based on the number of the plurality of free erase units being greater than a threshold value, the zone type includes a first zone type corresponding to a random write scheme, wherein random write operations performed according to the random write scheme are not constrained to be sequential, wherein, based on the number of the free erase units being smaller than or equal to the threshold value, the zone type includes a second zone type corresponding to a zone write scheme, wherein zone write operations performed according to the zone write scheme are constrained to be sequential, and wherein a number of bits per memory cell corresponding to the first zone type is smaller than a number of bits per memory cell corresponding to the second zone type.

In accordance with an aspect of the disclosure, a storage device includes a nonvolatile memory device including a plurality of memory cells; and a controller configured to: receive write command from an external host device, wherein the write command corresponds to data received from the external host device and indicates a first zone from among a plurality of zones corresponding to the plurality of memory cells, determine whether an amount of the data is larger than an available space in the first zone, based on determining that an amount of the data is larger than the available space in the first zone, open a second zone following the first zone, and perform an over-zone write operation to write the data to the first zone and the second zone.

In accordance with an aspect of the disclosure, a method of managing a storage device includes, based on receiving an open zone command from an external host device, determining a number of a plurality of free erase units from among a plurality of erase units included in a plurality of memory cells of a nonvolatile memory device included in the storage device; and allocating a group of free erase units from among the plurality of free erase units to a zone having a zone type which is determined based on the number of the plurality of free erase units, wherein, based on the number of the plurality of free erase units being greater than a threshold value, the zone type includes a first zone type corresponding to a random write scheme, wherein random write operations performed according to the random write scheme are not constrained to be sequential, wherein, based on the number of the free erase units being smaller than or equal to the threshold value, the zone type includes a second zone type corresponding to a zone write scheme, wherein zone write operations performed according to the zone write scheme are constrained to be sequential, and wherein a number of bits per memory cell corresponding to the first zone type is smaller than a number of bits per memory cell corresponding to the second zone type.

BRIEF DESCRIPTION OF DRAWINGS

The above and other aspects, features, and advantages of certain embodiments of the present disclosure will be apparent from the following description taken in conjunction with the accompanying drawings, in which:

FIGS. 3A to 3E are diagram illustrating an example in which a memory controller of a storage device manages a storage space of a nonvolatile memory device, according to an embodiment;

FIG. 6 is a diagram illustrating a second example in which a zone of a storage device is opened by an external host device, according to an embodiment;

FIG. 10 is a diagram illustrating a first example in which a storage device opens a reserved zone, according to an embodiment;

FIG. 11 is a diagram illustrating a second example in which a storage device opens a reserved zone, according to an embodiment;

FIG. 12 is a diagram illustrating a third example in which a storage device opens a reserved zone, according to an embodiment;

FIG. 13 is a diagram illustrating a fourth example in which a storage device opens a reserved zone, according to an embodiment;

FIG. 17 is a diagram illustrating an example in which data are written in a nonvolatile memory device based on the method of FIG. 16, according to an embodiment;

FIG. 30 is a diagram illustrating an example of a recovery where a storage device processes an access error, according to an embodiment;

FIGS. 36A and 36B are diagrams illustrating an example in which a zone map table is updated when an access error occurs, according to an embodiment;

FIGS. 37A to 37F are diagrams illustrating how a fail table is generated and updated as an access error occurs, according to an embodiment;

FIG. 55A to FIG. 55D are diagrams illustrating an example of a process in which a storage device performs migration, according to an embodiment;

FIG. 56 is a diagram illustrating an example in which a storage device writes data in a shared write booster buffer, according to an embodiment;

FIGS. 62A and 62B are diagrams illustrating an example in which an over-zone prefetch is performed, according to an embodiment;

FIG. 66A is a diagram illustrating an example of a format of a zone copy request of FIG. 65, according to an embodiment;

FIG. 66B is a diagram illustrating an example of a format through which source information of FIG. 65 is received, according to an embodiment;

FIG. 70A is a diagram illustrating an example of a format of a zone copy request of FIG. 69, according to an embodiment;

FIG. 70B is a diagram illustrating an example of a transfer length of FIG. 70A, according to an embodiment;

DETAILED DESCRIPTION

Below, embodiments of the present disclosure will be described in detail with reference to the accompanying drawings. Below, the term "and/or" is intended to include any one of items listed with regard to the term, or a combination of some of the listed items.

Figure 1:
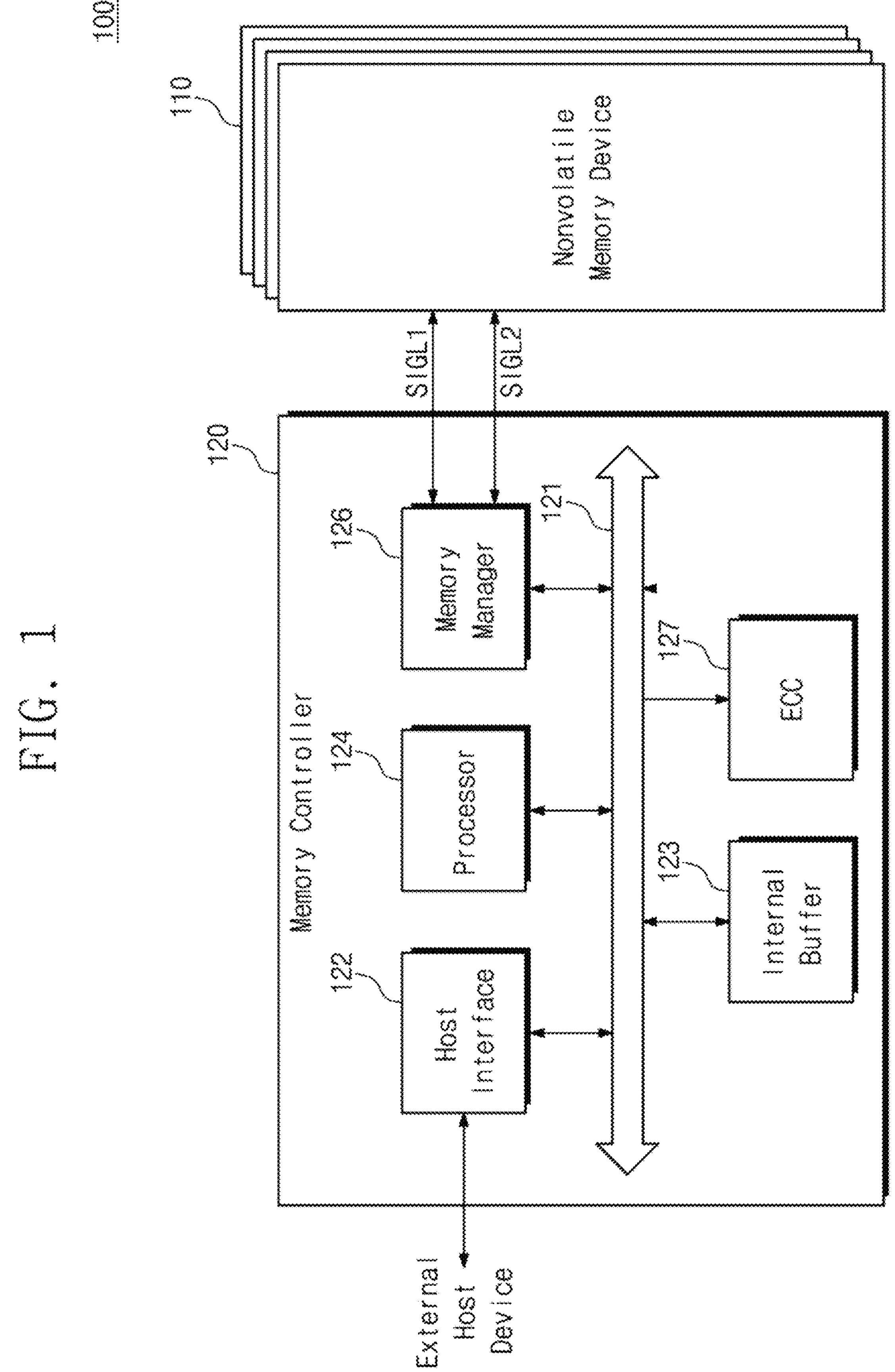
FIG. 1 is a diagram illustrating a storage device according to an embodiment.

FIG. 1 illustrates a storage device 100 according to an embodiment of the present disclosure. Referring to FIG. 1, the storage device 100 may include a nonvolatile memory device 110 and a memory controller 120. The nonvolatile memory device 110 may include a plurality of memory cells. Each of the plurality of memory cells may store one bit or two or more bits.

For example, the nonvolatile memory device 110 may include at least one of various nonvolatile memory devices such as a flash memory device, a phase change memory device, a ferroelectric memory device, a magnetic memory device, and a resistive memory device.

The memory controller 120 may receive requests for writing data in the nonvolatile memory device 110, or for reading data from the nonvolatile memory device 110, from an external host device.

The memory controller 120 may access the nonvolatile memory device 110 through first signal lines SIGL1 and second signal lines SIGL2. For example, the memory controller 120 may transmit a command and an address to the nonvolatile memory device 110 through the first signal lines SIGL1. The memory controller 120 may exchange data with the nonvolatile memory device 110 through the first signal lines SIGL1.

The memory controller 120 may transmit a first control signal to the nonvolatile memory device 110 through the second signal lines SIGL2. The memory controller 120 may receive a second control signal from the nonvolatile memory device 110 through the second signal lines SIGL2.

In an embodiment, the nonvolatile memory device 110 may include two or more nonvolatile memory chips. The memory controller 120 may be configured to control two or more nonvolatile memory chips. The memory controller 120 may provide first signal lines and second signal lines for each of the two or more nonvolatile memory chips.

As another example, the memory controller 120 may share the first signal lines with two or more nonvolatile memory chips. In an embodiment, the memory controller 120 may share some of the second signal lines between some of the two or more nonvolatile memory chips, and may provide the others of the second signal lines for each of the two or more nonvolatile memory chips.

The memory controller 120 may include a bus 121, a host interface 122, an internal buffer 123, a processor 124, a memory manager 126, and an error correction code block 127 (illustrated as "ECC").

The bus 121 may provide communication channels between the components in the memory controller 120. The host interface 122 may receive requests from the external host device and may parse the received requests. The host interface 122 may store the parsed requests in the internal buffer 123.

The host interface 122 may transmit responses to the external host device. The host interface 122 may exchange signals with the external host device in compliance with a given communication protocol. For example, the host interface 122 may exchange signals with the external host device in compliance with a Universal Flash Storage (UFS) communication protocol. The internal buffer 123 may include a random access memory. For example, the internal buffer 123 may include a static random access memory or a dynamic random access memory.

The processor 124 may drive an operating system or firmware for an operation of the memory controller 120. The processor 124 may read the parsed requests stored in the internal buffer 123 and may generate commands and addresses for controlling the nonvolatile memory device 110. The processor 124 may provide the generated commands and addresses to the memory manager 126.

The processor 124 may store meta data for managing the storage device 100 in the internal buffer 123. The processor 124 may control the memory manager 126 such that the user data stored in the internal buffer 123 are transferred to the nonvolatile memory device 110.

The processor 124 may control the host interface 122 such that the data stored in the internal buffer 123 are transferred to the external host device. The processor 124 may control the memory manager 126 such that the data received from the nonvolatile memory device 110 are stored in the internal buffer 123. The processor 124 may control the host interface 122 such that the data received from the external host device are stored in the internal buffer 123.

The memory manager 126 may communicate with the nonvolatile memory device 110 through the first signal lines SIGL1 and the second signal lines SIGL2 under control of the processor 124.

The memory manager 126 may access the nonvolatile memory device 110 under control of the processor 124. For example, the memory manager 126 may access the nonvolatile memory device 110 through the first signal lines SIGL1 and the second signal lines SIGL2. The memory manager 126 may communicate with the nonvolatile memory device 110 based on a protocol, for example a protocol that is defined in compliance with a standard, or is defined by a manufacturer.

The error correction code block 127 may perform error correction encoding on data to be transmitted to the nonvolatile memory device 110 using an error correction code ECC. The error correction code block 127 may perform error correction decoding on data received from the nonvolatile memory device 110 using the error correction code ECC.

Figure 2:
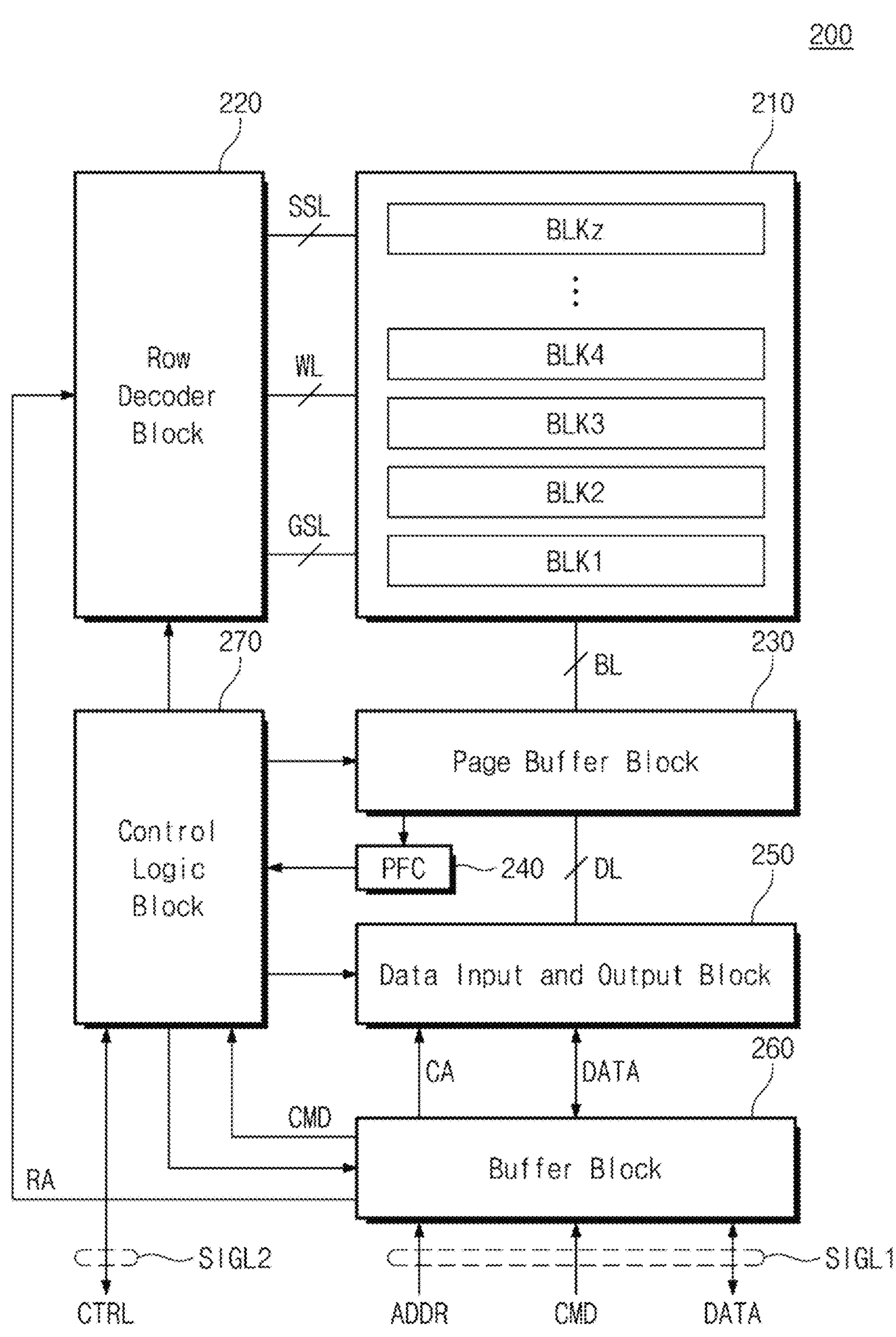
FIG. 2 is a block diagram illustrating a nonvolatile memory device according to an embodiment.

FIG. 2 is a block diagram illustrating a nonvolatile memory device 200 according to an embodiment of the present disclosure. In an embodiment, the nonvolatile memory device 200 may correspond to the nonvolatile memory device 110 of FIG. 1. Referring to FIGS. 1 and 2, the nonvolatile memory device 200 may include a memory cell array 210, a row decoder block 220, a page buffer block 230, a pass/fail check block 240 (illustrated as "PFC"), a data input and output block 250, a buffer block 260, and a control logic block 270.

The memory cell array 210 may include a plurality of memory blocks BLK1 to BLKz. Each of the memory blocks BLK1 to BLKz may include a plurality of memory cells. Each of the memory blocks BLK1 to BLKz may be connected with the row decoder block 220 through at least one ground selection line GSL, word lines WL, and at least one string selection line SSL. Some of the word lines WL may be used as dummy word lines. Each of the memory blocks BLK1 to BLKz may be connected with the page buffer block 230 through a plurality of bit lines BL. The plurality of memory blocks BLK1 to BLKz may be connected in common with the plurality of bit lines BL.

In an embodiment, each of the memory blocks BLK1 to BLKz may be a unit of an erase operation. In an embodiment, a "unit of" an operation, or an operation being performed in "units of" an element, may mean that the basic unit corresponding to the operation is the element. For example, this may mean that the operation may be specified by or correspond to one or more instances of the element, or that the element is the smallest unit on which the operation is performed. Accordingly, based on each of the memory blocks BLK1 to BLKz being a unit of the erase operation, the memory cells belonging to each of the memory blocks BLK1 to BLKz may be erased at the same time, for example during a single erase operation. As another example, each of the memory blocks BLK1 to BLKz may be divided into a plurality of sub-blocks. Each of the plurality of sub-blocks may correspond to a unit of the erase operation. Accordingly, memory cells belonging to each sub-block may be erased at the same time. Below, the unit of the erase operation may be referred to as an "erase unit". In an embodiment, the erase unit may be a memory block or a sub-block.

Each memory block may include a plurality of pages. The plurality of pages may be respectively connected with the word lines WL. Each of the pages may be a unit of a write operation. The unit of the write operation may be referred to as a "write unit".

Bits that are written in memory cells of one page may be included in logical pages. When three bits are written in one memory cell, one physical page may include three logical pages. When one bit is written in one memory cell, one physical page may include one logical page. The logical page, the logical pages, or the physical page may be a unit of the read operation. The unit of the read operation may be referred to as a "read unit".

The row decoder block 220 may be connected with the memory cell array 210 through the ground selection lines GSL, the word lines WL, and the string selection lines SSL. The row decoder block 220 may operate under control of the control logic block 270.

The row decoder block 220 may decode a row address RA received from the buffer block 260 and may control voltages to be applied to the string selection lines SSL, the word lines WL, and the ground selection lines GSL based on the decoded row address.

The page buffer block 230 may be connected with the memory cell array 210 through the plurality of bit lines BL. The page buffer block 230 is connected with the data input and output block 250 through a plurality of data lines DL. The page buffer block 230 may operate under control of the control logic block 270.

In a program operation, the page buffer block 230 may store data to be written in memory cells. The page buffer block 230 may apply voltages to the plurality of bit lines BL based on the stored data. In a read operation or in a verify read operation that may be performed during the program operation or the erase operation, the page buffer block 230 may sense voltages of the bit lines BL and may store a sensing result.

In the verify read operation associated with the program operation or the erase operation, the pass/fail check block 240 may verify the sensing result of the page buffer block 230. For example, in the verify read operation associated with the program operation, the pass/fail check block 240 may count the number of values respectively corresponding to on-cells that are not programmed to a target threshold voltage or more. In an embodiment, the number of values may be a number of zeros ("0s"), but embodiments are not limited thereto.

In the verify read operation associated with the erase operation, the pass/fail check block 240 may count the number of values respectively corresponding to off-cells that are not erased to a target threshold voltage or less. In an embodiment, the number of values may be a number of ones ("1s"), but embodiments are not limited thereto. When the counting result is greater than or equal to a threshold value, the pass/fail check block 240 may output a signal indicating a fail to the control logic block 270. When the counting result is smaller than the threshold value, the pass/fail check block 240 may output a signal indicating a pass to the control logic block 270. Depending on the verification result of the pass/fail check block 240, a program loop of the program operation may be further performed, or an erase loop of the erase operation may be further performed.

The data input and output block 250 may be connected with the page buffer block 230 through the plurality of data lines DL. The data input and output block 250 may receive a column address CA from the buffer block 260. The data input and output block 250 may output data read by the page buffer block 230 to the buffer block 260 depending on the column address CA. The data input and output block 250 may provide data received from the buffer block 260 to the page buffer block 230, based on the column address CA.

Through the first signal lines SIGL1, the buffer block 260 may receive a command CMD and an address ADDR from an external device and may exchange data DATA with the external device. The buffer block 260 may operate under control of the control logic block 270. The buffer block 260 may provide the command CMD to the control logic block 270. The buffer block 260 may provide the row address RA of the address ADDR to the row decoder block 220 and may provide the column address CA of the address ADDR to the data input and output block 250. The buffer block 260 may exchange the data DATA with the data input and output block 250.

The control logic block 270 may exchange a control signal CTRL with the external device through the second signal lines SIGL2. The control logic block 270 may allow the buffer block 260 to route the command CMD, the address ADDR, and the data DATA. The control logic block 270 may decode the command CMD received from the buffer block 260 and may control the nonvolatile memory device 200 based on the decoded command.

In an embodiment, the nonvolatile memory device 200 may be manufactured using a bonding method. The memory cell array 210 may be manufactured using a first wafer, and the row decoder block 220, the page buffer block 230, the data input and output block 250, the buffer block 260, and the control logic block 270 may be manufactured using a second wafer. The nonvolatile memory device 200 may be implemented by coupling the first wafer and the second wafer such that an upper surface of the first wafer and an upper surface of the second wafer face each other.

As another example, the nonvolatile memory device 200 may be manufactured in a cell over peri (COP) method. A peripheral circuit including the row decoder block 220, the page buffer block 230, the data input and output block 250, the buffer block 260, and the control logic block 270 may be implemented on a substrate. The memory cell array 210 may be implemented over the peripheral circuit. The peripheral circuit and the memory cell array 210 may be connected using through vias.

In an embodiment, the storage device 100 may be a zoned storage device. The zoned storage device may manage a storage space in units of a zone, in at least a portion of the storage space of the nonvolatile memory device 110. For example, when the external host device requests a data write operation, the storage device 100 may open a zone. The opening of the zone may include allocating a new zone, in which data are not written, for the data write operation. For example, the zone may include at least one erase unit or at least two erase units. In the opened zone, the external host device may write data based on sequential logical addresses (e.g., logical block addresses).

Because the external host device writes the data based on the sequential logical addresses within the zone, the storage device 100 may write the data corresponding to the sequential logical addresses at pages corresponding to sequential physical addresses.

The zone may be closed by the external host device. The closing of the zone may include allocating the zone, in which the data are written, in order to be used for read operations (even though there may be a page where data are not written) without additionally writing data therein.

The zone may be reset by the external host device. The resetting of the zone may include allowing the memory controller 120 to erase data of an invalidated zone at an arbitrary time or as desired or needed, by invalidating data written in the zone. Because zone invalidation may be managed by the external host device, a zone-based garbage collection operation may also be managed by the external host device.

Figure 3A:
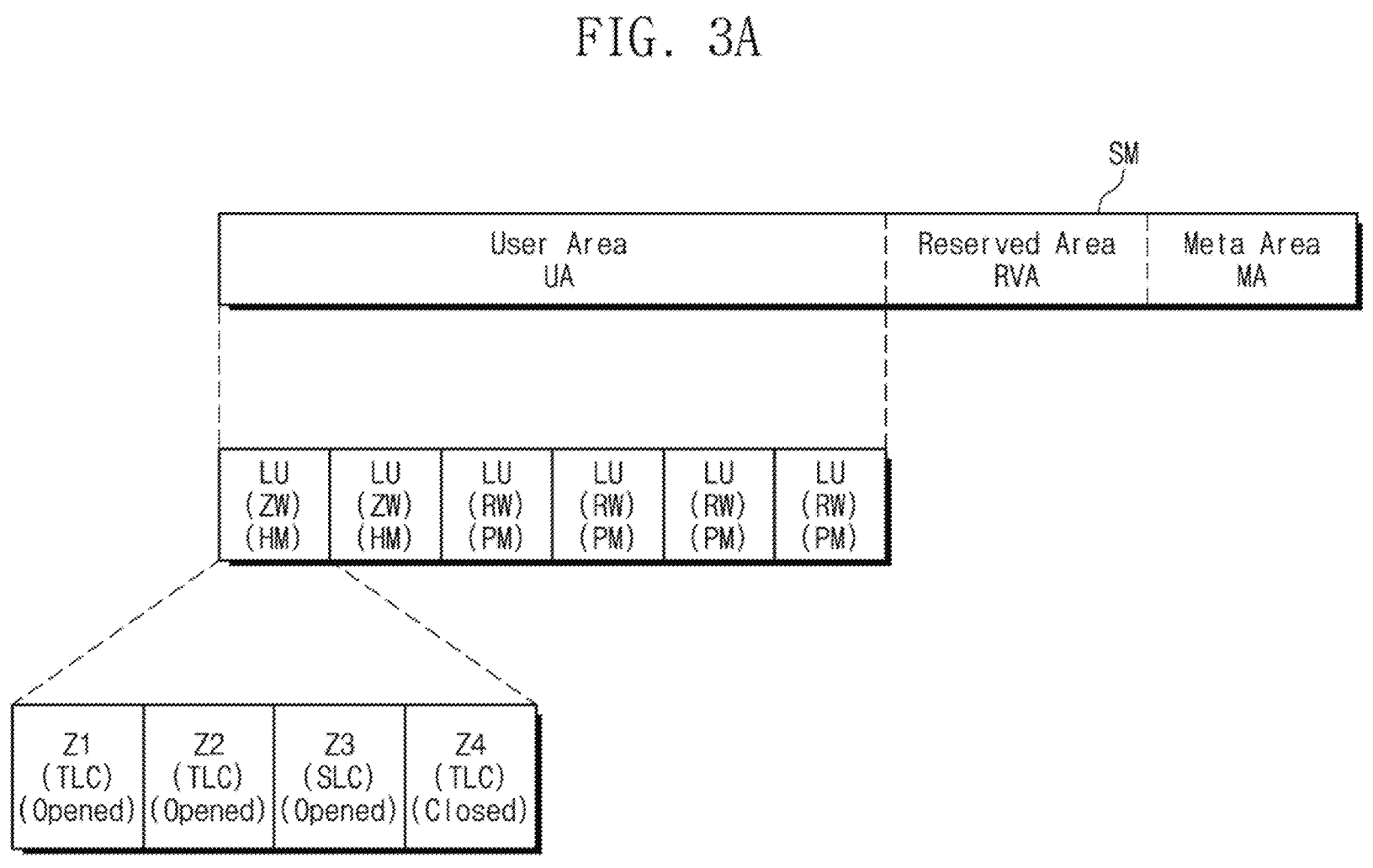
Figure 3B:
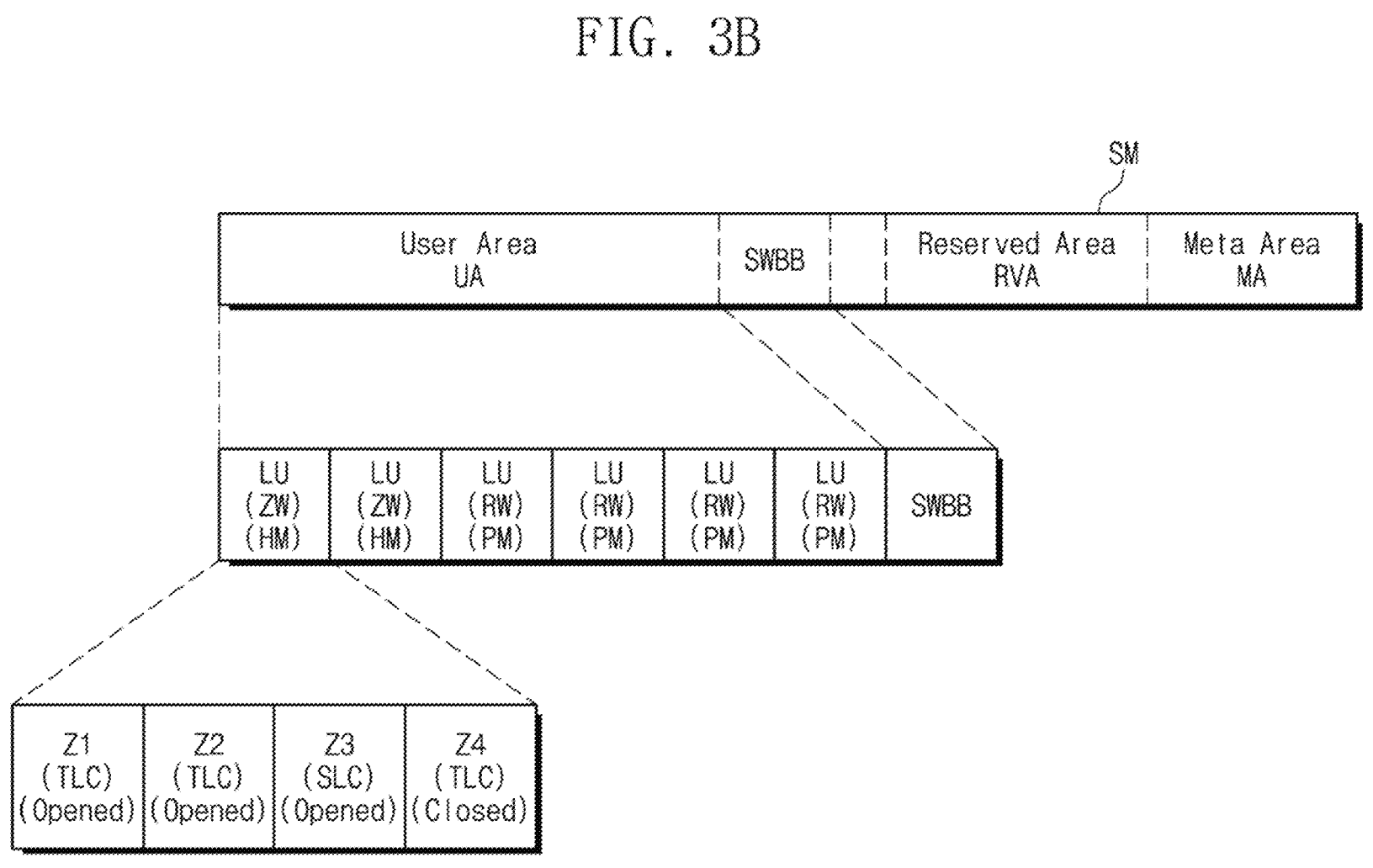
Figure 3D:
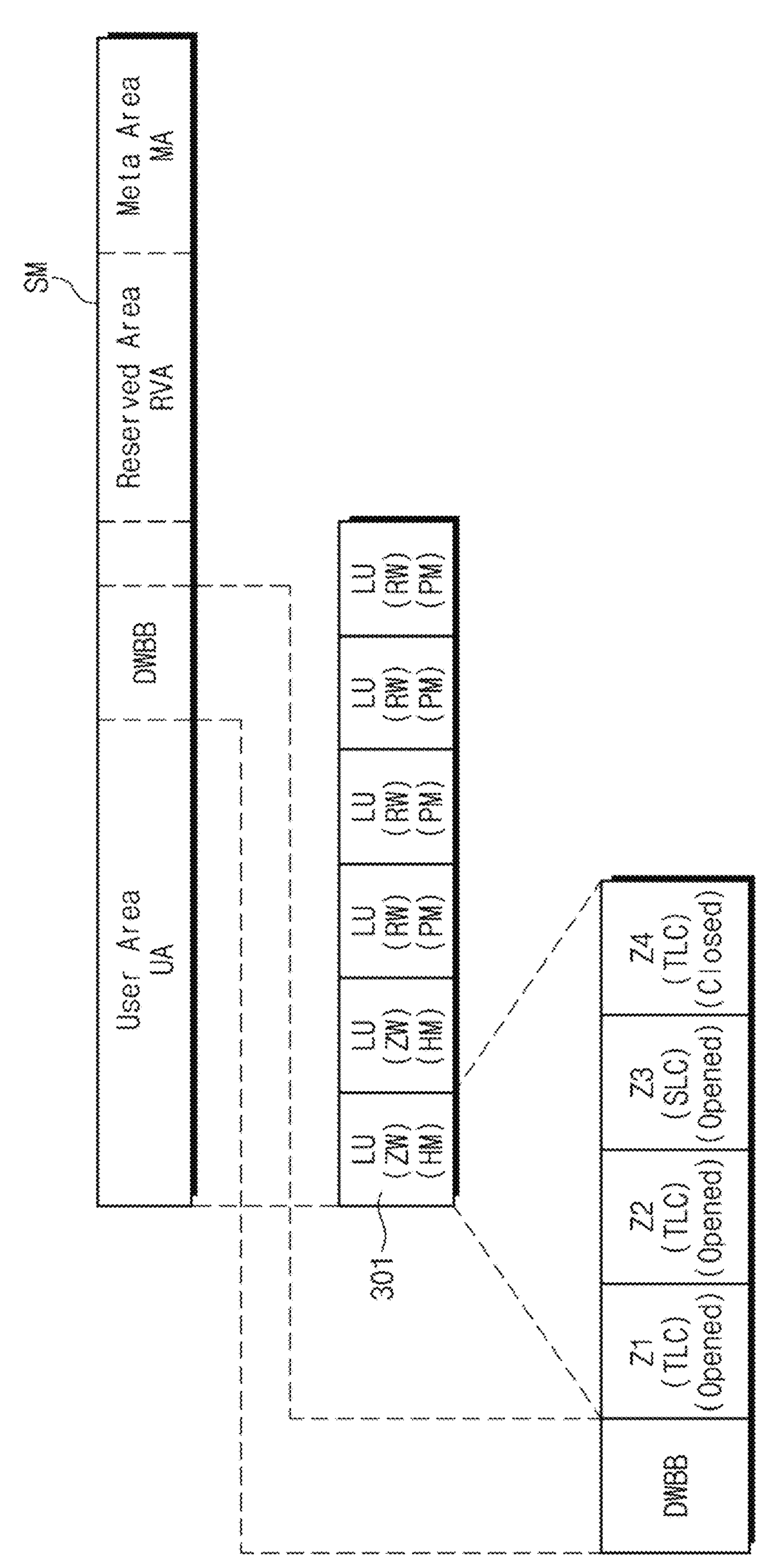

FIGS. 3A to 3E are diagram illustrating an example in which the memory controller 120 of the storage device 100 manages a storage space SM of the nonvolatile memory device 110. Referring to FIGS. 1, 2, and 3A, the storage space SM may include a user area UA, a reserved area RVA, and a meta area MA. Each of the user area UA, the reserved area RVA, and the meta area MA may include a plurality of erase units.

The memory controller 120 of the storage device 100 may provide the user area UA to the external host device as an accessible storage space. The external host device may allocate logical addresses to the user area UA. The memory controller 120 of the storage device 100 may not provide the reserved area RVA to the external host device. The memory controller 120 of the storage device 100 may use the reserved area RVA to improve the performance of the storage device 100. For example, the memory controller 120 may use the reserved area RVA as a memory for replacing a bad block, a backup memory, or a buffering memory. The memory controller 120 of the storage device 100 may not provide the meta area MA to the external host device. The memory controller 120 of the storage device 100 may store meta data, which may be used by the storage device 100 to operate, in the meta area MA.

The memory controller 120 of the storage device 100 may partition the user area UA into a plurality of logical units LU. Each of the logical units LU may include one or more memory blocks or erase units. Each of the logical units LU may be allocated to support a zone write ZW or a random write RW.

The memory controller 120 of the storage device 100 may allocate zones, for example, a first zone Z1, a second zone Z2, a third zone Z3, and a fourth zone Z4 to the logical unit LU allocated to the zone write ZW. The number of zones capable of being allocated to the logical unit LU allocated to the zone write ZW and the size of each of the zones may be determined by the external host device or the storage device 100. Each zone may include at least one erase unit or two or more erase units.

The memory controller 120 may map the zones to the erase units using a zone map table and may map logical addresses to pages using a page map table. For example, the memory controller 120 may manage the zone write ZW and the logical units LU using a multi-level map table MM including two or more map tables.

The memory controller 120 may allocate sequential logical addresses to each zone without change (or in a fixed state). The memory controller 120 may fixedly and sequentially manage logical addresses of data written in a plurality of zones. For example, in the logical unit LU allocated to the zone write ZW, data of a specific logical address may be always written at a location on fixed logical addresses of a fixed zone, and the fixed logical addresses may be sequentially allocated. The memory controller 120 may differently allocate erase units allocated to each zone, based on an internal policy.

Depending on the request of the external host device, the storage device 100 may open a specific zone. For example, the memory controller 120 may fix a cell type of the opened zone to one cell type or may select one of two or more different cell types. The cell type of the opened zone may be classified as a Quadruple Level Cell (QLC) type, a Triple Level Cell (TLC) type, a Multi Level Cell (MLC) type, or a Single Level Cell (SLC) type, but embodiments are not limited thereto.

With regard to the opened zone, the external host device may request sequential writes based on sequential logical addresses from the storage device 100. The memory controller 120 may map sequential physical addresses of erase units to sequential logical addresses of each zone. For example, the sequentiality of logical addresses and physical addresses in each zone may be guaranteed.

When the zone is full of data, or based on a request received from the external host device, the memory controller 120 may close the zone. The memory controller 120 may prohibit an additional write for the closed zone. The memory controller 120 may manage the closed zone as a read-only zone.

In an embodiment, the memory controller 120 may also manage zones which are not opened in the zone map table. The memory controller 120 may manage a state of each zone as "Opened", "Closed", or "Not opened" in the zone map table, but embodiments are not limited thereto.

The memory controller 120 of the storage device 100 may manage the logical units LU allocated to the random write RW using a page map table PM. The memory controller 120 may support a random write for the logical units LU allocated to the random write RW.

In an embodiment, the memory controller 120 may store the zone map table and the page map table PM of the logical units LU allocated to the zone write ZW and the page map table PM of the logical units LU allocated to the random write RW in the meta area MA. The memory controller 120 may load and use a portion of the zone map table of the logical units LU allocated to the zone write ZW and the page map table PM of the logical units LU allocated to the zone write ZW and the logical units LU allocated to the random write RW to the internal buffer 123.

Referring to FIGS. 1, 2, and 3B, the memory controller 120 may further allocate a shared write booster buffer SWBB. In an embodiment, the memory controller 120 may allocate a portion of the user area UA to one or more logical units and the shared write booster buffer SWBB in order to be duplicated (or overlapped). The shared write booster buffer SWBB may include at least one erase unit.

The shared write booster buffer SWBB may be allocated, for example, to be set to the SLC cell type. The memory controller 120 may write the data in the shared write booster buffer SWBB with priority in response to the write request received from the external host device. Afterwards, at an idle time or in a power-saving mode, the memory controller 120 may migrate the data written in the shared write booster buffer SWBB to one or more target logical units. As the shared write booster buffer SWBB is used, the write speed of the storage device 100 may be improved.

The memory controller 120 may write all the data to be written in the plurality of logical units LU in the shared write booster buffer SWBB with priority. For example, the shared write booster buffer SWBB may be shared by the plurality of logical units LU.

In an embodiment, the memory controller 120 may adaptively adjust the capacity of the shared write booster buffer SWBB depending on a ratio at which data are written in the user area UA. When a data write ratio of the user area UA increases, the memory controller 120 may decrease the capacity of the shared write booster buffer SWBB or may deactivate the shared write booster buffer SWBB, and thus, the storage space of the user area UA may be fully available by the external host device.

Referring to FIGS. 1, 2, and 3C, the memory controller 120 may allocate a portion of the storage space of the user area UA to be dedicated as the shared write booster buffer SWBB. For example, the storage space of the user area UA may be decreased by an amount that is the same as the storage space of the shared write booster buffer SWBB. The memory controller 120 may further improve the write speed of the storage device 100 by allocating the storage space of the shared write booster buffer SWBB in a fixed scheme.

Referring to FIGS. 1, 2, and 3D, the memory controller 120 may allocate a dedicated write booster buffer DWBB instead of the shared write booster buffer SWBB. For example, the memory controller 120 may allocate a portion of the user area UA to one or more logical units and the dedicated write booster buffer DWBB in order to be duplicated (or overlapped).

The dedicated write booster buffer DWBB may be dedicated to and used for a specific logical unit. An example in which the dedicated write booster buffer DWBB is allocated to the first logical unit LU 301 is illustrated in FIG. 3D.

When the dedicated write booster buffer DWBB is not dedicated to one logical unit, the dedicated write booster buffer DWBB may be used in the same manner as the shared write booster buffer SWBB of FIG. 3B. Thus, additional description may be omitted to avoid redundancy.

Figure 3E:
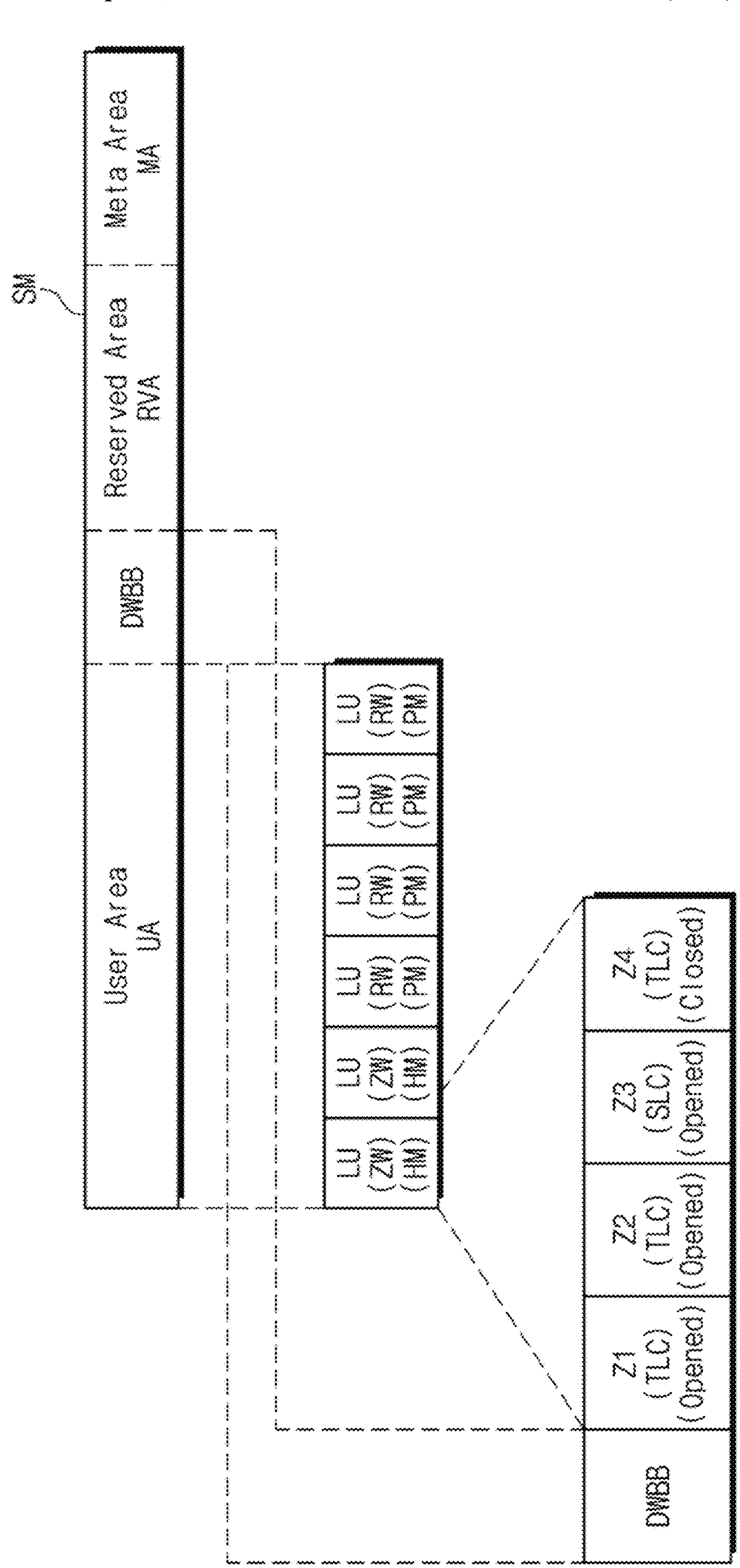

Referring to FIGS. 1, 2, and 3E, the memory controller 120 may allocate a portion of the storage space of the user area UA to be dedicated for the dedicated write booster buffer DWBB. For example, the storage space of the user area UA may be decreased by an amount that is the same as the storage space of the dedicated write booster buffer DWBB. The memory controller 120 may further improve the write speed of the storage device 100 by allocating the storage space of the dedicated write booster buffer DWBB in a fixed scheme.

Below, an example of data written, or data to be written, in the logical unit LU allocated to the zone write ZW is given. Regardless of the logical unit LU allocated to the zone write ZW, the memory controller 120 may access the logical units LU allocated to the random write RW depending on the request of the external host device.

Figure 4:
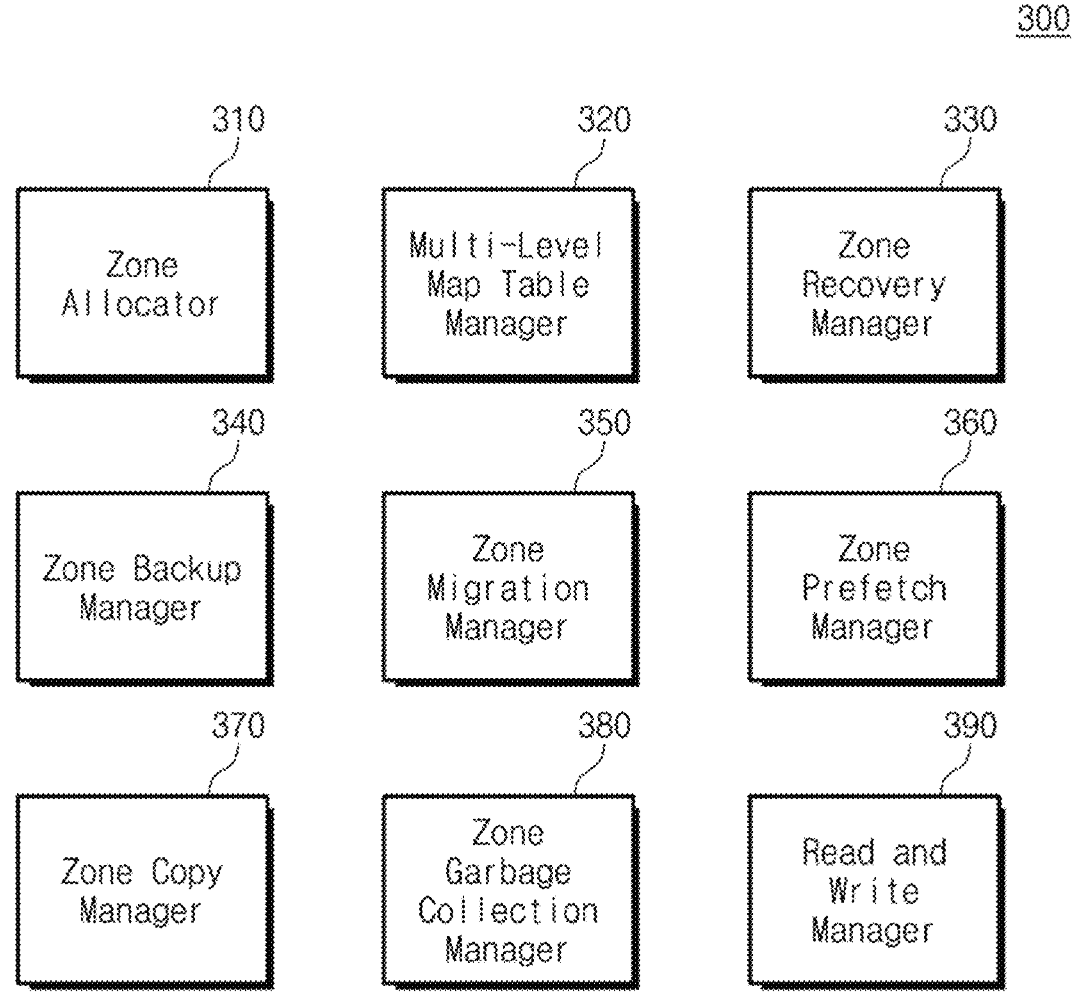
FIG. 4 is a diagram illustrating an example of modules executed by a controller of FIG. 1, according to an embodiment.

FIG. 4 is a diagram illustrating an example of modules 300 which may be executed by the memory controller 120 of FIG. 1. In an embodiment, the modules 300 may be or may include firmware or software that is executed by the processor 124 of the memory controller 120.

Referring to FIGS. 1 and 4, the modules 300 may include a zone allocator 310, a multi-level map table manager 320, a zone recovery manager 330, a zone backup manager 340, a zone migration manager 350, a zone prefetch manager 360, a zone copy manager 370, a zone garbage collection manager 380, and a read and write manager 390.

The zone allocator 310 may allocate a zone depending on the request of the external host device or depending on an internally defined policy. The zone allocator 310 may open the zone by allocating erase units to the zone. The zone allocator 310 may set a cell type (e.g., the number of bits written per memory cell) or various features of a zone.

The multi-level map table manager 320 may generate and manage at least two different map tables, for example, the zone map table and the page map table of the multi-level map table MM. The multi-level map table manager 320 may translate one or more logical addresses received from the external host device into one or more physical addresses of the nonvolatile memory device 110 using the zone map table and/or the page map table.

When an error (which may be referred to as a fail or a failure) occurs in the access requested from the external host device, the zone recovery manager 330 may control a recovery operation for correcting the error. The zone recovery manager 330 may perform a recovery operation for data including an error and operations for maintaining the sequentiality of logical addresses of data in a zone where the error occurs.

When there is a need or desire to back up the data stored in the internal buffer 123, the zone backup manager 340 may control the backup operation such that the data stored in the internal buffer 123 are written in the nonvolatile memory device 110. The zone backup manager 340 may select an erase unit in which the data of the internal buffer 123 are to be written. For example, the zone backup manager 340 may select an erase unit, in which the data of the internal buffer 123 are to be written, from among erase units of the reserved area RVA (as shown for example in FIGS. 3A to 3E).

The zone migration manager 350 may control the migration operation such that the data written in the reserved area RVA are migrated to one or more target logical units among the logical units LU allocated to the zone write ZW in the user area UA. The one or more target logical units may be one or more zones corresponding to one or more logical addresses received together with the write request of the external host device. After migrating the data to the one or more target logical units, the zone migration manager 350 may invalidate the relevant data in a source erase unit, for example the erase unit in which the data are written through the backup operation.

The zone prefetch manager 360 may control prefetch of the data written in the logical unit LU allocated to the zone write ZW. For example, based on the read requests for sequential logical addresses being received from a host, the memory controller 120 may prefetch data corresponding to next logical addresses without the request of the external host device. Accordingly, a speed at which the external host device performs the random read on the storage device 100 may be improved.

The zone copy manager 370 may control the zone copy operation. Based on the zone copy command being received from the external host device, the memory controller 120 may read data from a first zone among zones of the logical unit LU allocated to the zone write ZW and may write the data read from the first zone in a second zone of the logical unit LU allocated to the zone write ZW or in a second zone of the logical unit LU of another zone write ZW. In an embodiment, the zone copy manager 370 may allow the external host device to perform zone-based garbage collection.

The zone garbage collection manager 380 may perform the garbage collection in units of two or more zones among zones of a logical unit LU allocated to the zone write ZW, without the request of the external host device. For example, in the storage device 100, the garbage collection may be performed in units of a zone in response to the request of the external host device, and the garbage collection may be performed in units of two or more zones under control of the memory controller 120.

The read and write manager 390 may control the read operation and the write operation for the nonvolatile memory device 110.

Figure 5:
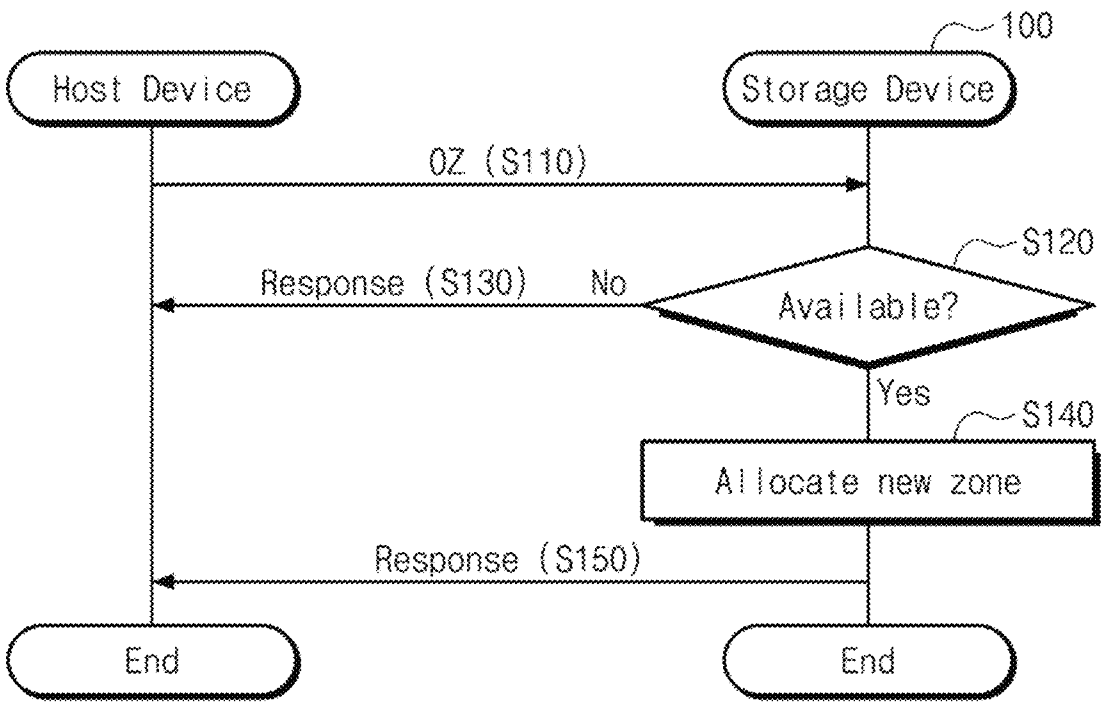
FIG. 5 is a diagram illustrating a first example in which a zone of a storage device is opened by an external host device, according to an embodiment.

FIG. 5 is a diagram illustrating a first example in which a zone of the storage device 100 is opened by an external host device. Referring to FIGS. 1 and 5, in operation S110, the memory controller 120 of the storage device 100 may receive an open zone request OZ from the external host device. The open zone request OZ may be received using a command UFS protocol information unit (UPIU) or a query request UPIU.

In operation S120, the memory controller 120 may determine whether it is possible to open the requested zone. For example, the memory controller may determine whether the requested zone is available to be opened. When the opening of the requested zone is impossible, in operation S130, the memory controller 120 may transmit a response providing a notification that the opening of the requested zone is impossible, to the external host device.

When the opening of the requested zone is possible, in operation S140, the memory controller 120 may allocate a new zone. For example, the memory controller 120 may open the requested zone by allocating erase units to the requested zone. Afterwards, in operation S150, the memory controller 120 may transmit a response providing a notification that the requested zone is opened, to the external host device. In an embodiment, the memory controller 120 may transmit the response to the external host device using the response UPIU or the query response UPIU.

FIG. 6 is a diagram illustrating a second example in which a zone of the storage device 100 is opened by an external host device. Referring to FIGS. 1 and 6, in operation S210, the memory controller 120 of the storage device 100 may receive a write request WR from the external host device. The write request WR may be received using the command UPIU.

In operation S220, the memory controller 120 may determine whether the write request WR is associated with a new zone. When the write request WR is associated with a new zone, in operation S230, the memory controller 120 may allocate the new zone. In an embodiment, as described with reference to FIG. 5, the memory controller 120 may determine whether the opening of the new zone is possible; when the opening of the new zone is impossible, the memory controller 120 may transmit a response to the external host device; and when the opening is possible, the memory controller 120 may allocate the new zone such that the zone is opened (e.g., may perform a zone open operation).

In operation S240, the memory controller 120 may write the write-requested data in a target zone corresponding to one or more logical addresses of the write request WR. In operation S250, the memory controller 120 may transmit a response providing a notification that the requested write is completed, to the external host device. When the new zone is opened, the memory controller 120 may include information which provides a notification that the new zone is opened, in the response. In an embodiment, the memory controller 120 may transmit the response to the external host device using the response UPIU.

In an embodiment, between operation S210 and operation S240 (or between operation S230 and operation S240), there additional operations may be performed, for example an operation of transmitting, by the memory controller 120, a “Ready to Transfer” UPIU to the external host device in response to the write request WR and an operation of receiving, at the memory controller 120, write data from the external host device together with a “Data Out” UPIU.

As described with reference to FIGS. 5 and 6, the memory controller 120 may open the zone in response to the open zone request OZ or the write request WR.

Figure 7:
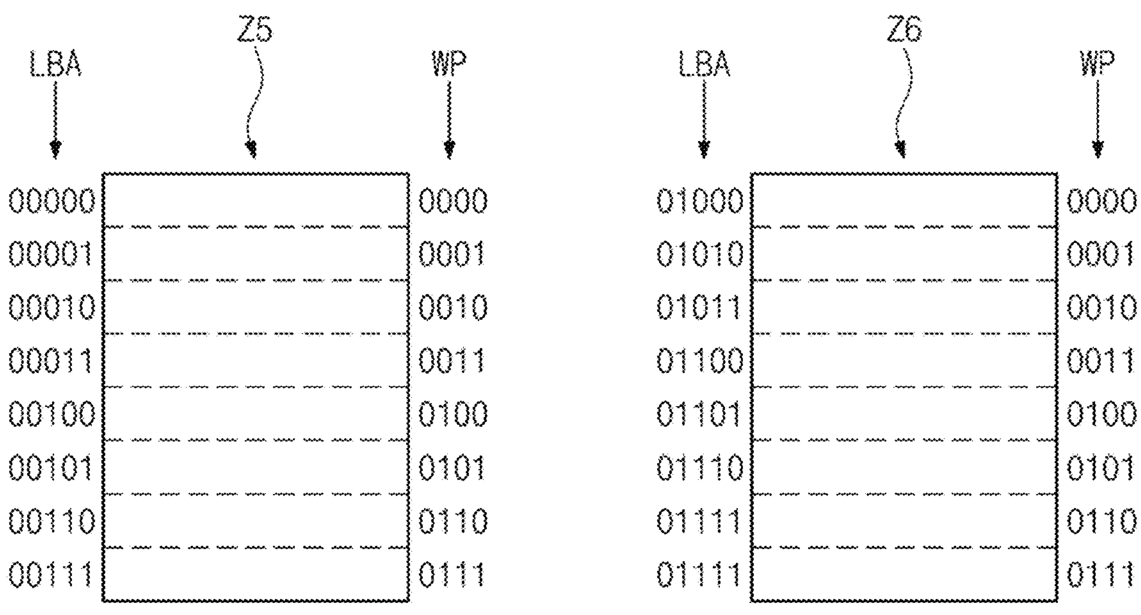
FIG. 7 is a diagram illustrating a first example in which there are mapped logical addresses and physical addresses in a zone, according to an embodiment.

FIG. 7 is a diagram illustrating a first example in which there are mapped logical addresses and physical addresses in a zone. Referring to FIGS. 1 and 7, logical addresses LBA of "00000", "00001", "00010", "00011". "00100", "00101", "00110", and "00111" may be allocated to the fifth zone Z5. Physical addresses of the zone may be managed using a write pointer WP. The write pointers WP of "0000", "0001", "0010", "0011", 0100", "0101", "0110", and "0111" may be allocated to the fifth zone Z5.

The sixth zone Z6 following the fifth zone Z5 may have continuous logical addresses. The logical addresses LBA of "01000", "01001", "01010", "01011", "01100", "01101", "01110", and "01111" may be allocated to the sixth zone Z6. The write pointers WP of "0000", "0001", "0010", "0011", 0100", "0101", "0110", and "0111" may be allocated to the sixth zone Z6.

The logical addresses LBA and the write pointers WP (which may be, or may indicate or refer to, physical addresses) may have fixed sequentiality. When the logical address of "00100" is received from the external host device, the memory controller 120 may identify the fifth zone Z5 using the zone map table. Also, the memory controller 120 may calculate the write pointer WP of "0100" from an offset of "0100" included in the logical address of "00100". Accordingly, the memory controller 120 may support the read operation, which is based on the zone map table, without the page map table.

Figure 8:
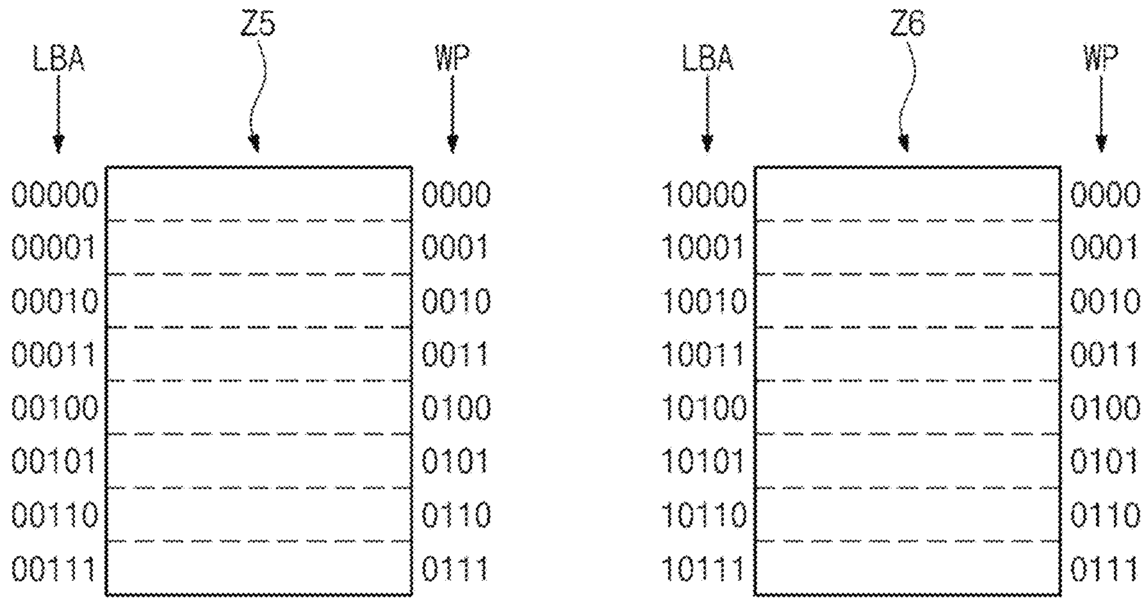
FIG. 8 is a diagram illustrating a second example in which there are mapped logical addresses and physical addresses in a zone, according to an embodiment.

FIG. 8 is a diagram illustrating a second example in which there are mapped logical addresses and physical addresses in a zone. Referring to FIGS. 1 and 8, the logical addresses LBA of "00000", "00001", "00010", "00011". "00100", "00101", "00110", and "00111" may be allocated to the fifth zone Z5. Physical addresses of the zone may be managed using the write pointer WP. The write pointers WP of "0000", "0001", "0010", "0011", 0100", "0101", "0110", and "0111" may be allocated to the fifth zone Z5.

The logical addresses LBA of "10000", "10001", "10010", "10011", "10100", "10101", "10110", and "10111" may be allocated to the sixth zone Z6. The write pointers WP of "0000", "0001", "0010", "0011", 0100", "0101", "0110", and "0111" may be allocated to the sixth zone Z6.

As shown in the examples above, according to embodiments low bits of a start address of each zone may be set to be identical to a start address of the write pointer WP. Accordingly, it may be easy to calculate the offset of the write pointer WP from the logical address LBA.

The last logical address "00111" of the fifth zone Z5 may be not continuous with the start logical address "10000" of the sixth zone Z6. The memory controller 120 may recognize that a virtual gap zone is present between the last logical address "00111" of the fifth zone Z5 and the start logical address "10000" of the sixth zone Z6.

Figure 9:
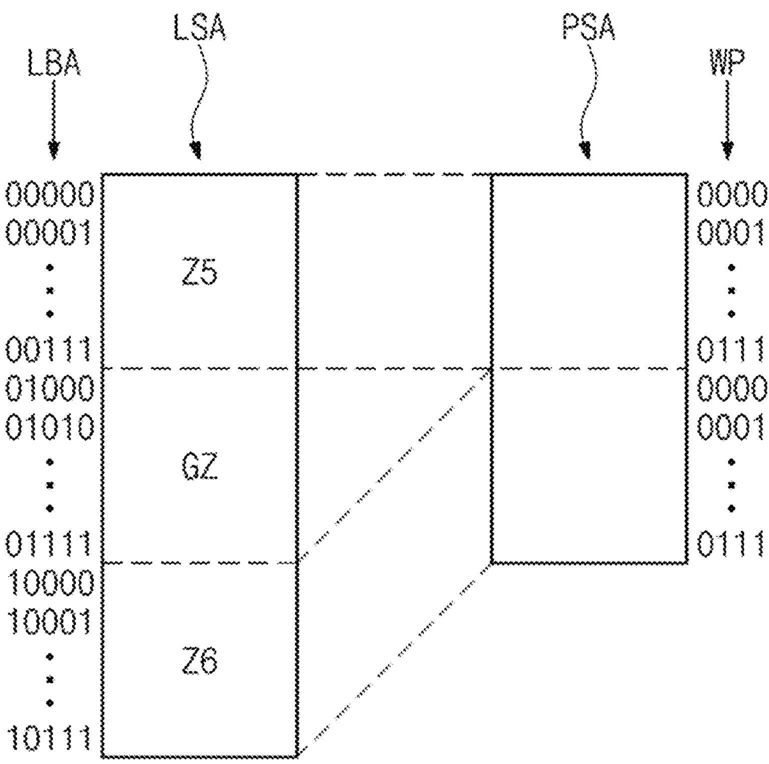
FIG. 9 is a diagram illustrating an example in which a storage device manages zones using a gap zone, according to an embodiment.

FIG. 9 is a diagram illustrating an example in which the storage device 100 manages zones using a gap zone GZ. Referring to FIGS. 1 and 9, in a logical storage area LSA based on the logical addresses LBA, the fifth zone Z5 may have the logical addresses LBA from "00000" to "00111". In the logical storage area LSA based on the logical addresses LBA, the gap zone GZ may have the logical addresses LBA from "01000" to "01111". In the logical storage area LSA based on the logical addresses LBA, the sixth zone Z6 may have the logical addresses LBA from "10000" to "10111".

In a physical storage area PSA based on physical addresses PBA, the fifth zone Z5 may have the write pointers WP "0000" to "0111" of erase units. In the physical storage area PSA based on the physical addresses PBA, the sixth zone Z6 may have the write pointers WP "0000" to "0111" of other erase units. The memory controller 120 may identify the erase units of the fifth zone Z5 and the erase units of the sixth zone Z6 using the zone map table.

In the logical addresses LBA based on the logical addresses LBA, the gap zone GZ having the logical addresses LBA from "01000" to "01111" may be not mapped to the physical storage area PSA. The memory controller 120 may identify the gap zone GZ as a read-only zone. When a write request for the gap zone GZ is received from the external host device, the memory controller 120 may transmit a response indicating an error to the external host device. When the read request for the gap zone GZ is received from the external host device, the memory controller 120 may transmit dummy data, given pattern data, or data indicating the gap zone to the external host device.

By setting the virtual gap zone GZ between the fifth zone Z5 and the sixth zone Z6, the storage device 100 may solve an issue caused by the discontinuity of the logical addresses LBA of the fifth zone Z5 and the sixth zone Z6 in the logical storage area LSA.

In an embodiment, to increase the storage capacity of the storage device 100, a zone may be set to the highest cell type that the storage device 100 supports. For example, when the maximum cell type supported by the storage device 100 corresponds to the TLC cell type, the zone may be the TLC zone. When the maximum cell type supported by the storage device 100 corresponds to the QLC cell type, the zone may be the QLC zone. Unlike the zone, another zone for storing data requiring a fast speed or important data may be set to a cell type lower than the highest cell type that the storage device 100 supports.

When the cell type of the zone is the maximum cell type supported by the storage device 100, the write speed of the zone may be the slowest write speed that the storage device 100 supports. To improve the write speed of the storage device 100, the UFS protocol may activate a write booster. As described with reference to FIGS. 3A to 3E, when the write booster is activated, the storage device 100 may write the write data in a write booster buffer (e.g., the shared write booster buffer SWBB or the dedicated write booster buffer DWBB) with priority. The cell type of the write booster buffer may correspond to the SLC cell type, and thus, the write speed of the write booster buffer may be higher than the write speed of the zone.

With regard to the above write booster, when opening a zone, the storage device 100 may select a type of the zone, for example, the cell type. When it is possible to open the reserved zone, the memory controller 120 may open the reserved zone having a cell type which is lower than the highest cell type supported by the storage device 100. The write data from the external host device may be written in the reserved zone. A speed at which the data are written in the reserved zone may be higher than a speed at which the data are written in a target zone. Accordingly, the operating speed of the storage device 100 may be improved. In an embodiment, the memory controller 120 may manage the reserved zone to be similar to the write booster buffer or may manage the reserved zone as the write booster buffer.

FIG. 10 is a diagram illustrating a first example in which the storage device 100 opens a reserved zone. Referring to FIGS. 1, 3A to 3E, and 10, in operation S310, the memory controller 120 of the storage device 100 may receive the open zone request OZ or the write request WR from the external host device. For example, the write request WR may be a write request causing the opening of a new zone. The open zone request OZ or the write request WR may be received using the command UPIU or the query request UPIU.

In response to the open zone request OZ or the write request WR causing the opening of the new zone, in operation S320, the memory controller 120 may determine whether the number of free erase units EU is greater than a first threshold value TH1.

In an embodiment, when the target zone and the reserved zone are set to be generated within the logical unit LU, the number of free erase units EU may be the number of free erase units in the logical unit LU. When the target zone and the reserved zone are set to be generated within the user area UA, the number of free erase units EU may be the number of free erase units EU in the user area UA. When the reserved zone is set to be generated within the reserved area RA, the number of free erase units EU may be the number of free erase units EU of the reserved area RA.

When the number of free erase units EU is greater than the first threshold value TH1, in operation S330, the memory controller 120 may open a zone having a first type (e.g., a reserved zone). The memory controller 120 may allocate erase units of an area, which is dedicated such that the reserved zone is generated, to the reserved zone. The first-type zone may have a cell type lower than the cell type of the target zone. For example, the first-type zone may have the SLC cell type. The memory controller 120 may permit random writes with respect to the zone having the first type.

When the number of free erase units EU is not greater than the first threshold value TH1, for example when the number of free erase units EU is smaller than or equal to the first threshold value TH1, in operation S340, the memory controller 120 may open a zone having a second type (e.g., a target zone). The second-type zone may have the cell type of the target zone. The memory controller 120 may allocate erase units of a logical unit, which is dedicated such that the target zone is generated, to the target zone. The memory controller 120 may permit only sequential writes based on sequential logical addresses with respect to the zone having the second type.

In an embodiment, when the write request WR is received in operation S310, between operation S310 and operation S350 (or between operation S330 or operation S340 and operation S350), additional operations may be performed, for example an operation of transmitting, at the memory controller 120, the "Ready to Transfer" UPIU to the external host device in response to the write request WR, and an operation of receiving, at the memory controller 120, write data from the external host device together with the "Data Out" UPIU, and an operation of writing, at the memory controller 120, the data corresponding to the write request WR in the opened zone.

In operation S350, the memory controller 120 may transmit a response including a zone type to the external host device. For example, the response may include information about whether any of the first-type zone and the second-type zone is generated. The response may be output using the response UPIU or the query response UPIU. In an embodiment, when the write request WR is received in operation S310, the response may include information providing a notification that the write is completed.

After the reserved zone is opened, the memory controller 120 may trigger migration such that the data of the reserved zone are moved to the target zone. To trigger the migration may mean to start the migration as the background operation. The memory controller 120 may perform operations according to the request of the external host device; in this case, the memory controller 120 may consistently perform the migration as the background operation between the operations according to the request.

In an embodiment, the memory controller 120 may reset the reserved zone of the target zone when closing the target zone. In an embodiment, the memory controller 120 may reset the reserved zone when the migration of the reserved zone is completed. In an embodiment, when the number of free erase units EU of the area dedicated to generate the reserved zone is smaller than a threshold value, the memory controller 120 may directly move the data of the reserved zone to the target zone and may reset the reserved zone. In an embodiment, when the number of free erase units EU of the area dedicated to generate the reserved zone is smaller than the threshold value and when the sequentiality between logical addresses of the data of the target zone and logical addresses of the data of the reserved zone is not guaranteed, the memory controller 120 may back up the data of the reserved zone and may reset the reserved zone. The backed-up data may be written in the erase unit of the reserved area RA.

FIG. 11 is a diagram illustrating a second example in which the storage device 100 opens a reserved zone. Referring to FIGS. 1, 3A to 3E, and 11, in operation S410, the memory controller 120 of the storage device 100 may receive the open zone request OZ or the write request WR from the external host device. For example, the write request WR may be a write request causing the opening of a new zone. The open zone request OZ or the write request WR may be received using the command UPIU or the query request UPIU.

In response to the open zone request OZ or the write request WR causing the opening of the new zone, in operation S420, the memory controller 120 may determine whether the write booster is activated. When the write booster is activated, in operation S430, the memory controller 120 may determine whether the number of free erase units EU is greater than a second threshold value TH2. The second threshold value TH2 may be the same as, or different from, the first threshold value TH1.

In an embodiment, as illustrated in FIGS. 3B and 3D, when the write booster buffer is generated to overlap the logical units LU, the number of free erase units EU may be the number of free erase units EU in the user area UA. As illustrated in FIGS. 3C and 3E, when the write booster buffer is a dedicated write booster buffer, the number of free erase units EU may be the number of free erase units EU in the write booster buffer. When the write booster buffer is a dedicated write booster buffer, the second threshold value TH2 may be smaller than the number of erase units included in one zone as much as "1". For example, when the opening of a new zone is possible in the write booster buffer, the memory controller 120 may open the reserved zone.

When the number of free erase units EU is greater than the second threshold value TH2, in operation S440, the memory controller 120 may open a zone having a first type (e.g., a reserved zone). The memory controller 120 may allocate erase units of the write booster buffer to the reserved zone. The first-type zone may have a cell type lower than the cell type of the target zone. The first-type zone may have the SLC cell type. The memory controller 120 may permit random writes with respect to the zone having the first type.

When the write booster is activated and the number of free erase units EU is not greater than the second threshold value TH2, or when the write booster is deactivated, in operation S450, the memory controller 120 may open a zone having a second type (e.g., a target zone). The second-type zone may have the cell type of the target zone. The memory controller 120 may allocate erase units of a logical unit, which is dedicated such that the target zone is generated, to the target zone. The memory controller 120 may permit only sequential writes based on sequential logical addresses with respect to the zone having the second type.

In an embodiment, when the write request WR is received in operation S410, between operation S410 and operation S460 (or between operation S440 or operation S450 and operation S460), additional operations may be performed, for example an operation of transmitting, at the memory controller 120, the "Ready to Transfer" UPIU to the external host device in response to the write request WR, an operation of receiving, at the memory controller 120, write data from the external host device together with the "Data Out" UPIU, and an operation of writing, at the memory controller 120, the data corresponding to the write request WR in the opened zone.

In operation S460, the memory controller 120 may transmit a response including a zone type to the external host device. For example, the response may include information about whether any of the first-type zone and the second-type zone is generated. The response may be output using the response UPIU or the query response UPIU. In an embodiment, when the write request WR is received in operation S410, the response may include information providing a notification that the write is completed.

The memory controller 120 may trigger migration of the data written in the write booster buffer.

FIG. 12 is a diagram illustrating a third example in which the storage device 100 opens a reserved zone. Referring to FIGS. 1, 3A to 3E, and 12, in operation S510, the memory controller 120 of the storage device 100 may receive the open zone request OZ or the write request WR from the external host device. For example, the write request WR may be a write request causing the opening of a new zone. The open zone request OZ or the write request WR may include information about a type of a zone targeted to be opened. The open zone request OZ or the write request WR may be received using the command UPIU or the query request UPIU.

In response to the open zone request OZ or the write request WR causing the opening of the new zone, in operation S520, the memory controller 120 may determine whether the type of zone requested by the external host device is a first type. When the type of the requested zone is the first type, in operation S530, the memory controller 120 may determine whether the number of free erase units EU is greater than a third threshold value TH3.

In an embodiment, when the target zone and the reserved zone are set to be generated within the logical unit LU, the number of free erase units EU may be the number of free erase units in the logical unit LU. When the target zone and the reserved zone are set to be generated within the user area UA, the number of free erase units EU may be the number of free erase units EU in the user area UA. When the reserved zone is set to be generated within the reserved area RA, the number of free erase units EU may be the number of free erase units EU of the reserved area RA.

When the number of free erase units EU is greater than the third threshold value TH3, in operation S540, the memory controller 120 may open a zone having a first type (e.g., a reserved zone). The memory controller 120 may allocate erase units of an area, which is dedicated such that the reserved zone is generated, to the reserved zone. The first-type zone may have a cell type lower than the cell type of the target zone. The first-type zone may have the SLC cell type. The memory controller 120 may permit random writes with respect to the zone having the first type.

When the type of the zone requested by the external host device is the first type, and when the number of free erase units EU is not greater than the third threshold value TH3, or when the type of the zone requested by the external host device is a second type, in operation S550, the memory controller 120 may open a zone having the second type (e.g., a target zone). The second-type zone may have the cell type of the target zone. The memory controller 120 may allocate erase units of a logical unit, which is dedicated such that the target zone is generated, to the target zone. The memory controller 120 may permit only sequential writes based on sequential logical addresses with respect to the zone having the second type.

In an embodiment, when the write request WR is received in operation S510, between operation S510 and operation S560 (or between operation S540 or operation S550 and operation S560), additional operations may be performed, for example an operation of transmitting, at the memory controller 120, the "Ready to Transfer" UPIU to the external host device in response to the write request WR, an operation of receiving, at the memory controller 120, write data from the external host device together with the "Data Out" UPIU, and an operation of writing, at the memory controller 120, the data corresponding to the write request WR in the opened zone.

In operation S560, the memory controller 120 may transmit a response including a zone type to the external host device. For example, when there is opened a zone of a type different from the type of the zone requested by the external host device, the response may include information about the opened zone. When the opened zone has the type requested by the external host device, the response may not include information about the opened zone. The response may be output using the response UPIU or the query response UPIU. In an embodiment, when the write request WR is received in operation S510, the response may include information providing a notification that the write is completed.

After the reserved zone is opened, the memory controller 120 may trigger migration such that the data of the reserved zone are moved to the target zone. In an embodiment, the memory controller 120 may reset the reserved zone of the target zone when closing the target zone. In an embodiment, the memory controller 120 may reset the reserved zone when the migration of the reserved zone is completed. In an embodiment, when the number of free erase units EU of the area dedicated to generate the reserved zone is smaller than a threshold value, the memory controller 120 may directly move the data of the reserved zone to the target zone and may reset the reserved zone. In an embodiment, when the number of free erase units EU of the area dedicated to generate the reserved zone is smaller than the threshold value and when the sequentiality between logical addresses of the data of the target zone and logical addresses of the data of the reserved zone is not guaranteed, the memory controller 120 may back up the data of the reserved zone and may reset the reserved zone. The backed-up data may be written in the erase unit of the reserved area RA.

FIG. 13 is a diagram illustrating a fourth example in which the storage device 100 opens a reserved zone. Referring to FIGS. 1, 3A to 3E, and 13, in operation S610, the memory controller 120 of the storage device 100 may receive the open zone request OZ or the write request WR from the external host device. For example, the write request WR may be a write request causing the opening of a new zone. The open zone request OZ or the write request WR may be received using the command UPIU or the query request UPIU.

In response to the open zone request OZ or the write request WR causing the opening of the new zone, in operation S620, the memory controller 120 may determine whether the number of free erase units EU is greater than a fourth threshold value TH4.

In an embodiment, when the target zone and the reserved zone are set to be generated within the logical unit LU, the number of free erase units EU may be the number of free erase units in the logical unit LU. When the target zone and the reserved zone are set to be generated within the user area UA, the number of free erase units EU may be the number of free erase units EU in the user area UA. When the reserved zone is set to be generated within the reserved area RA, the number of free erase units EU may be the number of free erase units EU in the reserved area RA.

When the number of free erase units EU is greater than the fourth threshold value TH4, in operation S630, the memory controller 120 may determine that a zone having a first type (e.g., a reserved zone) is available. When the number of free erase units EU is not greater than the fourth threshold value TH4, in operation S640, the memory controller 120 may determine that the first-type zone is unavailable. In operation S650, the memory controller 120 may transmit a response including information about the available zone type to the external host device. The response may be output using the response UPIU or the query response UPIU.

In operation S660, the memory controller 120 may receive a request for selecting a zone type from the external host device. The request for selecting the zone type may include information about a type of a zone which the external host device desires to open, from among the first-type zone and the second-type zone. The request for selecting the zone type may be received using the command UPIU or the query UPIU.

In operation S670, the memory controller 120 may open a zone having a selected type in response to the request for selecting the zone type.

When the first-type zone, for example the reserved zone, is selected, the memory controller 120 may allocate erase units of an area, which is dedicated such that the reserved zone is generated, to the reserved zone. The first-type zone may have a cell type lower than the cell type of the target zone. The first-type zone may have the SLC cell type. The memory controller 120 may permit random writes with respect to the zone having the first type.

When the second-type zone is selected, the memory controller 120 may open the second-type zone (e.g., a target zone). The second-type zone may have the cell type of the target zone. The memory controller 120 may allocate erase units of a logical unit, which is dedicated such that the target zone is generated, to the target zone. The memory controller 120 may permit only sequential writes based on sequential logical addresses with respect to the zone having the second type.

In an embodiment, when the write request WR is received in operation S610, between operation S610 and operation S660 (or between operation S670 and operation S680), additional operations may be performed, for example an operation of transmitting, at the memory controller 120, the "Ready to Transfer" UPIU to the external host device in response to the write request WR, an operation of receiving, at the memory controller 120, write data from the external host device together with the "Data Out" UPIU, and an operation of writing, at the memory controller 120, the data corresponding to the write request WR in the opened zone.

In operation S680, the memory controller 120 may transmit a response providing a notification that the zone is opened, to the external host device. For example, when there is opened a zone of a type different from the type of the zone requested by the external host device, the response may include information about the opened zone. When the opened zone has the type requested by the external host device, the response may not include information about the opened zone. The response may be output using the response UPIU or the query response UPIU. In an embodiment, when the write request WR is received in operation S610, the response may include information providing a notification that the write is completed.

After the reserved zone is opened, the memory controller 120 may trigger migration such that the data of the reserved zone are moved to the target zone. In an embodiment, the memory controller 120 may reset the reserved zone of the target zone when closing the target zone. In an embodiment, the memory controller 120 may reset the reserved zone when the migration of the reserved zone is completed. In an embodiment, when the number of free erase units EU of the area dedicated to generate the reserved zone is smaller than a threshold value, the memory controller 120 may directly move the data of the reserved zone to the target zone and may reset the reserved zone. In an embodiment, when the number of free erase units EU of the area dedicated to generate the reserved zone is smaller than the threshold value and when the sequentiality between logical addresses of the data of the target zone and logical addresses of the data of the reserved zone is not guaranteed, the memory controller 120 may back up the data of the reserved zone and may reset the reserved zone. The backed-up data may be written in the erase unit of the reserved area RA.

Figure 14:
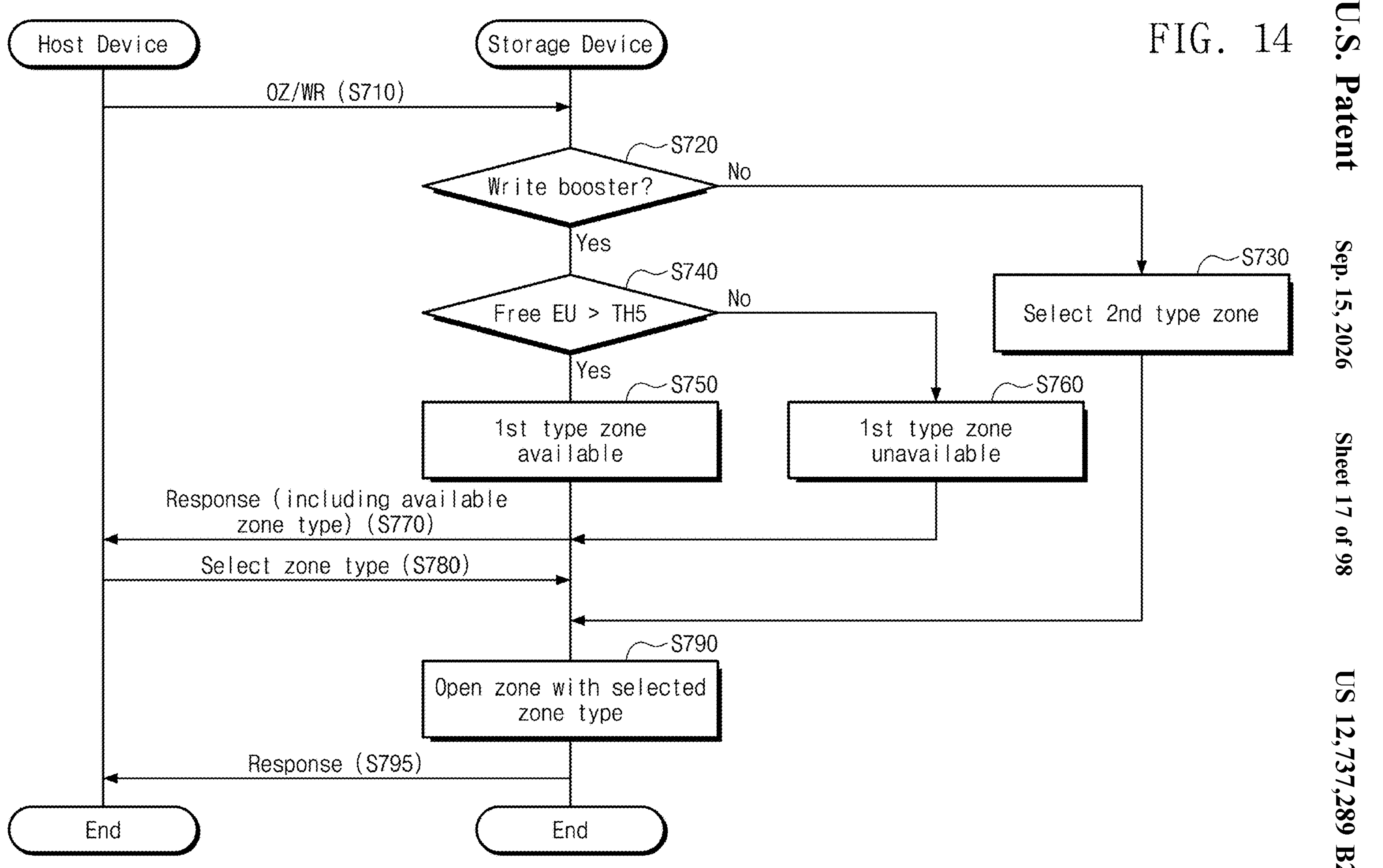
FIG. 14 is a diagram illustrating a fifth example in which a storage device opens a reserved zone, according to an embodiment.

FIG. 14 is a diagram illustrating a fifth example in which the storage device 100 opens a reserved zone. Referring to FIGS. 1, 3A to 3E, and 14, in operation S710, the memory controller 120 of the storage device 100 may receive the open zone request OZ or the write request WR from the external host device. For example, the write request WR may be a write request causing the opening of a new zone. The open zone request OZ or the write request WR may be received using the command UPIU or the query request UPIU.

In response to the open zone request OZ or the write request WR causing the opening of the new zone, in operation S720, the memory controller 120 may determine whether the write booster is activated. When the write booster is not activated, in operation S730, the memory controller 120 may select the second-type zone.

When the write booster is activated, in operation S740, in response to the open zone request OZ or the write request WR causing the opening of the new zone, the memory controller 120 may determine whether the number of free erase units EU is greater than a fifth threshold value TH5.

In an embodiment, as illustrated in FIGS. 3B and 3D, when the write booster buffer is generated to overlap the logical units LU, the number of free erase units EU may be the number of free erase units EU in the user area UA. As illustrated in FIGS. 3C and 3E, when the write booster buffer is a dedicated write booster buffer, the number of free erase units EU may be the number of free erase units EU in the write booster buffer. When the write booster buffer is a dedicated write booster buffer, the fifth threshold value TH5 may be smaller than the number of erase units included in one zone as much as "1". For example, when the opening of a new zone is possible in the write booster buffer, the memory controller 120 may open the reserved zone.

When the number of free erase units EU is greater than the fifth threshold value TH5, in operation S750, the memory controller 120 may determine that a zone having a first type (e.g., a reserved zone) is available. When the number of free erase units EU is not greater than the fifth threshold value TH5, in operation S760, memory controller 120 may determine that the first-type zone is unavailable. In operation S770, the memory controller 120 may transmit a response including information about the available zone type to the external host device. The response may be output using the response UPIU or the query response UPIU.

In operation S780, the memory controller 120 may receive a request for selecting a zone type from the external host device. The request for selecting the zone type may include information about a type of a zone, which the external host device desires to open, from among the first-type zone and the second-type zone. The request for selecting the zone type may be received using the command UPIU or the query UPIU.

In operation S790, the memory controller 120 may open a zone having a selected type in response to the request for selecting the zone type. In an embodiment, the memory controller 120 may open the second-type zone selected in operation S730.

When the first-type zone, for example the reserved zone, is selected, the memory controller 120 may allocate erase units of an area, which is dedicated such that the reserved zone is generated, to the reserved zone. The first-type zone may have a cell type lower than the cell type of the target zone. The first-type zone may have the SLC cell type. The memory controller 120 may permit random writes with respect to the zone having the first type.

When the second-type zone is selected, the memory controller 120 may open the second-type zone (e.g., a target zone). The second-type zone may have the cell type of the target zone. The memory controller 120 may allocate erase units of a logical unit, which is dedicated such that the target zone is generated, to the target zone. The memory controller 120 may permit only sequential writes based on sequential logical addresses with respect to the zone having the second type.

In an embodiment, when the write request WR is received in operation S710, between operation S710 and operation S790 (or between operation S790 and operation S795), additional operations may be performed, for example an operation of transmitting, at the memory controller 120, the "Ready to Transfer" UPIU to the external host device in response to the write request WR, an operation of receiving, at the memory controller 120, write data from the external host device together with the "Data Out" UPIU, and an operation of writing, at the memory controller 120, the data corresponding to the write request WR in the opened zone.

In operation S795, the memory controller 120 may transmit a response providing a notification that the zone is opened, to the external host device. For example, when there is opened a zone of a type different from the type of the zone requested by the external host device, the response may include information about the opened zone. When the opened zone has the type requested by the external host device, the response may not include information about the opened zone. The response may be output using the response UPIU or the query response UPIU. In an embodiment, when the write request WR is received in operation S710, the response may include information providing a notification that the write is completed.

The memory controller 120 may trigger migration of the data written in the write booster buffer.

Figure 15:
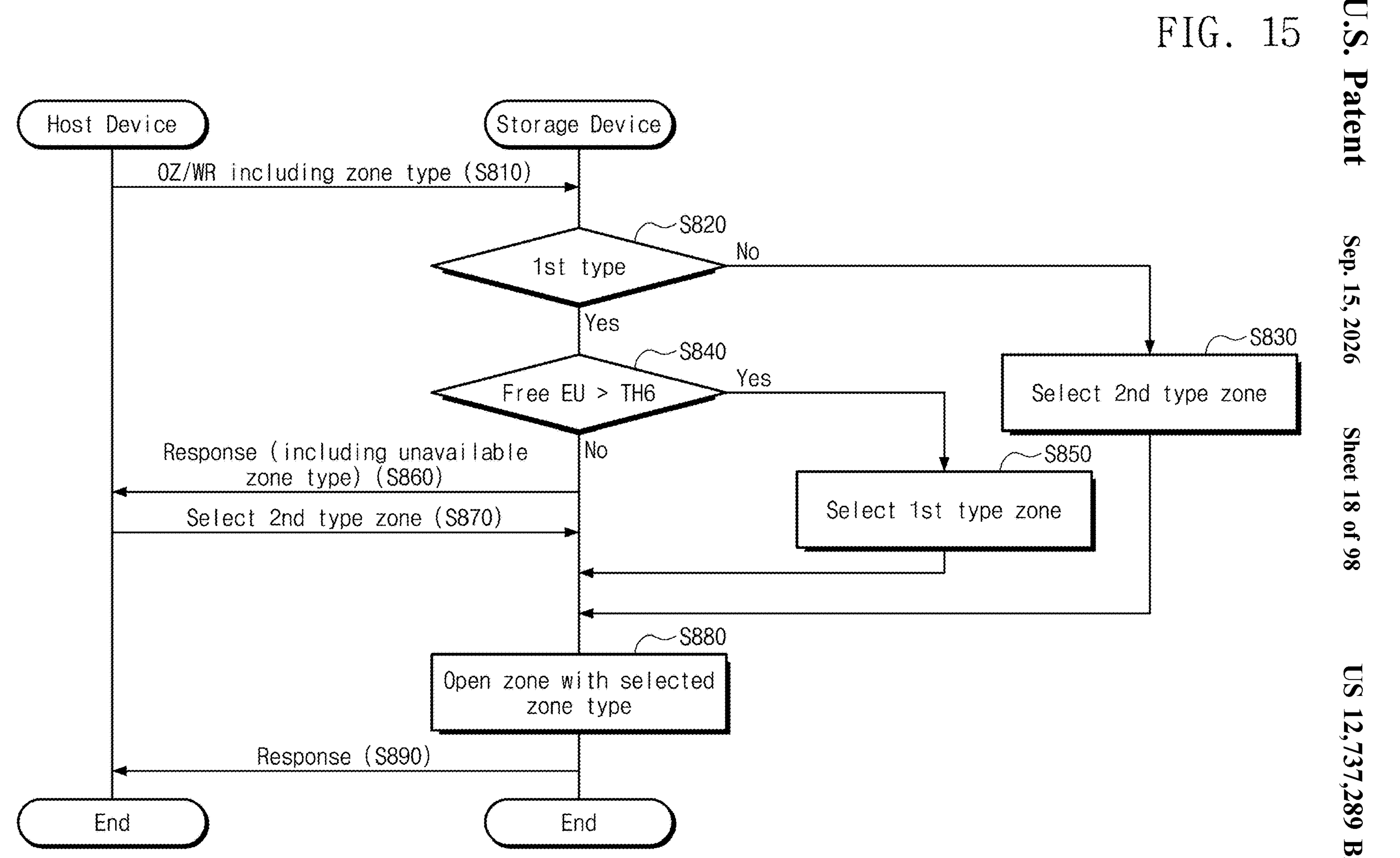
FIG. 15 is a diagram illustrating a sixth example in which a storage device opens a reserved zone, according to an embodiment.

FIG. 15 is a diagram illustrating a sixth example in which the storage device 100 opens a reserved zone. Referring to FIGS. 1, 3A to 3E, and 15, in operation S810, the memory controller 120 of the storage device 100 may receive the open zone request OZ or the write request WR from the external host device. For example, the write request WR may be a write request causing the opening of a new zone. The open zone request OZ or the write request WR may include information about a type of a zone targeted to be opened. The open zone request OZ or the write request WR may be received using the command UPIU or the query request UPIU.

In response to the open zone request OZ or the write request WR causing the opening of the new zone, in operation S820, the memory controller 120 may determine whether the type of zone requested by the external host device is a first type. When the type of the requested zone is not the first type, in operation S830, the memory controller 120 may select the second-type zone.

When the type of the requested zone is the first type, in operation S840, the memory controller 120 may determine whether the number of free erase units EU is greater than a sixth threshold value TH6.

In an embodiment, when the target zone and the reserved zone are set to be generated within the logical unit LU, the number of free erase units EU may be the number of free erase units in the logical unit LU. When the target zone and the reserved zone are set to be generated within the user area UA, the number of free erase units EU may be the number of free erase units EU in the user area UA. When the reserved zone is set to be generated within the reserved area RA, the number of free erase units EU may be the number of free erase units EU in the reserved area RA.

When the number of free erase units EU is greater than the sixth threshold value TH6, in operation S850, memory controller 120 may select the first-type zone.

When the number of free erase units EU is not greater than the sixth threshold value TH6, in operation S860, the memory controller 120 may transmit a response including information about the unavailable zone type to the external host device. For example, the memory controller 120 may transmit a response providing a notification that the first-type zone is unavailable, to the external host device. The response may be output using the response UPIU or the query response UPIU.

In operation S870, the memory controller 120 may receive a request for selecting the second-type zone from the external host device. The request for selecting the second-type zone may be received using the command UPIU or the query UPIU.

In operation S880, the memory controller 120 may open a zone having a selected type in response to the request for selecting the zone type. For example, the memory controller 120 may open the second-type zone selected in operation S830, the first-type zone selected in operation S850, or the second-type zone selected in operation S870.

In an embodiment, when the write request WR is received in operation S810, between operation S810 and operation S890 (or between operation S880 and operation S890), additional operations may be performed, for example an operation of transmitting, at the memory controller 120, the "Ready to Transfer" UPIU to the external host device in response to the write request WR, an operation of receiving, at the memory controller 120, write data from the external host device together with the "Data Out" UPIU, and an operation of writing, at the memory controller 120, the data corresponding to the write request WR in the opened zone.

In operation S890, the memory controller 120 may transmit a response providing a notification that the zone is opened, to the external host device. The response may be output using the response UPIU or the query response UPIU. In an embodiment, when the write request WR is received in operation S810, the response may include information providing a notification that the write is completed.

After the reserved zone is opened, the memory controller 120 may trigger migration such that the data of the reserved zone are moved to the target zone. In an embodiment, the memory controller 120 may reset the reserved zone of the target zone when closing the target zone. In an embodiment, the memory controller 120 may reset the reserved zone when the migration of the reserved zone is completed. In an embodiment, when the number of free erase units EU of the area dedicated to generate the reserved zone is smaller than a threshold value, the memory controller 120 may directly move the data of the reserved zone to the target zone and may reset the reserved zone. In an embodiment, when the number of free erase units EU of the area dedicated to generate the reserved zone is smaller than the threshold value and when the sequentiality between logical addresses of the data of the target zone and logical addresses of the data of the reserved zone is not guaranteed, the memory controller 120 may back up the data of the reserved zone and may reset the reserved zone. The backed-up data may be written in the erase unit of the reserved area RA.

Figure 16:
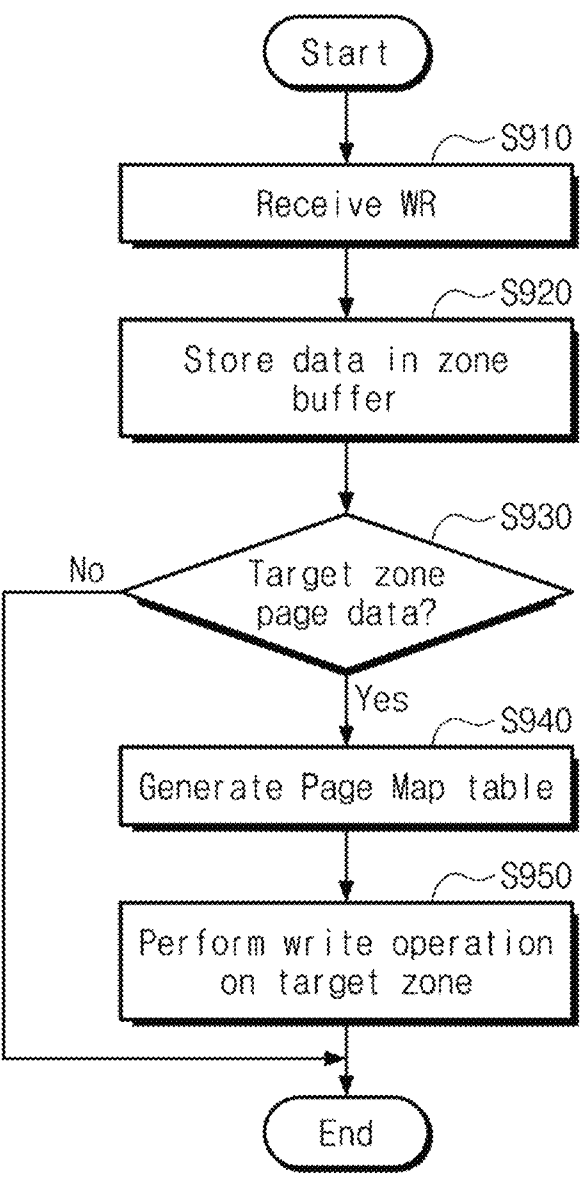
FIG. 16 is a diagram illustrating an example in which a storage device writes data in a nonvolatile memory device, according to an embodiment.

FIG. 16 is a diagram illustrating an example in which the storage device 100 writes data in the nonvolatile memory device 110. Referring to FIGS. 1 and 16, in operation S910, the memory controller 120 may receive the write request WR from the external host device. The write request WR may be received using the command UPIU. In an embodiment, the memory controller 120 may transmit the "Ready to Transfer" UPIU to the external host device in response to the write request WR and may receive the write data from the external host device together with the "Data Out" UPIU.

In operation S920, the memory controller 120 may store the data in a zone buffer. In an embodiment, the memory controller 120 may allocate a plurality of zone buffers to the internal buffer 123. Each zone buffer may store data to be written in a corresponding zone. The memory controller 120 may identify the target zone based on a logical address of the data received together with the write request WR and the zone map table and may store the data in the zone buffer of the target zone.

In operation S930, the memory controller 120 may determine whether all page data of the target zone are collected. For example, based on the cell type of the target zone corresponding to the TLC cell type, when three page data having logical addresses sequential to the logical address of the last data written in the target zone are stored in the zone buffer, the memory controller 120 may determine that all the page data of the target zone are collected.

When all the data of the target zone are not collected, the memory controller 120 may end the process in a state where data are stored in the zone buffer. When all the data of the target zone are collected, in operation S950, the memory controller 120 may perform the write operation on the target zone. For example, the memory controller 120 may write the data by performing the write operation on one or more erase units of the nonvolatile memory device 110 which may be allocated to the target zone.

Figure 17:
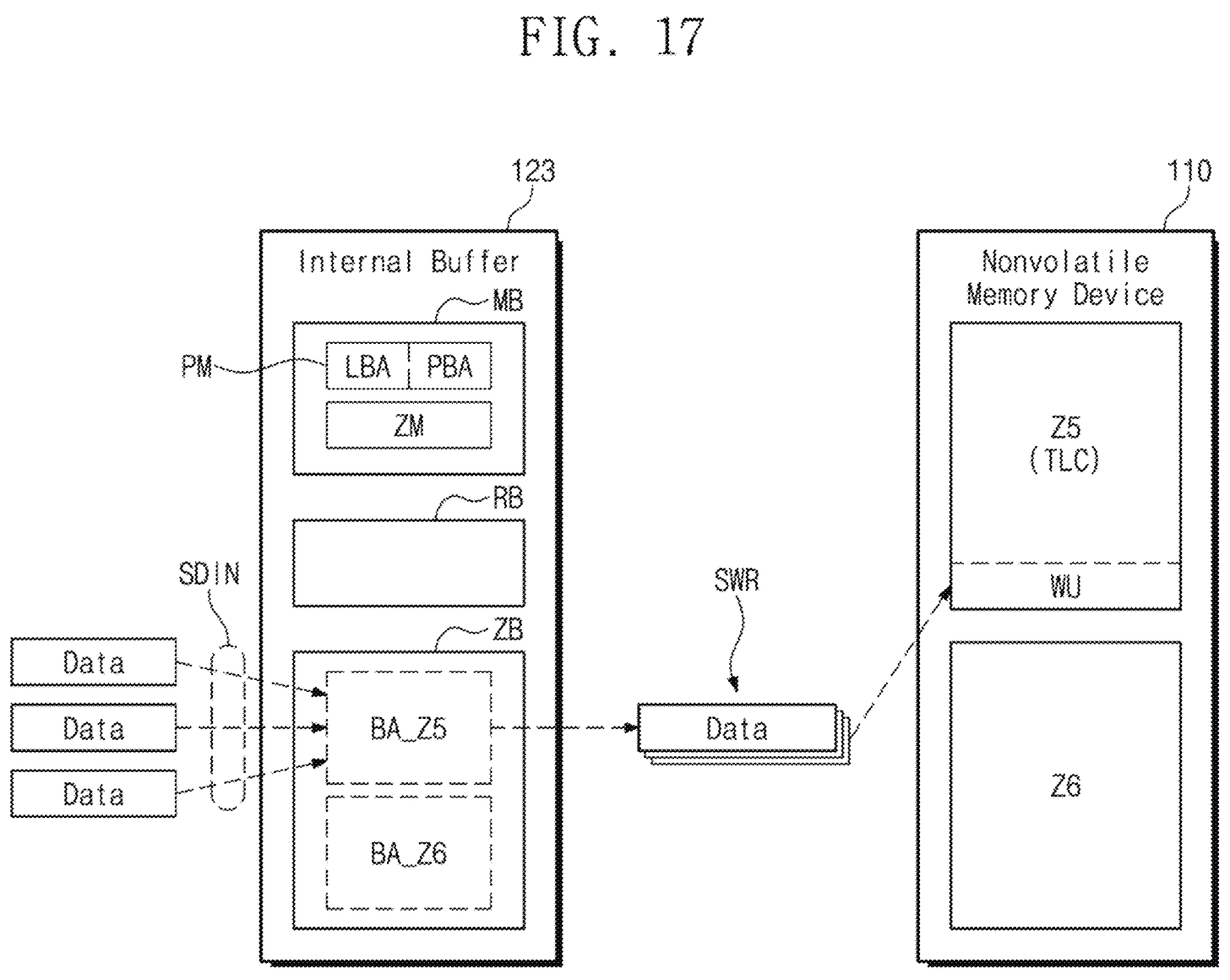

FIG. 17 is a diagram illustrating an example in which data are written in the nonvolatile memory device 110 based on the method of FIG. 16. Although FIG. 17 only illustrates the internal buffer 123 and one nonvolatile memory device 110, embodiments are not limited thereto, and other components may be present, or may be used.

Referring to FIGS. 1, 16, and 17, the internal buffer 123 may include a meta buffer MB, a read buffer RB, and a zone buffer ZB. The meta buffer MB may be used to store the meta data. For example, the meta buffer MB may store a zone map table ZM and the page map table PM. The read buffer RB may be used to store the data read from the nonvolatile memory device 110.

The zone buffer ZB may be used to store the data to be written in the logical units LU (as shown, for example, in FIGS. 3A to 3E) allocated to the zone write ZW. An embodiment in which the zone buffer ZB includes a zone buffer BA_Z5 corresponding to the fifth zone Z5 and a zone buffer BA_Z6 corresponding to the sixth zone Z6 is illustrated. In an embodiment, the internal buffer 123 may further include a buffer that is used to store the data to be written in the logical units LU allocated to the random write RW.

In a data input step SDIN, the data that are received from the external host device in order to be written in the fifth zone Z5 may be stored in the zone buffer BA_Z5 of the fifth zone Z5. When the data corresponding to a write unit WU of the fifth zone Z5 are stored in the zone buffer BA_Z5 of the fifth zone Z5, in a write step SWR, the memory controller 120 may read the data corresponding to the write unit WU from the zone buffer BA_Z5 of the fifth zone Z5 and may write the read data in the fifth zone Z5. For example, when the cell type of the fifth zone Z5 corresponds to the TLC cell type, the write unit WU of the fifth zone Z5 may correspond to three page data.

Before, while, or after writing the data of the write unit WU in the fifth zone Z5, the memory controller 120 may generate the page map table PM mapping the logical address LBA and the physical address PBA. The page map table PM may be stored in the meta buffer MB of the internal buffer 123.

Figure 18:
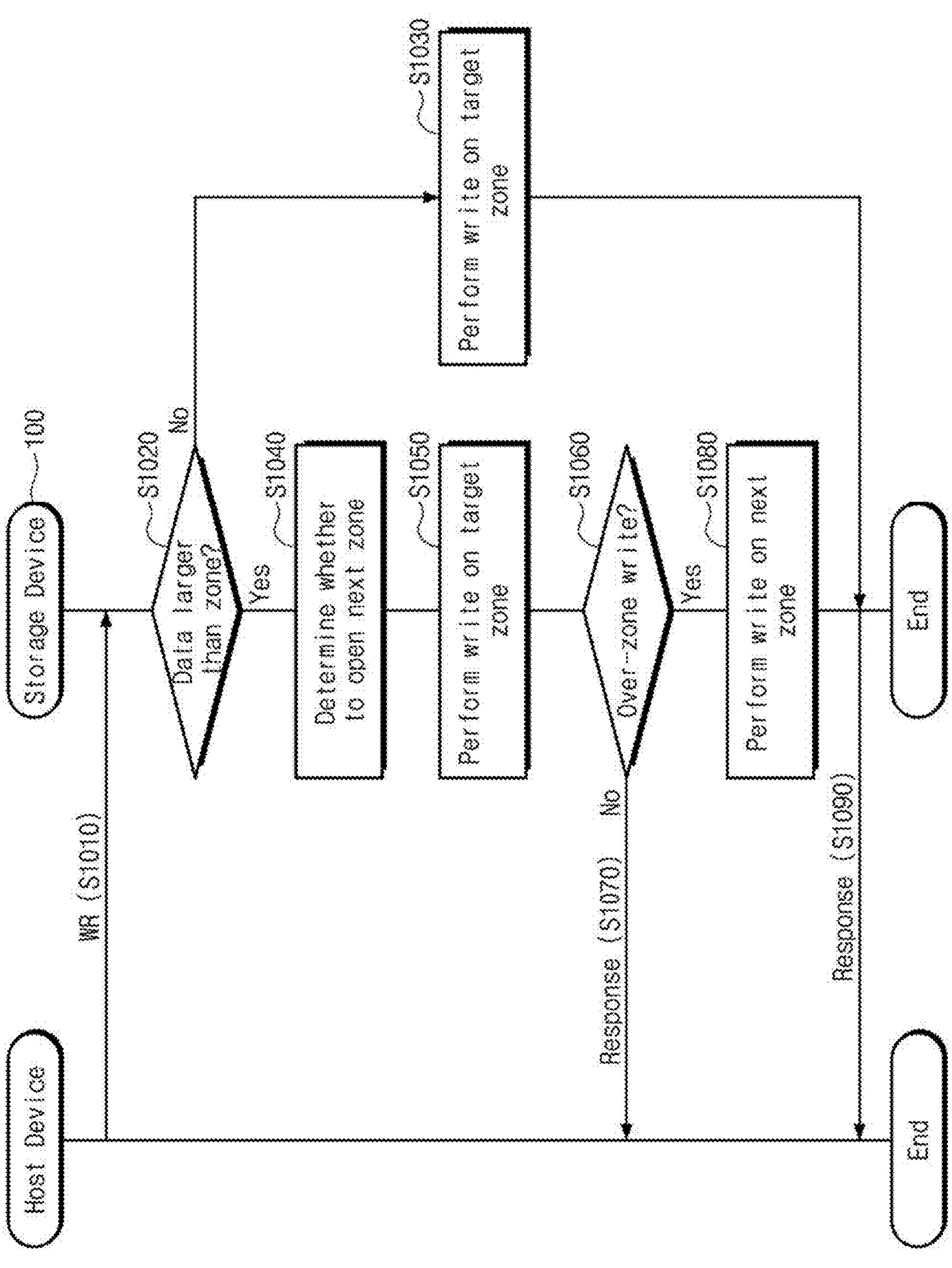
FIG. 18 is a diagram illustrating a first example in which a storage device opens a zone while performing a write operation, according to an embodiment.

FIG. 18 is a diagram illustrating a first example in which the storage device 100 opens a zone while performing a write operation. Referring to FIGS. 1 and 18, in operation S1010, the memory controller 120 may receive the write request WR from the external host device. The write request WR may be received using the command UPIU.

In operation S1020, the memory controller 120 may determine whether the write-requested data are larger than the zone. For example, when the amount of data write-requested by the write request WR is larger than a free capacity of the target zone, the memory controller 120 may determine that the write-requested data are larger than the zone.

When the write of data larger than the zone is not requested, the memory controller 120 may transmit the "Ready to Transfer" UPIU to the external host device and may receive the write data from the external host device together with the "Data Out" UPIU. In operation S1030, the memory controller may perform a write on the target zone. For example, the memory controller 120 may write the received data in the target zone.

When the write of data larger than the zone is requested, the memory controller 120 may determine whether to open a next zone. When it is determined that the next zone is to be opened (e.g., when there is a need or desire to open the next zone), the memory controller 120 may open the next zone internally without the communication with the external host device. The next zone may be a zone that follows on logical addresses.

In operation S1050, the memory controller 120 may perform the write on the target zone of the received data. Between operation S1020 and operation S1050, the memory controller 120 may transmit the "Ready to Transfer" UPIU to the external host device and may receive the write data from the external host device together with the "Data Out" UPIU.

In operation S1060, the memory controller 120 may determine whether a write larger than the zone (hereinafter referred to as an "over-zone write") is performed. For example, when the next zone is opened, the memory controller 120 may determine that the over-zone write is performed. For example, when the next zone is not opened, the memory controller 120 may determine that the over-zone write is not performed.

When the over-zone write is not performed, in operation S1070 the memory controller 120 may transmit a response to the external host device. The response may include at least one piece of relevant information such as information providing a notification that the write for the target zone is completed, information providing a notification that the write is not completed, and information about the logical address where the write is completed. The response may be output using the response UPIU. Afterwards, the process may end.

When the over-zone write is performed, in operation S1080, the memory controller 120 may perform the write on the next zone. Afterwards, in operation S1090, the memory controller 120 may transmit a response to the external host device. The response may include at least one piece of relevant information such as information providing a notification that the write is completed, information providing a notification that the new zone is opened, and information about the cell type of the new zone. The response may be output using the response UPIU.

Figure 19:
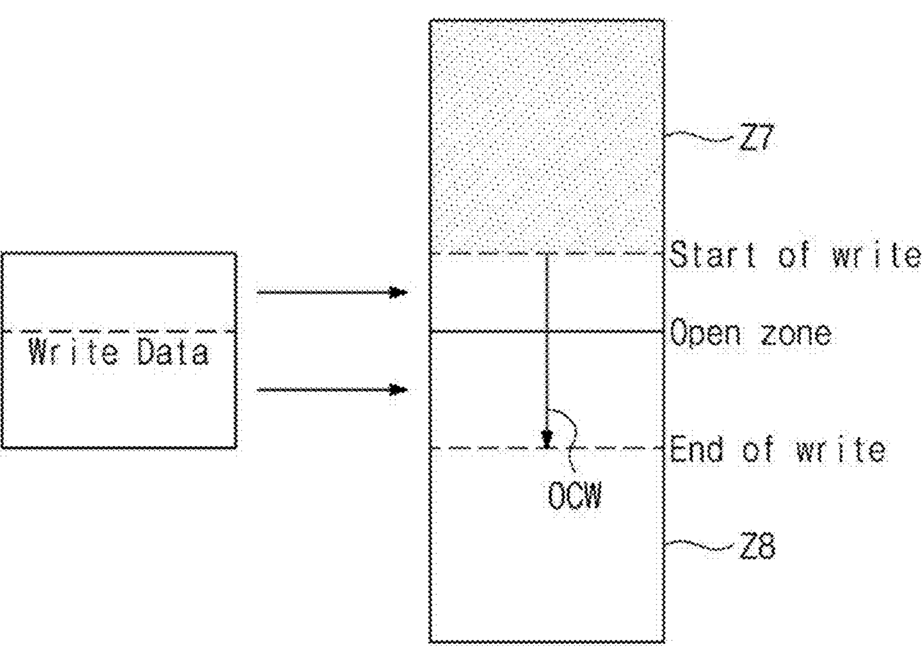
FIG. 19 is a diagram illustrating an example in which an over-zone write is performed, according to an embodiment.

FIG. 19 is a diagram illustrating an example in which an over-zone write is performed. Referring to FIGS. 1 and 19, the write data may be written from a start of the write of a seventh zone Z7. When the seventh zone Z7 is filled by a portion of the write data, the memory controller 120 may open an eighth zone Z8. Afterwards, the write data may be written up to an end of the write through one continuous write OCW.

Figure 20:
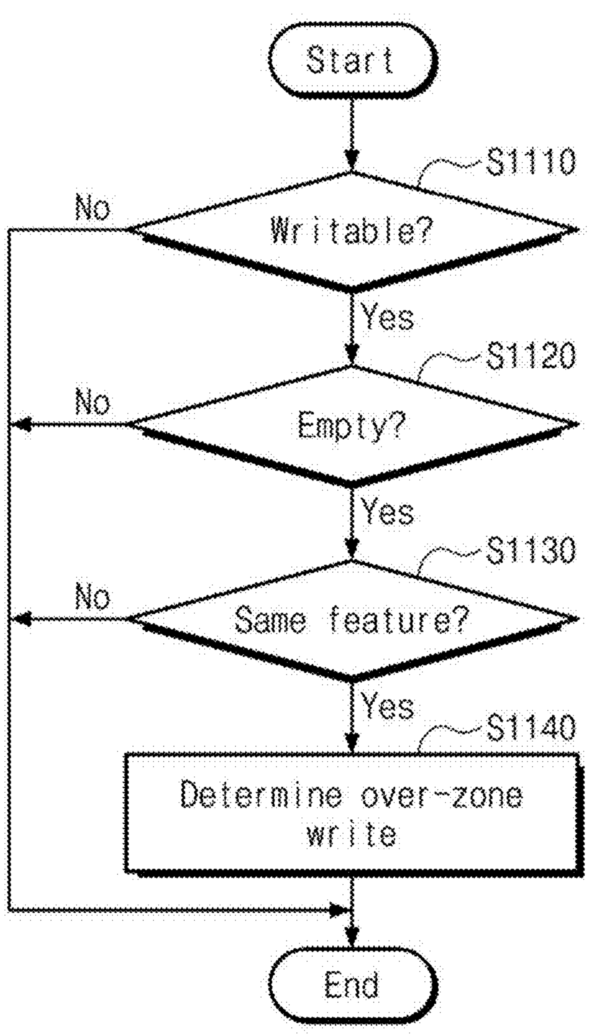
FIG. 20 is a diagram illustrating a first example in which a storage device determines whether to open a next zone, according to an embodiment.

FIG. 20 is a diagram illustrating a first example in which the storage device 100 determines whether to open a next zone. In an embodiment, one or more operations illustrated in FIG. 20 may correspond to operation S1040 of FIG. 18. Referring to FIGS. 1 and 20, in operation S1110, the memory controller 120 may determine whether a next zone is writable. For example, when the next zone is a read-only zone, the next zone may not be writable. When the next zone is not writable, the memory controller 120 may determine not to open the next zone.

When the next zone is writable, in operation S1120, the memory controller 120 may determine whether the next zone is empty. When the data are already written in the next zone, the memory controller 120 may determine that the next zone is not empty.

When the next zone is empty, the memory controller 120 may determine whether the next zone has the same feature as the target zone. For example, the memory controller 120 may open the next zone selectively depending on the feature of the target zone and the feature of the next zone. When the feature of the target zone is the same as the feature of the next zone, the memory controller 120 may determine to open the next zone. When the feature of the target zone and the feature of the next zone are different from each other, the memory controller 120 may determine not to open the next zone.

For example, the feature of each zone may include the cell type being the number of bits written per memory cell of each zone. When the cell type of the target zone is the same as the cell type of the next zone, the memory controller 120 may open the next zone.

The feature of each zone may include a stream identifier. The memory controller 120 may receive the stream identifier together when receiving the write request WR from the external host device. The memory controller 120 or the external host device may allocate the stream identifier to each zone and may write the data having the corresponding stream identifier. When the stream identifier allocated to the target zone is the same as the stream identifier of the next zone, the memory controller 120 may open the next zone.

The feature of each zone may include a temperature. The memory controller 120 may assign a temperature to each zone depending on the frequency of update of data written in each zone. For example, when the frequency of update of the data of the first zone Z1 is lower than a first threshold value, the memory controller 120 may classify the first zone Z1 as a cold zone. When the frequency of update of the data of the second zone Z2 is higher than or equal to the first threshold value and is lower than a second threshold value, the memory controller 120 may classify the second zone Z2 as a warm zone. When the frequency of update of the data of the third zone Z3 is higher than or equal to the second threshold value, the memory controller 120 may classify the third zone Z3 as a hot zone. When the temperature of the target zone is the same as the temperature of the next zone, the memory controller 120 may open the next zone.

For example, when the next zone is writable and empty and the feature of the next zone is the same as the feature of the target zone, in operation S1140, the memory controller 120 may determine to proceed with the over-zone write using the next zone.

Figure 21:
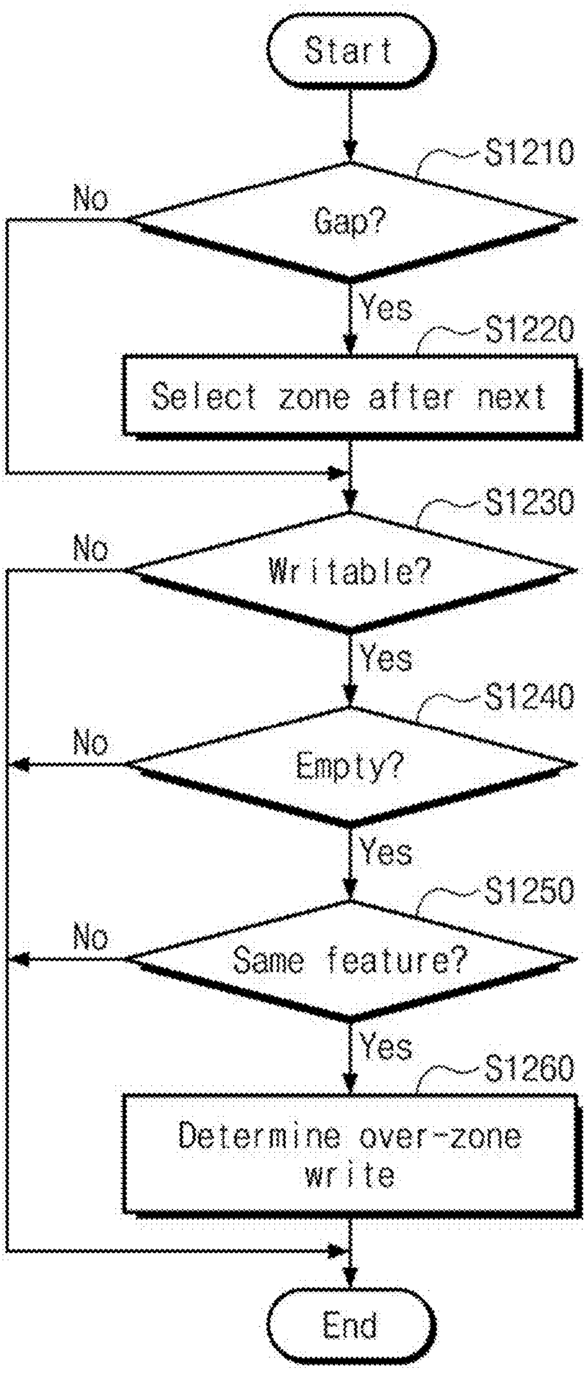
FIG. 21 is a diagram illustrating a second example in which a storage device determines whether to open a next zone, according to an embodiment.

FIG. 21 is a diagram illustrating a second example in which the storage device 100 determines whether to open a next zone. In an embodiment, one or more operations illustrated in FIG. 21 may correspond to operation S1040 of FIG. 18. Referring to FIGS. 1 and 21, in operation S1210, the memory controller 120 may determine whether a next zone is a gap zone. When the next zone is the gap zone, in operation S1220, the memory controller 120 may select a zone after the next zone. Afterwards, the memory controller 120 may determine whether to open the zone after the next zone by performing operation S1230, operation S1240, operation S1250, and operation S1260 with respect to the zone after the next zone.

When the next zone is not the gap zone, in operation S1220, the memory controller 120 may maintain the selection of the next zone. Afterwards, the memory controller 120 may determine whether to open the next zone by performing operation S1230, operation S1240, operation S1250, and operation S1260 with respect to the next zone.

Operation S1230, operation S1240, operation S1250, and operation S1260 are performed to be the same as operation S1110, operation S1120, operation S1130, and operation S1140 of FIG. 20. Thus, redundant or duplicative description may be omitted.

Figure 22:
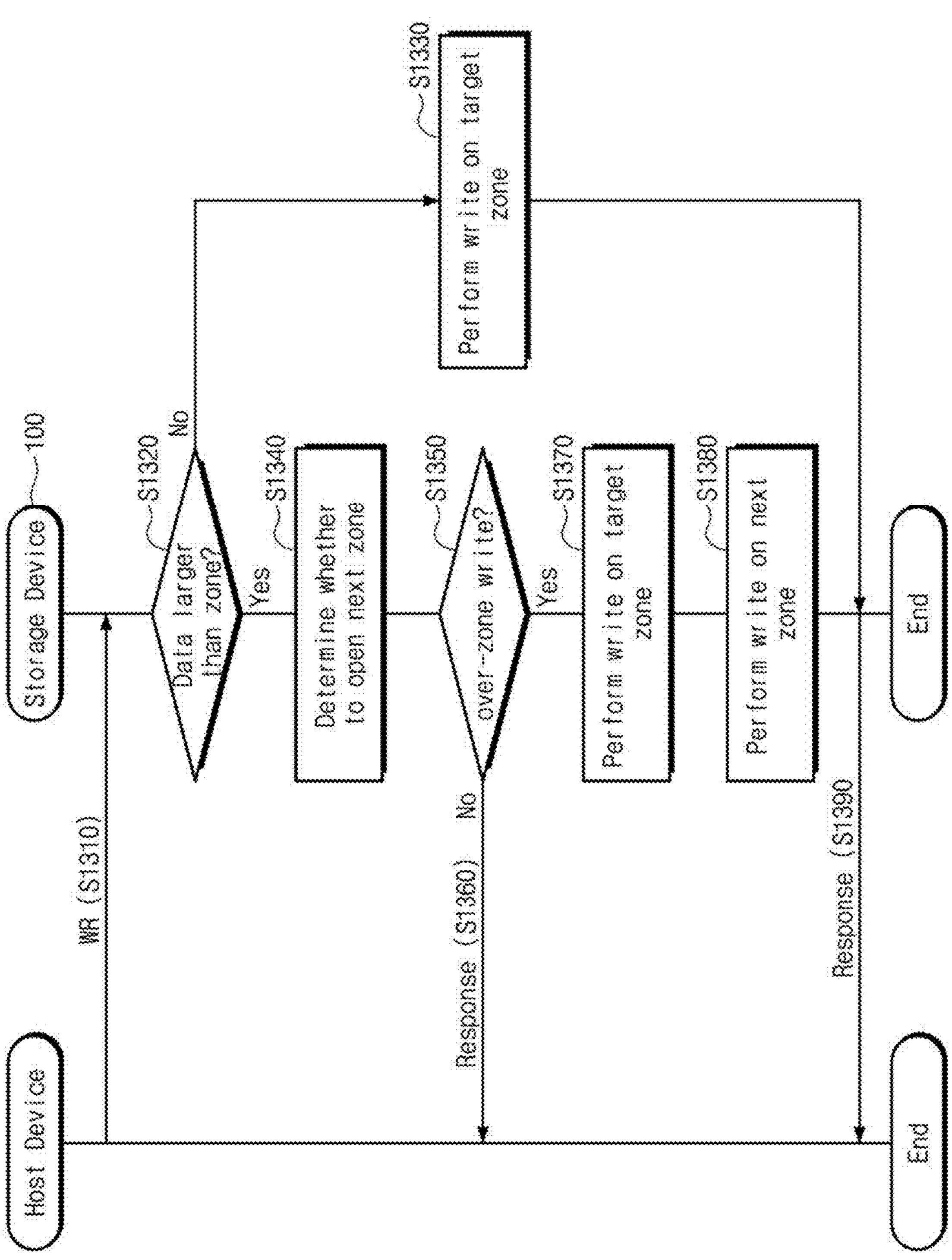
FIG. 22 is a diagram illustrating a second example in which a storage device opens a zone while performing a write operation, according to an embodiment.

FIG. 22 is a diagram illustrating a second example in which the storage device 100 opens a zone while performing a write operation. Referring to FIGS. 1 and 22, in operation S1310, the memory controller 120 may receive the write request WR from the external host device. The write request WR may be received using the command UPIU.

In operation S1320, the memory controller 120 may determine whether the write-requested data are larger than the zone. For example, when the amount of data write-requested by the write request WR is larger than a free capacity of the target zone, the memory controller 120 may determine that the write-requested data are larger than the zone.

When the write of data being over the zone is not requested, the memory controller 120 may transmit the "Ready to Transfer" UPIU to the external host device and may receive the write data from the external host device together with the "Data Out" UPIU. In operation S1330, the memory controller may perform a write on the target zone. For example, the memory controller 120 may write the received data in the target zone.

When the write of data larger than the zone is requested, the memory controller 120 may determine whether to open a next zone. When it is determined that the next zone is to be opened (e.g., when there is a need or desire to open the next zone), the memory controller 120 may open the next zone internally without the communication with the external host device. The next zone may be a zone that follows on logical addresses.

In operation S1350, the memory controller 120 may determine whether the over-zone write is performed. For example, when the next zone is opened, the memory controller 120 may determine the over-zone write is performed. For example, when the next zone is not opened, the memory controller 120 may determine that the over-zone write is not performed.

When the over-zone write is not performed, in operation S1360, the memory controller 120 may transmit a response to the external host device. The response may include at least one piece of relevant information such as information providing a notification that the write is completed and information providing a notification that the amount of data is larger than a free capacity of a target zone. The response may be output using the response UPIU. Afterwards, the process may end.

When the over-zone write is performed, in operation S1370, the memory controller 120 may perform the write on the target zone of the received data. Between operation S1320 and operation S1350 (or between operation S1350 and operation S1370), the memory controller 120 may transmit the "Ready to Transfer" UPIU to the external host device and may receive the write data from the external host device together with the "Data Out" UPIU.

In operation S1380, the memory controller 120 may perform the write on the next zone. Afterwards, in operation S1390, the memory controller 120 may transmit a response to the external host device. The response may include at least one piece of relevant information such as information providing a notification that the write is completed, information providing a notification that the new zone is opened, and information about the cell type of the new zone. The response may be output using the response UPIU.

Figure 23:
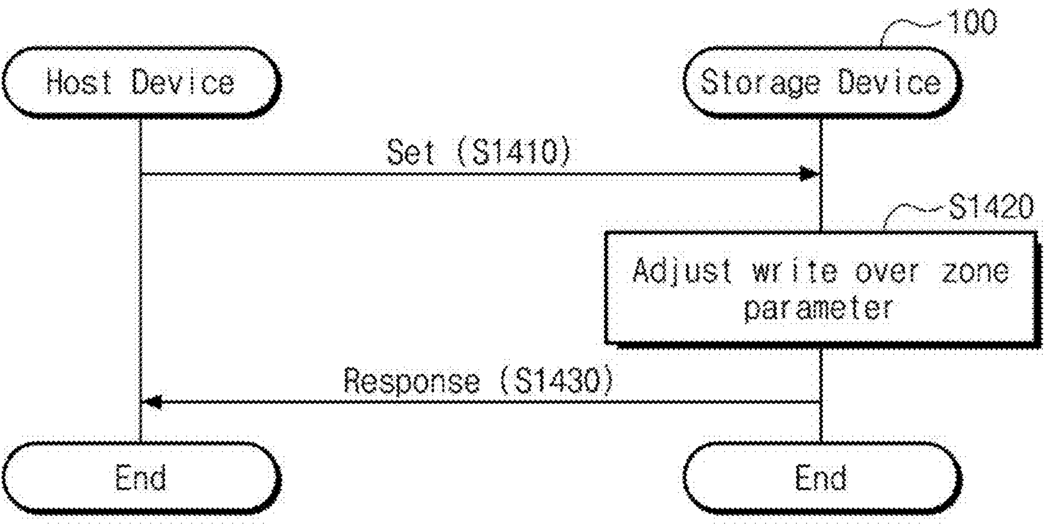
FIG. 23 is a diagram illustrating an example in which a storage device adjusts settings for an over-zone write, according to an embodiment.

FIG. 23 is a diagram illustrating an example in which the storage device 100 adjusts settings for an over-zone write. Referring to FIGS. 1 and 23, in operation S1410, the memory controller 120 may receive a set request from the external host device. The set request may be received using the command UPIU or the query request UPIU.

The set request may include information about parameters for performing the over-zone write. In an embodiment, the set request may include information about whether to activate one or more conditions for determining whether to open a new zone, for example, conditions described with reference to FIG. 20 or 21. The set request may include information about whether to activate the method described with reference to FIG. 19 and/or the method described with reference to FIG. 22, or whether to deactivate all the methods.

In operation S1420, the memory controller 120 may adjust a write-over-zone parameter(s) in response to the set request. In operation S1430, the memory controller 120 may transmit a response to the external host device. The response may include information providing a notification that the write-over-zone parameters are successfully adjusted. The response may be output using the response UPIU or the query response UPIU.

Figure 24:
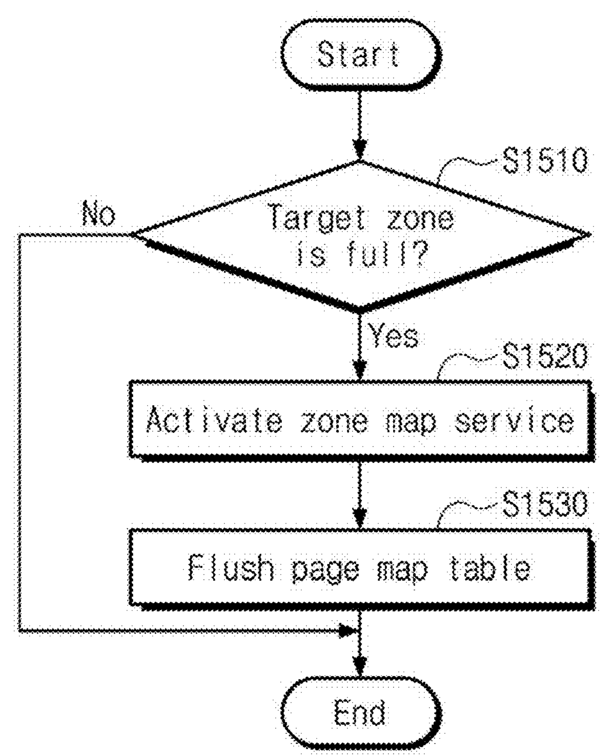
FIG. 24 is a diagram illustrating a first example in which a storage device provides a zone map service, according to an embodiment.

FIG. 24 is a diagram illustrating a first example in which the storage device 100 provides a zone map service. Referring to FIGS. 1 and 24, in operation S1510, the memory controller 120 may determine whether the target zone is full. For example, the memory controller 120 may perform the write operation on the target zone and may determine whether the free capacity of the target zone is exhausted by the write operation.

When the target zone is not full, the memory controller 120 may not activate the zone map service for the target zone. When the target zone is full, the memory controller 120 may activate the zone map service for the target zone. When the zone map service for the target zone is activated, the memory controller 120 may process the read requests for the target zone, for example, the read requests of the external host device based on the zone map table of the target zone.

After the zone map service for the target zone is activated, in operation S1530, the memory controller 120 may flush the page map table of the target zone. For example, the memory controller 120 may write (or back up) the page map table of the target zone in (or to) the meta area MA of the nonvolatile memory device 110. When the zone map service of the target zone is activated, because the page map table of the target zone is not used any longer, the memory controller 120 may discard the page map table of the target zone from the internal buffer 123. In an embodiment, the memory controller 120 may close the zone full of data.

Figures 25, 26:
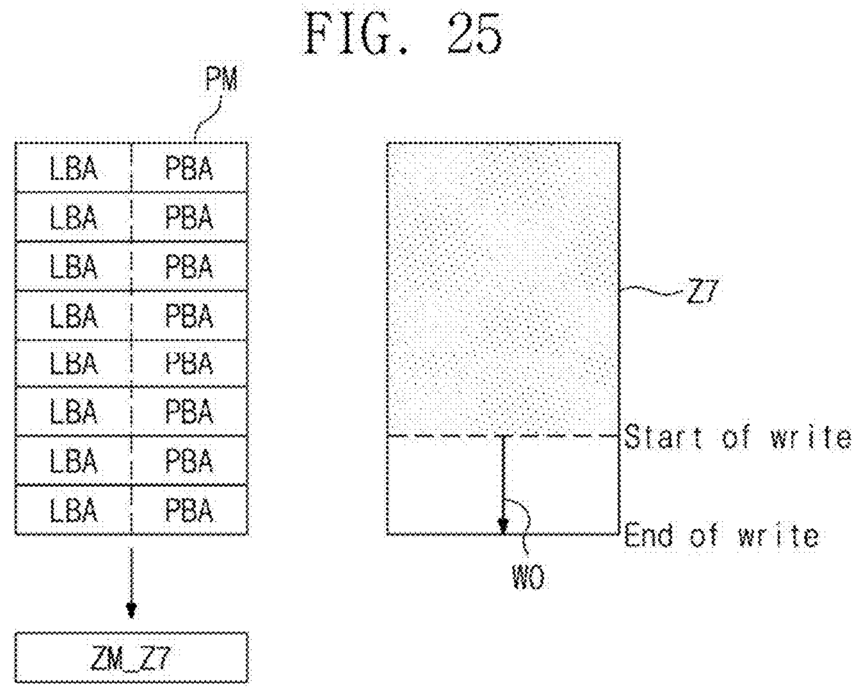
FIG. 25 is a diagram illustrating an example in which a zone map service is activated based on the method of FIG. 24, according to an embodiment.
FIG. 26 is a diagram illustrating a second example in which a storage device provides a zone map service, according to an embodiment.

FIG. 25 is a diagram illustrating an example in which a zone map service is activated based on the method of FIG. 24. Referring to FIGS. 1 and 25, as the data are written in the seventh zone Z7, the page map table PM of the seventh zone Z7 may be sequentially generated. When the data are written from a start of the write to an end of the write by the write operation WO, the seventh zone Z7 may be full. When the seventh zone Z7 is full, the additional write for the seventh zone Z7 may be prohibited, and the seventh zone Z7 may be used as read-only. When the zone map service of the seventh zone Z7 is activated, the memory controller 120 may perform the read operation using a zone map table ZM_Z7 of the seventh zone Z7.

FIG. 26 is a diagram illustrating a second example in which the storage device 100 provides a zone map service. Referring to FIGS. 1 and 26, in operation S1610, the memory controller 120 may determine whether the target zone is closed. For example, the memory controller 120 may determine whether the target zone is closed, based on a close zone request for the target zone being received from the external host device.

When the target zone is not closed, the memory controller 120 may not activate the zone map service for the target zone. When the target zone is closed, in operation S1620, the memory controller 120 may determine whether data to be written in the target zone are all written in the target zone. For example, when data to be written in the target zone are all written in the target zone, in operation S1630, the memory controller 120 may activate the zone map service for the target zone. When the zone map service for the target zone is activated, the memory controller 120 may process the read requests for the target zone, for example the read requests of the external host device based on the zone map table of the target zone.

After the zone map service for the target zone is activated, in operation S1640, the memory controller 120 may flush the page map table of the target zone. For example, the memory controller 120 may write (or back up) the page map table of the target zone in (or to) the meta area MA of the nonvolatile memory device 110. When the zone map service of the target zone is activated, because the page map table of the target zone is not used any longer, the memory controller 120 may discard the page map table of the target zone from the internal buffer 123.

When data to be written in the target zone are not all written in the target zone, for example, when a portion of the data to be written in the target zone is written in the erase unit for backup, the memory controller 120 may trigger migration such that the corresponding data are moved to the target zone. When the migration is completed, in operation S1630, the memory controller 120 may activate the zone map service for the target zone. Afterwards, in operation S1640, the memory controller 120 may flush the page map table of the target zone. The memory controller 120 may discard the page map table of the target zone from the internal buffer 123.

Figure 27:
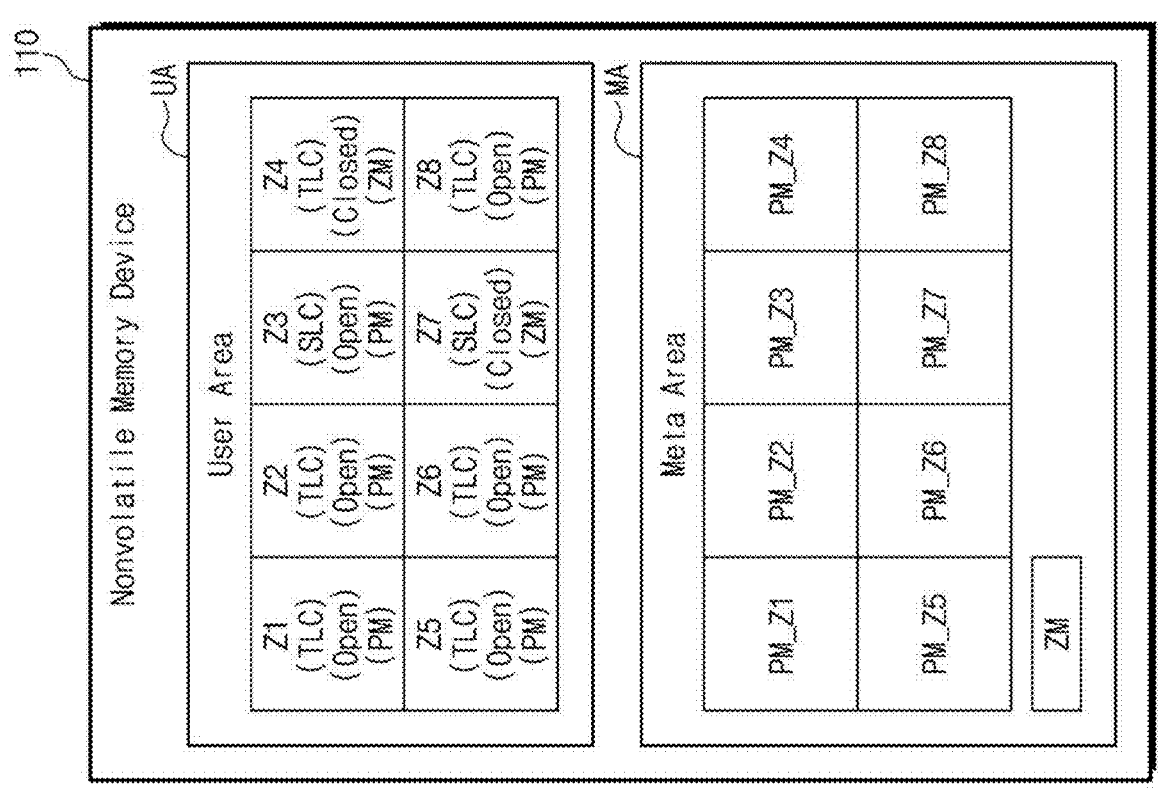
FIG. 27 is a diagram illustrating an example in which a memory controller manages meta data in an internal buffer, according to an embodiment.
Figure 27:
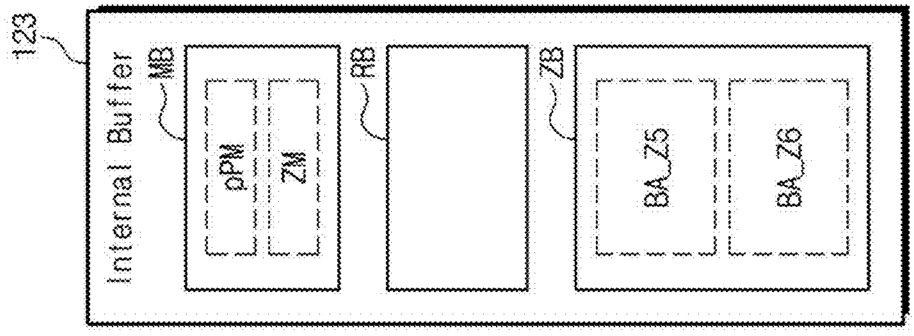

FIG. 27 is a diagram illustrating an example in which the memory controller 120 manages meta data in the internal buffer 123. Although FIG. 27 only illustrates the internal buffer 123 and the nonvolatile memory device 110, embodiments are not limited thereto, and other components may be present, or may be used. Referring to FIGS. 1 and 27, the cell type of the first zone Z1 may correspond to the TLC cell type. The first zone Z1 may be an open zone; in this case, the first zone Z1 may be managed based on the page map table PM.

The cell type of the second zone Z2 may correspond to the TLC cell type. The second zone Z2 may be an open zone; in this case, the second zone Z2 may be managed based on the page map table PM. The cell type of the third zone Z3 may correspond to the SLC cell type. The third zone Z3 may be an open zone; in this case, the third zone Z3 may be managed based on the page map table PM. The cell type of the fourth zone Z4 may correspond to the TLC cell type. The fourth zone Z4 may be a closed zone; in this case, the fourth zone Z4 may be managed based on the zone map table ZM.

The cell type of the fifth zone Z5 may correspond to the TLC cell type. The fifth zone Z5 may be an open zone; in this case, the fifth zone Z5 may be managed based on the page map table PM. The cell type of the sixth zone Z6 may correspond to the TLC cell type. The sixth zone Z6 may be an open zone; in this case, the sixth zone Z6 may be managed based on the page map table PM. The cell type of the seventh zone Z7 may correspond to the SLC cell type. The seventh zone Z7 may be a closed zone; in this case, the seventh zone Z7 may be managed based on the zone map table ZM. The cell type of the eighth zone Z8 may correspond to the TLC cell type. The eighth zone Z8 may be an open zone; in this case, the eighth zone Z8 may be managed based on the page map table PM.

The memory controller 120 may store a page map table PM_Z1 of the first zone Z1, a page map table PM_Z2 of the second zone Z2, a page map table PM_Z3 of the third zone Z3, a page map table PM_Z4 of the fourth zone Z4, a page map table PM_Z5 of the fifth zone Z5, a page map table PM_Z6 of the sixth zone Z6, a page map table PM_Z7 of the seventh zone Z7, a page map table PM_Z8 of the eighth zone Z8, and the zone map table ZM in the meta area MA of the nonvolatile memory device 110.

The internal buffer 123 of the memory controller 120 may include the meta buffer MB, the read buffer RB, and the zone buffer ZB. For example, the zone buffer ZB may include the zone buffer BA_Z5 of the fifth zone Z5 and the zone buffer BA_Z6 of the sixth zone Z6.

The memory controller 120 may store the zone map table ZM and a partial page map table pPM in the meta buffer MB of the internal buffer 123. Because the storage capacity of the internal buffer 123 is limited, it may be impossible to load all the data of the meta area MA of the nonvolatile memory device 110 to the meta buffer MB. The memory controller 120 may allow the zone map table ZM to reside in the meta buffer MB and may load a necessary or desired portion of the page map tables PM_Z1, PM_Z2, PM_Z3, PM_Z4, PM_Z5, PM_Z6, PM_Z7, and PM_Z8 to the meta buffer MB as the partial page map table pPM.

Figure 28:
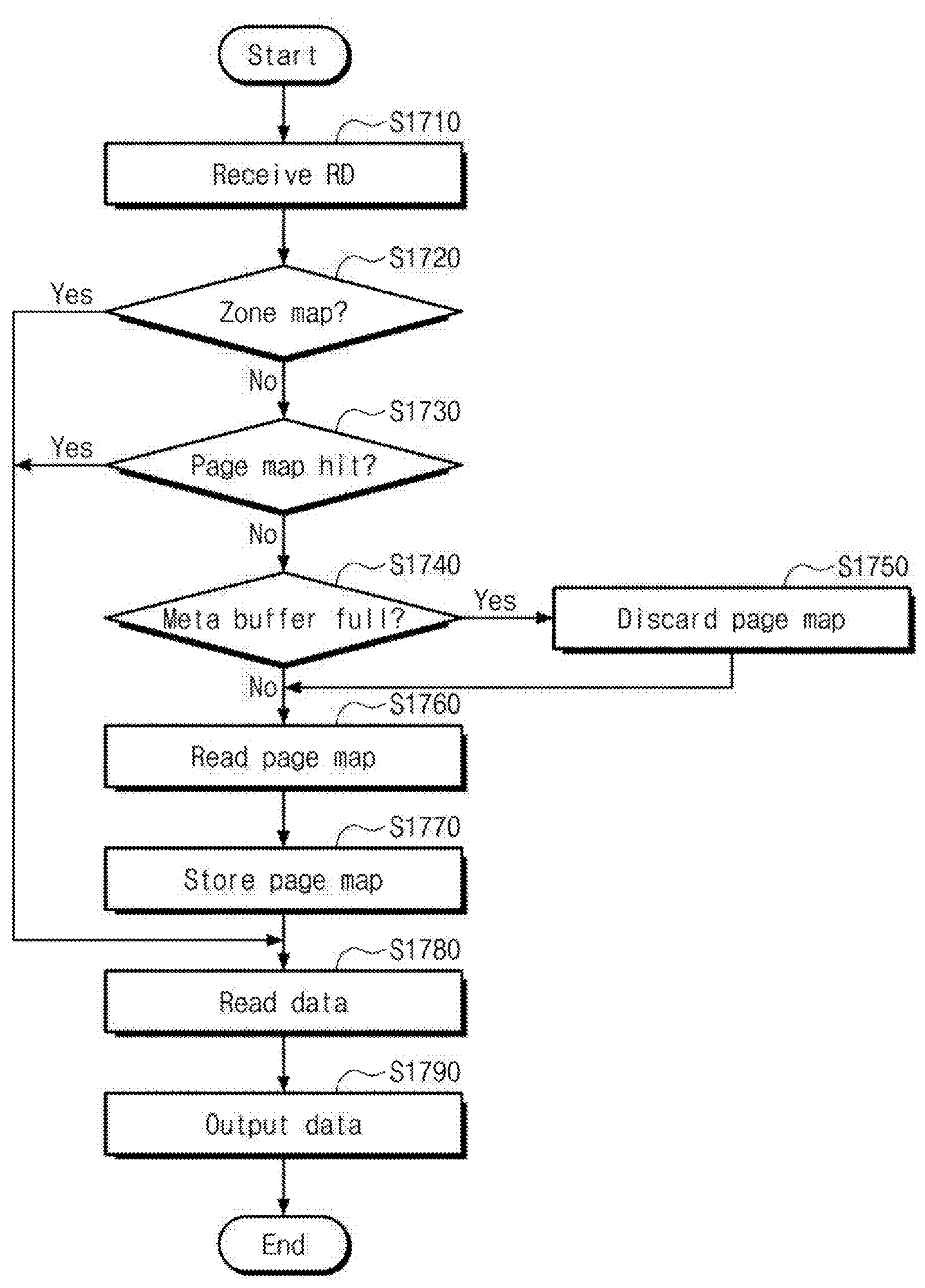
FIG. 28 is a diagram illustrating an example in which a storage device provides a read service based on a zone map table and a page map table, according to an embodiment.

FIG. 28 is a diagram illustrating an example in which the storage device 100 provides a read service based on a zone map table and a page map table. Referring to FIGS. 1, 27, and 28, in operation S1710, the memory controller 120 may receive a read request RD from the external host device.

In operation S1720, the memory controller 120 may determine whether the zone map service of the read-requested target zone is activated. When zone map service of the read-requested target zone is activated, in operation S1780, the memory controller 120 may read data from the nonvolatile memory device 110. For example, the memory controller 120 may identify the target zone based on the logical address included in the read request RD and the zone map table ZM, may calculate the offset of the write pointer WP from the logical address, and may calculate the physical address of the nonvolatile memory device 110 based on the offset. The memory controller 120 may read the data from the nonvolatile memory device 110 using the calculated physical address. Afterwards, in operation S1790, the memory controller 120 may output the data to the external host device.

When the zone map service of the target zone is not activated, in operation S1730, the memory controller 120 may determine whether a page map hit occurs. For example, when the logical address included in the read request RD is stored in the partial page map table pPM loaded to the meta buffer MB of the internal buffer 123, the page map hit may occur. When the page map hit occurs, the memory controller 120 may perform the read operation by performing operation S1780 and operation S1790 based on the logical address and the partial page map table pPM.

When the page map hit does not occur, in operation S1740, the memory controller 120 may determine whether the meta buffer MB is full. When the meta buffer MB is full, the memory controller 120 may select victim data from the partial page map table pPM. For example, the data first loaded to the meta buffer MB or the data used the longest time ago may be selected as the victim data. In operation S1750, the memory controller 120 may discard the page map table selected as the victim data.

When the free space is present in the meta buffer MB or when the free space is secured by discarding the page map table selected as the victim data, in operation S1760, the memory controller 120 may read a page map table corresponding to the logical address included in the read request RD from the meta area MA of the nonvolatile memory device 110. In operation S1770, the memory controller 120 may store the read page map table in the meta buffer MB of the internal buffer 123 as a portion of the partial page map table pPM. Afterwards, the memory controller 120 may perform the read operation by performing operation S1780 and operation S1790 based on the logical address and the partial page map table pPM.

As described above, when the zone map service is activated, there may be omitted an operation of determining whether the page map hit occurs or reading the page map table from the nonvolatile memory device 110. Accordingly, a speed at which the storage device 100 processes the read requests from the external host device may be improved.

In an embodiment, in the power-on event of the storage device 100, the memory controller 120 may read the zone map table ZM from the meta area MA of the nonvolatile memory device 110 and may store the zone map table ZM in the meta buffer MB of the internal buffer 123. In the power-off event of the storage device 100, the memory controller 120 may write (e.g., back up) the zone map table ZM stored in the meta buffer MB of the internal buffer 123 in the meta area MA of the nonvolatile memory device 110.

Figure 29:
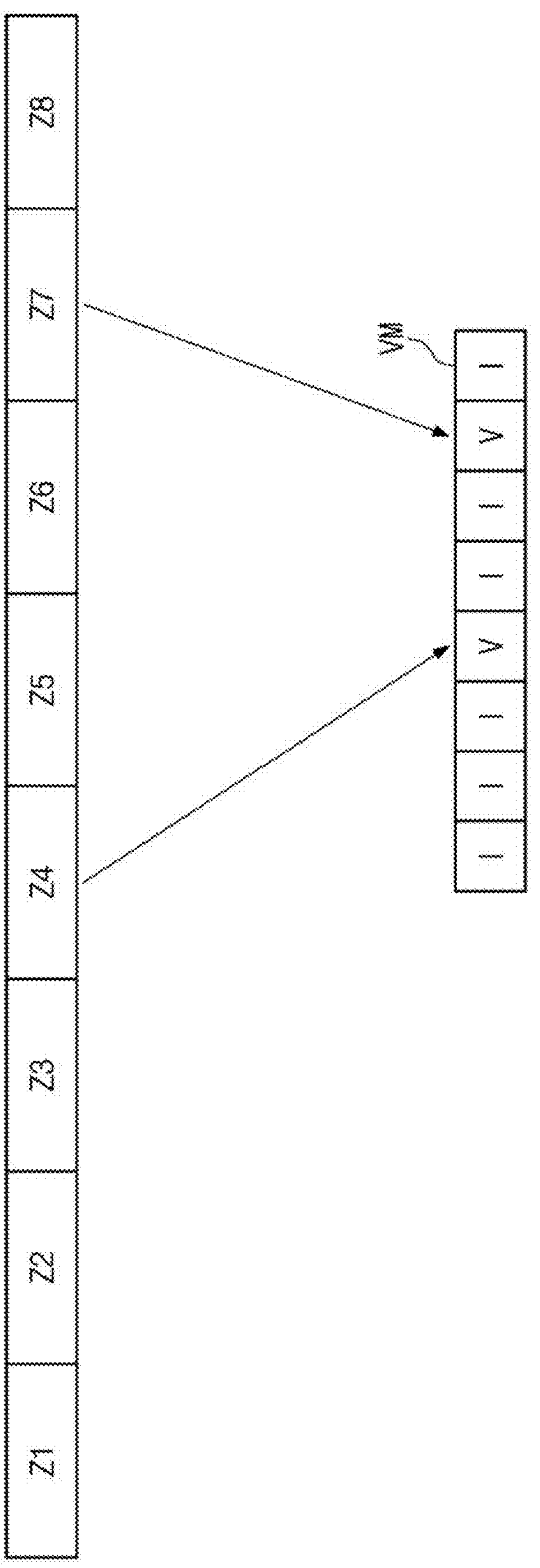
FIG. 29 is a diagram illustrating an example in which a storage device manages activation information about a zone map service, according to an embodiment.

FIG. 29 is a diagram illustrating an example in which the storage device 100 manages activation information about a zone map service. Referring to FIGS. 1, 27, and 29, the memory controller 120 may manage activation of the zone map service using a valid map VM. The valid map VM may be a bitmap that includes bits respectively corresponding to the first zone Z1, the second zone Z2, the third zone Z3, the fourth zone Z4, the fifth zone Z5, the sixth zone Z6, the seventh zone Z7, and the eighth zone Z8.

Because the first zone Z1, the second zone Z2, the third zone Z3, the fifth zone Z5, the sixth zone Z6, and the eighth zone Z8 are in an open state, the corresponding bits of the valid map VM may be set to bit "I" indicating that the zone map service is in an invalid state for those zones. Because the fourth zone Z4 and the seventh zone Z7 are in a closed state, the corresponding bits of the valid map VM may be set to bit "V" indicating that the zone map service is in a valid state for those zones.

When the read request for an arbitrary zone is received from the external host device, the memory controller 120 may check the corresponding bit of the valid map VM. When the corresponding bit of the valid map VM is set to bit "V" indicating the valid state, the memory controller 120 may calculate the physical address based on the logical address and the zone map table. When the corresponding bit of the valid map VM is set to bit "I" indicating the invalid state, the memory controller 120 may obtain a corresponding page map table by performing operation S1730 to operation S1770 of FIG. 28 and may obtain the physical address based on the logical address and the page map table.

FIG. 30 is a diagram illustrating an example of a recovery where the storage device 100 processes an access error. Referring to FIGS. 1 and 30, in operation S1810, the memory controller 120 may receive an access request from the external host device. The access request may be received using the command UPIU.

In operation S1820, the memory controller 120 may perform the access operation. For example, in response to the access request, the memory controller 120 may perform the access operation, for example, the write operation or the read operation on memory cells of an erase unit in a zone corresponding to the logical address of the access request.

In operation S1830, the memory controller 120 may determine whether an access error occurs. For example, when the write operation fails or when the number of error bits detected in the read operation is greater than or equal to a threshold value, the memory controller 120 may determine that the access error occurs.

When the access error does not occur, in operation S1860, the memory controller 120 may transmit a response to the external host device. The response may include information providing a notification that the access operation succeeds. The response may be output using the response UPIU.

When the access error occurs, in operation S1840, the memory controller 120 may write the data, in which the access error occurs, in a recovery area. For example, the memory controller 120 may write the data targeted for the write operation or the data targeted for the read operation in the recovery area. The recovery area may be defined in the reserved area RVA (as shown for example in FIGS. 3A to 3E). The recovery area may have the same feature as the target zone, for example, the same cell type as the target zone. The capacity of the recovery area may be identical to the capacity of the target zone. The number of erase units EU included in the recovery area may be identical to the number of erase units EU included in the target zone. To write the data, in which the access error occurs, in the recovery area may be referred to as a "recovery operation".

In operation S1850, the memory controller 120 may trigger a post recovery operation. The post recovery operation may include operations for supporting the read operation associated with the data written in the target zone and the data written in the recovery area. Afterwards, in operation S1860, the memory controller 120 may transmit a response to the external host device. The response may include a variety of information such as information providing a notification that an access error occurs and information providing a notification that data are written in the recovery area. As another example, the recovery operation (e.g., including the post recovery operation) may be performed in the background operation by the storage device 100 without providing a notification to the external host device. For example, the response may not include information about the access error or the recovery operation. The response may be output using the response UPIU.

Figure 31:
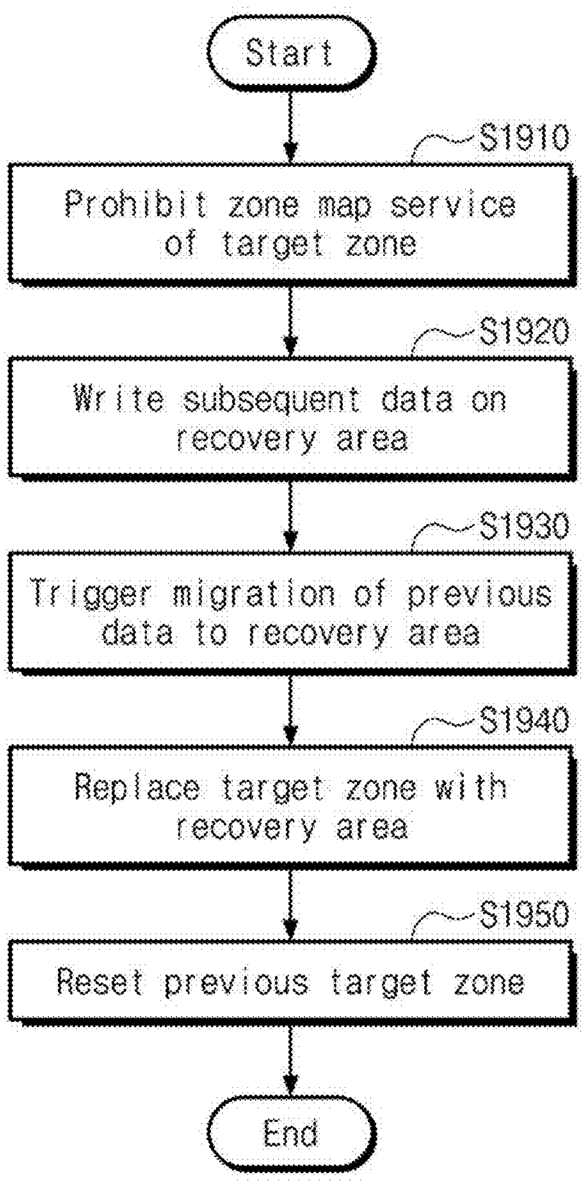
FIG. 31 is a diagram illustrating a first example in which a storage device performs a post recovery operation, according to an embodiment.

FIG. 31 is a diagram illustrating a first example in which the storage device 100 performs a post recovery operation. Referring to FIGS. 1 and 31, in operation S1910, the memory controller 120 may prohibit the zone map service of the target zone where the access error occurs. If the zone map service for the target zone is in an activated state, the memory controller 120 may deactivate the zone map service of the target zone. Afterwards, the memory controller 120 may prohibit the zone map service for the target zone from being activated. If the zone map service for the target zone is deactivated, the memory controller 120 may prohibit the zone map service of the target zone from being activated. The memory controller 120 may perform the access to the target zone based on the page map table. The memory controller 120 may maintain the prohibition of the zone map service of the target zone until the target zone is reset.

In operation S1920, the memory controller 120 may write subsequent data in the recovery area. For example, the memory controller 120 may perform writes, which are pending due to the write request for the target zone by the external host device, on the recovery area.

In operation S1930, the memory controller 120 may trigger migration of previous data to the recovery area. For example, the memory controller 120 may trigger the migration such that the data written in the target zone before the access error occurs are read from the target zone and the read data are written in the recovery area.

When the migration is completed, in operation S1940, the memory controller 120 may replace the target zone with the recovery area. For example, the memory controller 120 may map the target zone to erase units of the recovery area in the zone map table. Afterwards, in operation S1950, the memory controller 120 may reset the previous target zone.

Figure 32A:
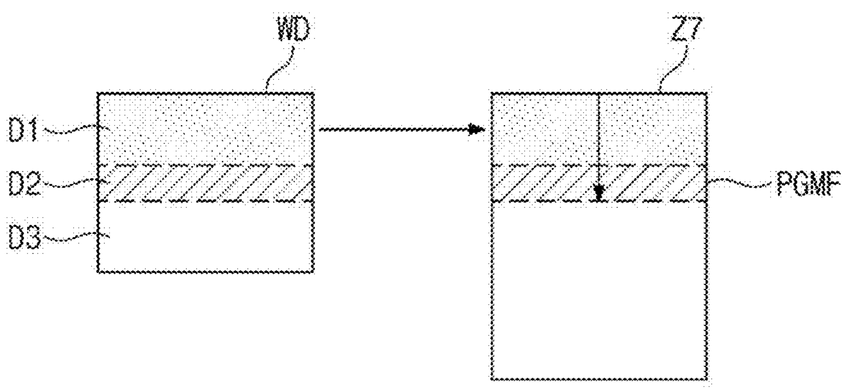
FIGS. 32A to 32D are diagrams illustrating a first example of a process in which there is generated a recovery operation, according to an embodiment.

FIGS. 32A to 32D are diagrams illustrating a first example of a process in which a recovery operation (e.g., including a post recovery operation) is performed. Referring to FIGS. 1 and 32A, the memory controller 120 may write the write data WD in the seventh zone Z7. The write data WD may include first data D1, second data D2, and third data D3. The memory controller 120 may successfully write the first data D1 in the seventh zone Z7. While the memory controller 120 writes the second data D2 in the seventh zone Z7, a write fail PGMF (which may be referred to as a program fail) may occur. When the write fail PGMF occurs, the memory controller 120 may perform the recovery operation.

Figure 32B:
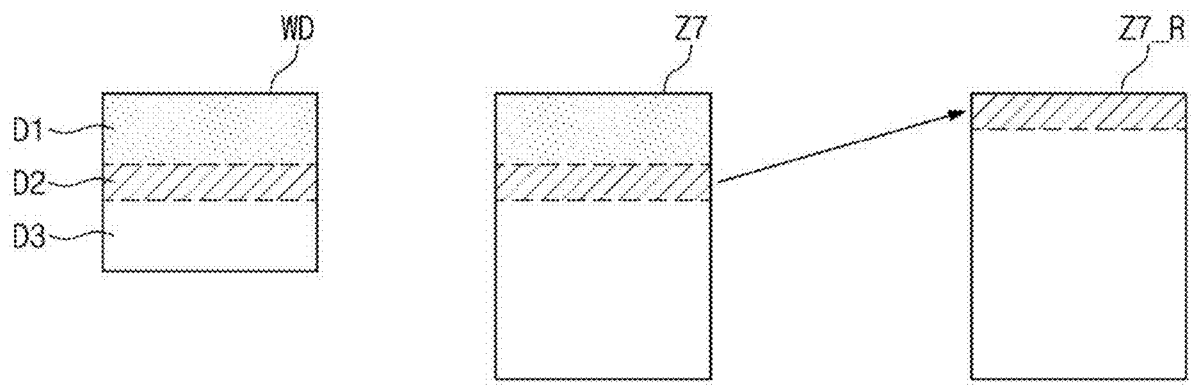

Referring to FIGS. 1 and 32B, the memory controller 120 may open a recovery area Z7_R of the seventh zone Z7. The feature of the recovery area Z7_R such as a cell type may be identical to that of the seventh zone Z7. The memory controller 120 may write the second data D2, in which the write fail PGMF occurs, in the recovery area Z7_R.

Figure 32C:
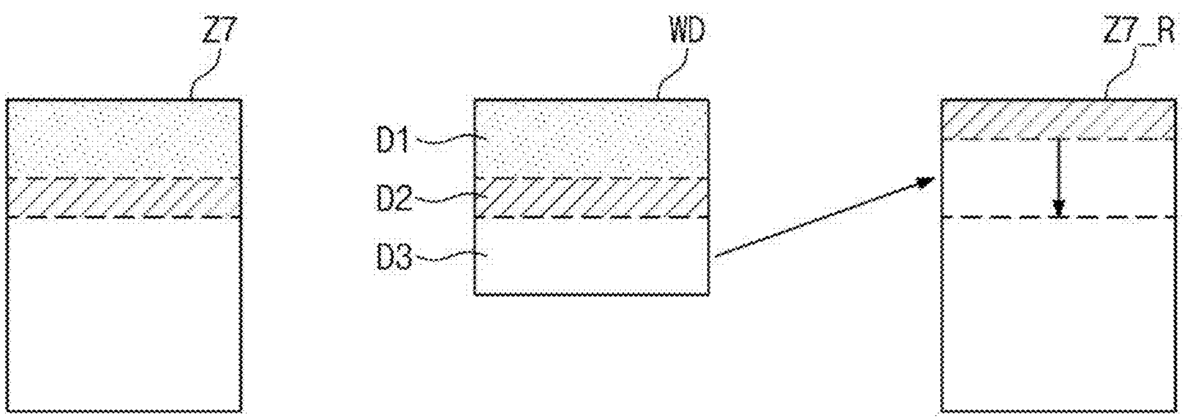

Referring to FIGS. 1 and 32C, the memory controller 120 may write subsequent data of the write data WD, for example the third data D3, in the recovery area Z7_R.

Figure 32D:
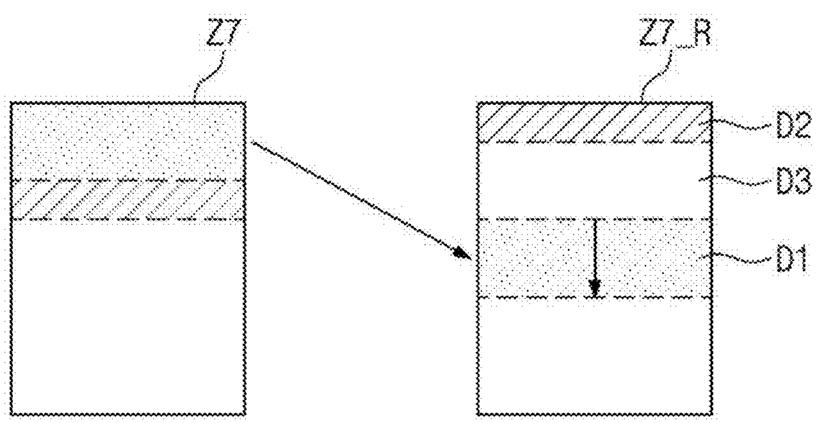

Referring to FIG. 32D, the memory controller 120 may migrate the previous data of the target zone, for example, the first data D1 from the seventh zone Z7 to the recovery area Z7_R. Afterwards, the memory controller 120 may replace the seventh zone Z7 with the recovery area Z7_R and may reset the previous seventh zone Z7.

The memory controller 120 may support a write and read service for the seventh zone Z7 based on the page map table. Because the sequentiality between logical addresses and physical addresses is not guaranteed in the seventh zone Z7, the memory controller 120 may prohibit the zone map service for the seventh zone Z7 until the seventh zone Z7 is reset.

FIGS. 33A to 33E are diagrams illustrating a second example of a process in which a recovery operation (e.g., including a post recovery operation) is performed. Referring to FIGS. 1 and 32A, the memory controller 120 may write the write data WD in the seventh zone Z7. The write data WD may include the first data D1 and the second data D2. The memory controller 120 may successfully write the first data D1 among the write data WD in the seventh zone Z7.

Figure 33A:
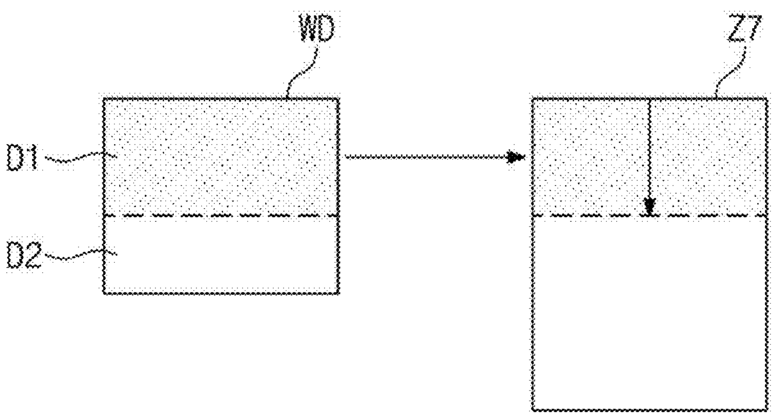
FIGS. 33A to 33E are diagrams illustrating a second example of a process in which there is generated a recovery operation, according to an embodiment.
Figure 33B:
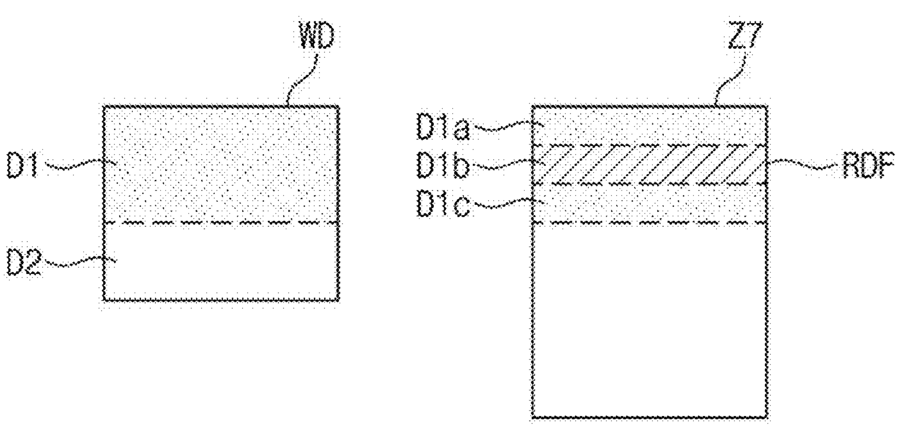

Referring to FIGS. 1 and 33B, the read request may be received from the external host device. The first data D1 may include 1a-th data D1*a,* 1b-th data D1*b*, and 1c-th data D1*c*, and the read request may request the read of the 1b-th data D1*b*. A read fail RDF may occur while the memory controller 120 performs the read operation for the 1b-th data D1*b*. For example, when the number of error bits detected in the read operation for the 1b-th data D1*b* is greater than or equal to a threshold value, the memory controller 120 may determine that the read fail RDF occurs. In an embodiment, the memory controller 120 may output the 1b-th data D1*b* read from the seventh zone Z7 to the external host device and may perform the recovery operation.

Figure 33C:
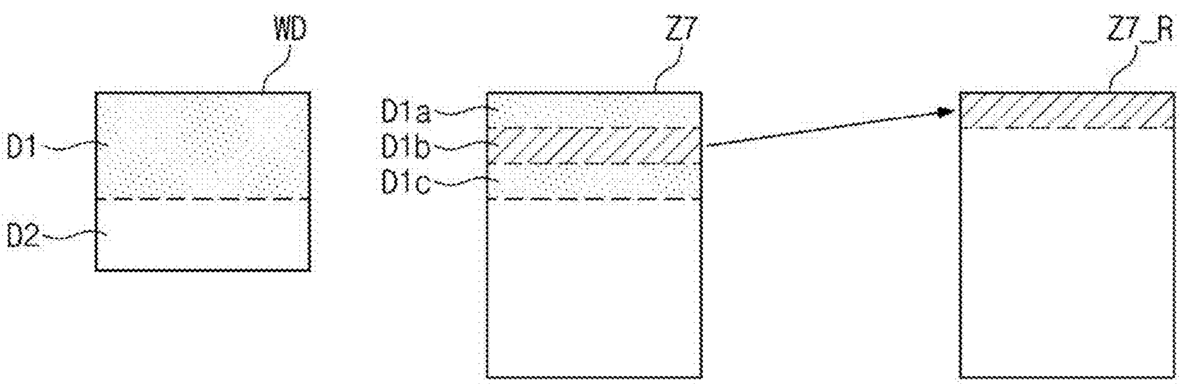

Referring to FIGS. 1 and 33C, the memory controller 120 may open the recovery area Z7_R of the seventh zone Z7. The feature of the recovery area Z7_R such as a cell type may be identical to that of the seventh zone Z7. The memory controller 120 may write the 1b-th data D1*b*, in which the read fail RDF occurs, in the recovery area Z7_R.

Figure 33D:
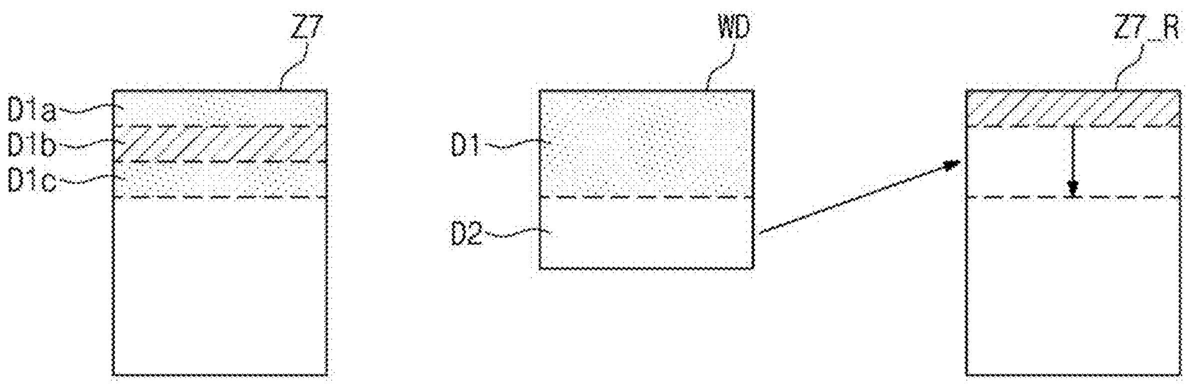

Referring to FIGS. 1 and 33D, the memory controller 120 may write subsequent data of the write data WD, For example, the second data D2 in the recovery area Z7_R.

Figure 33E:
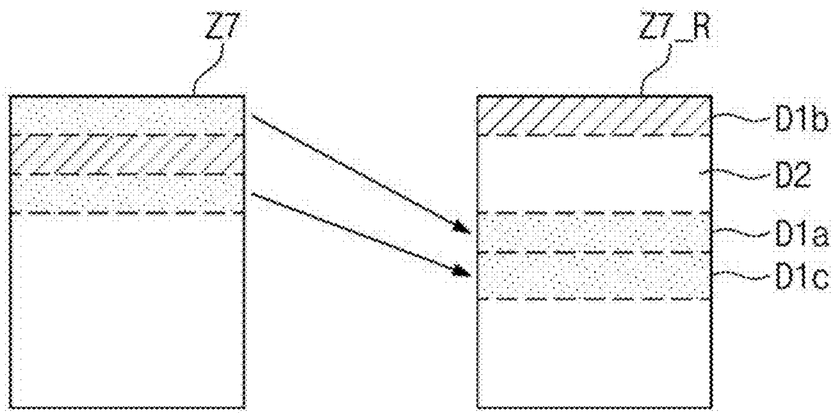

Referring to FIG. 33E, the memory controller 120 may migrate the previous data of the target zone, for example, the 1a-th data D1*a* and the 1c-th data D1*c* from the seventh zone Z7 to the recovery area Z7_R. Afterwards, the memory controller 120 may replace the seventh zone Z7 with the recovery area Z7_R and may reset the previous seventh zone Z7.

The memory controller 120 may support the write and read service for the seventh zone Z7 based on the page map table. Because the sequentiality between logical addresses and physical addresses is not guaranteed in the seventh zone Z7, the memory controller 120 may prohibit the zone map service for the seventh zone Z7 until the seventh zone Z7 is reset.

Figure 34:
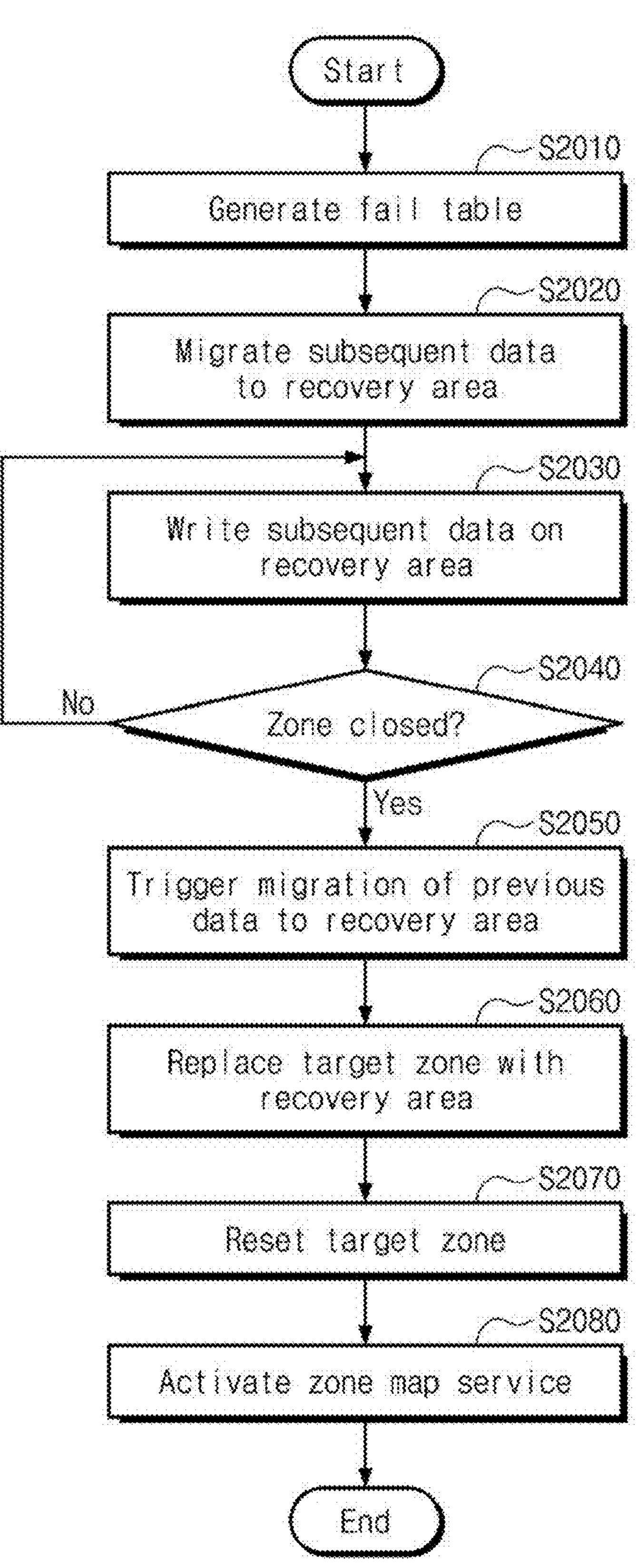
FIG. 34 is a diagram illustrating a second example in which a storage device performs a post recovery operation, according to an embodiment.

FIG. 34 is a diagram illustrating a second example in which the storage device 100 performs a post recovery operation. Referring to FIGS. 1 and 34, in operation S2010, the memory controller 120 may generate a fail table of the target zone where the access error occurs. The fail table may include information about an error and a recovery area. The fail table may assist the zone map table, and the memory controller 120 may support the zone map service based on the zone map table and the fail table.

In operation S2020, the memory controller 120 may migrate subsequent data. For example, when the access error occurs in the read operation, data having logical addresses which are subsequent to logical addresses of the data where the access error occurs may be present in the target zone. The memory controller 120 may migrate the data having the subsequent logical addresses from the target zone to the recovery area.

In operation S2030, the memory controller 120 may write the subsequent data in the recovery area. In operation S2040, the memory controller 120 may determine whether a zone is closed. When the zone is not closed, the memory controller 120 may again perform operation S2030. For example, the memory controller 120 may process the write requests received from the external host device in the recovery area until the target zone is closed.

In operation S2050, the memory controller 120 may trigger migration of previous data to the recovery area. For example, the memory controller 120 may trigger the migration such that the data written in the target zone before the access error occurs are read from the target zone and the read data are written in the recovery area.

When the migration is completed, in operation S2060, the memory controller 120 may replace the target zone with the recovery area. For example, the memory controller 120 may map the target zone to erase units of the recovery area in the zone map table. Afterwards, in operation S2070, the memory controller 120 may reset the previous target zone.

In operation S2080, the memory controller 120 may activate the zone map service of the target zone. For example, the memory controller 120 may support the zone map service of the target zone based on the zone map table and the fail table.

Figure 35A:
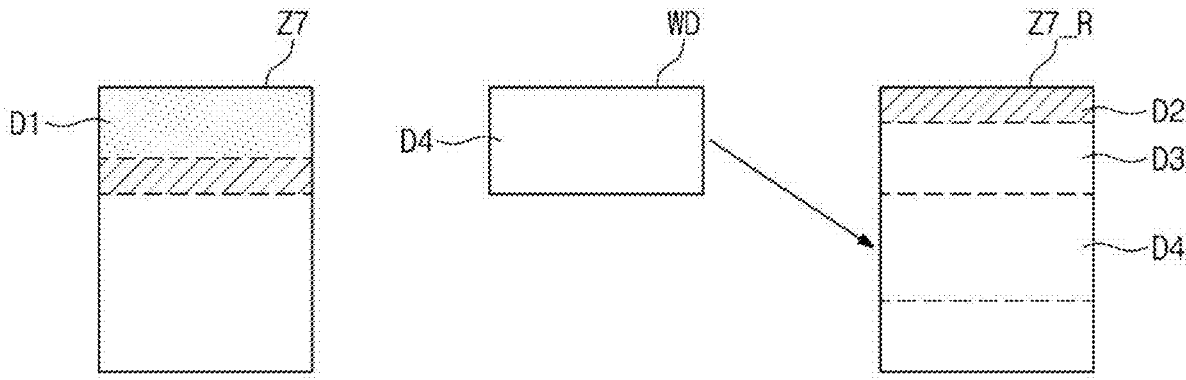
FIGS. 35A and 35B are diagrams illustrating a first example in which there is generated a recovery operation for generating a fail table, according to an embodiment.
Figure 35B:
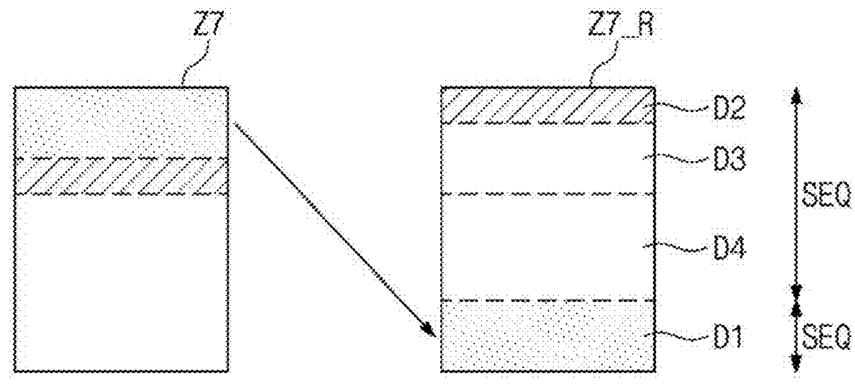

FIGS. 35A and 35B are diagrams illustrating a first example in which there is generated a recovery operation for generating a fail table. In an embodiment, FIGS. 35A and 35B show examples that are performed following FIG. 32C. Referring to FIGS. 1 and 35A, as the external host device requests to write the write data WD including fourth data D4 in the seventh zone Z7, the memory controller 120 may write the fourth data D4 in the recovery area Z7_R. After the fourth data D4 are written, the seventh zone Z7 may be closed.

Referring to FIGS. 1 and 35B, as the seventh zone Z7 is closed, the memory controller 120 may migrate the first data D1 written in the seventh zone Z7 to the recovery area Z7_R. In the recovery area Z7_R, the second data D2, the third data D3, and the fourth data D4 may have sequential logical addresses, and thus, the sequentiality SEQ is guaranteed. The first data D1 may have sequential logical addresses, and thus, the sequentiality SEQ is guaranteed. Accordingly, two data groups having the sequentiality of logical addresses may exist in the recovery area Z7_R. The memory controller 120 may record information about the boundary of the two data groups at the fail table. The memory controller 120 may provide the zone map service based on the zone map table and the fail table.

FIGS. 36A and 36B are diagram illustrating an example in which the zone map table ZM is updated when an access error occurs. Referring to FIGS. 1 and 36A, the zone map table ZM may include identification information about the first to eighth zones Z1 to Z8, status information about the first to eighth zones Z1 to Z8, information about the erase units EU mapped to the first to eighth zones Z1 to Z8, and the valid map VM of the first to eighth zones Z1 to Z8.

The first zone Z1 may be in an open state and may be mapped to the erase units EU of "5". The bit of the valid map VM corresponding to the first zone Z1 may have a value of "0". The value of "0" may indicate that the zone map service is in an invalid state. The second zone Z2 may be in an open state and may be mapped to the erase units EU of "4". The bit of the valid map VM corresponding to the second zone Z2 may have a value of "0".

The third zone Z3 may be in an open state and may be mapped to the erase units EU of "7". The bit of the valid map VM corresponding to the third zone Z3 may have a value of "0". The fourth zone Z4 may be in a closed state and may be mapped to the erase units EU of "6". The bit of the valid map VM corresponding to the fourth zone Z4 may have a value of "1". The value of "1" may indicate that the zone map service is in a valid state. The fifth zone Z5 may be in an open state and may be mapped to the erase units EU of "1". The bit of the valid map VM corresponding to the fifth zone Z5 may have a value of "0".

The sixth zone Z6 may be in an open state and may be mapped to the erase units EU of "2". The bit of the valid map VM corresponding to the sixth zone Z6 may have a value of "0". The seventh zone Z7 may be in an open state and may be mapped to the erase units EU of "3". The bit of the valid map VM corresponding to the seventh zone Z7 may have a value of "0". The eighth zone Z8 may be in an open state and may be mapped to the erase units EU of "8". The bit of the valid map VM corresponding to the eighth zone Z8 may have a value of "0".

Referring to FIGS. 1 and 36B, as the access error occurs in the seventh zone Z7, the memory controller 120 may update the information about the erase units EU of the seventh zone Z7 in the zone map table ZM in order to be changed to an index Fail_1 of the fail table. The memory controller 120 may refer to the zone map table ZM and may identify the information about the access error of the seventh zone Z7 through the first index of the fail table.

Figures 37A, 37B:
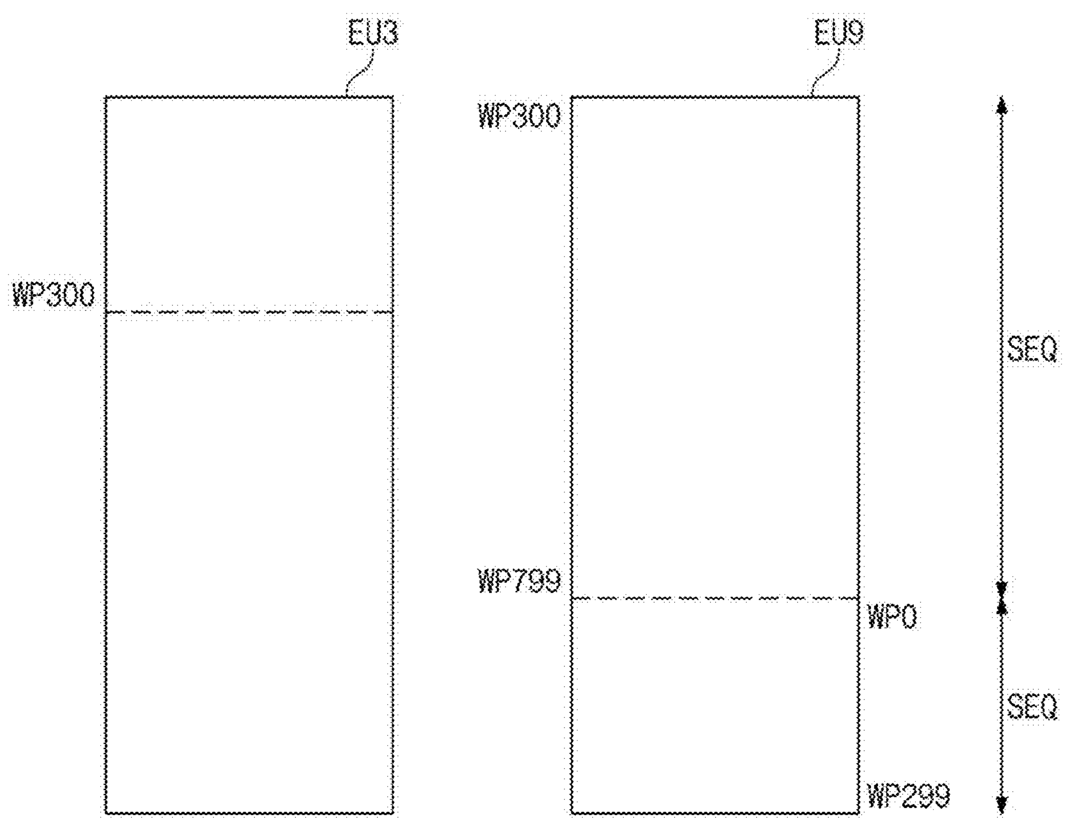

FIGS. 37A to 37F are diagrams illustrating an example of how a fail table is generated and updated as an access error occurs. Referring to FIGS. 1 and 37A, a fail table FT may include an index, erase units EU in which a fail occurs, erase units EU_R mapped to the recovery area, a fail pointer pointing to a write pointer where an access error occurs, a next entry indicating an index of the fail table FT in which next fail information is stored when a plurality of access errors occur, and a migration flag indicating whether data of a target zone are migrated to a recovery area after an access error.

Referring to FIGS. 1, 37A, and 37B, the access error may occur at write pointer WP300 of the third erase units EU3. When the recovery operation is performed, data of the write pointer WP300 where the access error occurs may be first written in the ninth erase units EU9 corresponding to the recovery area. Afterwards, data having logical address subsequent to the logical address where the access error occurs may be sequentially written. For example, data of the third erase units EU3, which are to be sequentially written from write pointers WP300 to WP799, may be written in the ninth erase units EU9 while guaranteeing the sequentiality SEQ. Afterwards, through the migration, the data of the third erase units EU3, which are previously written from write pointers WPO to WP299, may be written in the ninth erase units EU9 while guaranteeing the sequentiality SEQ.

Figure 37D:
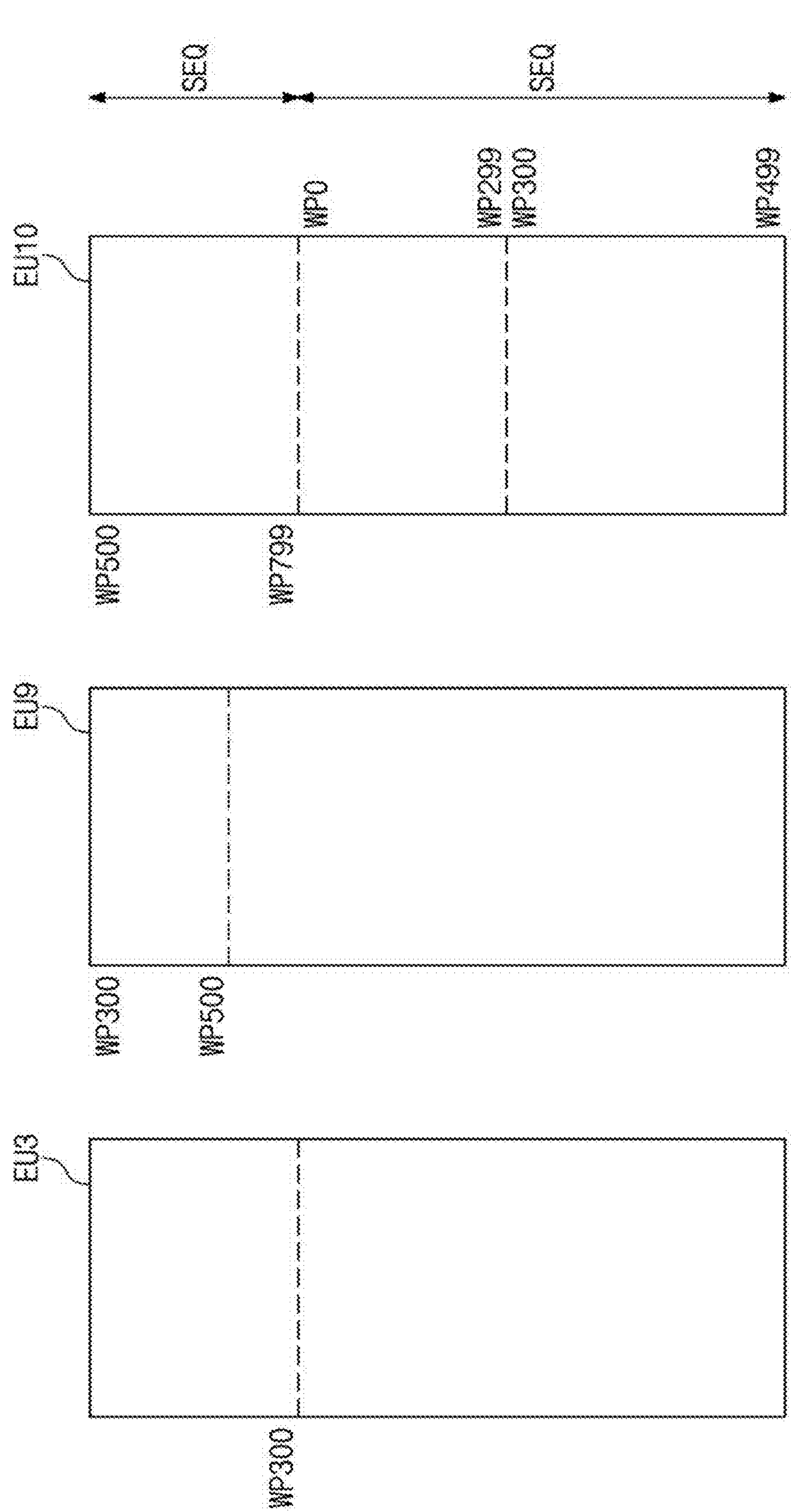

Referring to FIGS. 1, 37C, and 37D, in the process where the memory controller 120 writes subsequent data corresponding to write pointers WP300 to WP799 of the third erase units EU3 in the ninth erase units EU9, a write fail of the data corresponding to write pointer WP500 of the third erase units EU3 may occur.

The memory controller 120 may write information corresponding to the second access error in index "2" of the fail table FT. By writing "2" in the next entry of index "1" corresponding to the first access error, the memory controller 120 may identify that index "2" of the fail table FT should be referred to. The memory controller 120 may record information about the erase units EU of "9" where the access error occurs, information about the recovery erase units EU_R of "10", and the fail pointer of "500" where the access error occurs at index "2" of the fail table FT.

The memory controller 120 may write the data corresponding to write pointer WP500 of the third erase units EU3 where the access error occurs, in the tenth erase units EU10. The memory controller 120 may write data, which are to be written following write pointer WP500 of the third erase units EU3, in the tenth erase units EU10. For example, the data of the third erase units EU3, which are to be written from write pointers WP500 to WP799, may be written in the tenth erase units EU10 while guaranteeing the sequentiality SEQ.

Afterwards, the memory controller 120 may perform migration. For example, the memory controller 120 may sequentially migrate data not written in the tenth erase units EU10 from among the data to be written in the third erase units EU3. First, the memory controller 120 may migrate the data written at write pointers WPO to WP299 of the third erase units EU3 to the tenth erase units EU10. Next, the memory controller 120 may migrate data, which are requested to be written at write pointers WP300 to WP499 of the third erase units EU3, from the ninth erase units EU9 to the tenth erase units EU10. Accordingly, the data of the third erase units EU3, which are requested to be written from write pointers WPO to WP499, may be written in the tenth erase units EU10 while guaranteeing the sequentiality SEQ.

Figure 37F:
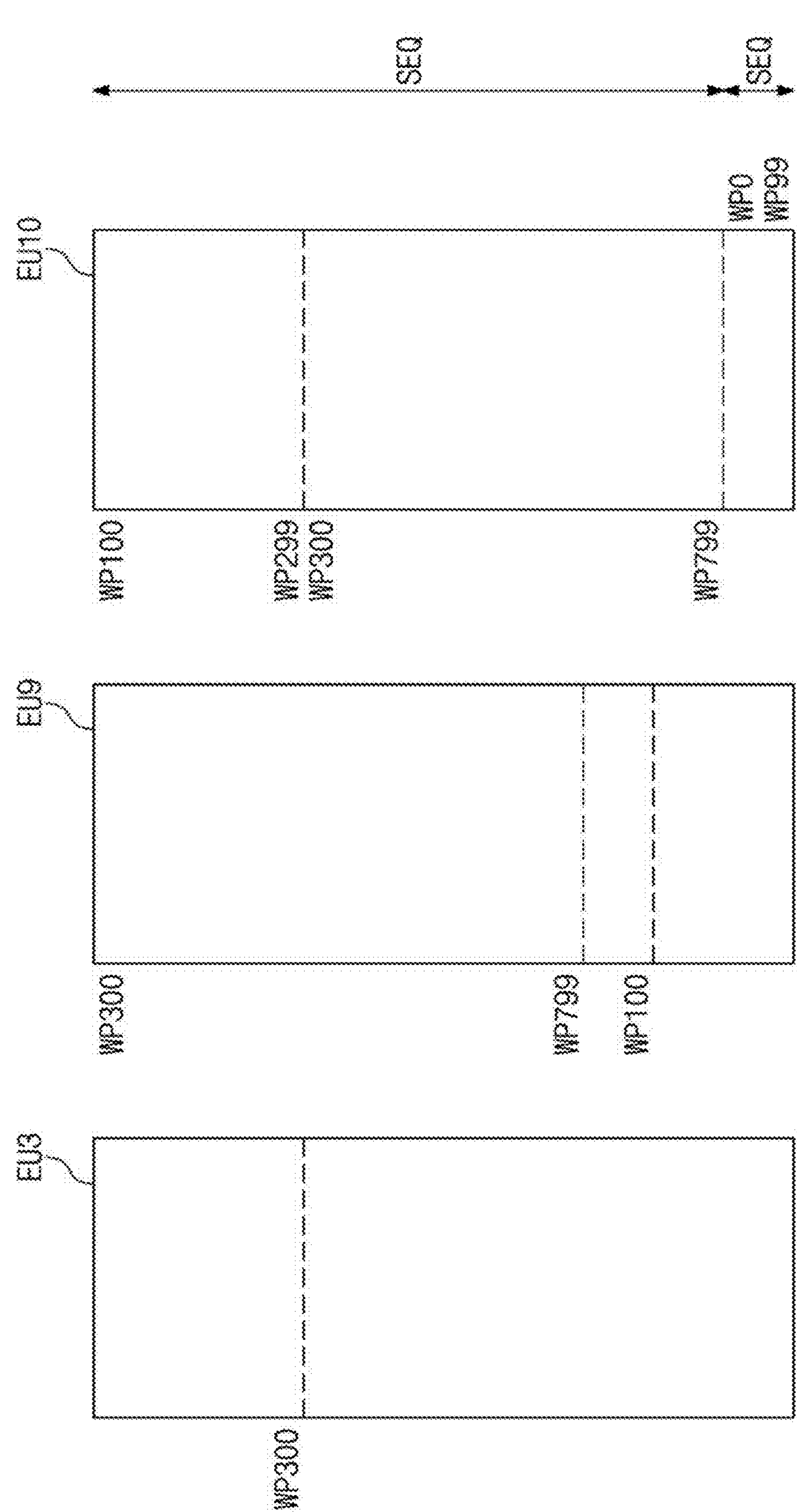

Referring to FIGS. 1, 37E, and 37F, in the process where the memory controller 120 migrates the data written at write pointers WPO to WP299 of the third erase units EU3 to the ninth erase units EU9, an access error (e.g., a read error or write fail of the migration) of the data corresponding to write pointer WP100 of the third erase units EU3 may occur.

The memory controller 120 may write information corresponding to the second access error in index "2" of the fail table FT. By writing "2" in the next entry of index "1" corresponding to the first access error, the memory controller 120 may identify that index "2" of the fail table FT should be referred to. The memory controller 120 may record information about the erase units EU of "9" where the access error occurs, information about the recovery erase units EU_R of "10", and the fail pointer of "100" where the access error occurs at index "2" of the fail table FT.

The memory controller 120 may write the data corresponding to write pointer WP100 of the third erase units EU3 where the access error occurs, in the tenth erase units EU10. The memory controller 120 may migrate the data following write pointer WP100 of the third erase units EU3 in the tenth erase units EU10. For example, the memory controller 120 may write the data corresponding to write pointers WP100 to WP299 of the third erase units EU3 in the tenth erase units EU10 by migrating the data written in the third erase units EU3 to the tenth erase units EU10.

Afterwards, the memory controller 120 may migrate the data written in the ninth erase units EU9 in the tenth erase units EU10. The memory controller 120 may migrate the data corresponding to write pointers WP300 to WP799 of the third erase units EU3 from the ninth erase units EU9 to the tenth erase units EU10. Accordingly, the data of the third erase units EU3, which are requested to be written from write pointers WPO to WP799, may be written in the tenth erase units EU10 while guaranteeing the sequentiality SEQ.

As described above, as the recovery based on the fail table FT is performed, two data groups, each of which has the sequentiality SEQ, are written in the erase units allocated to the zone. The fail table FT may include boundary information about two data groups, each of which has the sequentiality SEQ. Using the zone map table and the fail table, the memory controller 120 may calculate physical addresses for reading data from erase units (e.g., the tenth erase units EU10), for example, the write pointers of the tenth erase units EU10 from the logical addresses received from the external host device. Accordingly, the memory controller 120 may support the zone map service based on the zone map table and the fail table FT.

Figure 38:
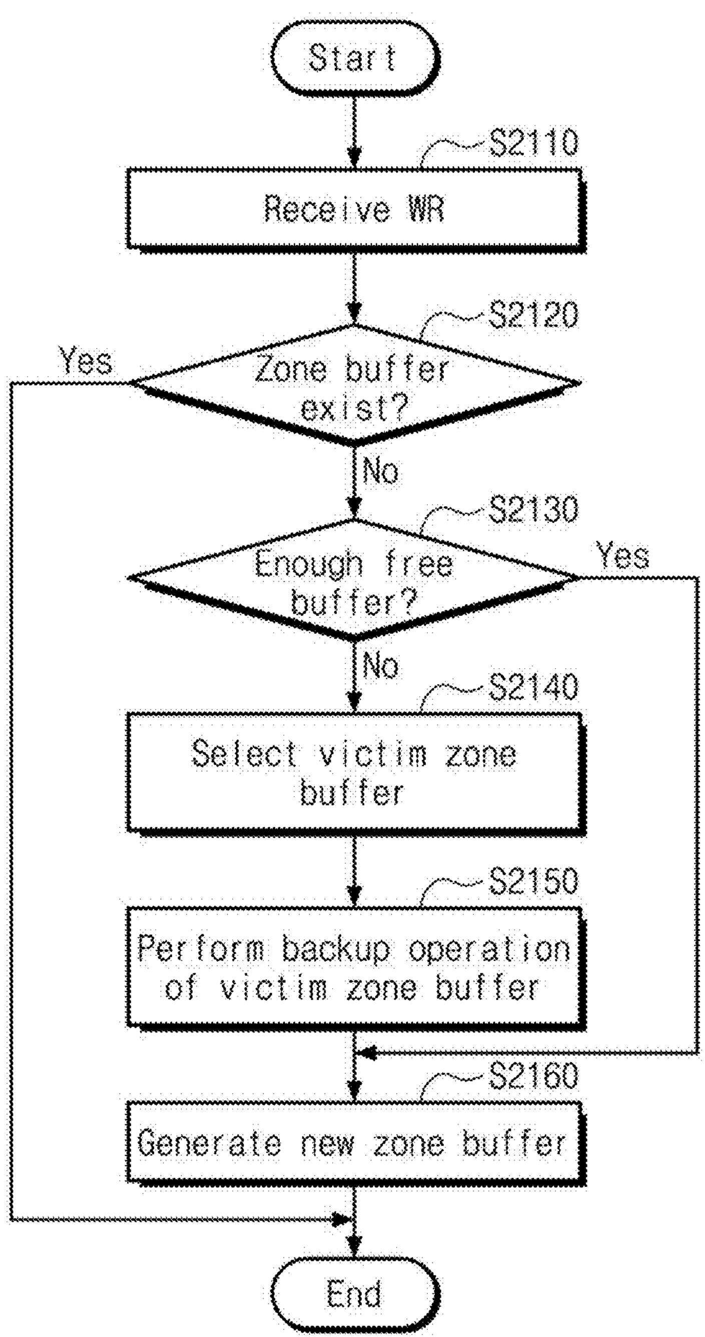
FIG. 38 is a diagram illustrating a first example in which a storage device performs a backup operation, according to an embodiment.

FIG. 38 is a diagram illustrating a first example in which the storage device 100 performs a backup operation. In an embodiment, because the capacity of the internal buffer 123 is limited, the number of zone buffers capable of being allocated to the internal buffer 123 may be less than the number of zones capable of being allocated to the storage device 100. The storage device 100 may use zone buffers by dynamically generating and discarding a zone buffer.

Referring to FIGS. 1 and 38, in operation S2110, the memory controller 120 may receive the write request WR from the external host device. The write request WR may be received using the command UPIU.

In operation S2120, the memory controller 120 may determine whether a zone buffer exists. For example, the memory controller 120 may determine whether a zone buffer corresponding to a zone on which the write request WR requests the write of data is generated (or allocated) in the internal buffer 123. When the zone buffer exists, the memory controller 120 may store the data in the zone buffer.

When the zone buffer does not exist, in operation S2130, the memory controller 120 may determine that enough free buffer exists. For example, the memory controller 120 may determine whether a free capacity sufficient to generate a new zone buffer is present in a capacity defined to be allocated to the zone buffer from among the capacity of the internal buffer 123. When the free capacity sufficient to generate a new zone buffer exists, in operation S2160, the memory controller 120 may generate a zone buffer corresponding to the write request WR and may write the data in the zone buffer.

When the free capacity sufficient to generate a new zone buffer does not exist, in operation S2140, the memory controller 120 may select a victim zone buffer among the zone buffers allocated to the internal buffer 123. In operation S2150, the memory controller 120 may perform the backup operation on the victim zone buffer. For example, the memory controller 120 may write the data present in the victim zone buffer in an erase unit selected for backup from among erase units of the reserved area RVA (as shown, for example, in FIGS. 3A to 3E). Afterwards, the memory controller 120 may discard the victim zone buffer. In operation S2160, the memory controller 120 may generate a zone buffer corresponding to the write request WR and may write the data in the zone buffer.

Afterwards, as described with reference to FIGS. 15 and 16, when data corresponding to the cell type of the target zone are collected in the zone buffer, the collected data may be written in the target zone.

Figure 39:
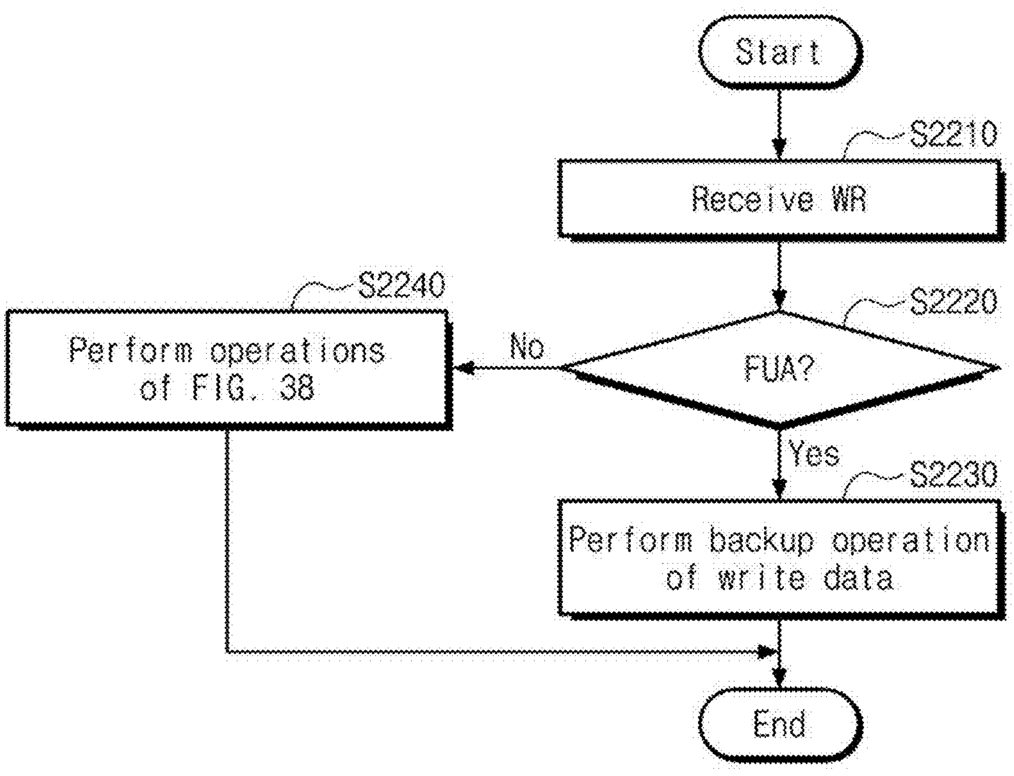
FIG. 39 is a diagram illustrating a second example in which a storage device performs a backup operation, according to an embodiment.

FIG. 39 is a diagram illustrating a second example in which the storage device 100 performs a backup operation. Referring to FIGS. 1 and 39, in operation S2210, the memory controller 120 may receive the write request WR from the external host device. The write request WR may be received using the command UPIU.

In operation S2220, the memory controller 120 may determine whether the received write request WR corresponds to a force unit access FUA. The force unit access FUA may be a request to directly write the data in the nonvolatile memory device 110. For example, the storage device 100 may generally operate in the write-back scheme, and may operate in the write-through scheme in response to the force unit access FUA.

When the write request WR corresponds to the force unit access FUA, in operation S2230, the memory controller 120 may perform the backup operation on the write data corresponding to the write request WR. For example, the memory controller 120 may write the write data in an erase unit selected for backup from among the erase units of the reserved area RVA (as shown, for example, in FIGS. 3A to 3E).

When the write request WR does not correspond to the force unit access FUA, in operation S2240, the memory controller 120 may perform the write request WR based on the method described with reference to FIG. 38.

Figure 40:
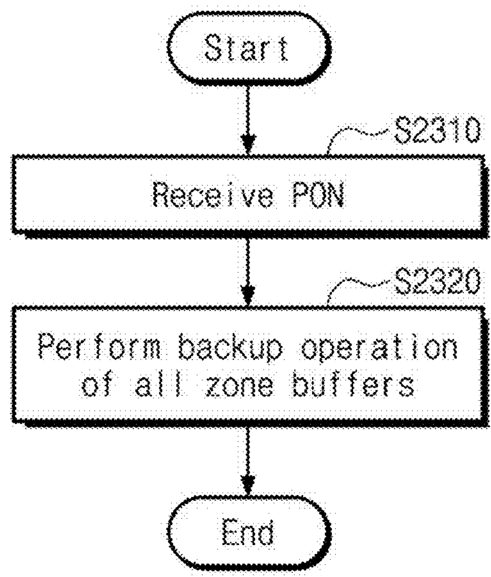
FIG. 40 is a diagram illustrating a third example in which a storage device performs a backup operation, according to an embodiment.

FIG. 40 is a diagram illustrating a third example in which the storage device 100 performs a backup operation. Referring to FIGS. 1 and 40, in operation S2310, the memory controller 120 may receive a power off notification PON. The power off notification PON may provide notification that the external host device will perform a power-off. The power off notification PON may be received using the command UPIU, the query request UPIU, or a separate control signal.

In operation S2320, in response to the power off notification PON, the memory controller 120 may perform the backup operation on the data stored in all the zone buffers. For example, the memory controller 120 may write the data present in all the zone buffers in an erase unit selected for backup from among the erase units of the reserved area RVA (as shown for example in FIGS. 3A to 3E). Afterwards, the memory controller 120 may perform the power-off depending on a sequence defined for the power-off.

Figure 41:
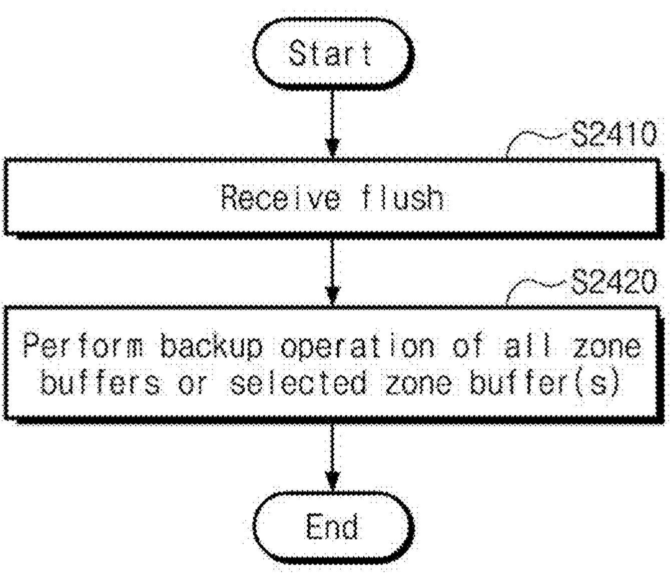
FIG. 41 is a diagram illustrating a fourth example in which a storage device performs a backup operation, according to an embodiment.

FIG. 41 is a diagram illustrating a fourth example in which the storage device 100 performs a backup operation. Referring to FIGS. 1 and 41, in operation S2410, the memory controller 120 may receive a flush request from the external host device. The flush request may be received using the command UPIU or the query request UPIU.

In operation S2420, in response to the flush request, the memory controller 120 may perform the backup operation on the data stored in all the zone buffers or one or more selected zone buffers. For example, the memory controller 120 may write the data present in all the zone buffers or the one or more selected zone buffers in an erase unit selected for backup from among the erase units of the reserved area RVA (as shown, for example, in FIGS. 3A to 3E). Afterwards, the memory controller 120 may perform the power-off depending on a sequence defined for the power-off.

As described with reference to FIGS. 38, 39, 40, and 41, the storage device 100 may perform the backup operation due to various factors. For optimization of the backup operation, the storage device 100 may select an erase unit for backup from the erase units of the reserved area RVA depending on an internal policy.

Figure 42:
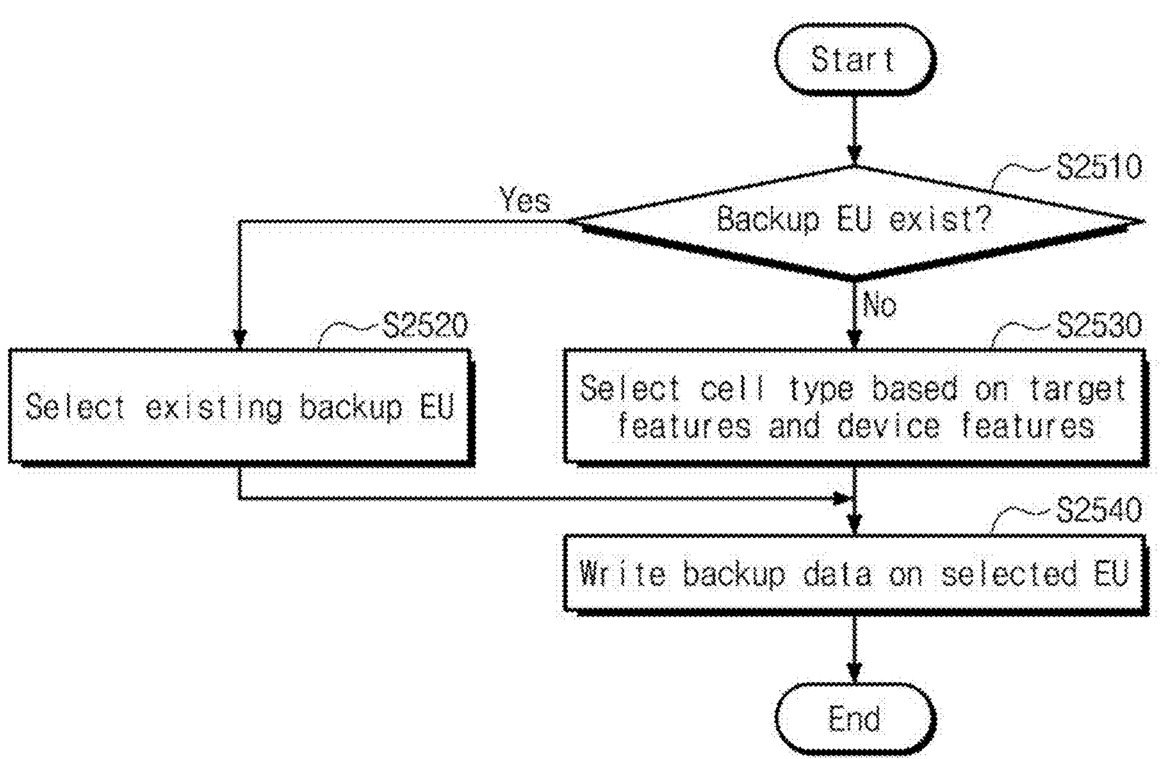
FIG. 42 is a diagram illustrating an example of a method in which a storage device selects an erase area for backup, according to an embodiment.

FIG. 42 is a diagram illustrating an example of a method in which the storage device 100 selects an erase area for backup. Referring to FIGS. 1 and 42, in operation S2510, the memory controller 120 may determine whether a backup erase unit EU exists. For example, the memory controller 120 may determine whether there is an erase unit EU where data are already written by the backup operation.

When the backup erase unit EU exists, in operation S2520, the memory controller 120 may select the existing backup erase unit EU. Afterwards, in operation S2540, the memory controller 120 may write the backup data in the selected erase unit EU.

When the backup erase unit EU does not exist, in operation S2530, the memory controller 120 may select a cell type of the erase unit EU for backup based on target features and device features.

In operation S2540, the memory controller 120 may write the backup data in the selected erase unit EU. For example, the memory controller 120 may write the backup data in the erase units EU having different cell types depending on situations.

As another example, the memory controller 120 may select the backup erase unit for each cell type. For example, the memory controller 120 may select the backup erase unit with the SLC cell type and the backup erase unit with the MLC cell type. In this case, the memory controller 120 may select the cell type based on the target features and the device features and may determine whether the backup erase unit of the selected cell type exists. When the backup erase unit of the selected cell type exists, the memory controller 120 may write the data targeted for the backup operation in the backup erase unit that exists already. When the backup erase unit of the selected cell type does not exist, the memory controller 120 may select a new backup erase unit with the selected cell type and may write the data in the selected backup erase unit.

Figure 43:
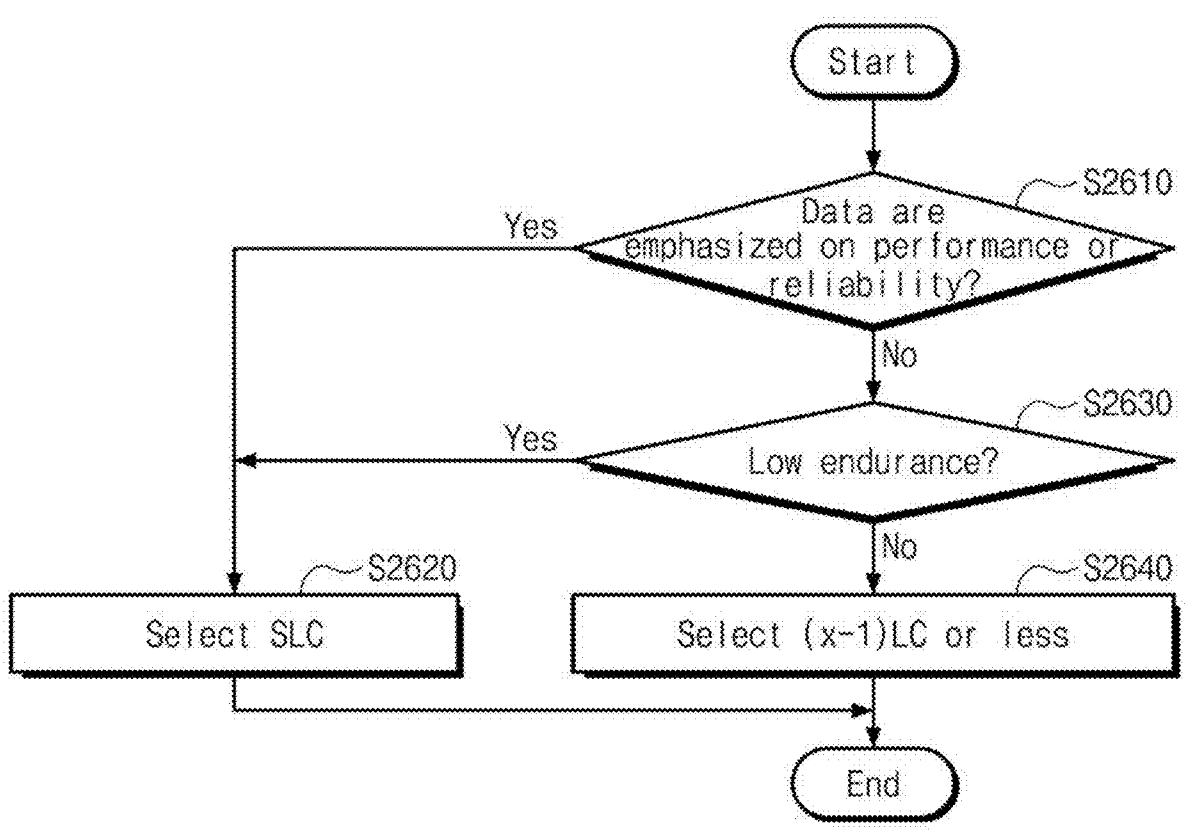
FIG. 43 is a diagram illustrating an example in which a storage device selects a cell type based on target features and device features, according to an embodiment.

FIG. 43 is a diagram illustrating an example in which the storage device 100 selects a cell type based on target features and device features. Referring to FIGS. 1 and 43, in operation S2610, the memory controller 120 may determine whether data write-requested by the external host device are data for which performance or reliability is emphasized. For example, the memory controller 120 may determine whether the write-requested data are data for which performance or reliability is emphasized, based on information which may be included in the write request received from the external host device, for example, at least one of performance requirement (or target) information, reliability requirement (or target) information, priority (or target) information, and stream identifier information. When the write-requested data are data for which performance or reliability is emphasized, in operation S2620, the memory controller 120 may select the SLC cell type as the cell type of the backup erase unit. In an embodiment, the target features may include a performance requirement, a reliability requirement, and a priority requirement.

When the write-requested data are not data for which performance or reliability is emphasized, in operation S2630, the memory controller 120 may determine whether the nonvolatile memory device 110 has low endurance. For example, when an average erase count of the nonvolatile memory device 110 is greater than a first threshold value or when a bit error rate when data are read from the nonvolatile memory device 110 is greater than a second threshold value, it may be determined that the endurance of the nonvolatile memory device 110 is low. When the endurance of the nonvolatile memory device 110 is low, in operation S2620, the memory controller 120 may select the SLC cell type as the cell type of the backup erase unit. In an embodiment, the device features may include endurance.

When the write-requested data are not data for which performance or reliability is emphasized, and when the durability of the nonvolatile memory device 110 is not low, in operation S2640, the memory controller 120 may select an erase unit having a cell type which is (x−1) LC or less (where x corresponds to a cell type of a target zone), as the backup erase unit. For example, the memory controller 120 may select, as the backup erase unit, an erase unit in which the number of bits written per memory cell is less than the number of bits written per memory cell of the target zone.

In the example of FIG. 43, performance and reliability and endurance are shown as criteria used for the memory controller 120 to select the cell type of the backup erase unit, but embodiments are not limited thereto. For example, as the size of data stored in a zone buffer(s) targeted for the backup operation from among the zone buffers of the internal buffer 123 increases, the cell type of the erase unit selected by the memory controller 120 may become lower, for example, the number of bits written per memory cell of the erase unit selected by the memory controller 120 may decrease. In an embodiment, the target features may include the size of data.

The memory controller 120 may assign a temperature to each zone depending on the frequency of update of data written in each zone. For example, when the frequency of update of the data of the first zone Z1 is lower than a first threshold value, the memory controller 120 may classify the first zone Z1 as a cold zone. When the frequency of update of the data of the second zone Z2 is higher than or equal to the first threshold value and is lower than a second threshold value, the memory controller 120 may classify the second zone Z2 as a warm zone. When the frequency of update of the data of the third zone Z3 is higher than or equal to the second threshold value, the memory controller 120 may classify the third zone Z3 as a hot zone. As the frequency of update of the data of the target zone increases, the cell type of the erase unit selected by the memory controller 120 may become lower, for example, the number of bits written per memory cell of the erase unit selected by the memory controller 120 may decrease. In an embodiment, the target features may include the frequency of update.

In an embodiment, the memory controller 120 may select the cell type of the backup erase unit depending on a factor causing the backup operation. For example, when the backup operation is performed in response to the power off notification PON, the memory controller 120 may select an erase unit having a cell type which corresponds to the SLC cell type. When the backup operation is performed by the backup of the victim zone buffer, the force unit access FUA, or the flush request, the memory controller 120 may select the cell type of the backup erase unit based on at least one of the above factors. In an embodiment, the target features may include a factor causing the backup operation.

According to an embodiment, after the backup operation is performed, the memory controller 120 may trigger migration of the backup erase unit. For example, when the backup operation is performed in response to the power off notification PON, the memory controller 120 may trigger the migration of the backup erase unit after a next power-on.

Figure 44:
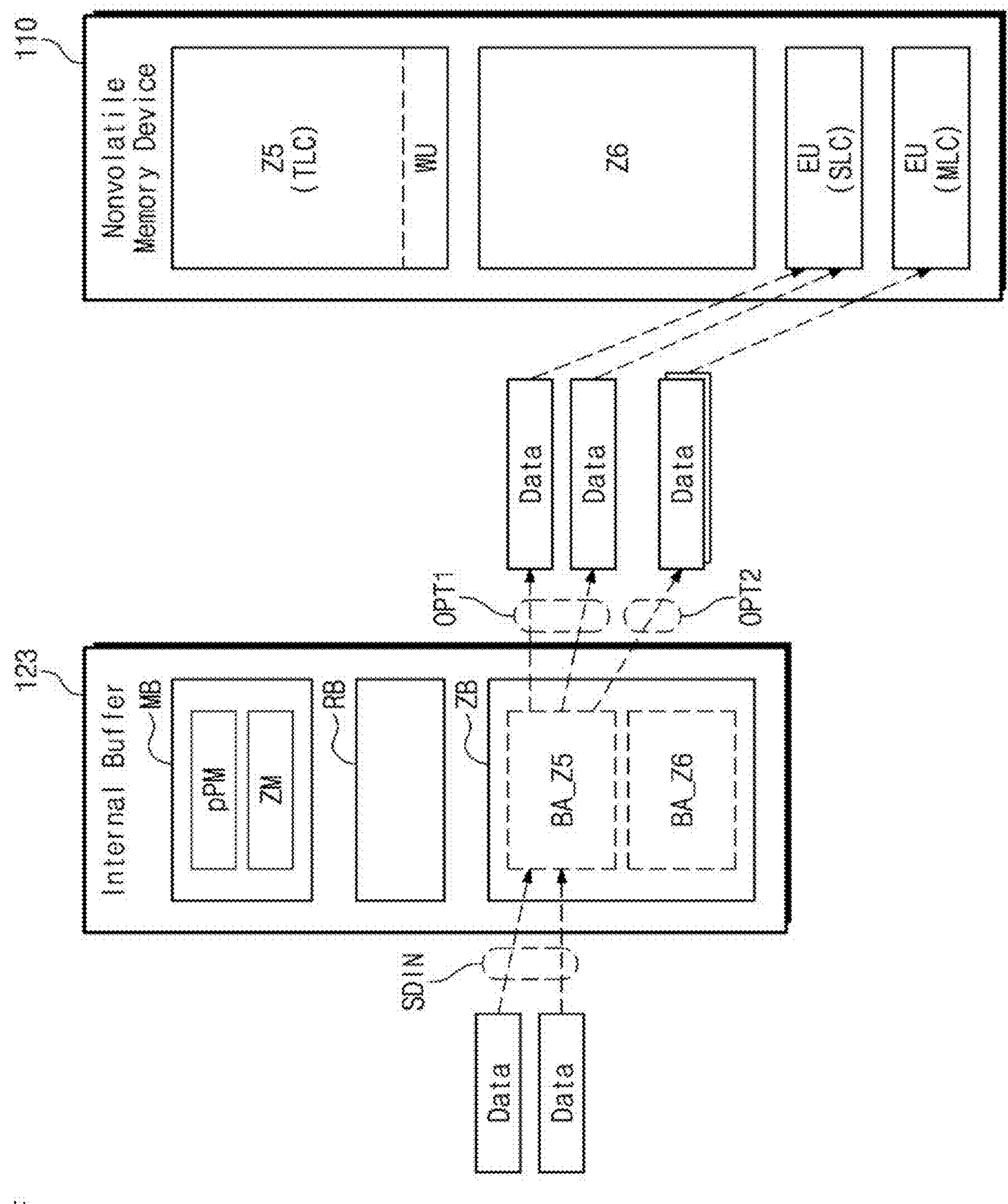
FIG. 44 is a diagram illustrating an example in which data of a zone buffer are written in a nonvolatile memory device by a backup operation, according to an embodiment.

FIG. 44 is a diagram illustrating an example in which data of a zone buffer are written in the nonvolatile memory device 110 by a backup operation. Referring to FIGS. 1 and 44, in the data input step SDIN, the memory controller 120 may receive data to be written in the fifth zone Z5 from the external host device. In an embodiment, the cell type of the fifth zone Z5 may correspond to the TLC cell type, and the write unit WU of the fifth zone Z5 may include three pages. When data of two pages are received from the external host device, the memory controller 120 may store the two page data in the zone buffer BA_Z5 of the fifth zone Z5.

As described with reference to FIGS. 38, 39, 40, and 41, when the backup operation is performed, based on a first option OPT1, the memory controller 120 may store the data of the zone buffer BA_Z5 of the fifth zone Z5 at two pages of an erase unit having a cell type which corresponds to the SLC cell type. In an embodiment, based on a second option OPT2, the memory controller 120 may store the data of the zone buffer BA_Z5 of the fifth zone Z5 at one page of an erase unit having a cell type which corresponds to the MLC cell type.

According to an embodiment, when the data are present in the backup erase unit, the memory controller 120 may be implemented to load the data present in the backup erase unit to the corresponding zone buffer of the internal buffer 123 and to write data in the target zone when data corresponding to the write unit of the target zone are collected in the zone buffer. However, when the writes for various zones are alternatingly performed, loading of the data of the backup erase unit to the corresponding zone buffer may allow the backup operation described with reference to FIG. 38 to be performed multiple times. This may cause an increase in write amplification and a decrease in the lifetime of the storage device 100. To prevent the above issues, the storage device 100 according to an embodiment of the present disclosure may be implemented to collect data in the backup erase unit.

Figure 45:
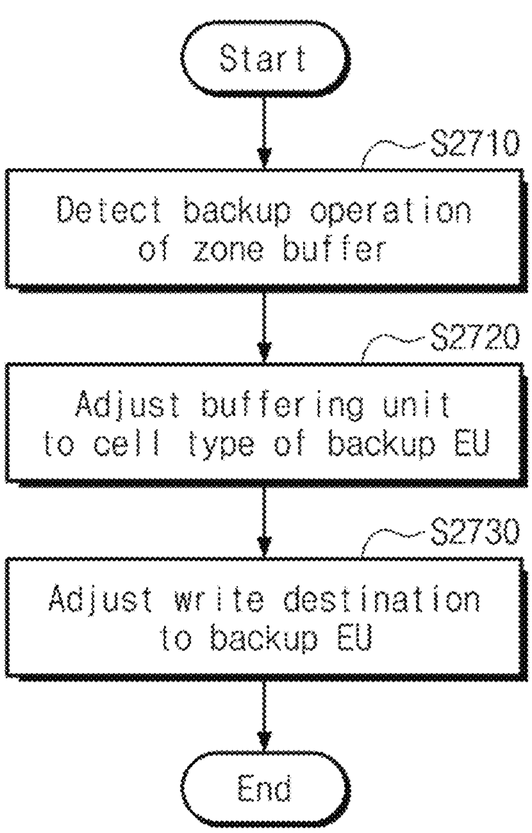
FIG. 45 is a diagram illustrating an example in which a storage device collects data in a backup erase unit, according to an embodiment.

FIG. 45 is a diagram illustrating an example in which the storage device 100 collects data in a backup erase unit. Referring to FIGS. 1 and 45, in operation S2710, the memory controller 120 may detect a backup operation of a zone buffer. In operation S2720, the memory controller 120 may adjust a buffering unit to the cell type of the backup erase unit EU. For example, the buffering unit may refer to a cell type of data that are collected in the zone buffer of the internal buffer 123 for the memory controller 120 to write data in a zone. In operation S2730, the memory controller 120 may adjust a write destination to the backup erase unit EU.

For example, after performing the backup operation, the memory controller 120 may adjust the buffering unit to the cell type of the backup erase unit EU and may write the data in the backup erase unit EU. The memory controller 120 may perform buffering using the backup erase unit EU. The backup erase unit EU may be selected from erase units of the reserved area RVA (as shown, for example, in FIGS. 3A to 3E). For example, the memory controller 120 may perform dual buffering using the zone buffer of the internal buffer 123 and the reserved area RA.

Figure 46:
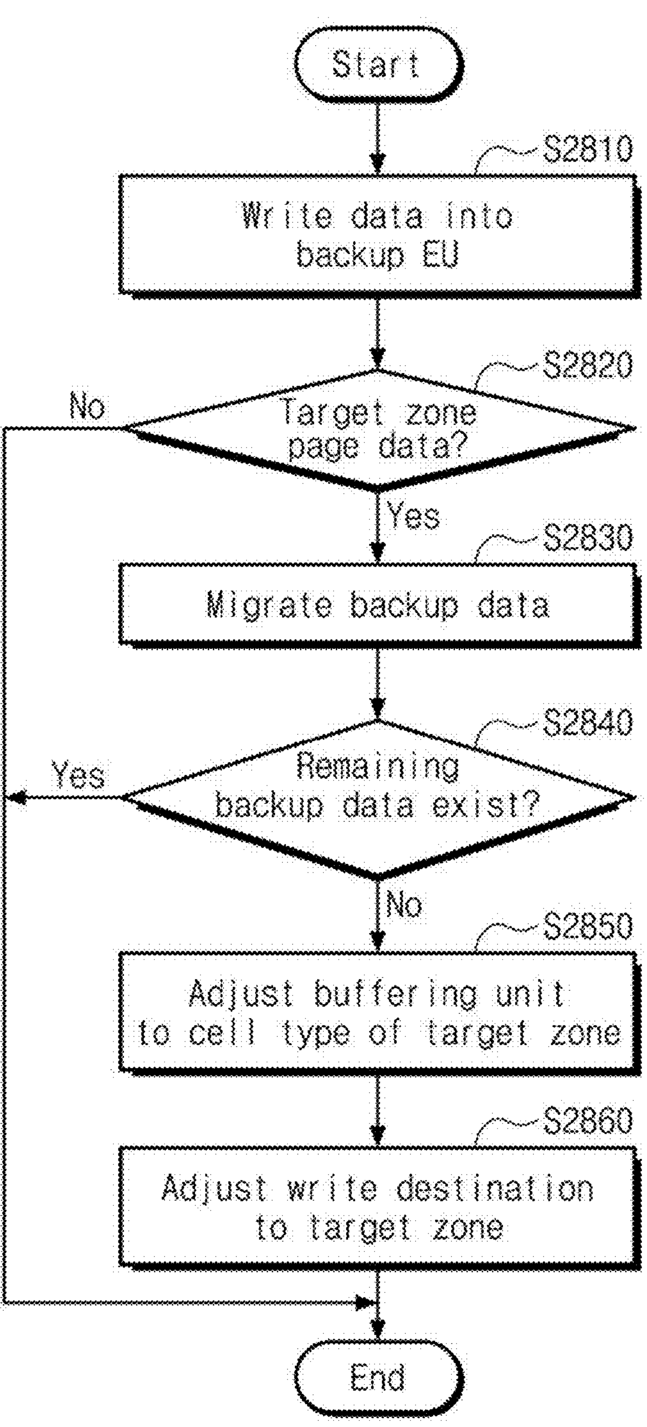
FIG. 46 is a diagram illustrating an example in which a storage device migrates data of a backup erase unit to a target zone, according to an embodiment.

FIG. 46 is a diagram illustrating an example in which the storage device 100 migrates data of a backup erase unit to a target zone. Referring to FIGS. 1 and 46, in operation S2810, the memory controller 120 may write data in the backup erase unit EU. For example, the memory controller 120 may store the data in the zone buffer of the internal buffer 123 in response to the write request of the external host device. As described with reference to FIG. 45, when the data stored in the zone buffer correspond to the cell type (or write unit) of the backup erase unit EU, the memory controller 120 may write the data of the zone buffer in the backup erase unit EU.

In operation S2820, the memory controller 120 may determine whether the data collected in the backup erase unit EU correspond to the page data of the target zone. For example, the memory controller 120 may determine whether the data collected in the backup erase unit EU reach the write unit corresponding to the cell type of the target zone. When the data collected in the backup erase unit EU do not correspond to the cell type of the target zone, the memory controller 120 may end the process. When the data collected in the backup erase unit EU correspond to the cell type of the target zone, the memory controller 120 may perform operation S2830.

In operation S2830, the memory controller 120 may migrate the backup data. For example, the memory controller 120 may read the data which correspond to the cell type of the target zone and are written in the backup erase unit EU and may write the read data in the target zone.

In operation S2840, the memory controller 120 may determine whether remaining backup data exist. For example, the memory controller 120 may determine whether the data of the target zone remain in the backup erase unit EU. In an embodiment, because the write unit of the back erase unit EU and the write unit of the target zone may be different, the data of the target zone may remain in the backup erase unit EU.

When the data of the target zone remain in the backup erase unit EU, the memory controller 120 may end the process. When the data of the target zone do not remain in the backup erase unit EU, in operation S2850, the memory controller 120 may adjust the buffering unit to the cell type of the target zone. In operation S2860, the memory controller 120 may adjust the write destination to the target zone. For example, after moving all the backup data to the target zone through the migration, the memory controller 120 may adjust the buffering unit to the cell type of the target zone and may write the data in the target zone.

Figure 47A:
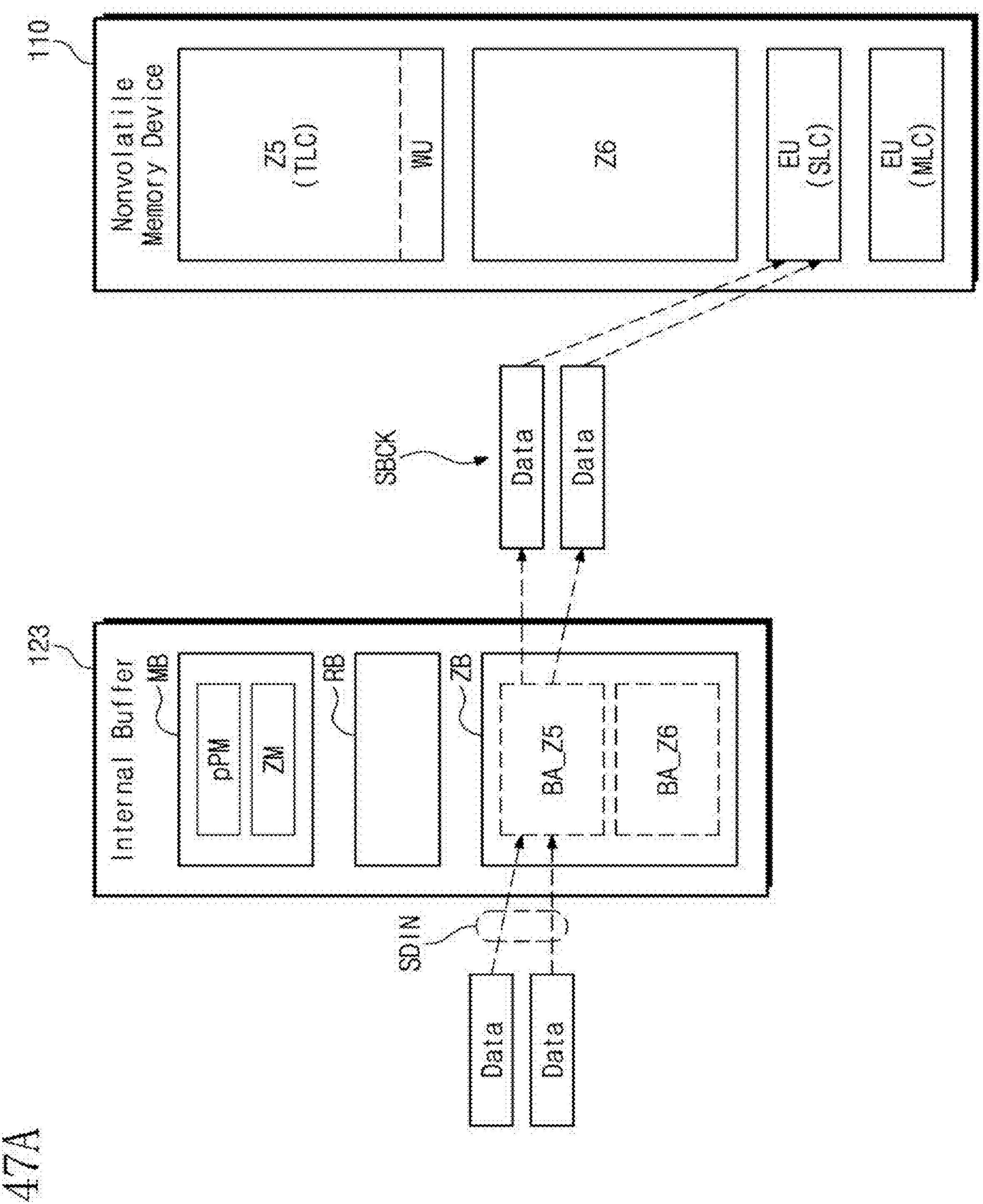
FIGS. 47A to 47C are diagrams illustrating an example in which a storage device performs buffering using a backup erase unit having a cell type which corresponds to an SLC, according to an embodiment.
Figure 47B:
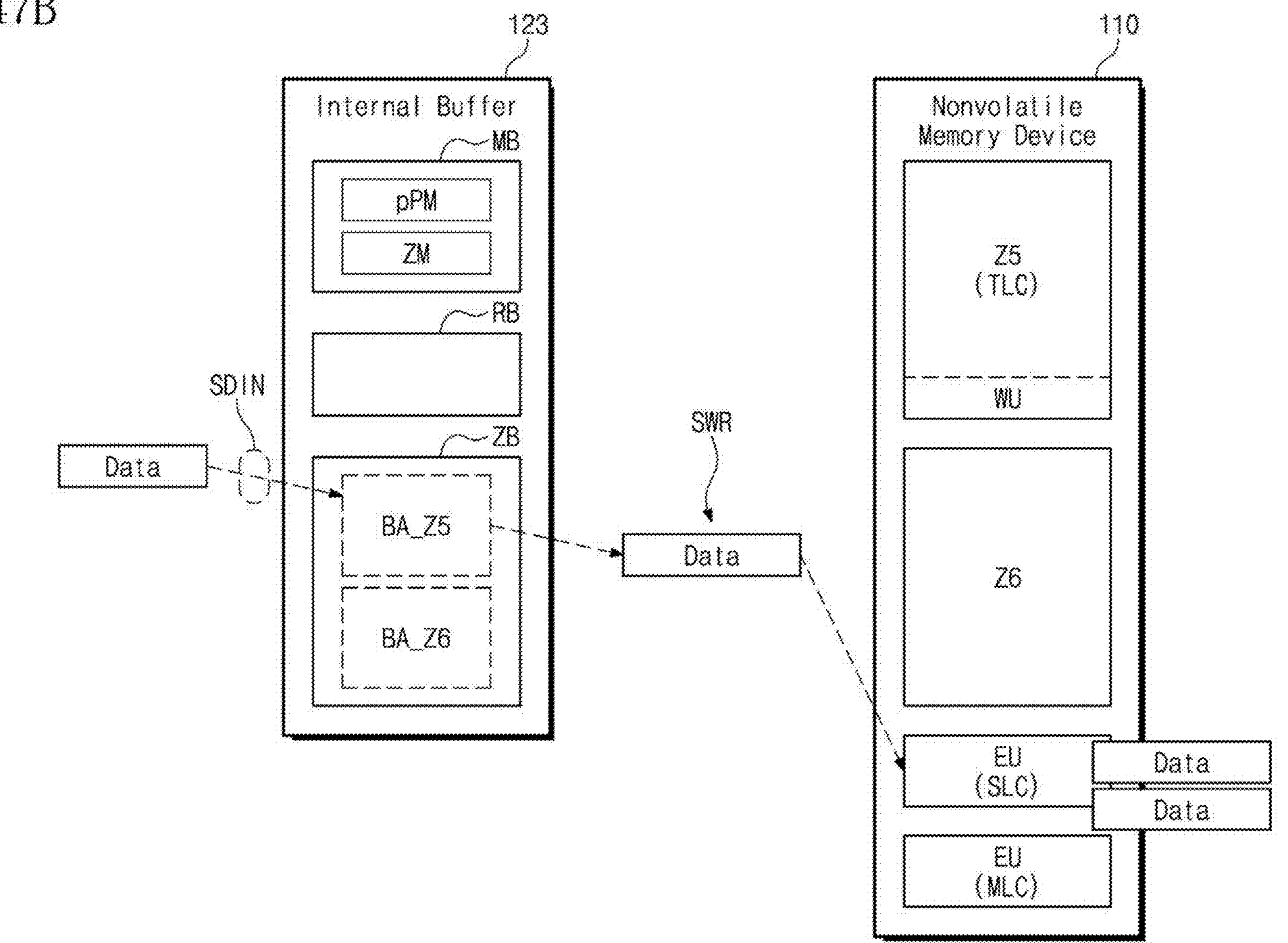
Figure 47C:
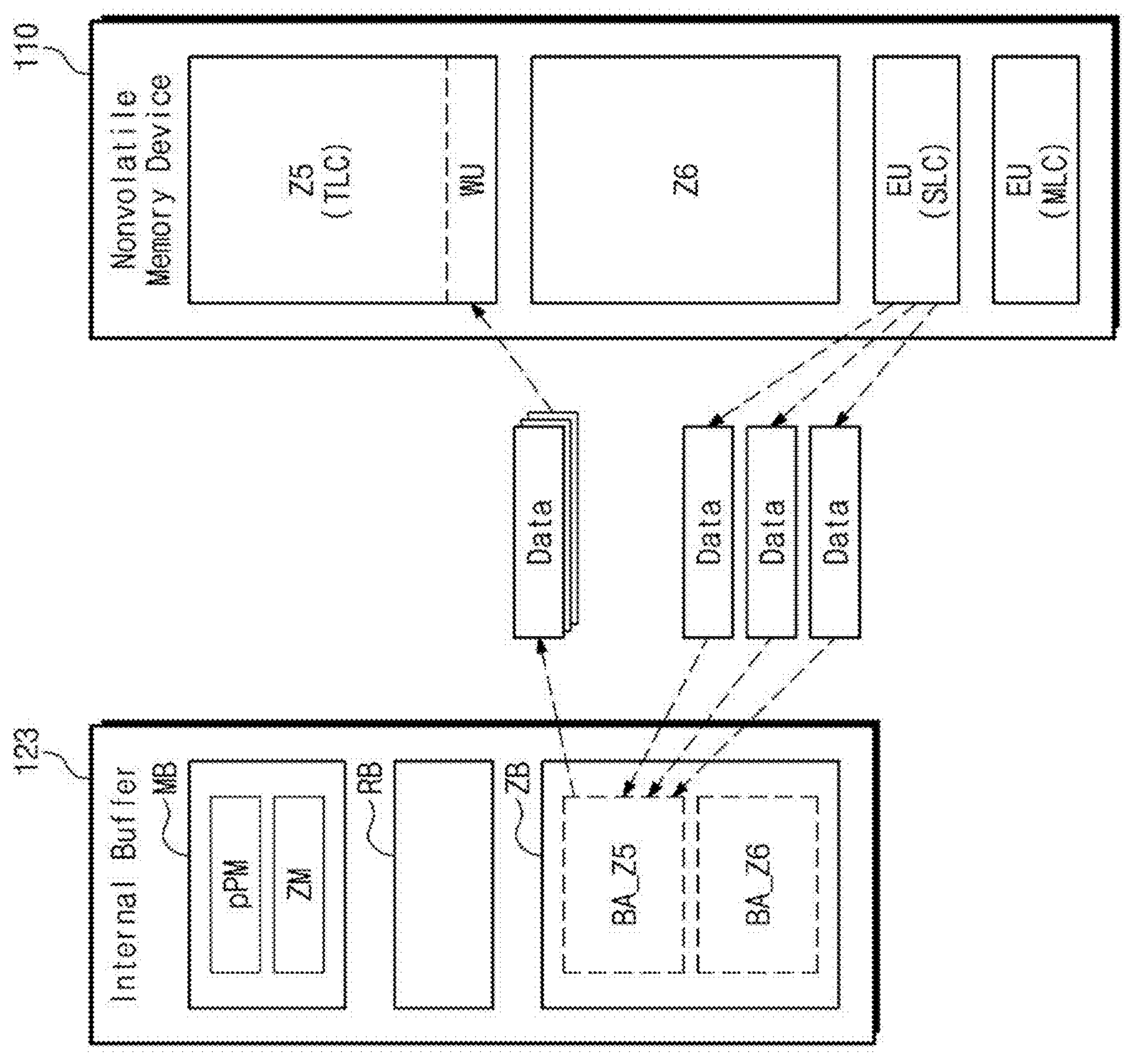

FIGS. 47A to 47C are diagrams illustrating an example in which the storage device 100 performs buffering using a backup erase unit having a cell type which corresponds to an SLC. Referring to FIGS. 1 and 47A, in the data input step SDIN, the memory controller 120 may store two page data received from the external host device in the zone buffer BA_Z5 of the fifth zone Z5. Afterwards, in a backup step SBCK, the memory controller 120 may back up the two page data stored in the zone buffer BA_Z5 of the fifth zone Z5 to the erase unit EU having a cell type which corresponds to the SLC cell type. As described with reference to FIG. 45, the memory controller 120 may adjust the buffering unit and the write destination of the fifth zone Z5 and may perform dual buffering using the erase unit EU having a cell type which corresponds to the SLC cell type.

Referring to FIGS. 1 and 47B, in the data input step SDIN, when one page data for the fifth zone Z5 are received from the external host device, the memory controller 120 may store the received one page data in the zone buffer BA_Z5 of the fifth zone Z5. Because the buffering unit of the fifth zone Z5 corresponds to the SLC cell type, in the write step SWR, the memory controller 120 may write the data stored in the zone buffer BA_Z5 of the fifth zone Z5 in the erase unit EU (e.g., a backup erase unit) having a cell type which corresponds to the SLC cell type.

Referring to FIGS. 1, 47B, and 47C, because the data corresponding to the TLC cell type of the fifth zone Z5 or the write unit WU of the fifth zone Z5 are collected in the erase unit EU with the SLC cell type, the memory controller 120 may migrate the data written in the erase unit EU with the SLC cell type to the fifth zone Z5. Afterwards, as described with reference to FIG. 46, the memory controller 120 may adjust the buffering unit and the write destination of the fifth zone Z5 to the fifth zone Z5.

Figure 48A:
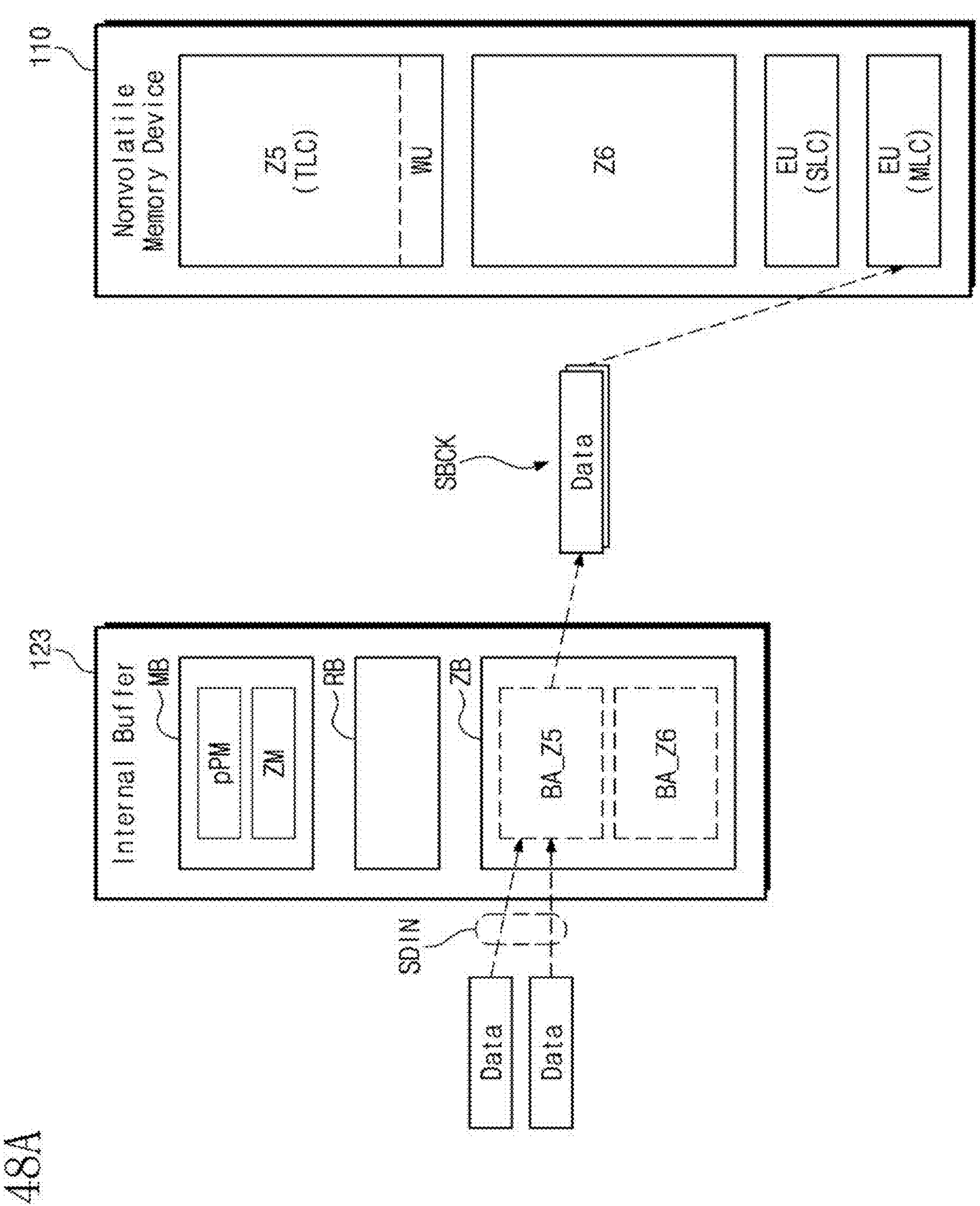
FIGS. 48A to 48C are diagrams illustrating an example in which a storage device performs buffering using a backup erase unit having a cell type which corresponds to an MLC, according to an embodiment.
Figure 48B:
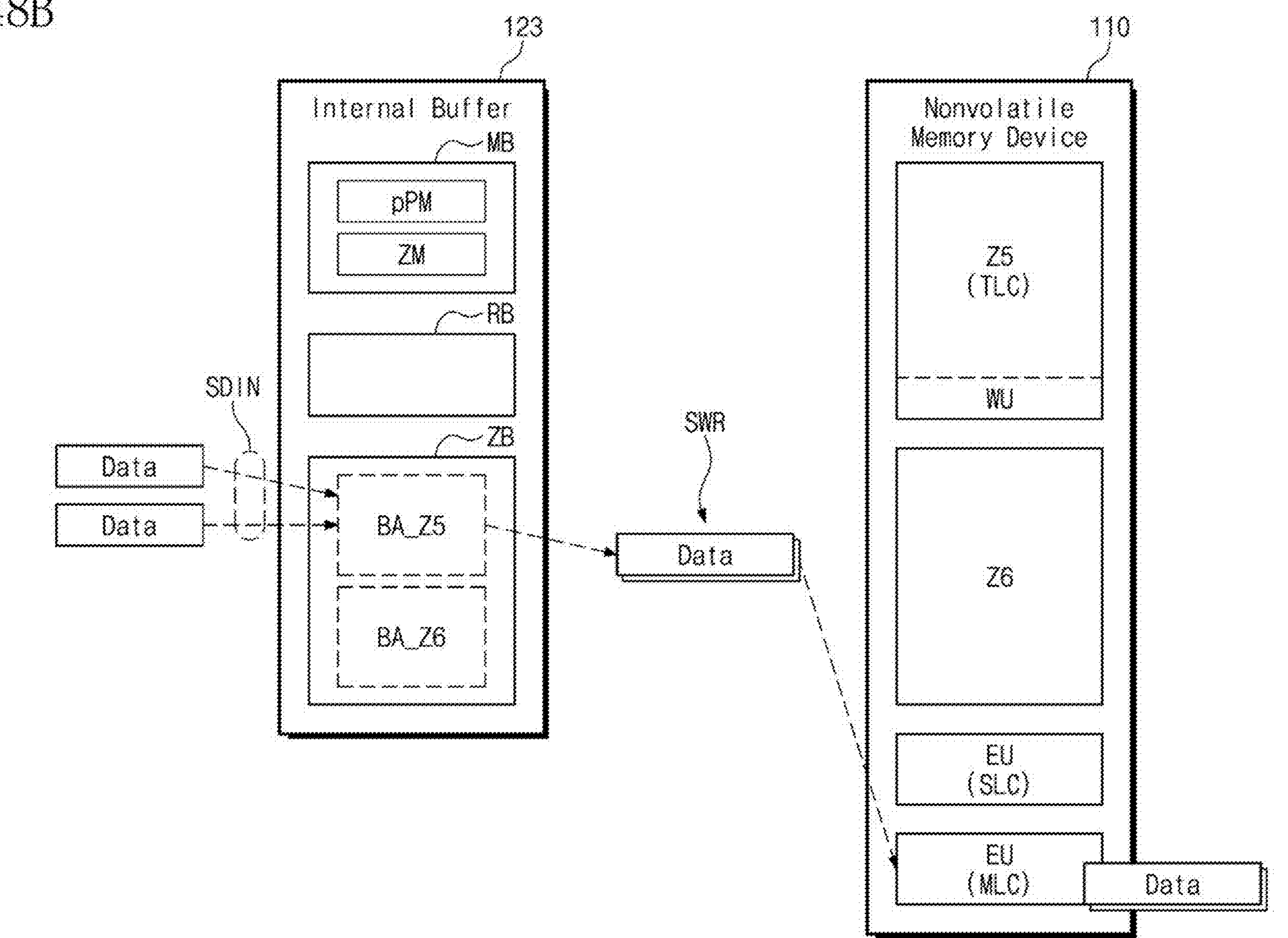
Figure 48C:
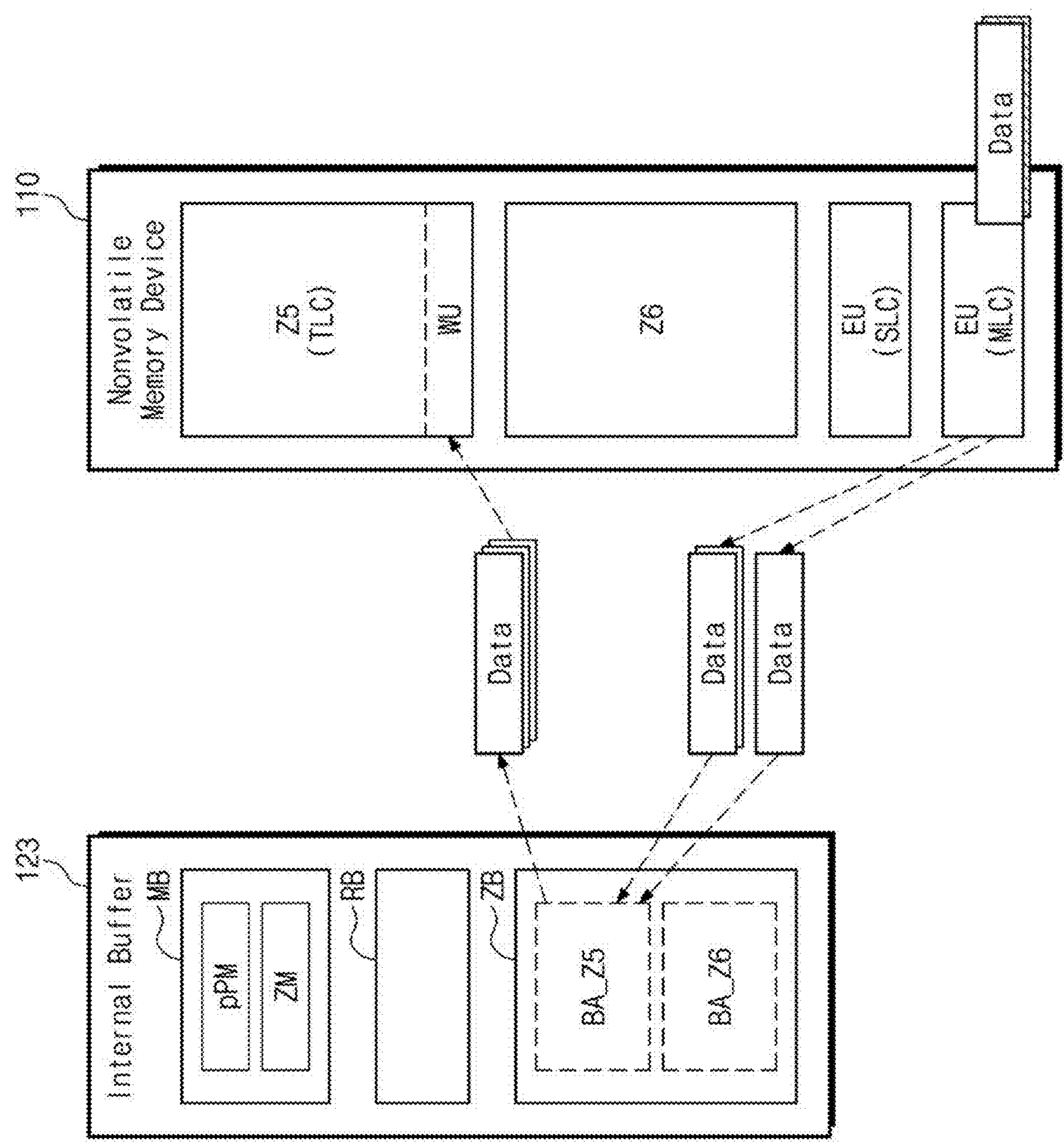

FIGS. 48A to 48C are diagrams illustrating an example in which the storage device 100 performs buffering using a backup erase unit having a cell type which corresponds to an MLC. Referring to FIGS. 1 and 48A, in the data input step SDIN, the memory controller 120 may store two page data received from the external host device in the zone buffer BA_Z5 of the fifth zone Z5. Afterwards, in the backup step SBCK, the memory controller 120 may back up the two page data stored in the zone buffer BA_Z5 of the fifth zone Z5 to the erase unit EU having a cell type which corresponds to the MLC cell type. As described with reference to FIG. 45, the memory controller 120 may adjust the buffering unit and the write destination of the fifth zone Z5 and may perform dual buffering using the erase unit EU having a cell type which corresponds to the MLC cell type.

Referring to FIGS. 1 and 48B, in the data input step SDIN, when two page data for the fifth zone Z5 are received from the external host device, the memory controller 120 may store the received two page data in the zone buffer BA_Z5 of the fifth zone Z5. Because the buffering unit of the fifth zone Z5 corresponds to the MLC cell type, in the write step SWR, the memory controller 120 may write the data stored in the zone buffer BA_Z5 of the fifth zone Z5 in the erase unit EU (e.g., a backup erase unit) having a cell type which corresponds to the MLC cell type.

Referring to FIGS. 1, 48B, and 48C, because the data corresponding to the TLC cell type of the fifth zone Z5 or the write unit WU of the fifth zone Z5 are collected in the erase unit EU with the MLC cell type, the memory controller 120 may migrate three page data among the data written in the erase unit EU with the MLC cell type to the fifth zone Z5. Because one page data remain in the erase unit EU with the MLC cell type, as described with reference to FIG. 46, the memory controller 120 may maintain the buffering unit and the write destination of the fifth zone Z5, which correspond to the erase unit EU with the MLC cell type.

In an embodiment, when two page data to be written in the fifth zone Z5 are further received from the external host device, the memory controller 120 may write the two page data in the erase unit EU with the MLC cell type and may migrate the three page data from the erase unit EU with the MLC cell type to the fifth zone Z5. Afterwards, as described with reference to FIG. 46, the memory controller 120 may adjust the buffering unit and the write destination of the fifth zone Z5 to the fifth zone Z5.

Figure 49:
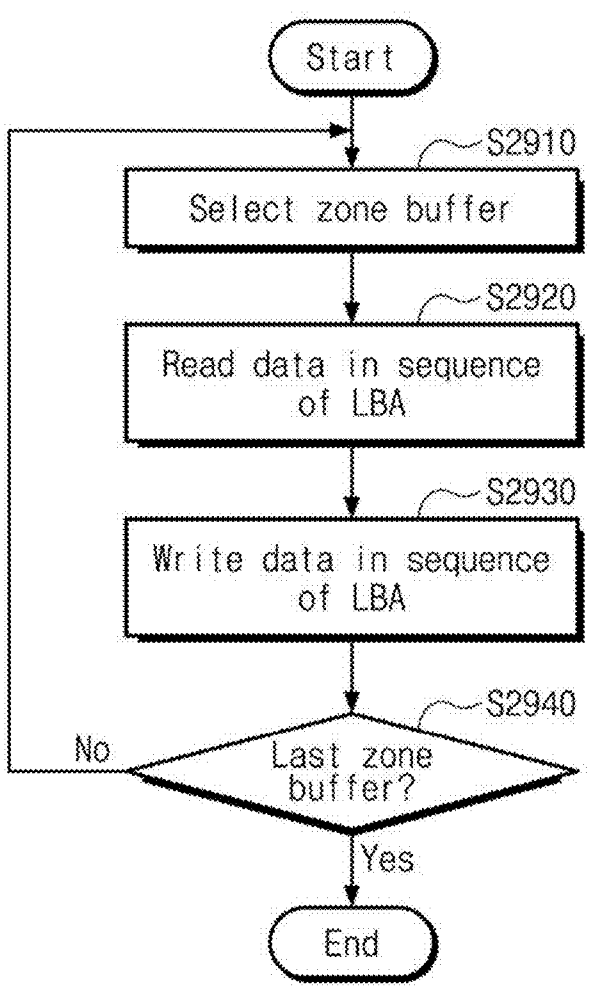
FIG. 49 is a diagram illustrating an example in which a storage device performs a backup operation of data associated with two or more zones, according to an embodiment.

FIG. 49 is a diagram illustrating an example in which the storage device 100 performs a backup operation of data associated with two or more zones. In an embodiment, when the flush request for two or more zones is received from the external host device or when the power off notification is received from the external host device, data of two or more zone buffers may be backed up.

Referring to FIGS. 1 and 49, in operation S2910, the memory controller 120 may select a zone buffer. For example, the memory controller 120 may select one of zone buffers targeted for the backup operation of the internal buffer 123.

In operation S2920, the memory controller 120 may read data of the selected zone buffer in the sequence of logical addresses LBA. In operation S2930, the memory controller 120 may write data in the sequence of logical addresses LBA. For example, the memory controller 120 may write the data read from the selected zone buffer in the backup erase unit in the sequence of logical addresses LBA.

In operation S2940, the memory controller 120 may determine whether the selected zone buffer is the last zone buffer. For example, the memory controller 120 may determine whether the selected zone buffer is the last zone buffer among the zone buffers targeted for the backup operation of the internal buffer 123. When the selected zone buffer is not the last zone buffer, the memory controller 120 may select a next zone buffer in operation S2910 and may again perform operation S2920, operation S2930, and operation S2940. When the selected zone buffer is the last zone buffer, the memory controller 120 may end the backup operation.

For example, when there is a need or desire to back up the data present in two or more zone buffers of the internal buffer 123, the memory controller 120 may collect the data present in the two or more zone buffers of the internal buffer 123 for each zone buffer, in order to be written in the backup erase unit.

Figure 50:
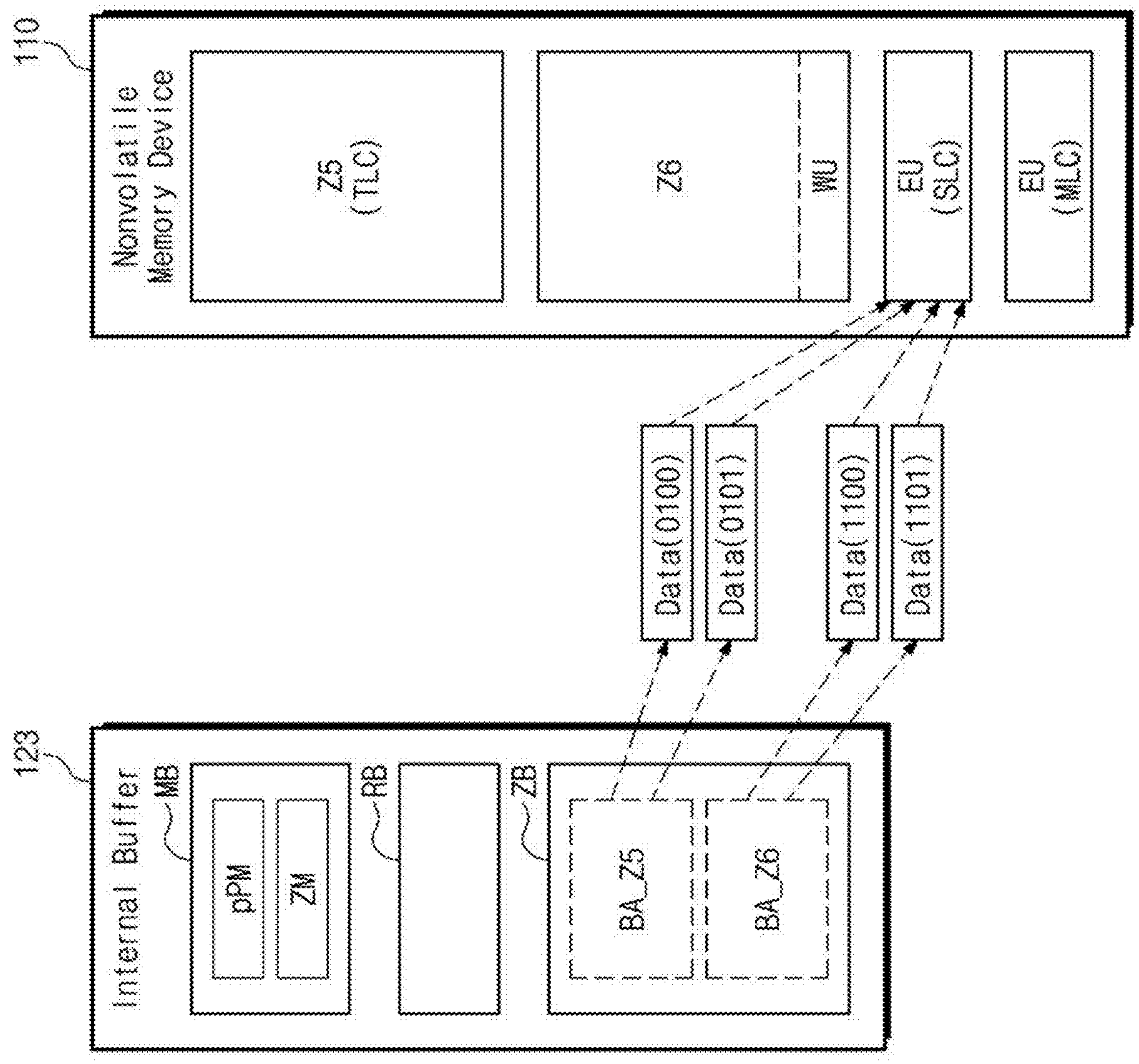
FIG. 50 is a diagram illustrating an example in which a storage device backs up data of zone buffers, according to an embodiment.

FIG. 50 is a diagram illustrating an example in which the storage device 100 backs up data of zone buffers. Referring to FIGS. 1 and 50, the zone buffer BA_Z5 of the fifth zone Z5 may store data corresponding to logical addresses of "0100" and "0101". The storage device 100 may write the data corresponding to the logical addresses of "0100" and "0101" in the erase unit EU with the SLC cell type in the sequence of logical addresses.

The zone buffer BA_Z6 of the sixth zone Z6 may store data corresponding to logical addresses of "1100" and "1101". The storage device 100 may write the data corresponding to the logical addresses of "1100" and "1101" in the erase unit EU with the SLC cell type in the sequence of logical addresses.

Figure 51:
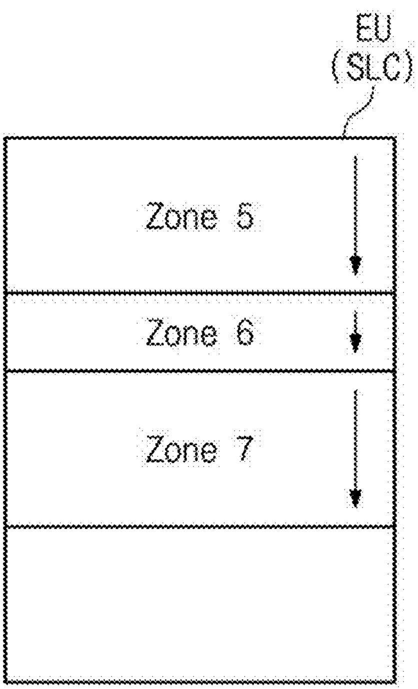
FIG. 51 is a diagram illustrating an example in which data of zones are backed up to a backup erase unit, according to an embodiment.

FIG. 51 is a diagram illustrating an example in which data of zones are backed up to a backup erase unit. Referring to FIGS. 1 and 51, data of the fifth zone Z5 may be written in the backup erase unit EU with the SLC cell type in the sequence of logical addresses. Next, data of the sixth zone Z6 may be written in the backup erase unit EU with the SLC cell type in the sequence of logical addresses. Then, data of the seventh zone Z7 may be written in the backup erase unit EU with the SLC cell type in the sequence of logical addresses.

The process of migrating the data of the backup erase unit EU to target zones may be accelerated by collecting the backup data for each zone buffer (or for each zone) and backing up the collected data in the sequence of logical addresses.

Figure 52:
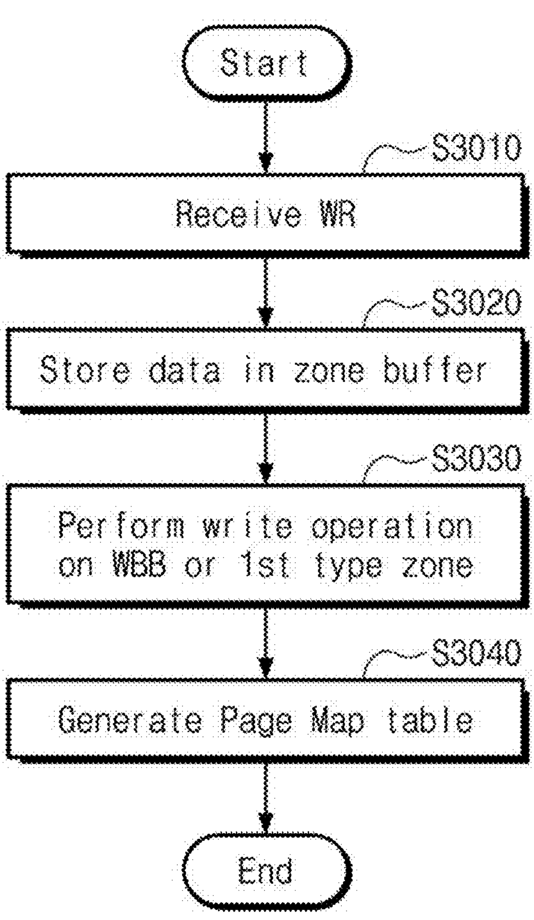
FIG. 52 is a diagram illustrating another example in which a storage device performs buffering using a nonvolatile memory device, according to an embodiment.

FIG. 52 is a diagram illustrating another example in which the storage device 100 performs buffering using the non-volatile memory device 110. Referring to FIGS. 1 and 52, in operation S3010, the memory controller 120 may receive the write request WR from the external host device. The write request WR may be received using the command UPIU.

In operation S3020, the memory controller 120 may store the data received together with the write request WR in the internal buffer 123 (or a zone buffer). In an embodiment, between operation S3010 and operation S3020, additional operations may be performed, for example, an operation of transmitting, at the memory controller 120, the "Ready to Transfer" UPIU to the external host device in response to the write request WR and an operation of receiving, at the memory controller 120, write data from the external host device together with the "Data Out" UPIU.

In operation S3030, the memory controller 120 may write the data stored in the internal buffer 123 (or the zone buffer) in a write booster buffer WBB or the first-type zone (an example of which is described above with reference to FIGS. 10 to 15).

For example, based on the data being written in the shared write booster buffer SWBB (as shown, for example, in FIGS. 3A to 3E), when the data stored in the internal buffer 123 regardless of the target zone correspond to the cell type of the write booster buffer WBB, the memory controller 120 may write the data stored in the internal buffer 123 in the shared write booster buffer SWBB.

For example, based on the data being written in the dedicated write booster buffer DWBB or the first-type zone, when the data stored in the zone buffer of the internal buffer 123 to share the target zone correspond to the cell type of the dedicated write booster buffer DWBB or the first-type zone, the memory controller 120 may write the data sharing the target zone in the first-type zone or the dedicated write booster buffer DWBB corresponding to the target zone.

In operation S3040, the memory controller 120 may generate the page map table of the written data.

Figure 53:
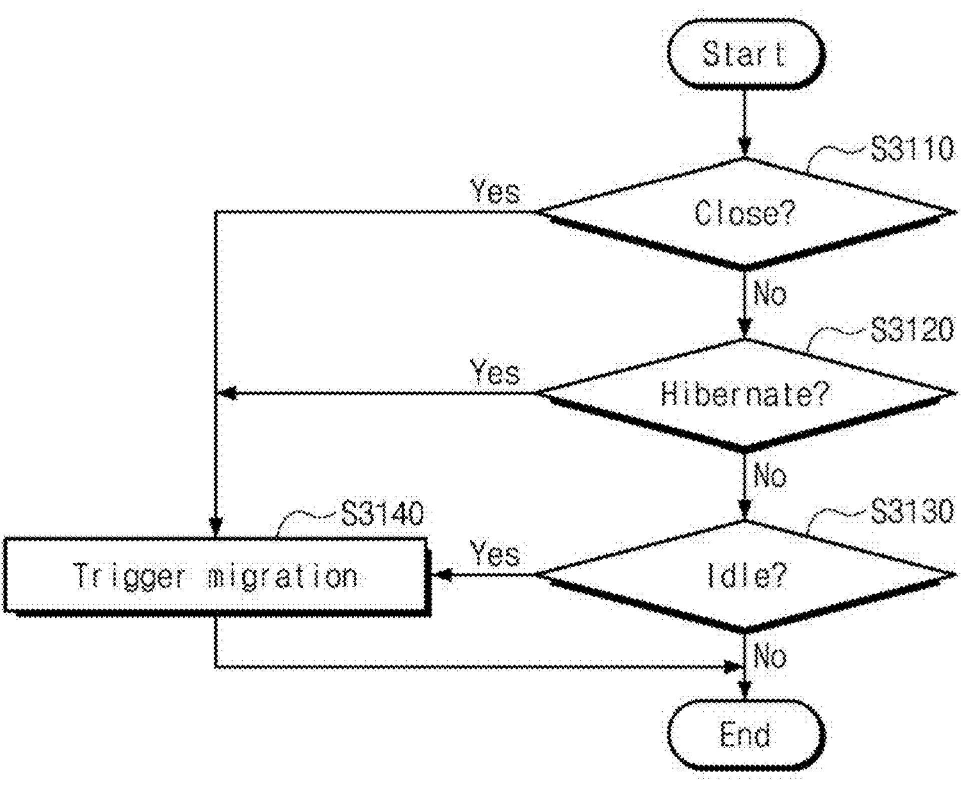
FIG. 53 is a diagram illustrating an example of a method in which a storage device triggers migration, according to an embodiment.

FIG. 53 is a diagram illustrating an example of a method in which the storage device 100 triggers migration. Referring to FIGS. 1 and 53, in operation S3210, the memory controller 120 may determine whether a close zone request is received. When the close zone request is received, in operation S3140, the memory controller 120 may trigger migration of a zone corresponding to the close zone request.

When the close zone request is not received, in operation S3120, the memory controller 120 may determine whether the storage device 100 is in a hibernate state (e.g., a power-saving state). When the storage device 100 is in the hibernate state, in operation S3140, the memory controller 120 may trigger migration. For example, the memory controller 120 may trigger migration of data written in the backup erase unit, data stored in the write booster buffer WBB (as shown, for example, in FIGS. 3A to 3E), or data written in the first-type zone.

When the storage device 100 is not in the hibernate state, in operation S3130, the memory controller 120 may determine whether the storage device 100 is in an idle state. The idle state may refer to a state where there requests pending for execution are absent from the storage device 100. When the storage device 100 is in the idle state, in operation S3140, the memory controller 120 may trigger migration. For example, the memory controller 120 may trigger migration of data written in the backup erase unit, data stored in the write booster buffer WBB, or data written in the first-type zone. When the storage device 100 is not in the idle state, the memory controller 120 may end determination without triggering migration.

The migration triggered in the hibernate state or the idle state may be suspended together with the end of the hibernate state or the idle state. The memory controller 120 may resume the suspended migration in response to again entering the hibernate state or the idle state.

As described above, the storage device 100 may be implemented to perform migration as the background operation that is not recognized by the external host device.

Figure 54:
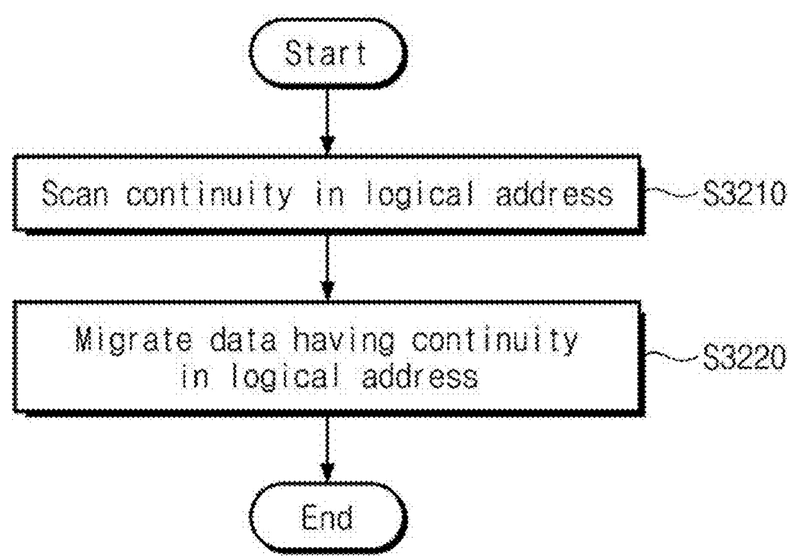
FIG. 54 is a diagram illustrating a first example in which a storage device performs migration, according to an embodiment.

FIG. 54 is a diagram illustrating an example in which the storage device 100 performs migration. Referring to FIGS. 1 and 54, in operation S3210, the memory controller 120 may scan continuity in logical addresses of data sharing the target zone, in the write booster buffer WBB, the backup erase unit, or the first-type zone being a source of migration.

For example, the memory controller 120 may determine continuity based on a write unit or a cell type of the target zone of the migration. The logical addresses of the data written in the source of the migration may be divided into groups by the write unit or the cell type of the target zone. When all the data corresponding to the logical addresses of the divided group are written in a source zone, the memory controller 120 may determine that the corresponding group has continuity.

In operation S3220, the memory controller 120 may migrate the data having the continuity. For example, the memory controller 120 may migrate the group with the continuity written in the source of the migration sequentially from the lowest logical address. Accordingly, in the target zone, the sequentiality of physical addresses and logical addresses may be guaranteed.

Figure 55A:
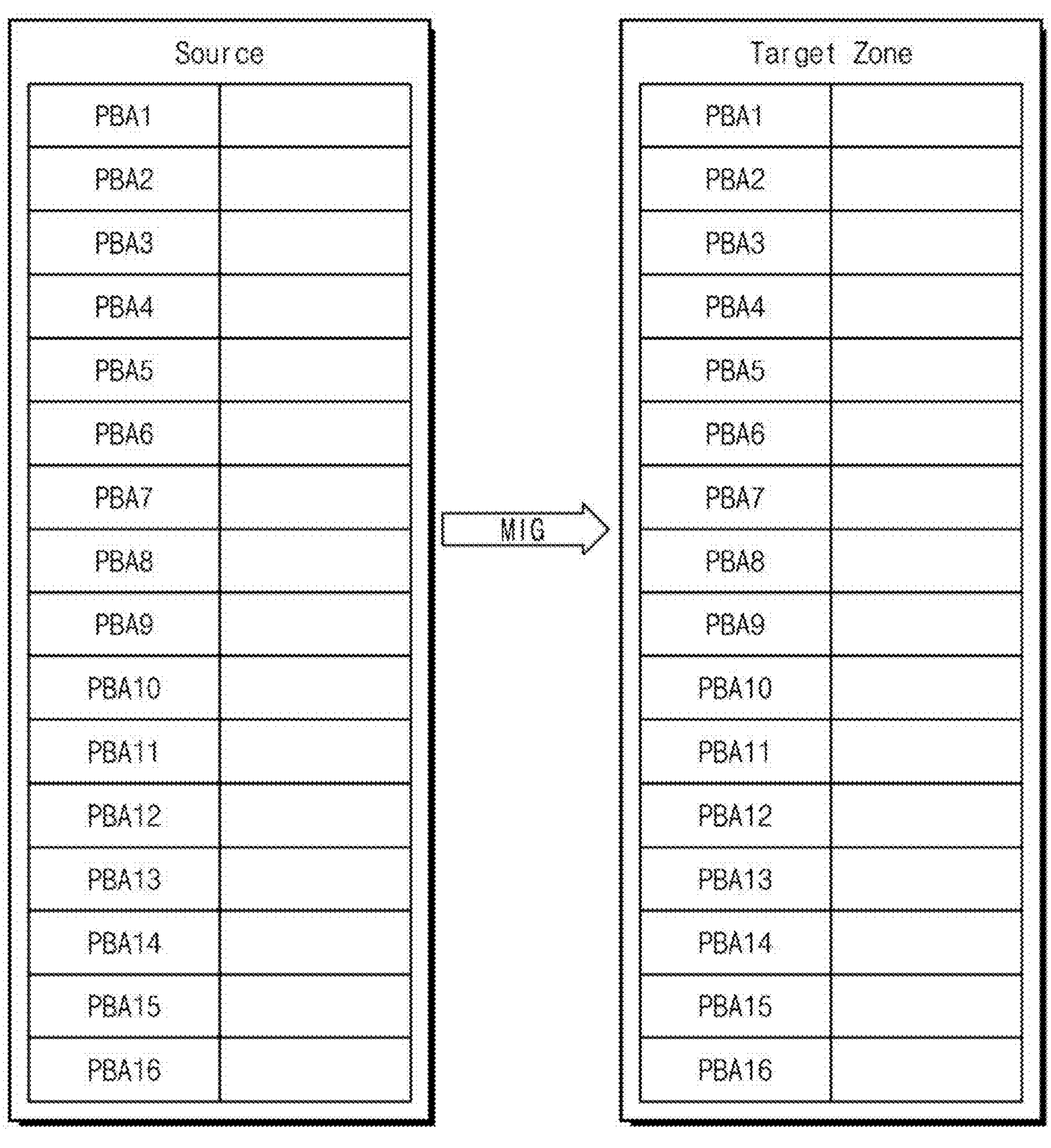

FIG. 55A to FIG. 55D are diagrams illustrating an example of a process in which the storage device 100 performs migration. Referring to FIG. 55A, a source of the migration may be a write booster buffer, a backup erase unit, or a first-type zone. The migration source may include first to sixteenth physical addresses PBA1 to PBA16. A target zone may include first to sixteenth physical addresses PBA1 to PBA16. Because the physical structure of the migration source is identical to the physical structure of the target zone, the numbers of physical addresses may be identical.

In an embodiment, for the description of the migration operation, the memory controller 120 may write data received together with a write request from the external host device in the migration source.

Referring to FIG. 55B, in operation S3311, the write of data corresponding to the first logical address LBA1 may be requested by the external host device. The memory controller 120 may write data based on the sequence of physical addresses. The memory controller 120 may write the data in a storage space corresponding to the first physical address PBA1 of the migration source and may store mapping information about the first physical address PBA1 and the first logical address LBA1.

In operation S3312, the write of data corresponding to the third logical address LBA3 may be requested by the external host device. The memory controller 120 may write the data in a storage space corresponding to the second physical address PBA2 of the migration source and may store mapping information about the second physical address PBA2 and the third logical address LBA3.

In operation S3313, the write of data corresponding to the fourth logical address LBA4 may be requested by the external host device. The memory controller 120 may write the data in a storage space corresponding to the third physical address PBA3 of the migration source and may store mapping information about the third physical address PBA3 and the fourth logical address LBA4.

In operation S3314, the write of data corresponding to the sixth logical address LBA6 may be requested by the external host device. The memory controller 120 may write the data in a storage space corresponding to the fourth physical address PBA4 of the migration source and may store mapping information about the fourth physical address PBA4 and the sixth logical address LBA6.

In operation S3315, the write of data corresponding to the seventh logical address LBA7 may be requested by the external host device. The memory controller 120 may write the data in a storage space corresponding to the fifth physical address PBA5 of the migration source and may store mapping information about the fifth physical address PBA5 and the seventh logical address LBA7.

In operation S3316, the write of data corresponding to the ninth logical address LBA9 may be requested by the external host device. The memory controller 120 may write the data in a storage space corresponding to the sixth physical address PBA6 of the migration source and may store mapping information about the sixth physical address PBA6 and the ninth logical address LBA9.

In operation S3317, the write of data corresponding to the tenth logical address LBA10 may be requested by the external host device. The memory controller 120 may write the data in a storage space corresponding to the seventh physical address PBA7 of the migration source and may store mapping information about the seventh physical address PBA7 and the tenth logical address LBA10.

In operation S3318, the write of data corresponding to the twelfth logical address LBA12 may be requested by the external host device. The memory controller 120 may write the data in a storage space corresponding to the eighth physical address PBA8 of the migration source and may store mapping information about the eighth physical address PBA8 and the twelfth logical address LBA12.

According to the example illustrated in FIG. 55B, because there is no group having continuity, the migration MIG may not be performed.

Figure 55C:
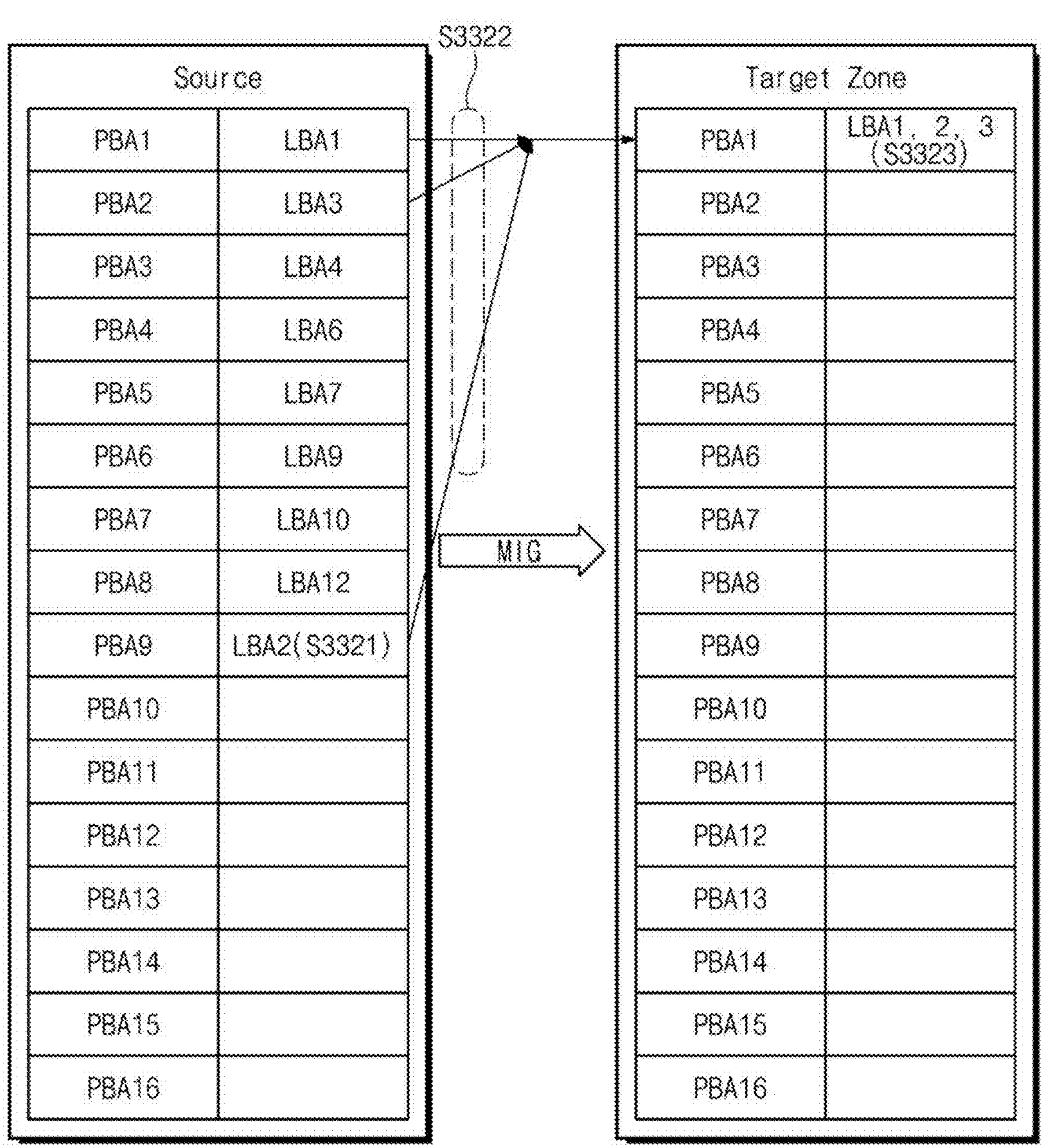

Referring to FIG. 55C, in operation S3321, the write of data corresponding to the second logical address LBA2 may be requested by the external host device. The memory controller 120 may write the data in a storage space corresponding to the ninth physical address PBA9 of the migration source and may store mapping information about the ninth physical address PBA9 and the second logical address LBA2.

When the TLC cell type is used as the cell type of a memory cell of the target zone, three logical addresses may be mapped to one physical address of the target zone. The memory controller 120 may determine that continuity of a group corresponding to the lowest logical address, for example, continuity of a group including the first logical address LBA1, the second logical address LBA2, and the third logical address LBA3, is secured.

In operation S3322, the memory controller 120 may perform the migration MIG by writing the data of the group including the first logical address LBA1, the second logical address LBA2, and the third logical address LBA3 at the first physical address PBA1 of the target zone. In operation S3323, the memory controller 120 may store mapping information about the first physical address PBA1 of the target zone and the first, second, and third logical addresses LBA1, LBA2, and LBA3.

Figure 55D:
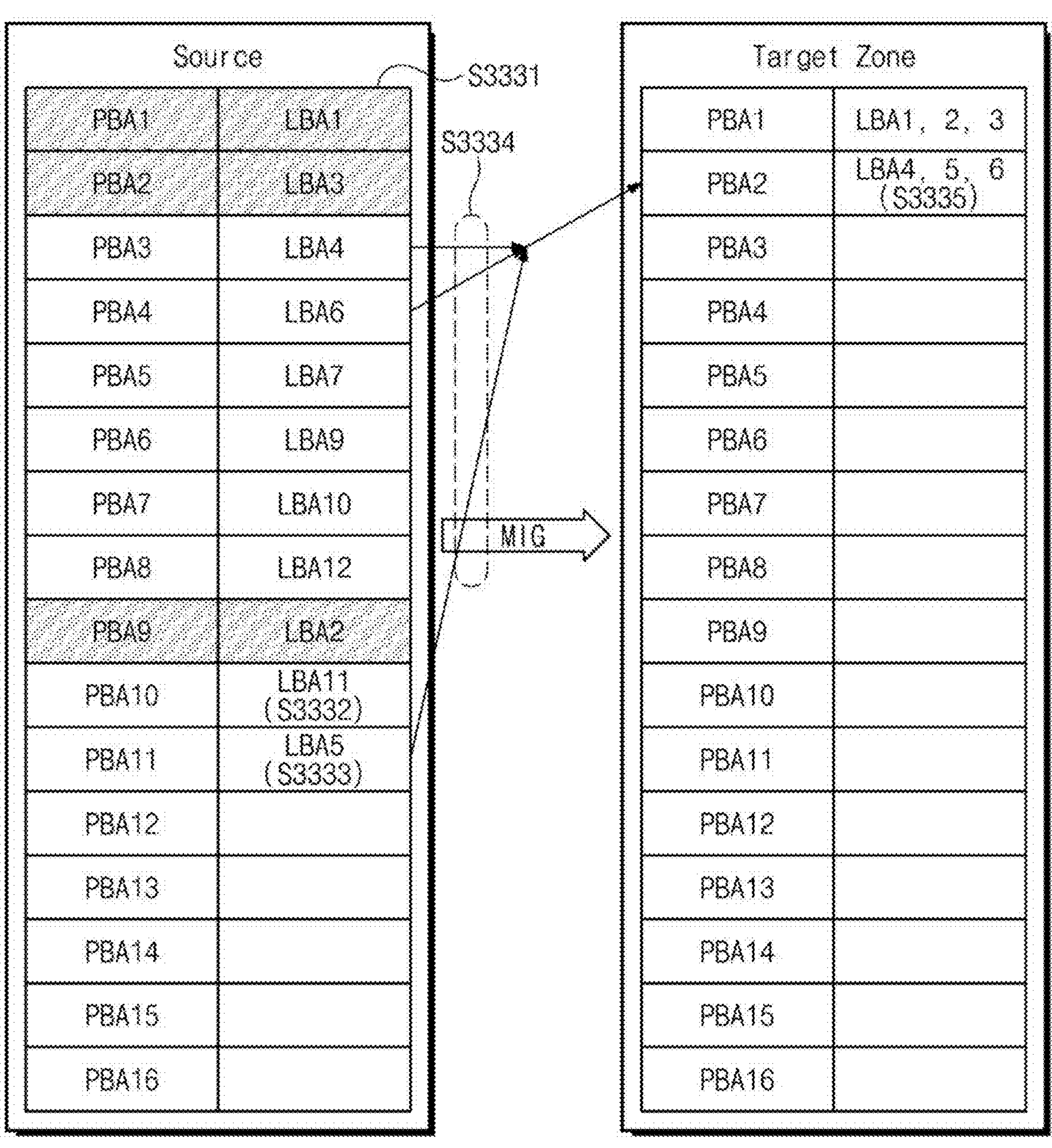

Referring to FIG. 55D, in operation S3331, the memory controller 120 may invalidate the mapping information and the migrated data of the first logical address LBA1, the second logical address LBA2, and the third logical address LBA3.

In operation S3332, the write of data corresponding to the eleventh logical address LBA11 may be requested by the external host device. The memory controller 120 may write the data in a storage space corresponding to the tenth physical address PBA10 of the migration source and may store mapping information about the tenth physical address PBA10 and the eleventh logical address LBA11.

When the data of the eleventh logical address LBA11 are written, the memory controller 120 may determine that continuity of a group including the tenth logical address LBA10, the eleventh logical address LBA11, and the twelfth logical address LBA12 is secured. However, because the continuity-secured group is not a next group (in terms of a logical address sequence) with respect to the group including the first logical address LBA1, the second logical address LBA2, and the third logical address LBA3, the memory controller 120 may not perform the migration MIG.

In operation S3333, the write of data corresponding to the fifth logical address LBA5 may be requested by the external host device. The memory controller 120 may write the data in a storage space corresponding to the eleventh physical address PBA11 of the migration source and may store mapping information about the eleventh physical address PBA11 and the fifth logical address LBA5.

When the data of the fifth logical address LBA5 are written, the memory controller 120 may determine that continuity of a group including the fourth logical address LBA4, the fifth logical address LBA5, and the sixth logical address LBA6 is secured. The continuity-secured group may be a next group with respect to the group including the first logical address LBA1, the second logical address LBA2, and the third logical address LBA3.

In operation S3334, the memory controller 120 may perform the migration MIG by writing the data of the group including the fourth logical address LBA4, the fifth logical address LBA5, and the sixth logical address LBA6 at the second physical address PBA2 of the target zone. In operation S3335, the memory controller 120 may store mapping information about the second physical address PBA2 of the target zone and the fourth, fifth, and sixth logical addresses LBA4, LBA5, and LBA6.

As described above, the memory controller 120 may guarantee the sequentiality of logical addresses and physical addresses in the target zone by migrating the data written in the migration source in the sequence of random logical addresses.

In the above embodiments, examples in which data are written in the migration source based on random logical addresses are described. However, data may be written in the migration source based on sequential logical addresses, for example, based on the zone characteristic. When data are written in the migration source based on sequential logical addresses, the memory controller 120 may perform migration as soon as the continuity of logical addresses of each group is secured, as described with reference to FIGS. 47A to 47C and 48A to 48C.

FIG. 56 is a diagram illustrating an example in which the storage device 100 writes data in the shared write booster buffer SWBB. Referring to FIGS. 1 and 56, the memory controller 120 may write data in the shared write booster buffer SWBB depending on a write sequence WS from "1" to "20". Because the shared write booster buffer SWBB is shared by two or more logical units, the data written in the shared write booster buffer SWBB may include data of the fifth zone Z5, data of the sixth zone Z6, and data of the seventh zone Z7.

Validity of the data written in the shared write booster buffer SWBB may be marked by a valid flag VF. The valid flag VF that is set to "I" may indicate that the corresponding data are invalid data. The valid flag VF that is set to "V" may indicate that the corresponding data are valid data.

As described above, the memory controller 120 may write data of two or more different zones in the shared write booster buffer SWBB. When performing migration on the data written in the shared write booster buffer SWBB, the memory controller 120 may select data of a zone to be first migrated in any manner, according to embodiments. For example, the memory controller 120 may select data to be migrated based on features of target zones (e.g., target erase units) of the data stored in the shared write booster buffer SWBB.

Figure 57:
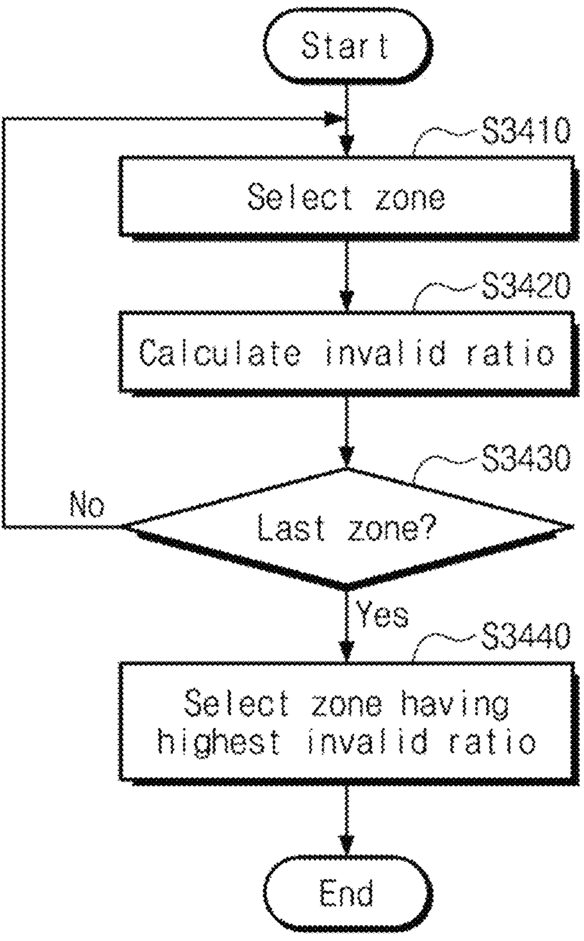
FIG. 57 is a diagram illustrating a first example in which a storage device selects data of a zone targeted for migration, according to an embodiment.

FIG. 57 is a diagram illustrating a first example in which the storage device 100 selects data of a zone targeted for migration. Referring to FIGS. 1, 56, and 57, in operation S3410, the memory controller 120 may select a zone. For example, the memory controller 120 may select the zone from among zones corresponding to the data stored in the shared write booster buffer SWBB.

In operation S3420, the memory controller 120 may calculate an invalid ratio. For example, the memory controller 120 may calculate a ratio of valid data and invalid data of the selected zone, which are stored in the shared write booster buffer SWBB.

In operation S3430, the memory controller 120 may determine whether the selected zone is the last zone. For example, the memory controller 120 may determine whether the selected zone is the last zone among the zones corresponding to the data stored in the shared write booster buffer SWBB. When the selected zone is not the last zone, the memory controller 120 may select a next zone in operation S3410 and may again perform operation S3420 and operation S3430.

When the selected zone is the last zone, in operation S3440, the memory controller 120 may select a zone having the highest invalid ratio. For example, the memory controller 120 may select the data of the zone (or the erase units of the zone) having the highest invalid ratio as a migration target.

In an embodiment, as illustrated in FIG. 56, the data of the fifth zone Z5 may include four invalid data and four valid data. The invalid ratio of the fifth zone Z5 may be 50%. The data of the sixth zone Z6 may include two invalid data and six valid data. The invalid ratio of the sixth zone Z6 may be 25%. The data of the fifth zone Z7 may include four valid data without invalid data. The invalid ratio of the seventh zone Z7 may be 0%.

When the migration is triggered, the memory controller 120 may select the data of the fifth zone Z5 as the migration target. When the data of the fifth zone Z5 are migrated prior to the data of the sixth zone Z6 and the data of the seventh zone Z7, a ratio of invalid data of the shared write booster buffer SWBB may be greatly increased. Accordingly, the erase unit of the shared write booster buffer SWBB may be invalidated more quickly and may be reused after erased.

Figure 58:
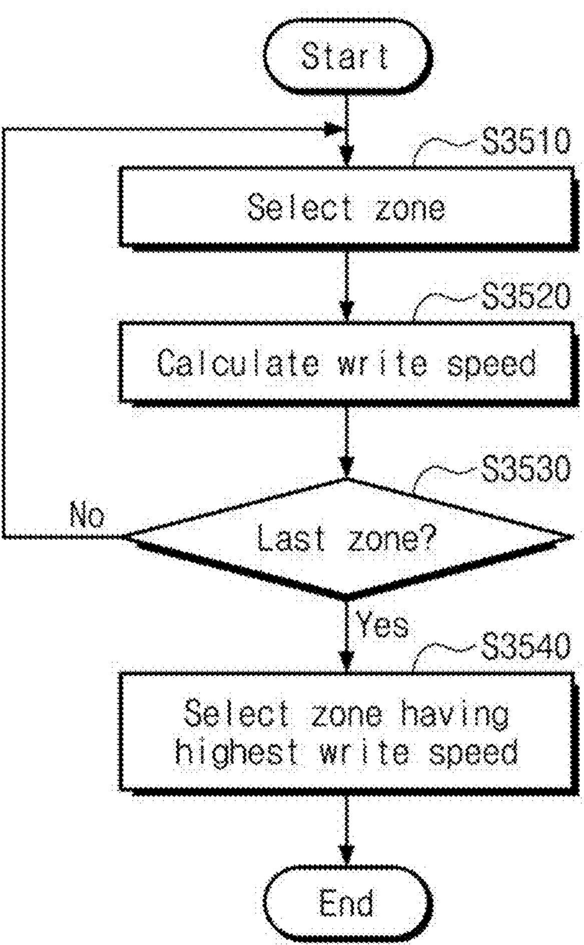
FIG. 58 is a diagram illustrating a second example in which a storage device selects data of a zone targeted for migration, according to an embodiment.

FIG. 58 is a diagram illustrating a second example in which the storage device 100 selects data of a zone targeted for migration. Referring to FIGS. 1, 56, and 58, in operation S3510, the memory controller 120 may select a zone. For example, the memory controller 120 may select the zone from among zones corresponding to the data stored in the shared write booster buffer SWBB.

In operation S3520, the memory controller 120 may calculate a write speed. For example, the memory controller 120 may calculate a speed at which data of the selected zone stored in the shared write booster buffer SWBB are written.

In an embodiment, the memory controller 120 may calculate a difference between the last write order of data written last in the selected zone and the start write order of data written first in the selected zone. The memory controller 120 may calculate the write speed of the selected zone by dividing the total write count by the calculated difference.

In operation S3530, the memory controller 120 may determine whether the selected zone is the last zone. For example, the memory controller 120 may determine whether the selected zone is the last zone among the zones corresponding to the data stored in the shared write booster buffer SWBB. When the selected zone is not the last zone, the memory controller 120 may select a next zone in operation S3510 and may again perform operation S3520 and operation S3530.

When the selected zone is the last zone, in operation S3540, the memory controller 120 may select a zone having the highest write speed. For example, the memory controller 120 may select the data of the zone (or the erase units of the zone) having the highest write speed as a migration target.

In an embodiment, as illustrated in FIG. 56, the last write order of the data of the fifth zone Z5 may be 20, and the start write order may be 1. The difference of the fifth zone Z5 calculated by the memory controller 120 may be 19. The write speed of the fifth zone Z5 calculated by the memory controller 120 may be "20/19". The last write order of the data of the sixth zone Z6 may be 19, and the start write order may be 4. The difference of the sixth zone Z6 calculated by the memory controller 120 may be 15. The write speed of the sixth zone Z6 calculated by the memory controller 120 may be "20/15". The last write order of the data of the seventh zone Z7 may be 17, and the start write order may be 13. The difference of the seventh zone Z7 calculated by the memory controller 120 may be 4. The write speed of the seventh zone Z7 calculated by the memory controller 120 may be "20/4".

When the flush request or the power off notification for two or more zones is received, the memory controller 120 may write the data of the two or more zones in the erase unit of the reserved area RVA (as shown, for example, in FIGS. 3A to 3E) together. Data of a zone (or erase units of a zone) to be migrated may be selected from the erase unit of the reserved area RVA based on the method described with reference to FIGS. 56 to 58.

Figure 59:
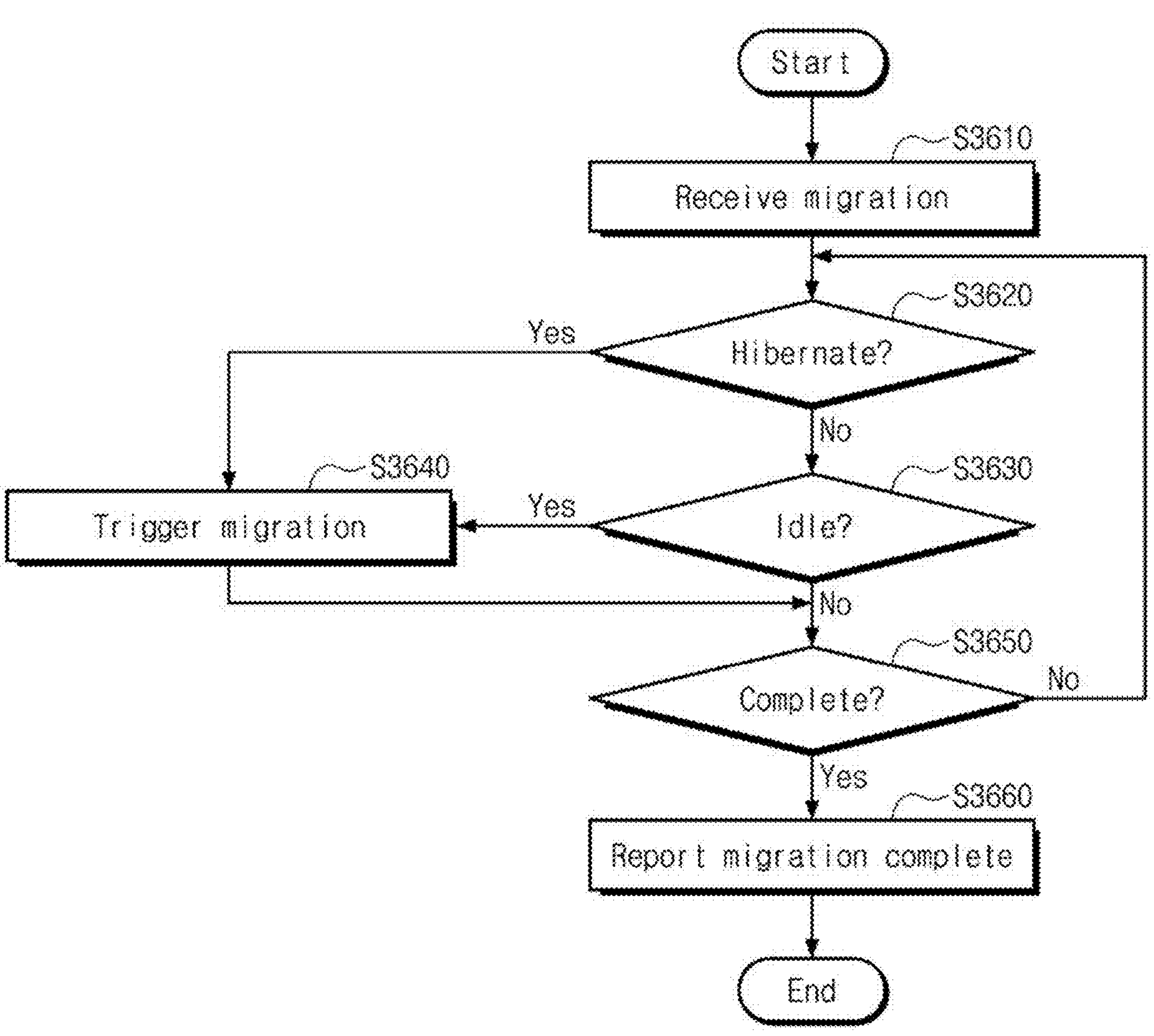
FIG. 59 is a diagram illustrating a second example in which a storage device performs migration, according to an embodiment.

FIG. 59 is a diagram illustrating a second example in which the storage device 100 performs migration. Referring to FIGS. 1 and 59, in operation S3610, the memory controller 120 may receive a migration request from the external host device. For example, the migration request may be received using the command UPIU or the query request UPIU defined by the UFS.

In operation S3620, the memory controller 120 may determine whether the storage device 100 is in a hibernate state (e.g., a power-saving state). When the storage device 100 is in the hibernate state, in operation S3640, the memory controller 120 may trigger migration.

When the storage device 100 is not in the hibernate state, in operation S3630, the memory controller 120 may determine whether the storage device 100 is in the idle state. The idle state may refer to a state where there requests pending for execution are absent from the storage device 100. When the storage device 100 is in the idle state, in operation S3640, the memory controller 120 may trigger migration. When the storage device 100 is not in the idle state, the memory controller 120 may not trigger migration.

The migration triggered in the hibernate state or the idle state may be suspended together with the end of the hibernate state or the idle state. The memory controller 120 may resume the suspended migration in response to again entering the hibernate state or the idle state.

In operation S3650, the memory controller 120 may determine whether the migration is completed. When the migration is not completed, the memory controller 120 may again perform operation S3620. When the migration is completed, in operation S3660, the memory controller 120 may notify the external host device that the migration is completed. For example, the memory controller 120 may add information which indicates that the migration is completed to the response UPIU to be transmitted to the external host device in response to the migration request or an arbitrary UPIU received from the external host device.

As described above, the storage device 100 may be implemented to perform migration as the background operation, which is not recognized by the external host device, in response to the request of the external host device.

Figure 60:
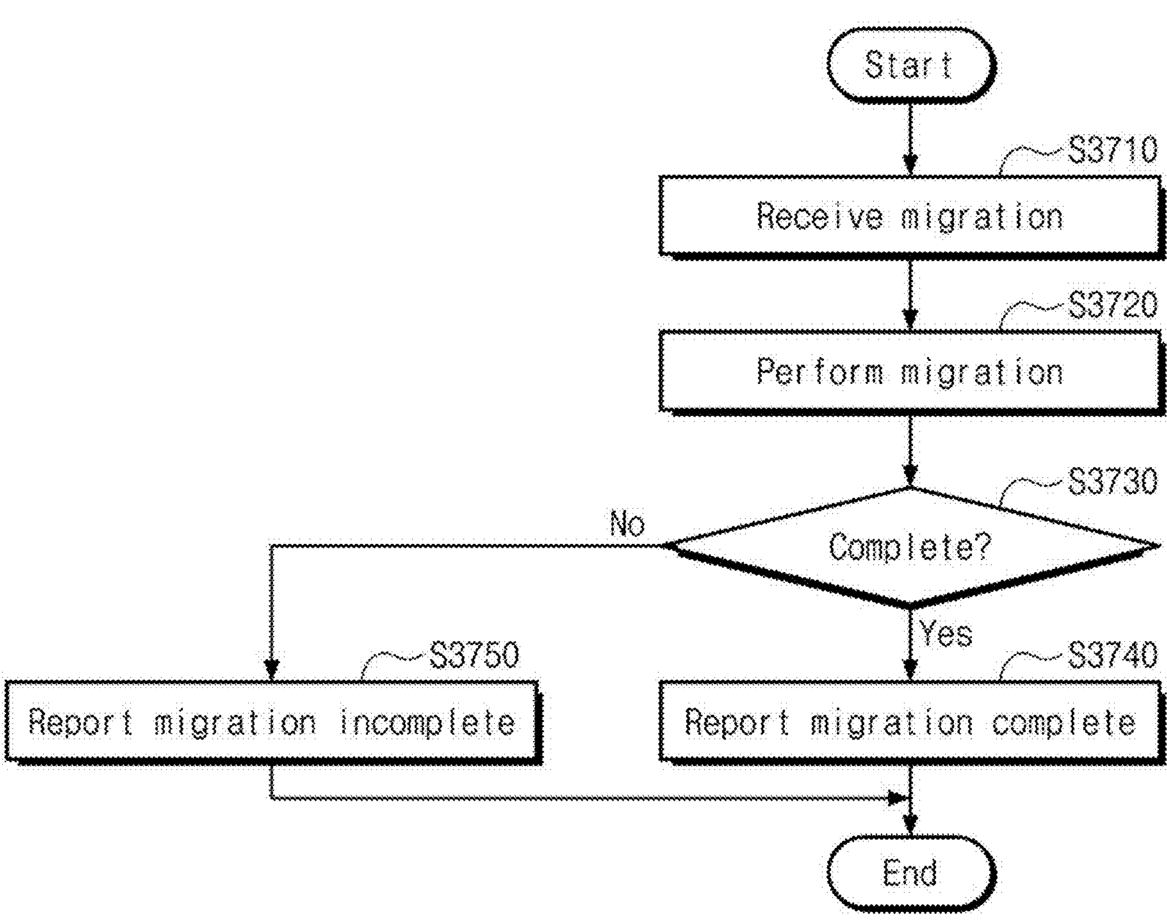
FIG. 60 is a diagram illustrating a third example in which a storage device performs migration, according to an embodiment.

FIG. 60 is a diagram illustrating a third example in which the storage device 100 performs migration. Referring to FIGS. 1 and 60, in operation S3710, the memory controller 120 may receive the migration request from the external host device. The migration request may be received using the command UPIU or the query request UPIU defined by the UFS.

In operation S3720, the memory controller 120 may perform migration. In operation S3730, the memory controller 120 may determine whether the migration is completed. When the migration is completed, in operation S3740, the memory controller 120 may notify the external host device that the migration is completed. For example, the memory controller 120 may include information which indicates that the migration is completed in the response UPIU for the migration request.

When continuity of logical addresses of data to be migrated to the target zone is not satisfied, the migration may not be completed. When the migration is not completed, in operation S3750, the memory controller 120 may notify the external host device that the migration is not completed.

For example, the memory controller 120 may include information which indicates that the migration is not completed in the response UPIU for the migration request. The memory controller 120 may include logical addresses of valid data, which are not migrated, in the response UPIU.

In an embodiment, the storage device 100 may be implemented to perform one of the operating methods (e.g., the migration methods) of FIGS. 53, 59, and 60. When the storage device 100 is implemented to perform migration in response to the migration request of the external host device as described with reference to FIGS. 59 and 60, the storage device 100 may not internally perform migration (for example, as described with reference to FIG. 53) without the migration request of the external host device.

The storage device 100 may be implemented to perform at least two of the operating methods (e.g., the migration methods) of FIGS. 53, 59, and 60. The storage device 100 may be set by the query request UPIU of the external host device in order to perform one of two or more methods.

Figure 61:
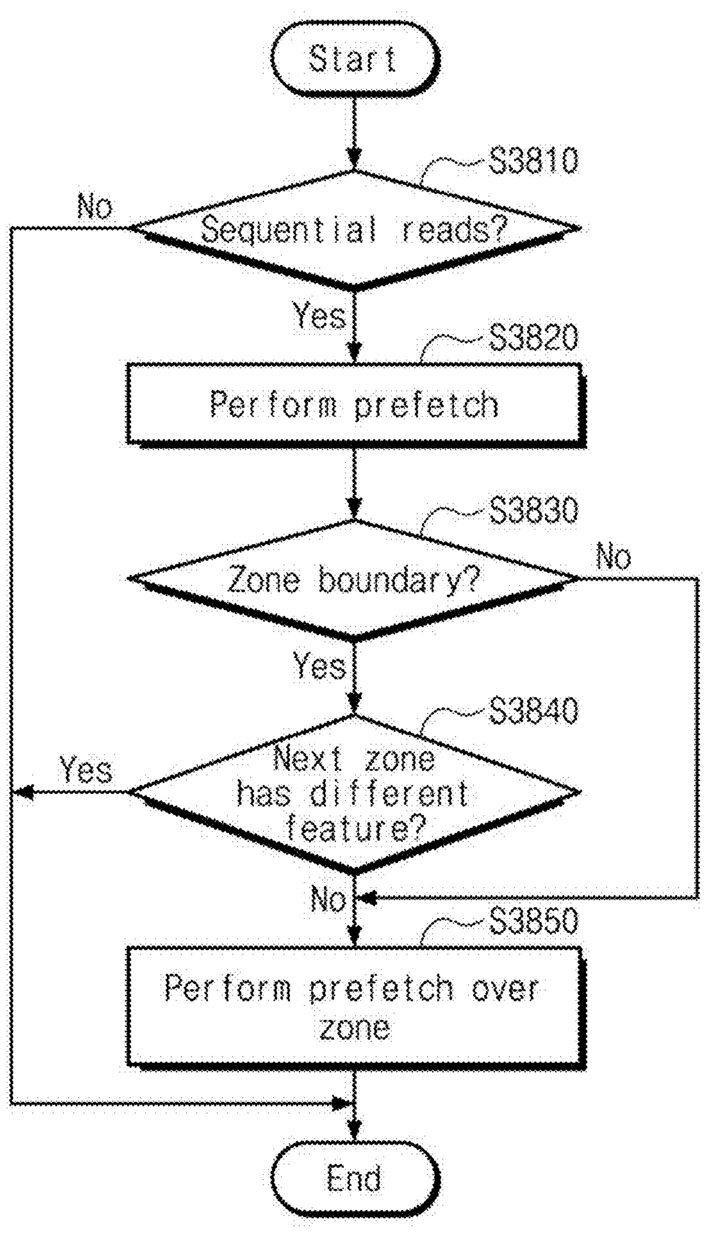
FIG. 61 is a diagram illustrating an example of a method in which a storage device performs prefetch, according to an embodiment.

FIG. 61 is a diagram illustrating an example of a method in which the storage device 100 performs prefetch. Referring to FIGS. 1 and 61, in operation S3810, the memory controller 120 may determine whether sequential reads are requested from the external host device. For example, when the number of times that reads corresponding to sequential logical addresses are requested by the external host device is greater than or equal to a threshold value, the memory controller 120 may determine that the sequential reads are requested by the external host device.

When the sequential reads are not requested by the external host device, the memory controller 120 may end the process. When the sequential reads are requested by the external host device, in operation S3820, the memory controller 120 may start prefetch. For example, even without the request of the external host device, the prefetch may include prefetching, at the memory controller 120, data of sequential next logical addresses of the logical addresses of the sequential reads from the nonvolatile memory device 110.

In operation S3830, the memory controller 120 may determine whether the prefetch reaches a zone boundary. For example, when the zone boundary is included in a range of the logical addresses of the prefetch, the arrival at the zone boundary may be made while performing the prefetch. When the zone boundary is not included in the range of the logical addresses of the prefetch, the zone boundary may not arrive while performing the prefetch. When the zone boundary does not arrive, the memory controller 120 may complete the prefetch regardless of the zone boundary.

When the arrival at the zone boundary is made, in operation S3840, the memory controller 120 may determine whether a next zone has any different features. For example, the memory controller 120 may compare features of the zone experiencing the sequential reads with the features of the next zone. When the features of the zone targeted for the sequential reads are identical to the features of the next zone, in operation S3850, the memory controller 120 may perform the prefetch (hereinafter referred to as an "over-zone prefetch") up to the next zone over the zone boundary.

When the features of the zone experiencing the sequential reads are different from the features of the next zone, the memory controller 120 may not perform the prefetch with respect to the next zone. For example, with regard to the range of the logical addresses of the prefetch, the memory controller 120 may perform the prefetch only on partial data belonging to the zone experiencing the sequential reads.

In an embodiment, a feature of a zone may include a cell type of a zone. When the cell type of the zone experiencing the sequential reads is identical to the cell type of the next zone, the memory controller 120 may perform the over-zone prefetch at the zone boundary.

In an embodiment, a feature of a zone may include a temperature of a zone. The memory controller 120 may assign a temperature to each zone depending on the frequency of update of each zone. When the temperature of the zone experiencing the sequential reads is identical to the temperature of the next zone, the memory controller 120 may perform the over-zone prefetch at the zone boundary.

In an embodiment, a feature of a zone may include a stream identifier of data written in a zone. The memory controller 120 may receive the stream identifier from the external host device together with the write data. When the stream identifier of the data written in the zone experiencing the sequential reads is identical to the stream identifier of the data written in the next zone, the memory controller 120 may perform the over-zone prefetch at the zone boundary.

In an embodiment, the memory controller 120 may combine at least two of a cell type, a temperature, and a stream identifier as a feature of a zone. Depending on the request received from the external host device, the memory controller 120 may determine whether to use any one (or more) of a cell type, a temperature, and a stream identifier as a feature of a zone.

In an embodiment, based on the number of read requests received from the external host device regardless of the logical addresses of the prefetched data being greater than or equal to a threshold value, the memory controller 120 may discard the data stored in the internal buffer 123 by the prefetch.

Figure 62A:
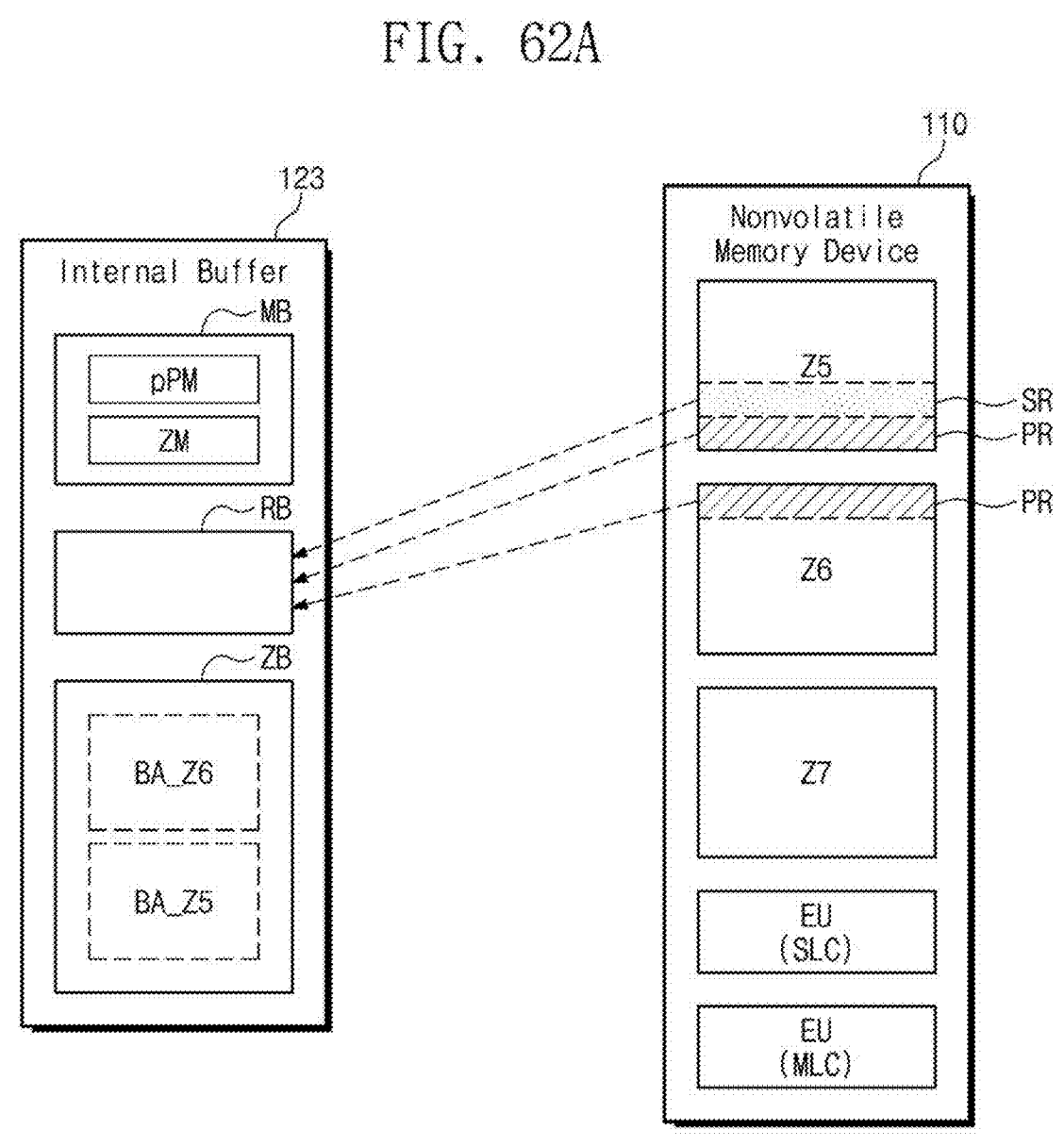
Figure 62B:
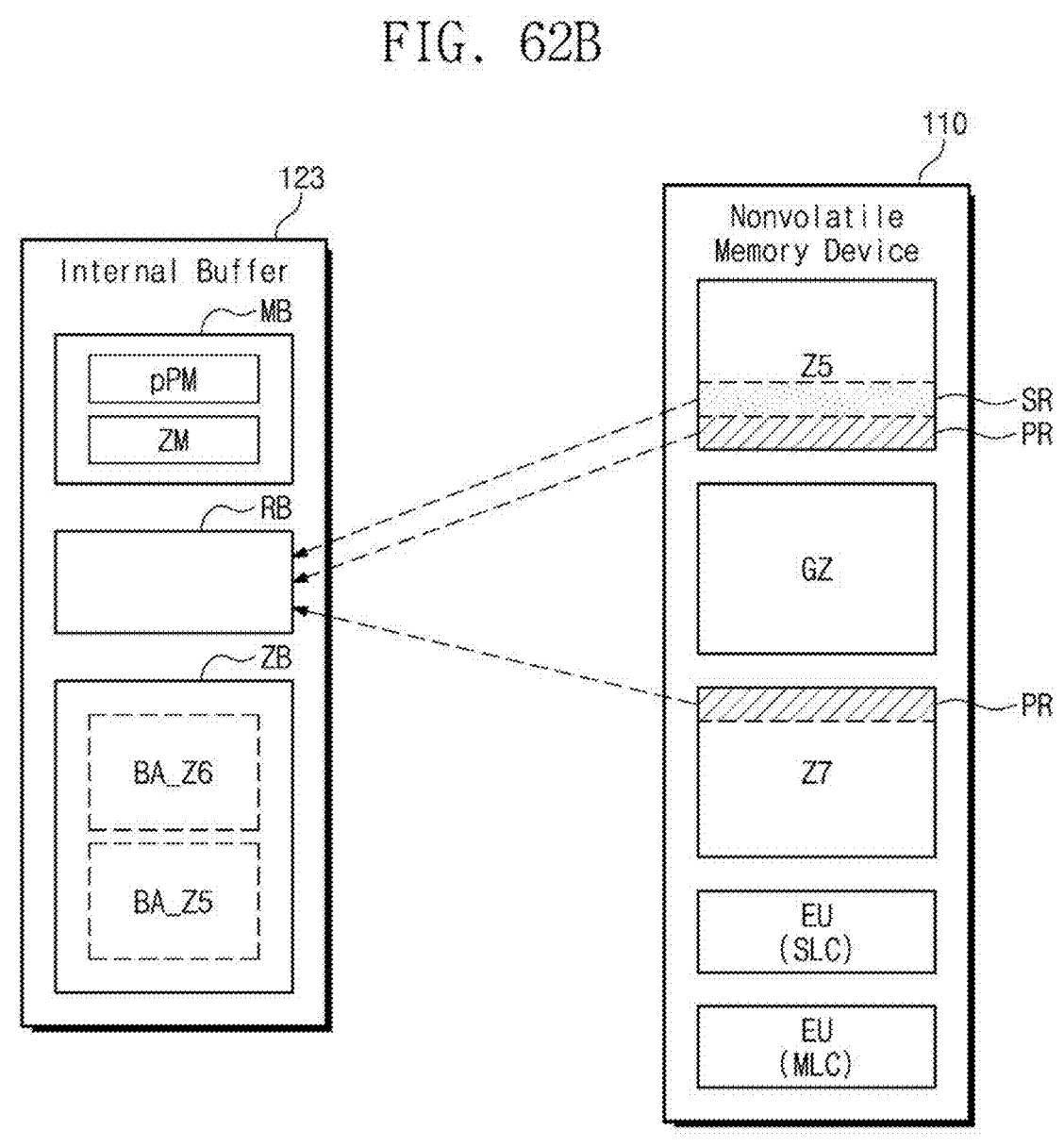

FIGS. 62A and 62B are diagrams illustrating an example in which an over-zone prefetch is performed. Referring to FIGS. 1 and 62A, the memory controller 120 may perform sequential reads in the fifth zone Z5. The read data may be stored in the read buffer RB of the internal buffer 123. When the fifth zone Z5 and the sixth zone Z6 have the same feature, in response to sequential reads SR, the memory controller 120 may perform an over-zone prefetch PR in the fifth zone Z5 and the sixth zone Z6.

Referring to FIGS. 1 and 62B, the gap zone GZ may exist between the fifth zone Z5 and the sixth zone Z6. For example, a next zone of the fifth zone Z5 may be the gap zone GZ. When the next zone is the gap zone GZ, the memory controller 120 may perform the prefetch PR selectively depending on features of the sixth zone Z6 and a feature of the fifth zone Z5 corresponding to logical addresses continuous with the gap zone GZ. When the fifth zone Z5 and the sixth zone Z6 have the same feature, in response to the sequential reads SR, the memory controller 120 may perform the prefetch PR over the gap zone GZ, with respect to the fifth zone Z5 and the sixth zone Z6.

Figure 63:
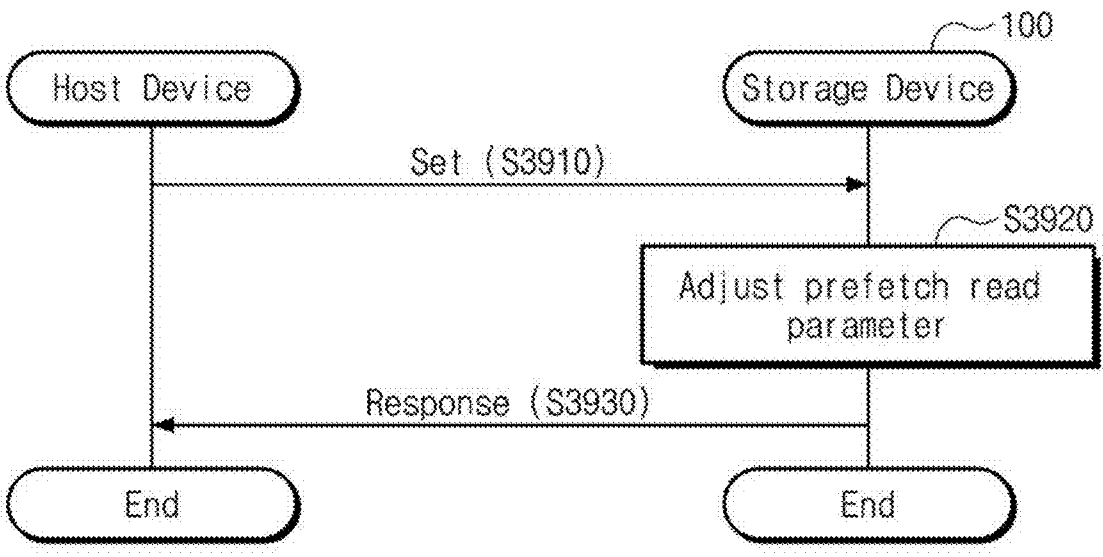
FIG. 63 is a diagram illustrating an example in which a storage device adjusts settings for an over-zone prefetch, according to an embodiment.

FIG. 63 is a diagram illustrating an example in which the storage device 100 adjusts settings for an over-zone prefetch. Referring to FIGS. 1 and 63, in operation S3910, the memory controller 120 may receive the set request from the external host device. The set request may be received using the command UPIU or the query request UPIU.

The set request may include information about parameters for performing the over-zone prefetch. In an embodiment, the set request may include information about whether to perform a prefetch over zone, whether to perform a prefetch over gap zone, and whether to use any parameter as a feature of each zone.

In operation S3920, the memory controller 120 may adjust a prefetch-over-zone parameter in response to the set request. In operation S3930, the memory controller 120 may transmit a response to the external host device. The response may include information providing a notification that the prefetch-over-zone parameters are successfully adjusted. The response may be output using the response UPIU or the query response UPIU.

Figure 64:
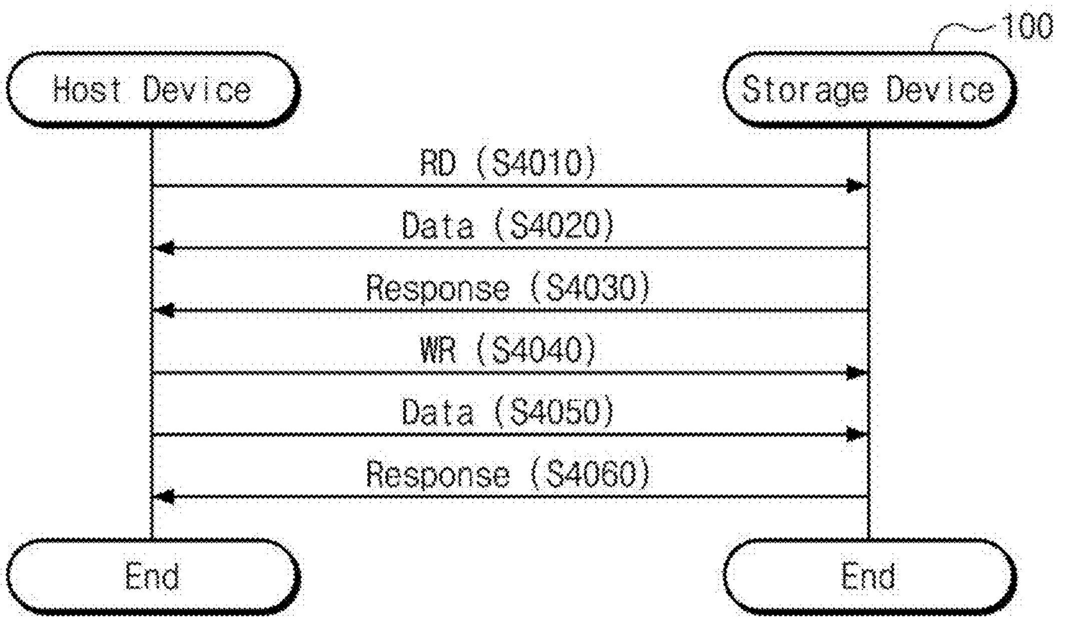
FIG. 64 is a diagram illustrating a first example in which a storage device performs garbage collection, according to an embodiment.

FIG. 64 is a diagram illustrating a first example in which the storage device 100 performs garbage collection. In an embodiment, garbage collection of a zone unit may be performed under control of the external host device.

Referring to FIGS. 1 and 64, in operation S4010, the memory controller 120 may receive the read request RD from the external host device. The read request may be received using the command UPIU. In operation S4020, the memory controller 120 may read data from the nonvolatile memory device 110 and may output the read data to the external host device. The data may be output through the "Data In" UPIU. In operation S4030, the memory controller 120 may transmit a response to the external host device. The response may be output using the response UPIU. Operation S4010, operation S4020, and operation S4030 may form a read step for garbage collection.

In operation S4040, the memory controller 120 may receive the write request WR from the external host device. The write request may be received using the command UPIU. In operation S4050, the memory controller 120 may receive data from the external host device. The data may be received using the "Data Out" UPIU. Between operation S4040 and operation S4050, an additional operation may be further performed, for example, an operation of transmitting, at the memory controller 120, the "Ready to Transfer" UPIU to the external host device. In operation S4060, the memory controller 120 may transmit a response to the external host device. The response may be output using the response UPIU. Operation S4040, operation S4050, and operation S4060 may form a write step for garbage collection.

When valid data of a specific zone are moved through the garbage collection operation, the memory controller 120 may reset the specific zone depending on the reset request received from the external host device. The reset request may be received using the command UPIU or the query request UPIU.

Figure 65:
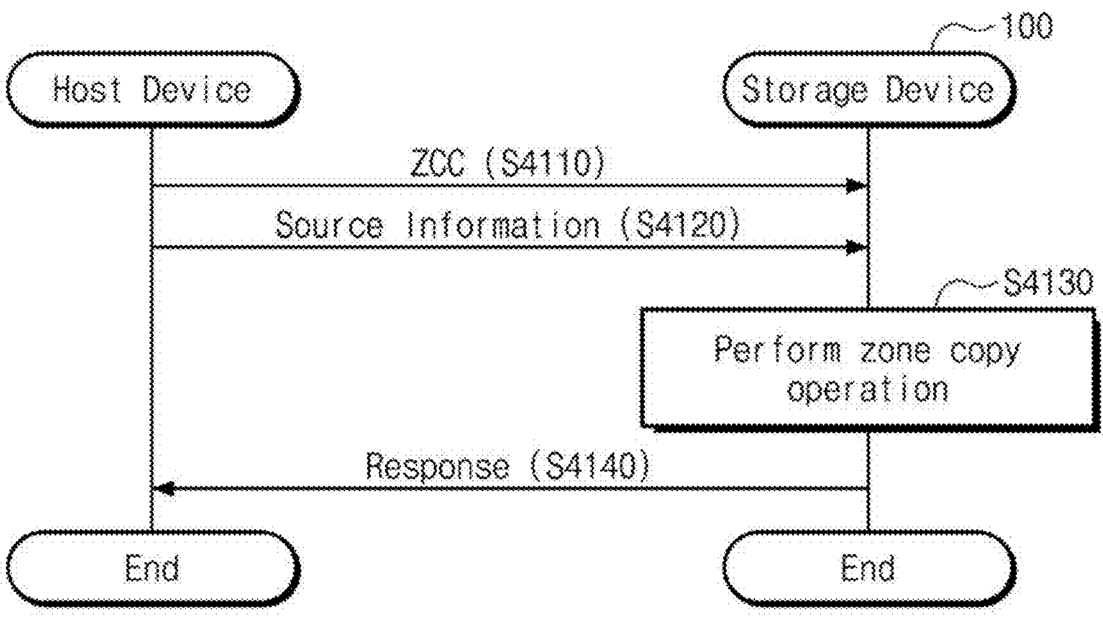
FIG. 65 is a diagram illustrating a second example in which a storage device performs garbage collection, according to an embodiment.

FIG. 65 is a diagram illustrating a second example in which the storage device 100 performs garbage collection. In an embodiment, garbage collection of a zone unit may be performed under control of the external host device.

Referring to FIGS. 1 and 65, in operation S4110, the memory controller 120 may receive a zone copy request ZCC from the external host device. The zone copy request may be received using the command UPIU or the query request UPIU. The zone copy request ZCC may include information about a target zone targeted for copy. For example, the zone copy request ZCC may be similar in configuration to the write request.

In operation S4120, the memory controller 120 may receive source information from the external host device. The source information may include information about a source zone targeted for copy, for example, a source zone which includes data which are to be copied. For example, the source information may be similar in configuration to the "Data Out" UPIU.

In operation S4130, the memory controller 120 may perform the zone copy operation. For example, the memory controller 120 may read data corresponding to logical addresses included in the source information from the source zone and may sequentially write the read data in the target zone.

When the zone copy operation is completed, in operation S4140, the memory controller 120 may transmit a response to the external host device. The response may be output using the response UPIU.

Compared to the method of FIG. 64 in which the read request RD and the write request WR are used, the method of FIG. 65 may copy data from the source zone to the target zone more quickly and more concisely using the zone copy request ZCC.

In an embodiment, when the target zone of the zone copy request ZCC does not exist, the memory controller 120 may automatically open the target zone. The memory controller 120 may determine whether to automatically open the target zone depending on the request of the external host device.

FIG. 66A is a diagram illustrating an example of a format of the zone copy request ZCC of FIG. 65. Referring to FIGS. 1 and 66A, a command descriptor block (CDB) of the command UPIU of the zone copy request ZCC is illustrated.

The zeroth to seventh bits of the zeroth byte of the command descriptor block may include an operation code of "A1h" indicating a zone copy. The zeroth bit and the second bit of the first byte of the command descriptor block may be reserved. The first bit of the first byte of the command descriptor block may include a Force Unit Access Non-volatile (FUA_NV), may be reserved, and may have a value of "0b".

The third bit of the first byte of the command descriptor block may indicate whether to activate a Force Unit Access (FUA). The fourth bit of the first byte of the command descriptor block may include a Disable Page Out (DPO) and may indicate control information about a retention priority. The fifth to seventh bits of the first byte of the command descriptor block may include WRPROTECT and may have a value of "000b".

The second to ninth bytes of the command descriptor block may include bits from a least significant bit (LSB) to a most significant bit (MSB) of the logical block address. The logical block address may include an address of a target zone to which data are to be copied through the zone copy. The tenth to thirteenth bytes of the command descriptor block may include bits from an LSB to an MSB of the transfer length. The transfer length may indicate a length of logical addresses of a source zone included in source information.

The zeroth to fourth bits of the fourteenth byte of the command descriptor block may indicate a group number and may indicate whether copied data have a system data characteristic or is linked to a context identifier. The fifth to seventh bits of the fourteenth byte of the command descriptor block may be reserved. The fifteenth byte of the command descriptor block may include a control having a value of "00h" and may be ignored.

FIG. 66B is a diagram illustrating an example of a format through which source information of FIG. 65 is received. Referring to FIGS. 1 and 66B, the source information may be received using the "Data Out" UPIU. The "Data Out" UPIU of the source information may include the zeroth to 31st fields.

The zeroth field of the source information may include a transaction type and may have a value of "xx000010b". The first field of the source information may include a flag associated with a data retransfer. The second field of the source information may include a logical unit number LUN. The third field of the source information may include a task flag and may be used to identify correlated tasks.

A portion of the fourth field of the source information may include an initiator identifier IID for initiating a task, and the remaining portion thereof may be reserved. The fifth and sixth fields of the source information may be reserved. A portion of the seventh field of the source information may store an MSB of the initiator identifier IID as EXT_IID, and the remaining portion thereof may be reserved. The eighth field of the source information may include a total Extra Header Segment (EHS) length and may have, for example, a value of "00h". The ninth field of the source information may be reserved.

The tenth field of the source information may include an MSB portion of a length of logical addresses of a source zone included as a data portion, and the eleventh field of the source information may include an LSB portion of a length of logical addresses of a source zone included as a data portion.

The twelfth to fifteenth fields of the source information may include bits from an LSB to an MSB of a data buffer offset and may indicate an offset of the corresponding source information from among all the logical addresses targeted for the zone copy. For example, the memory controller 120 may receive one or more source information following one zone copy request ZCC from the external host device.

The sixteenth to nineteenth fields of the source information may include bits from an LSB to an MSB of a data transfer count and may indicate a size of logical addresses included in the corresponding source information as a data portion. The twentieth to thirty-first fields of the source information may be reserved. The source information may include a header End to End CRC (E2ECRC) following the twentieth to thirty-first fields of the source information and may be omitted when an HD bit being the seventh bit of the transaction type is "0".

Following the header E2ECRC, the source information may include information about logical addresses of data to be copied from a source zone as a data portion. For example, the source information may include information about logical addresses in the k-th to (k+L−1)-th fields. In an embodiment, L may correspond to a data segment length of the tenth and eleventh fields.

In the k-th to (k+3)-th fields, the source information may include the number of logical address LBA entries NLBA. The number of logical address LBA entries NLBA may indicate the number of logical address LBA entries listed from the next thereof.

Afterwards, when a source logical address indicates one logical address, the source information may include a source logical address LBA in 8 fields. For example, the source information may include bits [63:32] of the first source logical address LBA [1], in the (k+4)-th to (k+7)-th fields. The source information may include bits [31:0] of the first source logical address LBA [1], in the (k+8)-th to (k+11)-th fields. In four following fields, the source information may include a first transfer length indicating a length of data to be copied, starting from a logical address included in 8 preceding fields.

As described above, the source information may include a logical address in 8 fields and may include a transfer length identifying a target to be copied following the logical address LBA in 4 following fields. For example, in the (k+L−12)-th to (k+L−9)-th fields, the source information may include bits [63:32] of the LNBA-th source logical address LBA [NLBA]. In the (k+L−8)-th to (k+L−5)-th fields, the information may include bits [31:0] of the NLBA-th source logical address LBA [NLBA]. In the (k+length-4)-th to (k+L−1)-th fields, the source information may include a transfer length corresponding to the LNBA-th source logical address LBA [NLBA].

After including information about logical addresses of data to be copied from a source zone as a data portion, the source information may include an E2ECRC of a data portion, which may be omitted when a DD bit being the sixth bit of the transaction type is "0".

In an embodiment, when data to be copied are absent at a previous logical address and a next logical address of the data to be copied, for example, when the data to be copied are in an isolation state, the source information may include logical addresses without a transfer length at a data portion. For example, when the source information includes a logical address in 8 fields and the source information includes a logical address without a transfer length in 8 following fields, 8 preceding logical addresses may indicate that only data of the logical address are copied.

In an embodiment, a logical address entry may include 8 fields or 12 fields. The logical address entry including 8 fields may indicate that only data corresponding to one logical address are copied. The logical address entry including 12 fields may indicate that data corresponding to one logical address and at least one logical address continuous thereto are copied.

As another example, the logical address entry may include 12 fields. The logical address entry in which a transfer length is "1" may indicate that only data corresponding to one logical address are copied. The logical address entry in which a transfer length is greater than "1" may indicate that data corresponding to a logical address and at least one logical address continuous thereto are copied.

Figure 67:
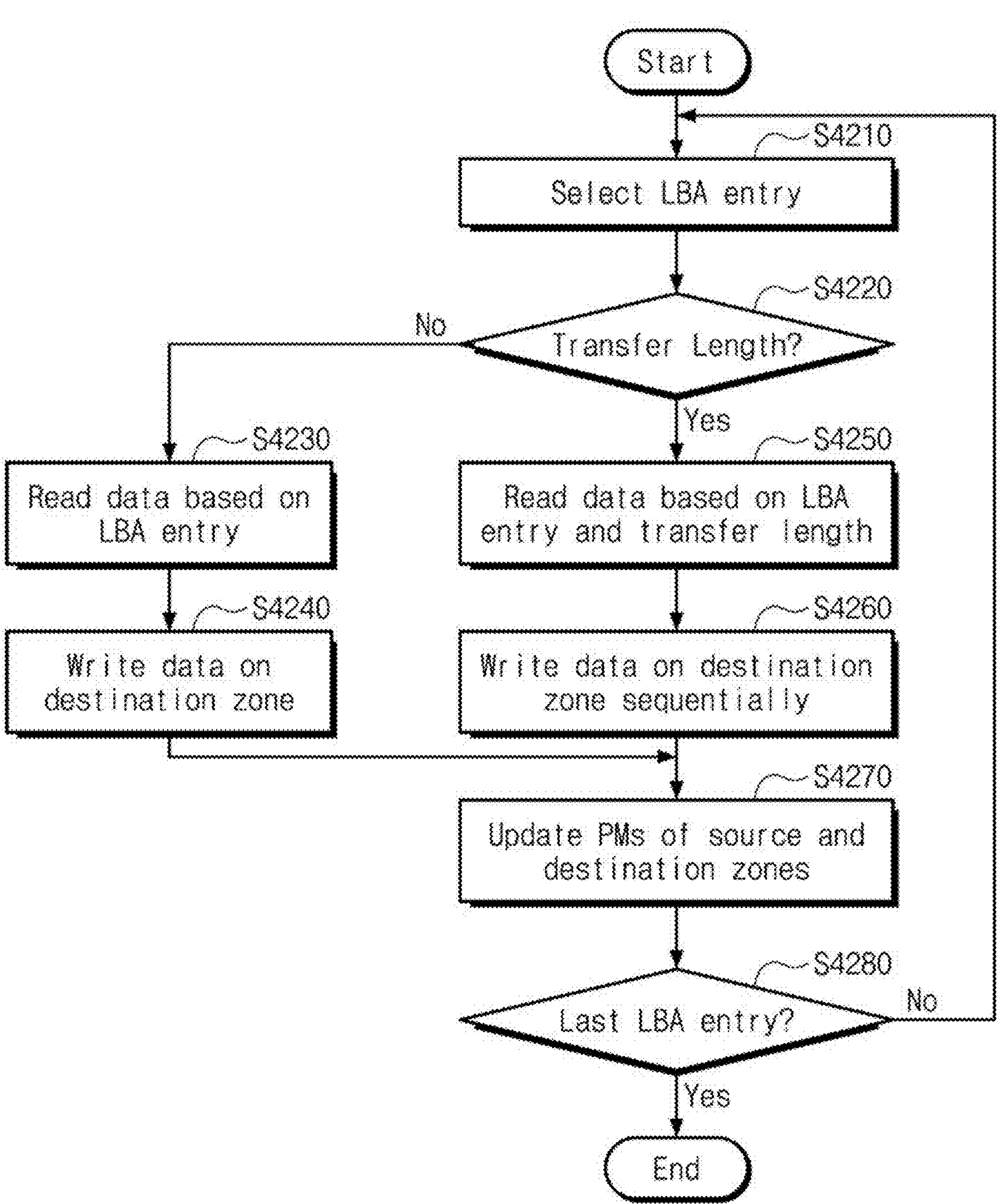
FIG. 67 is a diagram illustrating an example in which a storage device performs a zone copy based on a zone copy request of FIG. 66A and source information of FIG. 66B, according to an embodiment.

FIG. 67 is a diagram illustrating an example in which the storage device 100 performs the zone copy based on the zone copy request ZCC of FIG. 66A and source information of FIG. 66B. Referring to FIGS. 1 and 67, in operation S4210, the memory controller 120 may select a logical address LBA entry. For example, the memory controller 120 may select the first logical address LBA entry of the data portion of the source information.

In operation S4220, the memory controller 120 may determine a transfer length. For example, when the transfer length does not exist or is "1", the memory controller 120 may determine that the transfer length does not exist. When the transfer length does not exist, in operation S4230, the memory controller 120 may read data from a source zone of the nonvolatile memory device 110 based on the logical address LBA entry. In operation S4240, the memory controller 120 may write the read data in the target zone of the nonvolatile memory device 110. Afterwards, the memory controller 120 may perform operation S4270.

When the transfer length exists or is greater than "1", the memory controller 120 may determine that the transfer length exists. When the transfer length exists, in operation S4250, the memory controller 120 may read the data from the source zone of the nonvolatile memory device 110 based on the logical address LBA entry and the transfer length. For example, the memory controller 120 may read the data corresponding to two or more logical addresses. In operation S4260, the memory controller 120 may sequentially write the read data in the target zone of the nonvolatile memory device 110. Afterwards, the memory controller 120 may perform operation S4270.

In operation S4270, the memory controller 120 may update page map tables PMs of the source and target zones. For example, the memory controller 120 may generate the page map table of the data copied to the target zone and may invalidate the page map table of the data copied from the source zone. The memory controller 120 may identify the data copied from the source zone as invalid data.

In operation S4280, the memory controller 120 may determine whether the selected logical address LBA entry is the last logical address LBA entry. For example, the memory controller 120 may determine whether the logical address LBA entry selected from the logical address LBA entries included in the data portion of the source information is the last logical address LBA entry. That the selected logical address LBA entry is the last logical address LBA entry may mean that the zone copy operation is completed, and thus, the memory controller 120 may end the process. When the selected logical address LBA entry is not the last logical address LBA entry, in operation S4210, the memory controller 120 may select a next logical address LBA entry of the data portion included in the source information. Afterwards, the memory controller 120 may again perform operation S4220 to operation S4280.

Figure 68A:
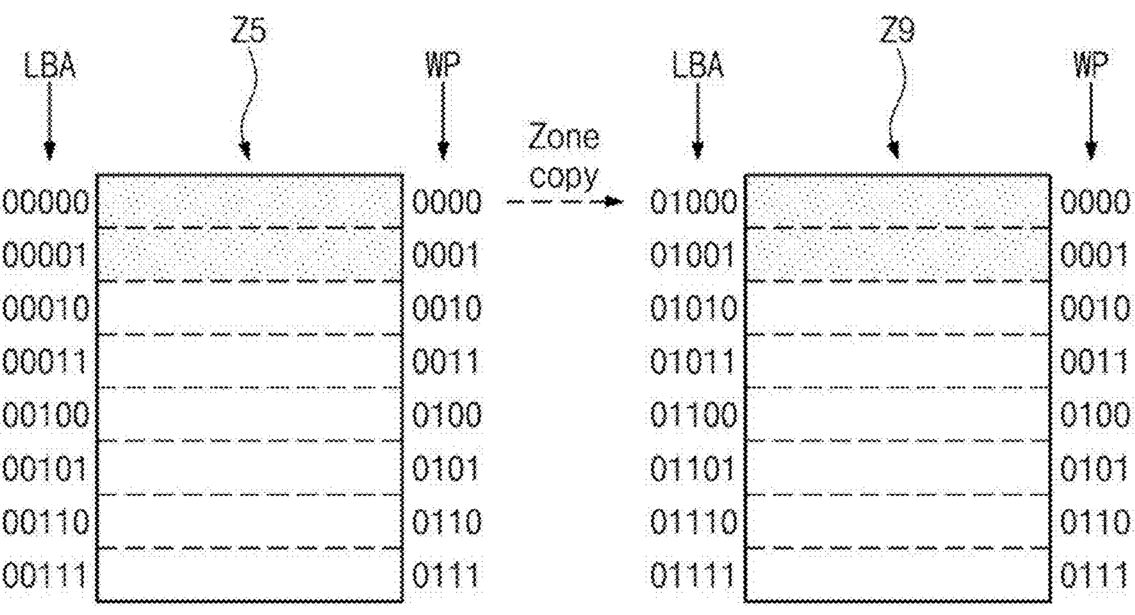
FIGS. 68A to 68D are diagrams illustrating an example in which a storage device performs a zone copy based on the method of FIG. 67, according to an embodiment.

FIGS. 68A to 68D are diagrams illustrating an example in which the storage device 100 performs the zone copy based on the method of FIG. 67. Referring to FIGS. 1 and 68A, the fifth zone Z5 may correspond to logical addresses LBA of "00000" to "00111" and may correspond to write pointers WP of "0000" to "0111". The ninth zone Z9 may correspond to logical addresses LBA of "01000" to "01111" and may correspond to write pointers WP of "0000" to "0111". In an embodiment, the fifth zone Z5 may be a closed zone and may be a source zone of the zone copy. The ninth zone Z9 may be a new zone and may be a target zone of the zone copy.

Depending on the zone copy request ZCC, data corresponding to the logical addresses LBA of "00000" and "00001" and the write pointers WP of "0000" and "0001" of the fifth zone Z5 may be copied to an area corresponding to the logical addresses LBA of "01000" and "01001" and the write pointers WP of "0000" and "0001" of the ninth zone Z9.

Figure 68B:
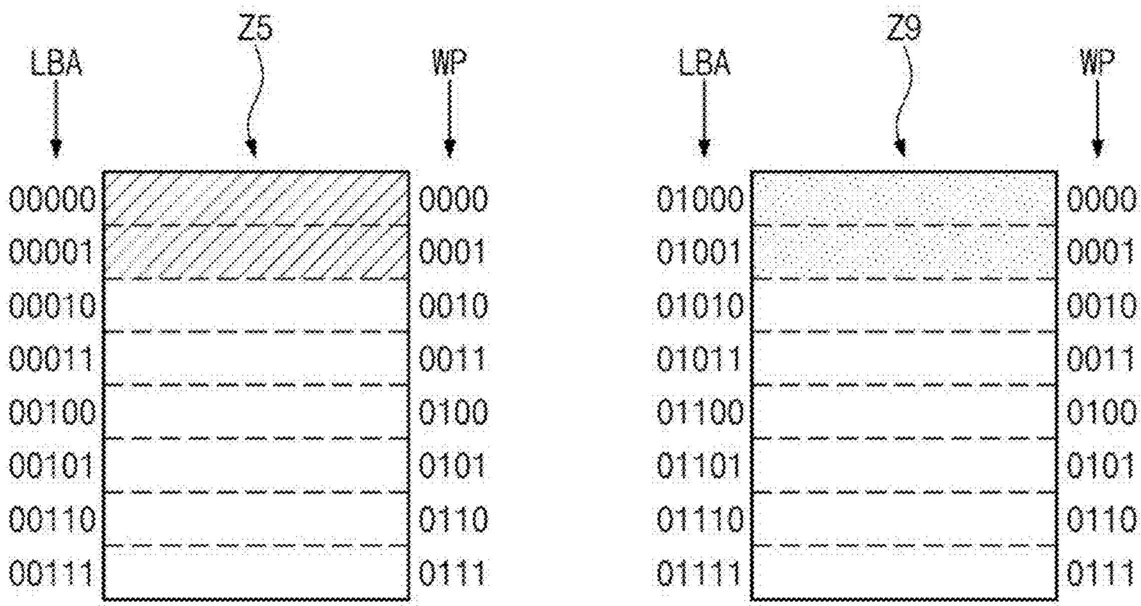

Referring to FIGS. 1 and 68B, the copied data may be invalidated in the fifth zone Z5 as indicated by a slashed line.

Figure 68C:
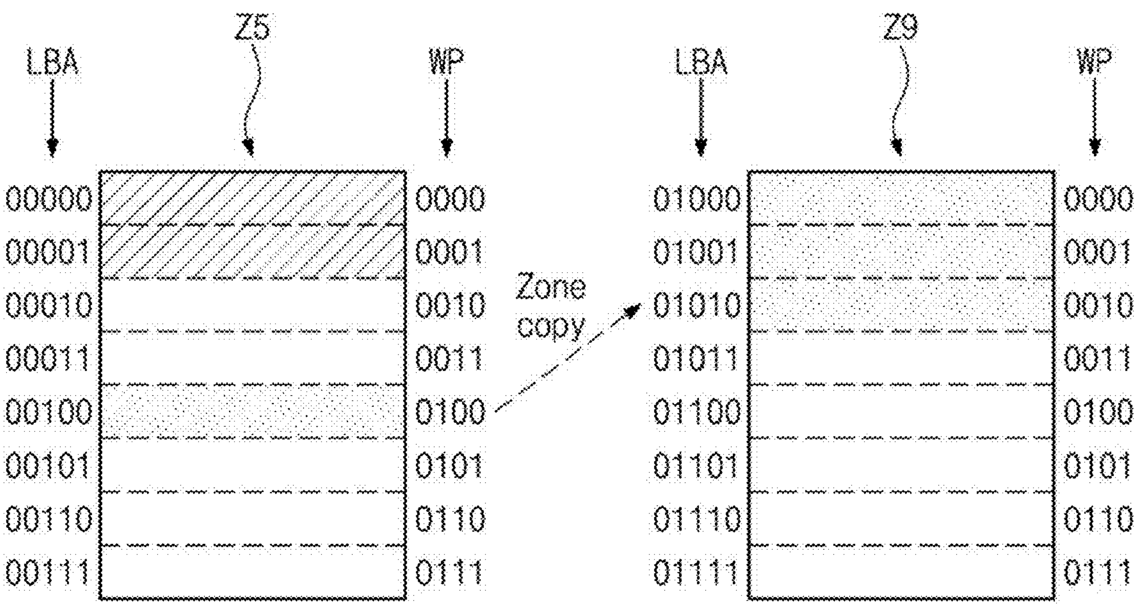

Referring to FIGS. 1 and 68C, depending on the zone copy request ZCC, data corresponding to the logical address LBA of "00100" and the write pointer WP of "0100" of the fifth zone Z5 may be copied to an area corresponding to the logical address LBA of "01010" and the write pointer WP of "0010" of the ninth zone Z9.

Figure 68D:
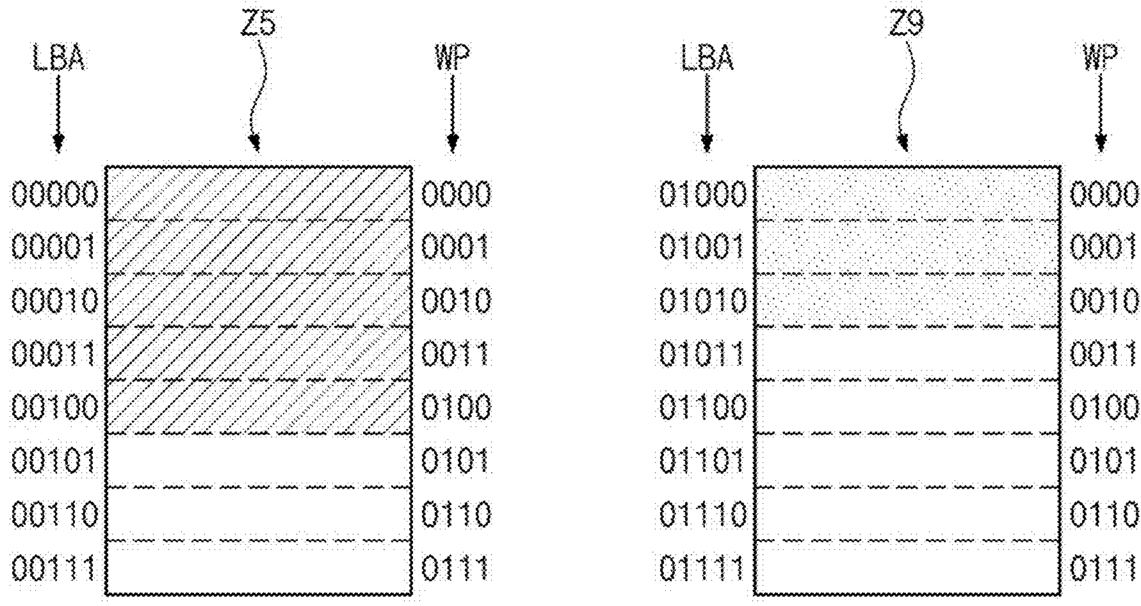

Referring to FIGS. 1 and 68D, the copied data and data having previous (e.g., lower) logical addresses LBA of the copied data, for example, the logical addresses LBA of "00010", "00011", and "00100" may be invalidated in the fifth zone Z5 as indicated by a slashed line.

The external host device may manage the data written in the storage device 100 based on a file system (e.g., a flash friendly file system (F2FS)). The memory controller 120 may manage the data written in the nonvolatile memory device 110 based on a map table (e.g., the zone map table and the page map table). The file system may share information about deleted data with the memory controller 120 through a trim operation, but there may occur a time difference to share the information.

Data that are not copied by the zone copy may be regarded as previously deleted data by the external host device. Accordingly, the memory controller 120 may identify the data not copied by the zone copy request ZCC of the external host device as invalid data.

Figure 69:
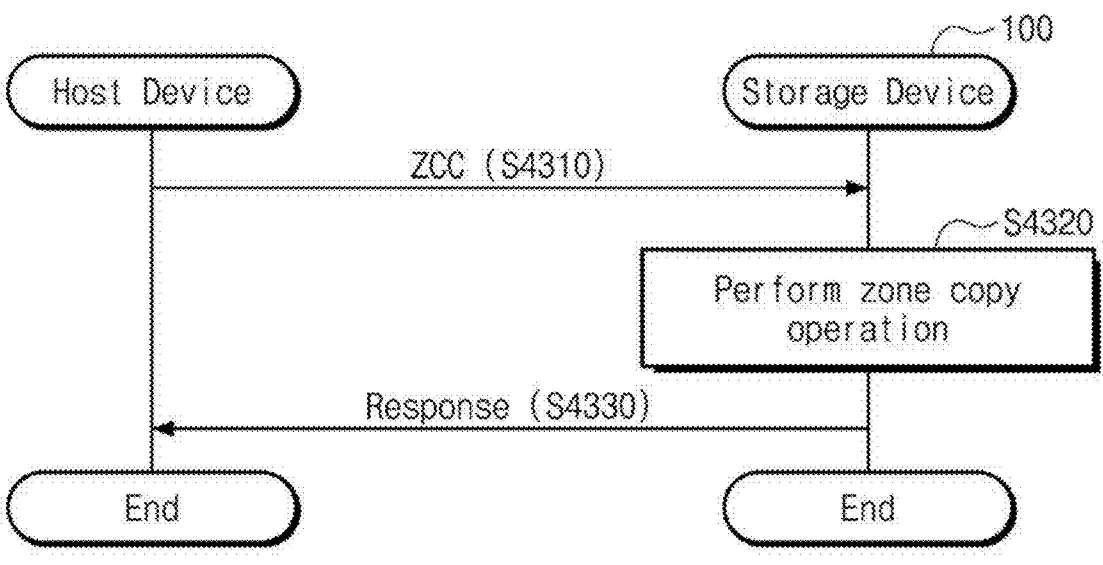
FIG. 69 is a diagram illustrating a third example in which a storage device performs garbage collection, according to an embodiment.

FIG. 69 is a diagram illustrating a third example in which the storage device 100 performs garbage collection. In an embodiment, garbage collection of a zone unit may be performed under control of the external host device.

Referring to FIGS. 1 and 69, in operation S4310, the memory controller 120 may receive the zone copy request ZCC from the external host device. The zone copy request ZCC may be received using the command UPIU or the query request UPIU. The zone copy request ZCC may include information about a target zone targeted for copy and information about a source zone targeted for copy. For example, the zone copy request ZCC may be similar in configuration to the write request.

In operation S4320, the memory controller 120 may perform the zone copy operation. For example, the memory controller 120 may read data corresponding to logical addresses LBA of the source zone included in the zone copy request ZCC from the source zone and may sequentially write the read data in the target zone indicated by a logical address LBA included in the zone copy request ZCC.

When the zone copy operation is completed, in operation S4330, the memory controller 120 may transmit a response to the external host device. The response may be output using the response UPIU.

Compared to the method of FIG. 64 in which the read request RD and the write request WR are used, the method of FIG. 69 may copy data from the source zone to the target zone more quickly and more concisely using the zone copy request ZCC.

In an embodiment, when the target zone of the zone copy request ZCC does not exist, the memory controller 120 may automatically open the target zone. The memory controller 120 may determine whether to automatically open the target zone depending on the request of the external host device.

FIG. 70A is a diagram illustrating an example of a format of the zone copy request ZCC of FIG. 69. Referring to FIGS. 1 and 70A, the command descriptor block (CDB) of the command UPIU of the zone copy request ZCC is illustrated. The command descriptor block of FIG. 70A may be similar to the command descriptor block of FIG. 66A except that the zeroth to 7th bits of the zeroth byte of the command descriptor block include an operation code of "8aH" indicating a zone copy and the transfer length is used for another purpose. Thus, redundant or duplicative description may be omitted.

FIG. 70B is a diagram illustrating an example of a transfer length of FIG. 70A. In an embodiment, the transfer length of the zone copy request ZCC may include double words Dword each including the zeroth to thirty-first bits. In an embodiment, all the fields of the command descriptor block of the zone copy request ZCC may be double words, or the fields of the transfer length of the command descriptor block may be double words.

In an embodiment, the zeroth double word of the transfer length field may include a signature. For example, the signature may include a value of "0x5950435A" and may indicate "ZCPY" as an ASCII code.

In an embodiment, the first double word of the transfer length field may indicate a header size. A range of the header may be defined by the UFS protocol or any other standard protocol associated with a nonvolatile storage device.

The second double word of the transfer length field may include a valid bitmap size. The valid bitmap size may indicate a size of a valid bitmap among bitmaps described below.

The third and fourth double words of the transfer length field may include an identifier of a source zone. The fifth and sixth double words of the transfer length field may include the write pointer WP (or the logical address LBA) of a source zone.

The seventh and eighth double words of the transfer length field may include an identifier of a target zone. The ninth and tenth double words of the transfer length field may include the write pointer WP (or the logical address LBA) of a target zone.

The zeroth to 15th bits of the eleventh double word of the transfer length field may include a zone copy user write rate, and the 16th to 31st bits thereof may include a zone copy migration rate. The memory controller 120 may throttle write requests received from the external host device and write requests by the zone copy depending on the zone copy user write rate and the zone copy migration rate.

The twelfth double word of the transfer length field may include a valid block count. The valid block count may indicate the number of bits indicating validity from among bits included in the valid bit map.

The request block count may indicate the number of logical addresses to be copied through the zone copy from among logical addresses of a source zone of the zone copy.

The fourteenth and fifteenth double words of the transfer length field may be reserved. After the fifth double word of the transfer length field, the zone copy request ZCC may include a bitmap corresponding to the fifteenth to (15+valid bitmap size)-th double words.

The bitmap may include information identifying a logical address to be copied, starting from a source zone write pointer WP (or logical address LBA). For example, data marked with the first logical value in the bitmap may be copied to a target zone by the zone copy request ZCC, and data marked with the second logical value may not be copied by a target zone by the zone copy request ZCC.

Figure 71:
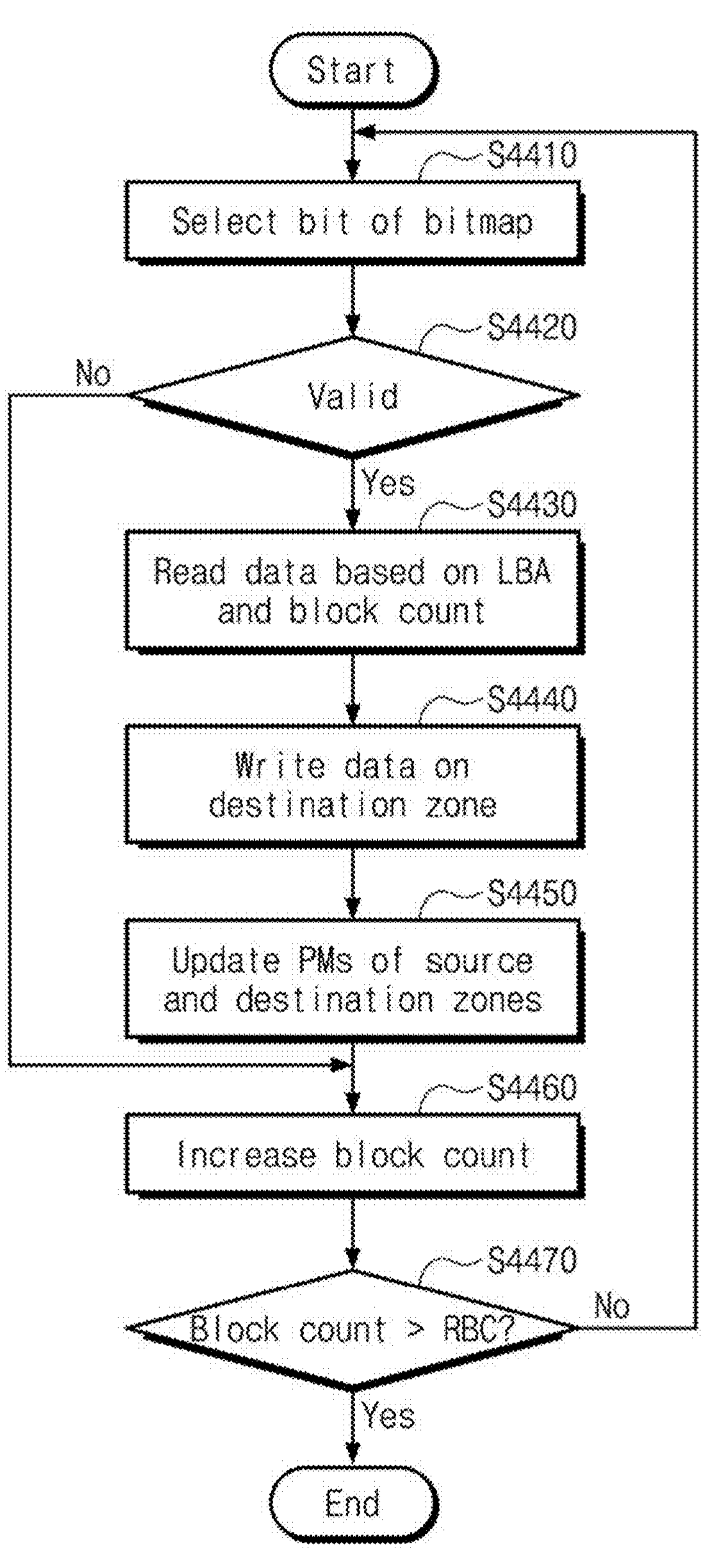
FIG. 71 is a diagram illustrating an example in which a storage device performs a zone copy based on a zone copy request of FIG. 69, according to an embodiment.

FIG. 71 is a diagram illustrating an example in which the storage device 100 performs a zone copy based on the zone copy request ZCC of FIG. 69. Referring to FIGS. 1 and 71, in operation S4410, the memory controller 120 may select the first bit from the bitmap of the zone copy request ZCC.

In operation S4420, the memory controller 120 may determine whether the selected bit of the bitmap is valid. When the selected bit of the bitmap is not valid, the memory controller 120 may perform operation S4460.

When the selected bit of the bitmap is valid, in operation S4430, the memory controller 120 may read data from the source zone based on a block count and the logical address LBA. For example, based on the block count and the logical address LBA, the memory controller 120 may read the data corresponding to the cell type or the write unit of the target zone from the source zone.

In operation S4440, the memory controller 120 may write the read data in the target zone. In operation S4450, the memory controller 120 may update the page map tables PMs of the source and target zones. Afterwards, the memory controller 120 may perform operation S4460.

In operation S4460, the memory controller 120 may increase the block count. When it is determined in operation S4470 that the block count is greater than a request block count RBC, the memory controller 120 may end the zone copy process. When the block count is not greater than the request block count RBC, the memory controller 120 may select another bit in operation S4410 and may perform operation S4420 to operation S4480.

Figure 72:
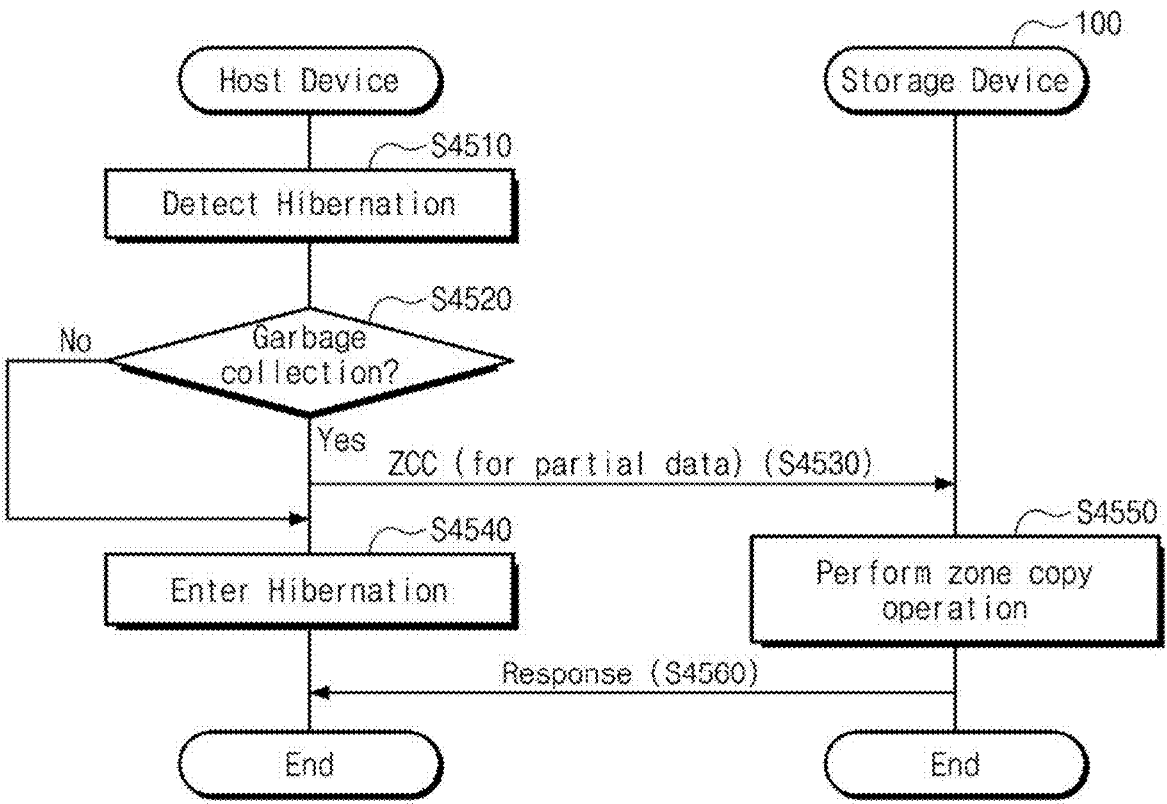
FIG. 72 is a diagram illustrating an example in which an external host device perform garbage collection of a zone unit, according to an embodiment.

FIG. 72 is a diagram illustrating an example in which an external host device performs garbage collection of a zone unit. In the example of FIG. 72, the storage device 100 may be a zoned storage device which may assume a sequential writing of logical addresses of each zone. Accordingly, the storage device 100 may assume sequentiality of logical addresses and write pointers for a target zone.

The storage device 100 may assume that the management of data of a zone unit is performed by the external host device. Accordingly, the storage device 100 may perform the garbage collection of the zone unit depending on the request of the external host device and may perform internal garbage collection for improving performance independently of the external host device.

Referring to FIGS. 1 and 72, in operation S4510, the external host device may detect hibernation. For example, the external host device may determine that the communication with the storage device 100 has entered the hibernate state (e.g., a power-saving state).

In operation S4520, the external host device may determine whether a zone registered as a target of garbage collection exists. When a zone registered as a target of garbage collection does not exist, in operation S4540, the external host device may allow the communication with the storage device 100 to enter the hibernate state.

When a zone registered as a target of garbage collection exists, in operation S4530, the external host device may transmit the zone copy request ZCC to the storage device 100. For example, the external host device may determine the zone registered as the garbage collection target as a source zone and may transmit the zone copy request ZCC for partial data among the data of the source zone to the storage device 100. After transmitting the zone copy request ZCC to the storage device 100, in operation S4540, the external host device may enter the hibernate state.

While the external host device in the hibernate state, the storage device 100 may perform the zone copy request ZCC in response to the zone copy request ZCC. In an embodiment, after the communication between the external host device and the storage device 100 enters the hibernate state, in operation S4560, the storage device 100 may transmit a response of the zone copy request ZCC to the external host device.

Figure 73:
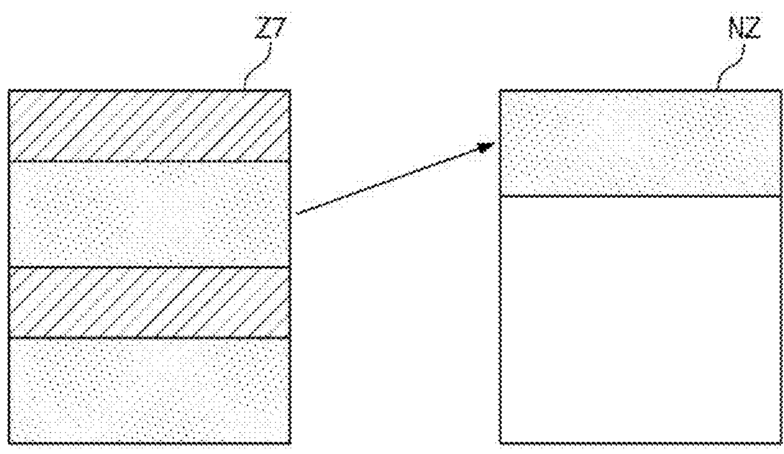
FIG. 73 is a diagram illustrating an example in which data of a seventh zone are copied to a new zone by the method of FIG. 72, according to an embodiment.

FIG. 73 is a diagram illustrating an example in which data of the seventh zone Z7 are copied to a new zone NZ by the method of FIG. 72. Referring to FIGS. 1 and 73, a slashed portion of the seventh zone Z7 may be identified by the external host device as invalid data. A dotted portion of the seventh zone Z7 may be identified as valid data by the external host device. In response to the zone copy request ZCC, the storage device 100 may copy a portion of valid data of the seventh zone Z7 to the new zone NZ.

Figure 74:
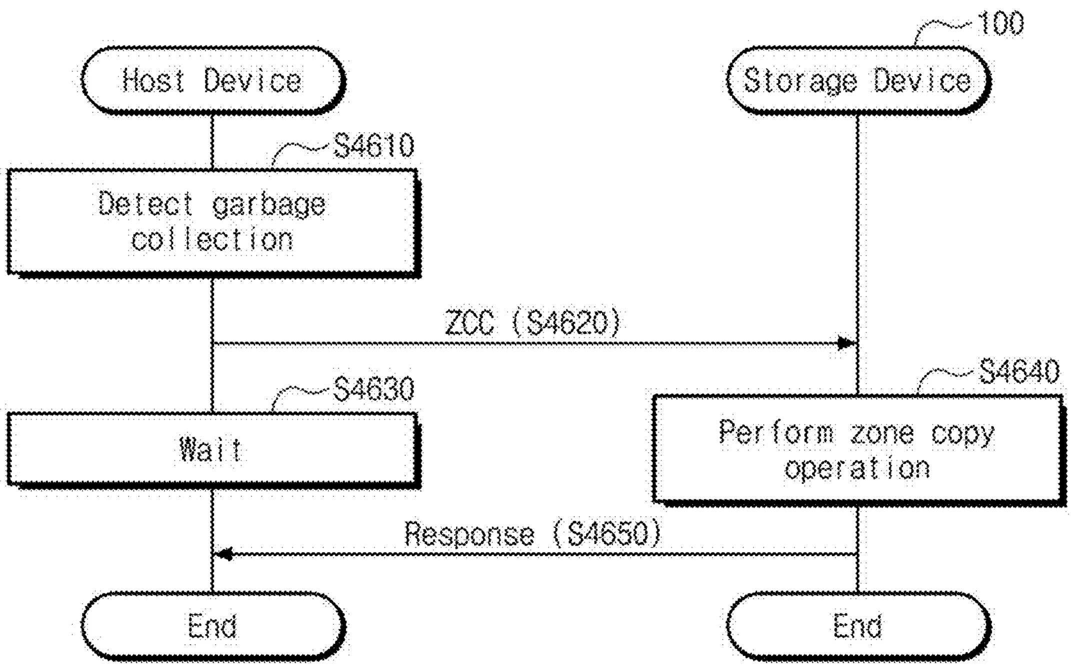
FIG. 74 is a diagram illustrating an example in which an external host device completes garbage collection of a zone unit, according to an embodiment.

FIG. 74 is a diagram illustrating an example in which an external host device completes garbage collection of a zone unit. Referring to FIGS. 1 and 74, in operation S4610, the external host device may detect garbage collection. For example, to allocate a new zone for writing new data, the external host device may determine that the garbage collection is to be performed, or that the garbage collection is required.

In operation S4620, the external host device may transmit the zone copy request ZCC to the storage device 100. For example, the external host device may select one of zones registered as a garbage collection target as a source zone. For example, as described with reference to FIGS. 72 and 73, the external host device may select a zone to which the partial data are copied by the zone copy request ZCC, as the source zone. The external host device may transmit the zone copy request ZCC for copying valid data of the source zone to the storage device 100. Afterwards, in operation S4630, the external host device may wait until the garbage collection according to the zone copy request ZCC is completed.

In operation S4640, the storage device 100 may perform the zone copy operation in response to the zone copy request ZCC. In operation S4650, the storage device 100 may transmit a response of the zone copy operation to the external host device. In an embodiment, the external host device may transmit the zone copy request ZCC to the storage device 100 two times or more until the garbage collection is completed.

Figure 75:
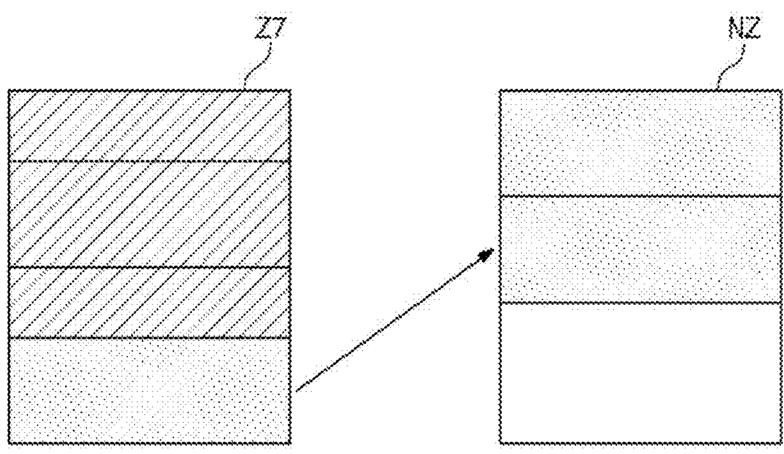
FIG. 75 is a diagram illustrating an example of garbage collection by the method of FIG. 74, according to an embodiment.

FIG. 75 is a diagram illustrating an example of garbage collection by the method of FIG. 74. Referring to FIGS. 1 and 75, in the description given with reference to FIG. 73, based on the seventh zone Z7 being the source zone, the data in the seventh zone Z7 which are copied to the new zone may be identified as invalid data in the seventh zone Z7 by the external host device and the storage device 100.

In response to the zone copy request ZCC of FIG. 74, the storage device 100 may copy the remaining valid data of the seventh zone Z7 to the new zone NZ. Based on the seventh zone Z7 being the source zone, the data in the seventh zone Z7 which are copied to the new zone NZ may be identified as invalid data in the seventh zone Z7 by the external host device and the storage device 100. For example, the seventh zone Z7 may be identified as including only invalid data.

When the garbage collection is completed, the external host device may secure erase units capable of allocating a new zone by resetting the seventh zone Z7.

In an embodiment, the external host device may perform the garbage collection as the background operation, based on the method described with reference to FIG. 72. In the case where the hibernate state of the sufficient number of times or a sufficient time is secured, the external host device may complete the garbage collection as the background operation.

The external host device may actively perform the garbage collection, based on the method described with reference to FIG. 74. For example, when there is a need or desire to allocate a new zone immediately, the external host device may secure erase units for allocating a new zone, by copying data of one or more zones to a new zone or an existing zone and resetting the one or more zones.

Figure 76:
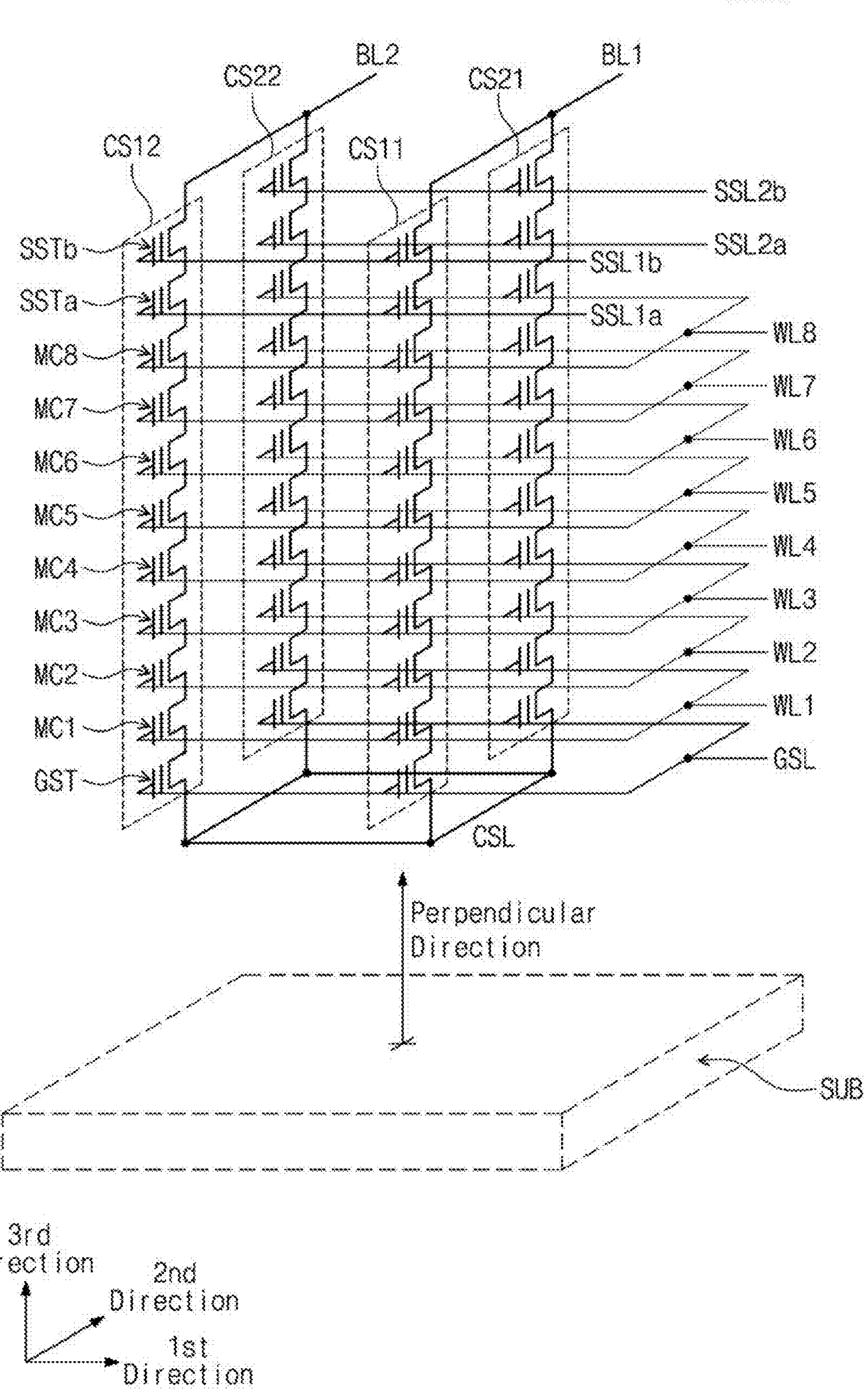
FIG. 76 is a circuit diagram illustrating an example of one memory block of memory blocks of FIG. 2, according to an embodiment.

FIG. 76 is a circuit diagram illustrating an example of one memory block BLKa of the memory blocks BLK1 to BLKz of FIG. 2. Referring to FIGS. 1, 2, and 76, a plurality of cell strings CS11, CS12, CS21, and CS22 may be arranged on a substrate SUB in rows and columns. Each row may extend along a first direction. Each column may extend along a second direction. The plurality of cell strings CS11, CS12, CS21, and CS22 may be connected in common with the common source line CSL formed on (or in) the substrate SUB. In FIG. 76, a location of the substrate SUB is depicted as an example for better understanding of the structure of the memory block BLKa.

Cell strings of each row may be connected in common with the ground selection line GSL and may be connected with corresponding string selection lines of first string selection lines SSL1*a* and SSL1*b* and second string selection lines SSL2*a* to SSL2*b*. Cell strings of each column may be connected with a corresponding bit line of first and second bit lines BL1 and BL2.

Each cell string may include at least one ground selection transistor GST connected with the ground selection line GSL and a plurality of memory cells MC1 to MC8 respectively connected with a plurality of word lines WL1 to WL8. Cell strings of the first row may further include string selection transistors SSTa and SSTb respectively connected with the first string selection lines SSL1*a* and SSL1*b*. Cell strings of the second row may further include string selection transistors SSTa and SSTb respectively connected with the second string selection lines SSL2*a* and SSL2*b*.

In each cell string, the ground selection transistor GST, the memory cells MC1 to MC8, and the string selection transistors SSTa and SSTb may be connected in series in a direction perpendicular to the substrate SUB, for example, a third direction and may be sequentially stacked in the direction perpendicular to the substrate SUB. In each of the cell strings CS11, CS12, CS21, and CS22, at least one of the memory cells MC1 to MC8 may be used as a dummy memory cell. The dummy memory cell may not be programmed (e.g., may be program-inhibited) or may be programmed differently from the remaining memory cells of the memory cells MC1 to MC8 other than the dummy memory cell.

In an embodiment, memory cells that are placed at the same height and are associated with one string selection line SSL1*a*, SSL1*b*, SSL2*a*, or SSL2*b* may form one physical page. Memory cells of one physical page may be connected with one sub-word line. Sub-word lines of physical pages located at the same height may be connected in common with one word line. Below, the term "word line" may be used to indicate a word line or a sub-word line and may be interpreted based on the context.

An embodiment in which the memory block BLKa includes the cell strings CS11, CS12, CS21, and CS22 at intersections of the first row corresponding to the first string selection lines SSL1*a* and SSL1*b*, the second row corresponding to the second string selection lines SSL2*a* and SSL2*b*, the first column corresponding to the first bit line BL1, and the second column corresponding to the second bit line BL2 is illustrated, but the numbers of rows and columns of cell strings included in the memory block BLKa are not limited.

The memory controller 120 of the storage device 100 may manage the memory block BLKa using two or more erase units. For example, the memory controller 120 may divide the memory block BLKa into two or more erase units along the direction perpendicular to the substrate SUB. The memory controller 120 may erase the two or more erase units independently of each other. For example, one erase target may be independently erased by applying an erase voltage (e.g., a high voltage) to a vertical channel, applying a low voltage to word lines of an erase unit being an erase target, and floating word lines of one or more erase units which are not the erase target.

In the memory block BLKa, the order of programming the memory cells MC1 to MC8 may be determined depending on the structure and feature of the memory cells MC1 to MC8. For example, the memory controller 120 may control the nonvolatile memory device 110 such that the memory cells MC1 to MC8 are programmed in the order of the eighth memory cell MC8 from the first memory cell MC1 or in the order of the first memory cell MC1 from the eighth memory cell MC8. A program (or a program operation) may refer to an operation that the nonvolatile memory device 110 performs to write data in the memory cell MC1 to MC8.

For example, the program order of the memory block BLKa may be fixed. In this case, based on valid data being written in at least one erase unit of the memory block BLKa, even though another erase unit of the memory block BLKa is independently erased, data may be prohibited from being written in the erased erase unit. For example, when valid data are written in at least one erase unit of the memory block BLKa, data of all the erase units of the memory block BLKa may be invalidated; after all the erase units of the memory block BLKa are erased (or are set to an erase state), the memory controller 120 may write new data in the memory block BLKa.

Figure 77:
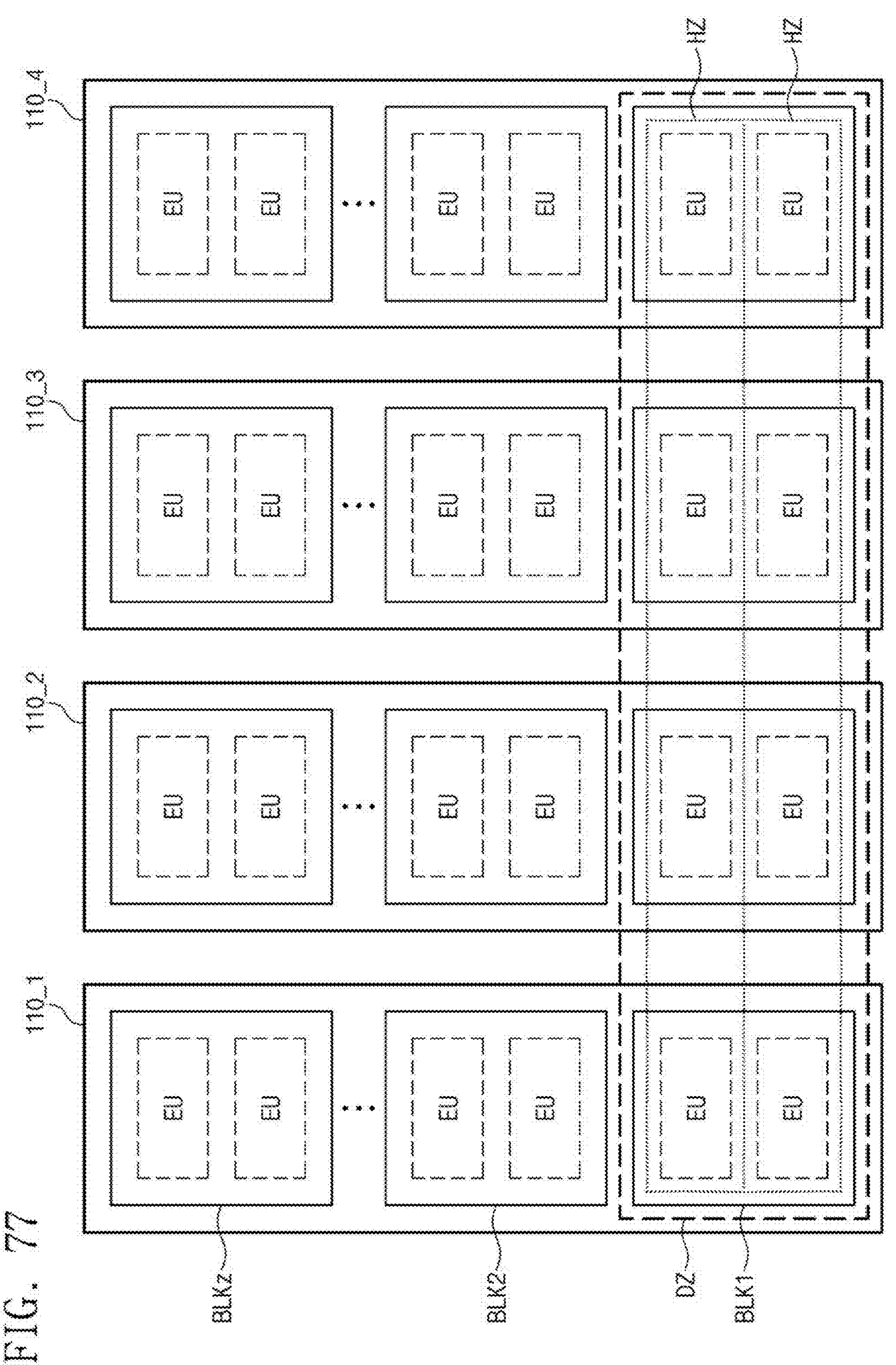
FIG. 77 is a diagram illustrating an example of first to fourth memory chips of a nonvolatile memory device, according to an embodiment.

FIG. 77 is a diagram illustrating an example of first to fourth memory chips 110_1 to 110_4 of the nonvolatile memory device 110. Referring to FIGS. 1 and 77, each of the first to fourth memory chips 110_1 to 110_4 may include the first to z-th memory blocks BLK1 to BLKz. Each of the first to z-th memory blocks BLK1 to BLKz may include, for example, two erase units EU.

In an embodiment, as the size of the zone increases, the overhead that the external host device performs garbage collection of the zone may increase. To reduce the overhead of the external host device, the memory controller 120 may allocate a host zone HZ and a device zone DZ to the erase units EU of the first to z-th memory blocks BLK1 to BLKz of the first to fourth memory chips 110_1 to 110_4.

In each of the first to fourth memory chips 110_1 to 110_4, the memory controller 120 may select one (or at least one) erase unit in order to be allocated to the host zone HZ. The memory controller 120 may notify the external host device that a zone is capable of being allocated in units of host zone. A zone that the external host device opens may be allocated to the host zone HZ. The external host device may open a zone in the host zone HZ, may perform garbage collection, and may reset the zone. Because the size of the host zone HZ may be smaller than the size of the device zone DZ, the overhead that the external host device performs garbage collection of the zone may decrease.

In each of the first to fourth memory chips 110_1 to 110_4, the memory controller 120 may select one (or at least one) memory block to be allocated to the device zone DZ. As described with reference to FIG. 76, when the erase units EU of the memory block BLKa are in an erase state, writing of data in the memory block BLKa is permitted. Accordingly, in a state where data are written in one host zone HZ belonging to one device zone DZ, data may be prohibited from being written in another host zone HZ being in an erase state. This may cause the issue that the storage device 100 is incapable of writing data in a zone when the external host device intends to open a new zone in an empty host zone HZ.

To prevent the above issue, the memory controller 120 may perform garbage collection as the background operation in units of device zone DZ. The memory controller 120 may secure the device zone DZ of the erase state by performing garbage collection as the background operation.

For example, the external host device may open a zone in the host zone HZ and may perform garbage collection for securing an empty host zone HZ. The device zone DZ may include two or more host zones HZ. The storage device 100 may perform garbage collection for securing the device zone DZ of the erase state.

In an embodiment, the host zone HZ may include different erase units of the first to fourth memory chips 110_1 to 110_4, and thus, the memory controller 120 may perform parallel or interleaving processing on requests for the access of the external host device to the host zones HZ of the first to fourth memory chips 110_1 to 110_4.

For example, in the case where the memory controller 120 is connected with the first to fourth memory chips 110_1 to 110_4 through channels independent of each other, the memory controller 120 may perform parallel processing on requests for the access of the external host device to the host zones HZ of the first to fourth memory chips 110_1 to 110_4.

In the case where the memory controller 120 is connected with the first to fourth memory chips 110_1 to 110_4 through a shared channel, the memory controller 120 may perform interleaving processing on requests for the access of the external host device to the host zones HZ of the first to fourth memory chips 110_1 to 110_4.

In the case where the memory controller 120 is connected with the first and second memory chips 110_1 and 110_2 through a first shared channel and is connected with the third and fourth memory chips 110_3 and 110_4 through a second shared channel, the memory controller 120 may perform parallel and interleaving processing on requests for the access of the external host device to the host zones HZ.

Figure 78:
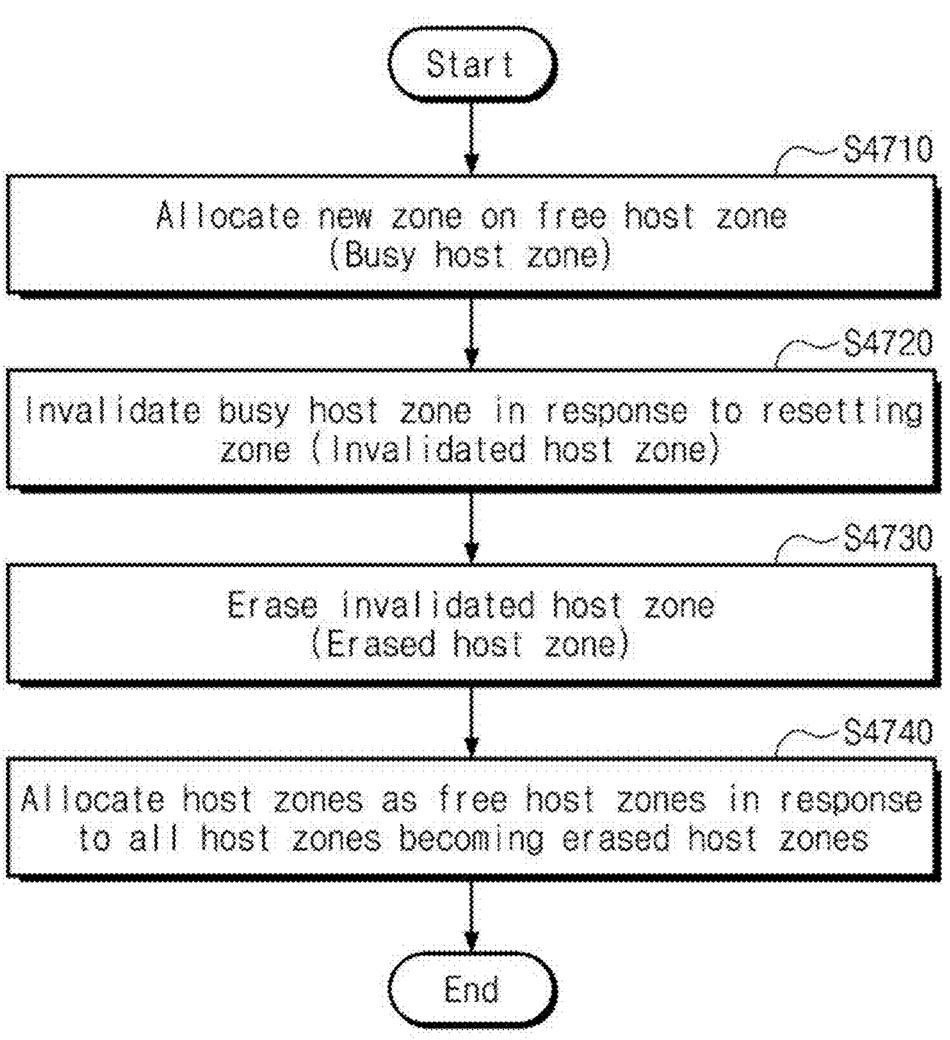
FIG. 78 is a diagram illustrating an example of a method in which a storage device manages a device zone and a host zone, according to an embodiment.

FIG. 78 is a diagram illustrating an example of a method in which the storage device 100 manages the device zone DZ and the host zone HZ. Referring to FIGS. 1 and 78, in operation S4710, the memory controller 120 may allocate a new zone on a free host zone HZ. For example, in response to an open zone request or a write request of the external host device, the memory controller 120 may allocate a new zone on the free host zone HZ. The memory controller 120 may set the host zone, on which the new zone is allocated, to a busy host zone.

In operation S4720, based on the external host device resetting a zone, the memory controller 120 may invalidate the busy host zone. The memory controller 120 may set the invalidated busy host zone as an invalidated host zone.

In operation S4730, the memory controller 120 may erase the invalidated host zone. For example, the memory controller 120 may erase the invalidated host zone at an idle time, or as desired or needed. The memory controller 120 may set the host zone as an erased host zone.

In operation S4740, the memory controller 120 may allocate host zones to free host zones based on all the host zones in a device zone being erased host zones.

Figure 79A:
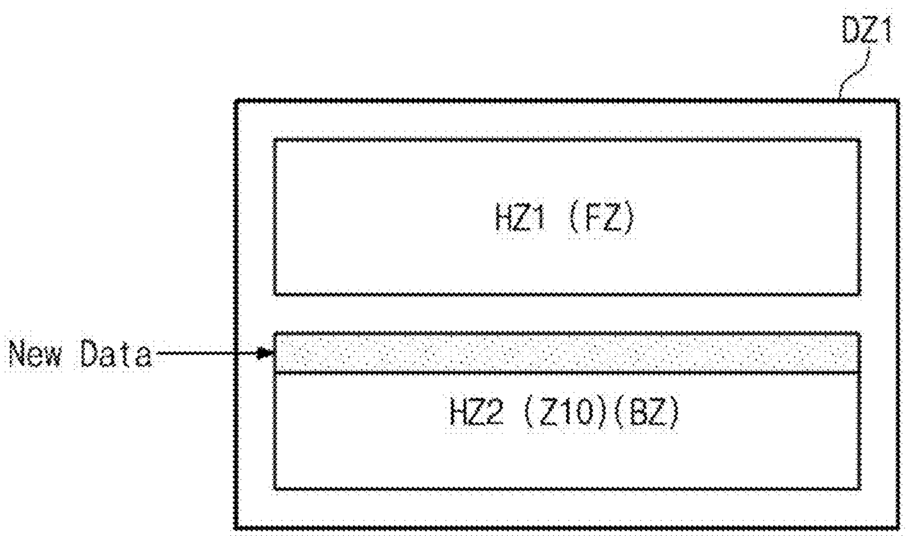
FIGS. 79A to 79F are diagrams illustrating an example of a process in which a storage device manages a first device zone, according to an embodiment.

FIGS. 79A to 79F are diagrams illustrating an example of a process in which the storage device 100 manages a first device zone DZ1. Referring to FIGS. 1 and 79A, the first device zone DZ1 may include a first host zone HZ1 and a second host zone HZ2. The first host zone HZ1 may be a free host zone FZ.

Based on the request of the external host device, the memory controller 120 may allocate the tenth zone Z10 to the second host zone HZ2 and may write new data in the second host zone HZ2; in this case, the memory controller 120 may set the second host zone HZ2 to a busy host zone BZ.

Figure 79B:
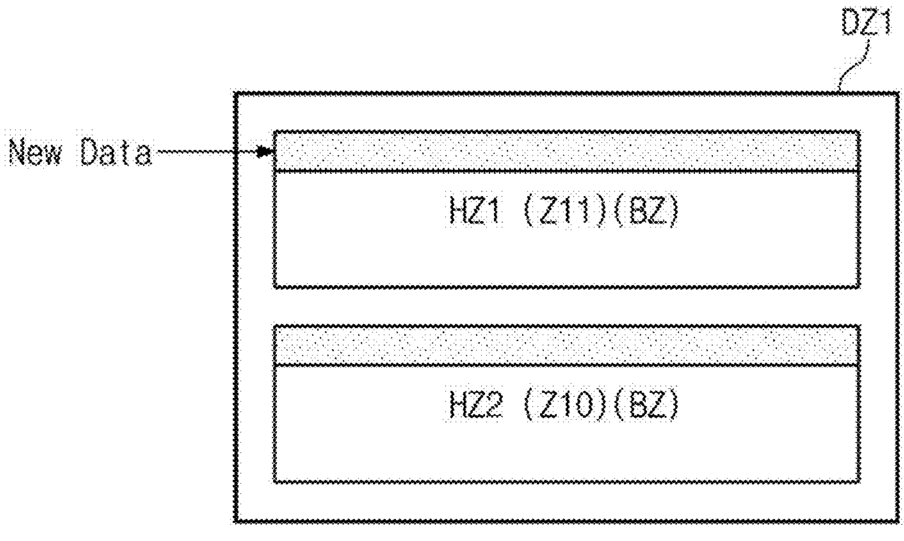

Referring to FIGS. 1 and 79B, based on the request of the external host device, the memory controller 120 may open the eleventh zone Z11 in the first host zone HZ1 and may write new data in the eleventh zone Z11; in this case, the memory controller 120 may set the first host zone HZ1 to the busy host zone BZ.

Figure 79C:
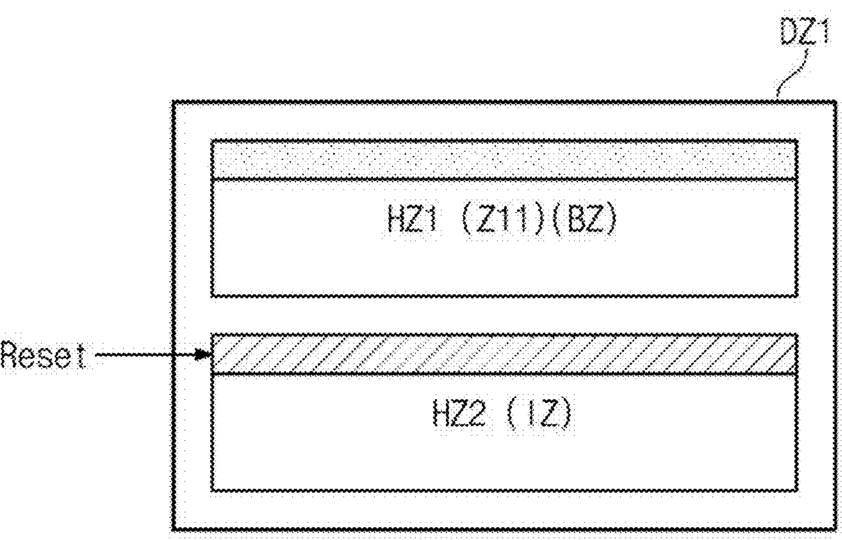

Referring to FIGS. 1 and 79C, as the memory controller 120 resets the tenth zone Z10 of the second host zone HZ2 based on the request of the external host device, the memory controller 120 may set the second host zone HZ2 to an invalidated host zone IZ.

Figure 79D:
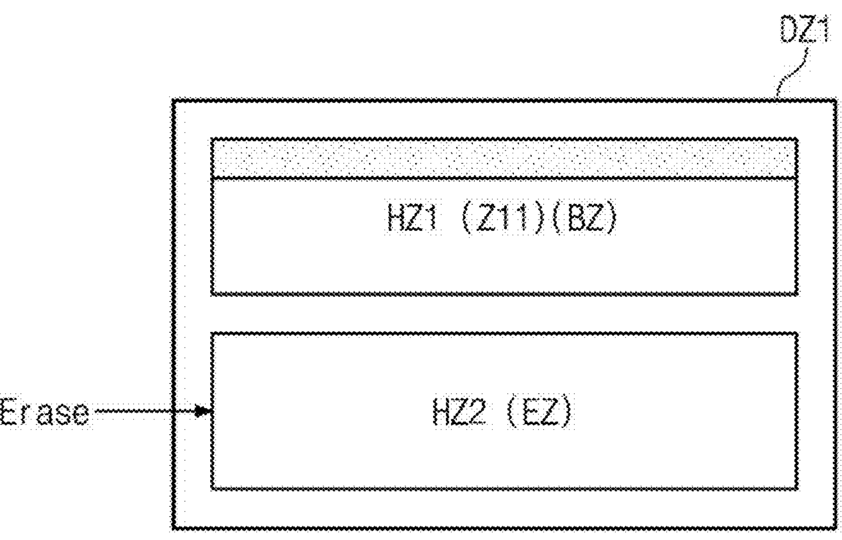

Referring to FIGS. 1 and 79D, as the memory controller 120 erases the second host zone HZ2, the memory controller 120 may set the second host zone HZ2 to an erased host zone EZ. In an embodiment, the memory controller 120 may permit the allocation of a new zone to the free host zone FZ but may prohibit the allocation of a new zone to the erased host zone EZ.

Figure 79E:
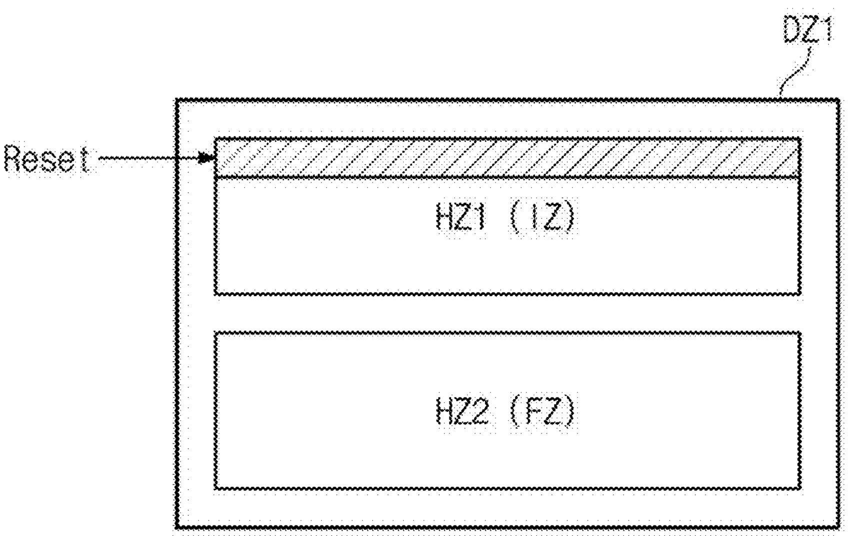

Referring to FIGS. 1 and 79E, as the memory controller 120 resets the eleventh zone Z11 of the first host zone HZ1 based on the request of the external host device, the memory controller 120 may set the first host zone HZ1 to the invalidated host zone IZ.

Figure 79F:
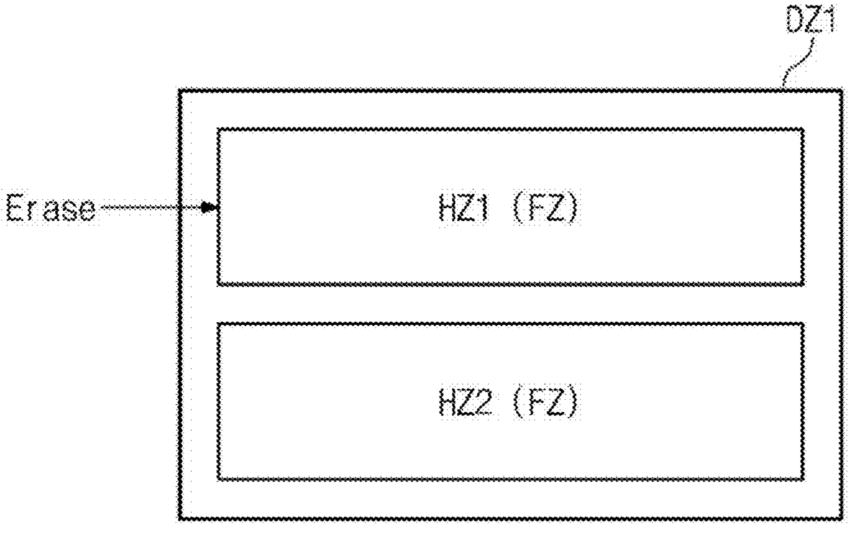

Referring to FIGS. 1 and 79F, as the memory controller 120 erases the first host zone HZ1, both the first host zone HZ1 and the second host zone HZ2 of the first device zone DZ1 may be set to the erased host zone EZ. Accordingly, the memory controller 120 may set each of the first host zone HZ1 and the second host zone HZ2 to the free host zone FZ.

Figure 80A:
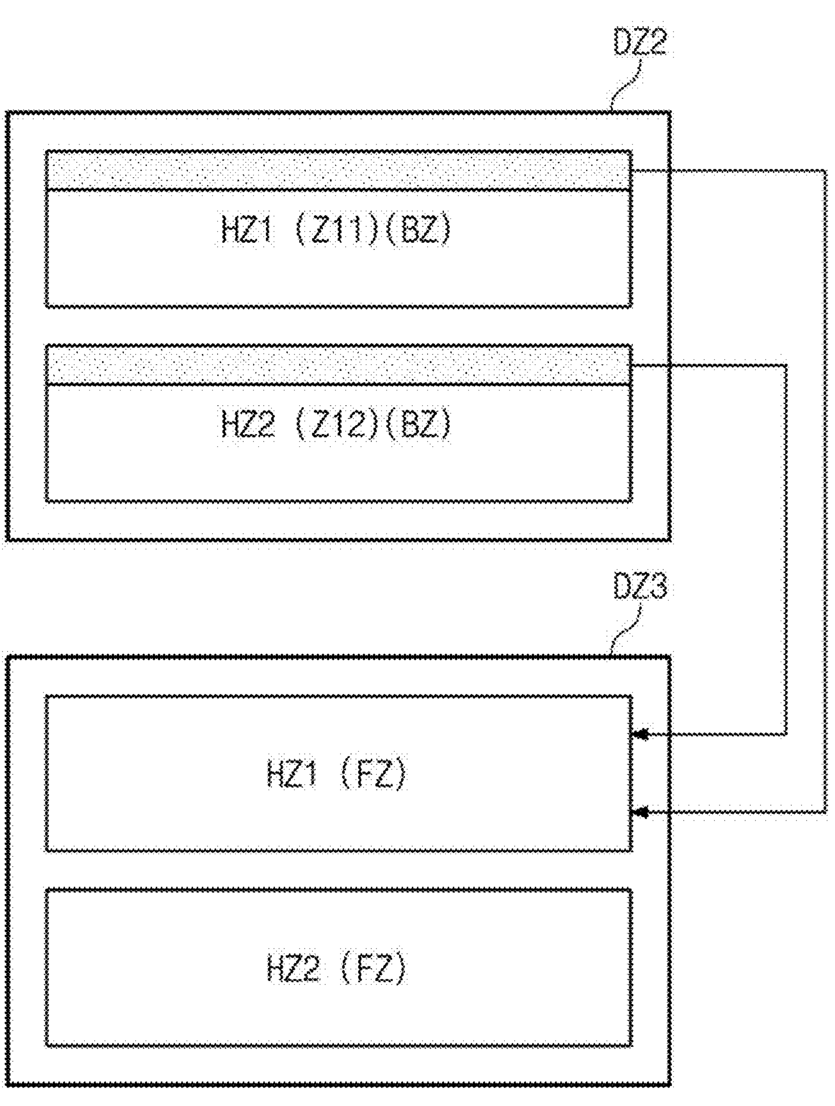
FIGS. 80A and 80B are diagrams illustrating examples of a process in which an external host device performs garbage collection in units of host zone, according to embodiments.

FIG. 80A shows an example of a process in which an external host device performs garbage collection in units of host zone. Referring to FIGS. 1 and 80A, the first host zone HZ1 of the second device zone DZ2 may be the busy host zone BZ. The eleventh zone Z11 may be allocated to the first host zone HZ1 of the second device zone DZ2. The second host zone HZ2 of the second device zone DZ2 may be the busy host zone BZ. The twelfth zone Z12 may be allocated to the second host zone HZ2 of the second device zone DZ2. Each of the first host zone HZ1 and the second host zone HZ2 of the third device zone DZ3 may be the free host zone FZ.

In an embodiment, the external host device may open a new zone in the first host zone HZ1 of the third device zone DZ3. The external host device may perform garbage collection such that data of the eleventh zone Z11 allocated to the first host zone HZ1 of the second device zone DZ2 and data of the twelfth zone Z12 allocated to the second host zone HZ2 of the second device zone DZ2 are copied to the new zone allocated on the first host zone HZ1 of the third device zone DZ3. As the garbage collection is performed, the external host device may secure the first host zone HZ1 and the second host zone HZ2 of the second device zone DZ2 as a capacity capable of allocating a new zone.

The storage device 100 may erase the second device zone DZ2 such that each of the first host zone HZ1 and the second host zone HZ2 of the second device zone DZ2 is set to the free host zone FZ.

Figure 80B:
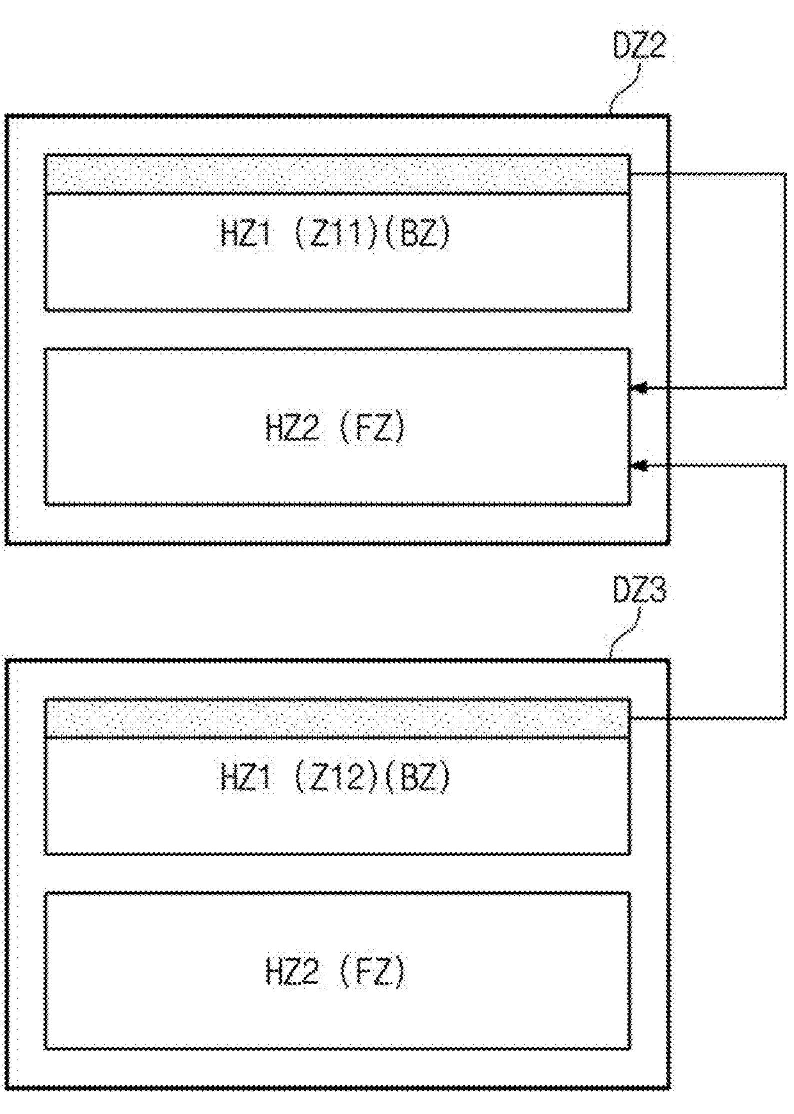

FIG. 80B shows another example in which garbage collection is performed by an external host device. Referring to FIGS. 1 and 80B, the first host zone HZ1 of the second device zone DZ2 may be the busy host zone BZ. The eleventh zone Z11 may be allocated to the first host zone HZ1 of the second device zone DZ2. The second host zone HZ2 of the second device zone DZ2 may be the free host zone FZ.

The first host zone HZ1 of the third device zone DZ3 may be the busy host zone BZ. The twelfth zone Z12 may be allocated to the first host zone HZ1 of the third device zone DZ3. The second host zone HZ2 of the third device zone DZ3 may be the free host zone FZ.

In an embodiment, the external host device may open a new zone in the second host zone HZ2 of the second device zone DZ2. The external host device may perform garbage collection such that data of the eleventh zone Z11 allocated to the first host zone HZ1 of the second device zone DZ2 and data of the twelfth zone Z12 allocated to the first host zone HZ1 of the third device zone DZ3 are copied to the new zone allocated on the second host zone HZ2 of the second device zone DZ2. As the garbage collection is performed, the external host device may secure the first host zone HZ1 of the second device zone DZ2 and the first host zone HZ1 of the third device zone DZ3 as a capacity capable of allocating a new zone.

The storage device 100 may erase the third device zone DZ3 such that each of the first host zone HZ1 and the second host zone HZ2 of the third device zone DZ3 is set to the free host zone FZ.

In an embodiment, the method of allocating and managing zones based on the device zone DZ and the host zone HZ is described. However, embodiments are not limited thereto. For example, the method in which the storage device 100 allocates and manages zones is not limited to the device zone DZ and the host zone HZ described above.

For example, based on performance required or desired by the external host device, for example, required or desired performance of a zone that the external host device intends to open, the storage device 100 may allocate the device zone DZ and corresponding host zones HZ using various schemes. For example, when the required or desired performance of the zone that the external host device intends to open is high, the storage device 100 may plan the improvement of performance through interleaving by setting the device zone DZ and corresponding host zones HZ with respect to the first to fourth memory chips 110_1 to 110_4.

When the required or desired performance of the zone that the external host device intends to open is low, the storage device 100 may improve the convenience or flexibility of zone management by opening the device zone DZ and corresponding host zones HZ in a memory block of at least one nonvolatile memory chip or opening the device zone DZ and corresponding host zones HZ in memory blocks of at least two nonvolatile memory chips. The mapping of one device zone DZ and corresponding host zones HZ to any memory block (or erase units) of any nonvolatile memory chip may be dynamically or adaptively changed in the storage device 100 depending on an internally defined policy.

Figure 81:
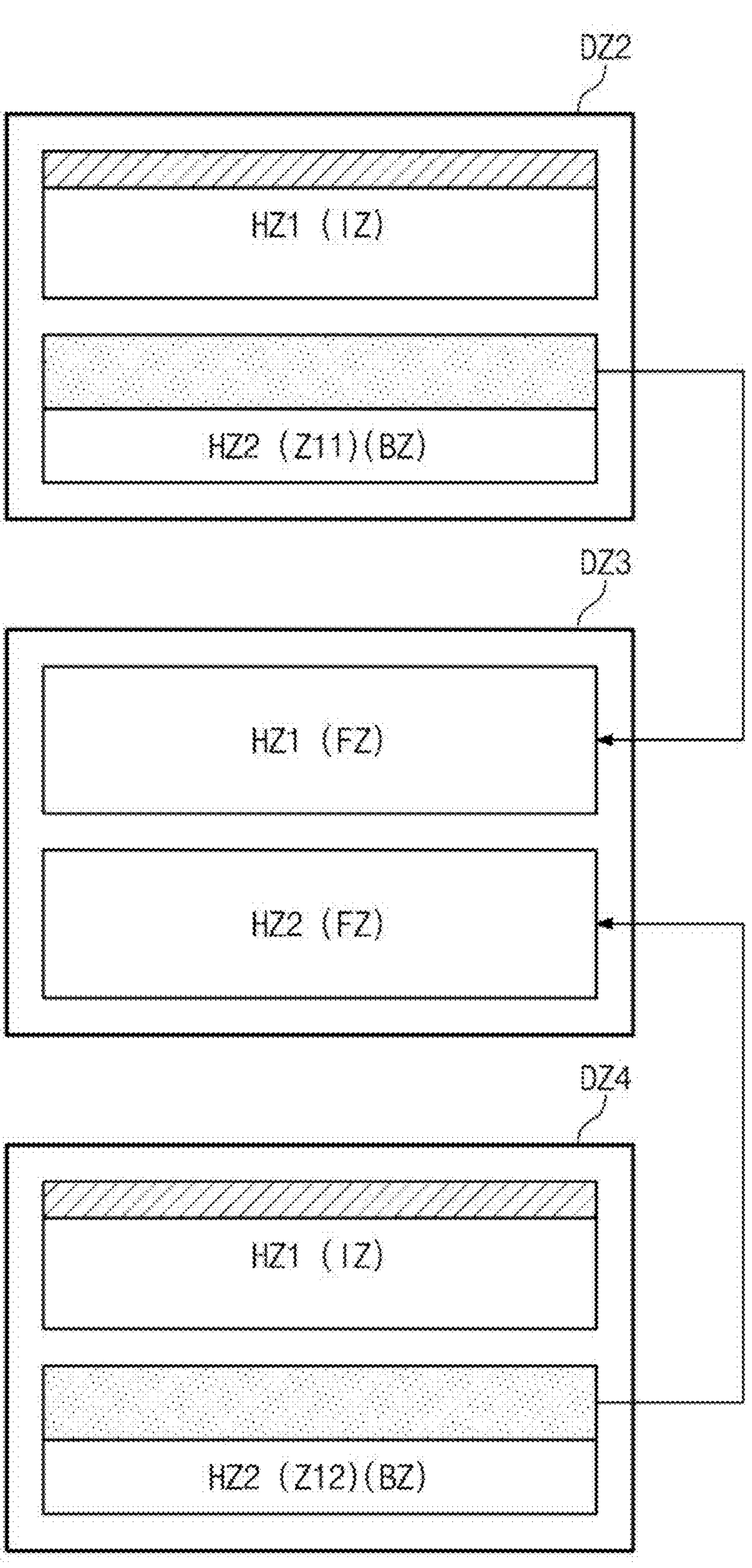
FIG. 81 illustrates an example in which a storage device performs garbage collection as a background operation, according to an embodiment.

FIG. 81 is a diagram illustrating an example in which the storage device 100 performs garbage collection as a background operation. Referring to FIGS. 1 and 81, the first host zone HZ1 of the second device zone DZ2 may be the invalidated host zone IZ. The second host zone HZ2 of the second device zone DZ2 may be the busy host zone BZ. The eleventh zone Z11 may be allocated to the second host zone HZ2 of the second device zone DZ2.

Each of the first host zone HZ1 and the second host zone HZ2 of the third device zone DZ3 may be the free host zone FZ.

The first host zone HZ1 of the fourth device zone DZ4 may be the invalidated host zone IZ. The second host zone HZ2 of the fourth device zone DZ4 may be the busy host zone BZ. The twelfth zone Z12 may be allocated to the second host zone HZ2 of the fourth device zone DZ4.

The memory controller 120 may perform garbage collection as the background operation. For example, the memory controller 120 may copy data of the second host zone HZ2 of the second device zone DZ2 to the first host zone HZ1 of the third device zone DZ3. The memory controller 120 may map the first host zone HZ1 of the third device zone DZ3 to the eleventh zone Z11.

The memory controller 120 may copy data of the second host zone HZ2 of the fourth device zone DZ4 to the second host zone HZ2 of the third device zone DZ3. The memory controller 120 may map the second host zone HZ2 of the third device zone DZ3 to the twelfth zone Z12.

As the garbage collection is performed, the memory controller 120 may erase the second device zone DZ2 and the fourth device zone DZ4 and may set the first host zone HZ1 and the second host zone HZ2 of the second device zone DZ2 and the first host zone HZ1 and the second host zone HZ2 of the fourth device zone DZ4 to free host zones.

Figure 82:
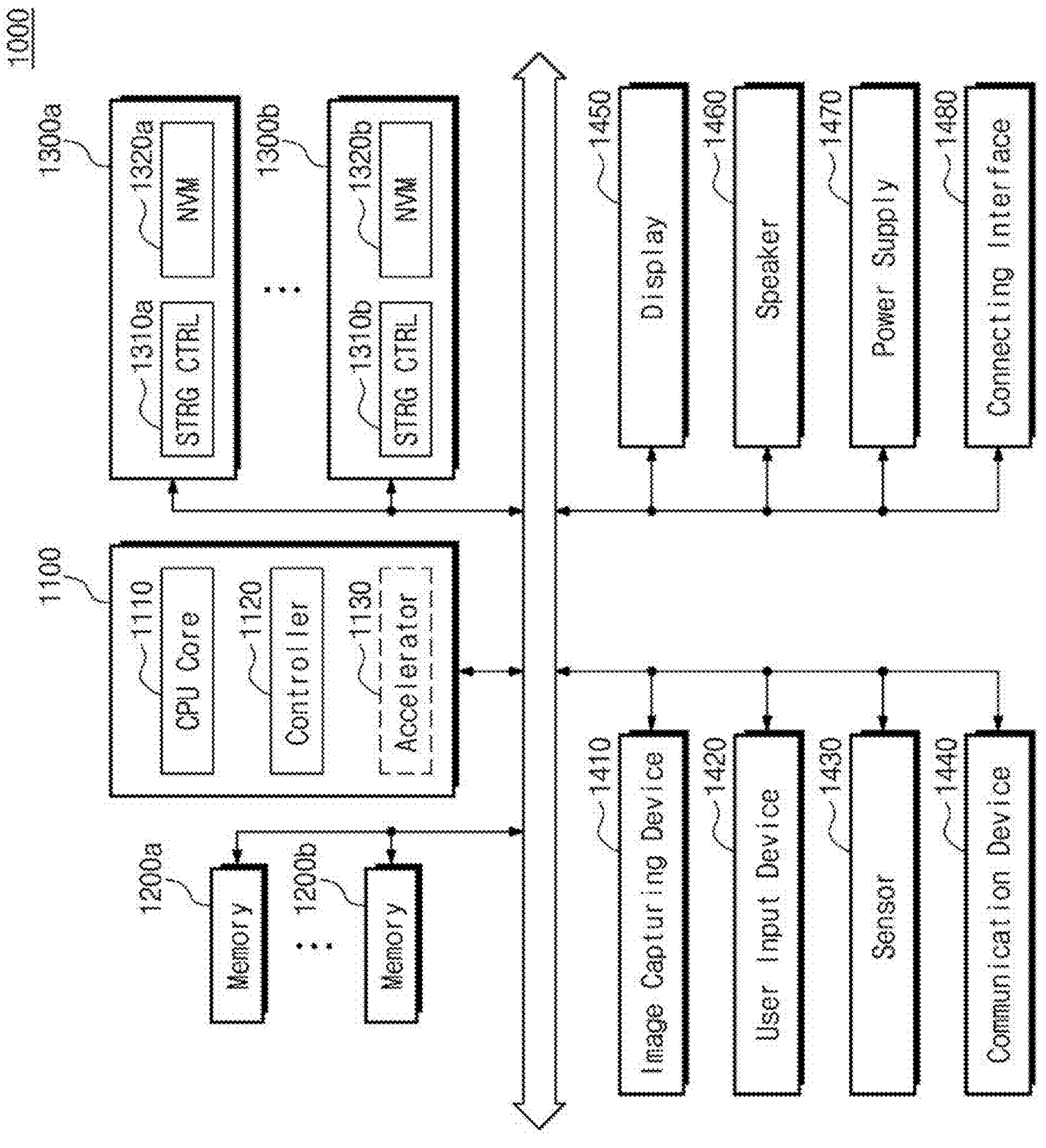
FIG. 82 is a diagram illustrating a system according to an embodiment.

FIG. 82 is a diagram of a system 1000 to which a storage device may be applied, according to an embodiment. The system 1000 of FIG. 82 may be, for example, a mobile system, such as a portable communication terminal (e.g., a mobile phone), a smartphone, a tablet personal computer (PC), a wearable device, a healthcare device, or an Internet of things (IoT) device. However, the system 1000 of FIG. 82 is not limited to the mobile system, and according to embodiments, the system 1000 may be a PC, a laptop computer, a server, a media player, or an automotive device (e.g., a navigation device).

Referring to FIG. 82, the system 1000 may include a main processor 1100, memories (e.g., 1200*a* and 1200*b*), and storage devices (e.g., 1300*a* and 1300*b*). In addition, the system 1000 may include at least one of an image capturing device 1410, a user input device 1420, a sensor 1430, a communication device 1440, a display 1450, a speaker 1460, a power supply 1470, and a connecting interface 1480.

The main processor 1100 may control all operations of the system 1000, more specifically, operations of other components included in the system 1000. The main processor 1100 may be implemented as a general-purpose processor, a dedicated processor, or an application processor.

The main processor 1100 may include at least one CPU core 1110 and further include a controller 1120 configured to control the memories 1200*a* and 1200*b* and/or the storage devices 1300*a* and 1300*b*. In some embodiments, the main processor 1100 may further include an accelerator 1130, which is a dedicated circuit for a high-speed data operation, such as an artificial intelligence (AI) data operation. The accelerator 1130 may include a graphics processing unit (GPU), a neural processing unit (NPU) and/or a data processing unit (DPU) and be implemented as a chip that is physically separate from the other components of the main processor 1100.

The memories 1200*a* and 1200*b* may be used as main memory devices of the system 1000. Although each of the memories 1200*a* and 1200*b* may include a volatile memory, such as static random access memory (SRAM) and/or dynamic RAM (DRAM), each of the memories 1200*a* and 1200*b* may include non-volatile memory, such as a flash memory, phase-change RAM (PRAM) and/or resistive RAM (RRAM). The memories 1200*a* and 1200*b* may be implemented in the same package as the main processor 1100.

The storage devices 1300*a* and 1300*b* may serve as non-volatile storage devices configured to store data regardless of whether power is supplied thereto, and have larger storage capacity than the memories 1200*a* and 1200*b*. The storage devices 1300*a* and 1300*b* may respectively include storage controllers (STRG CTRL) 1310*a* and 1310*b* and NVM (Non-Volatile Memory) s 1320*a* and 1320*b* configured to store data via the control of the storage controllers 1310*a* and 1310*b*. Although the NVMs 1320*a* and 1320*b* may include flash memories having a two-dimensional (2D) structure or a three-dimensional (3D) V-NAND structure, the NVMs 1320*a* and 1320*b* may include other types of NVMs, such as PRAM and/or RRAM.

The storage devices 1300*a* and 1300*b* may be physically separated from the main processor 1100 and included in the system 1000 or implemented in the same package as the main processor 1100. In addition, the storage devices 1300*a* and 1300*b* may have types of solid-state devices (SSDs) or memory cards and be removably combined with other components of the system 1000 through an interface, such as the connecting interface 1480 described below. The storage devices 1300*a* and 1300*b* may be devices to which a standard protocol, such as a universal flash storage (UFS), an embedded multi-media card (eMMC), or a non-volatile memory express (NVMe), is applied, without being limited thereto.

The image capturing device 1410 may capture still images or moving images. The image capturing device 1410 may include a camera, a camcorder, and/or a webcam.

The user input device 1420 may receive various types of data input by a user of the system 1000 and include a touch pad, a keypad, a keyboard, a mouse, and/or a microphone.

The sensor 1430 may detect various types of physical quantities, which may be obtained from the outside of the system 1000, and convert the detected physical quantities into electric signals. The sensor 1430 may include a temperature sensor, a pressure sensor, an illuminance sensor, a position sensor, an acceleration sensor, a biosensor, and/or a gyroscope sensor.

The communication device 1440 may transmit and receive signals between other devices outside the system 1000 according to any communication protocol, according to embodiments. The communication device 1440 may include an antenna, a transceiver, and/or a modem.

The display 1450 and the speaker 1460 may serve as output devices configured to respectively output visual information and auditory information to the user of the system 1000.

The power supply 1470 may appropriately convert power supplied from a battery embedded in the system 1000 and/or an external power source, and supply the converted power to each of components of the system 1000.

The connecting interface 1480 may provide connection between the system 1000 and an external device, which is connected to the system 1000 and capable of transmitting and receiving data to and from the system 1000. The connecting interface 1480 may be implemented using any interface scheme, such as advanced technology attachment (ATA), serial ATA (SATA), external SATA (e-SATA), small computer small interface (SCSI), serial attached SCSI (SAS), peripheral component interconnection (PCI), PCI express (PCIe), NVMe, IEEE 1394, a universal serial bus (USB) interface, a secure digital (SD) card interface, a multi-media card (MMC) interface, an eMMC interface, a UFS interface, an embedded UFS (eUFS) interface, and a compact flash (CF) card interface.

In an embodiment, the storage device 100 described with reference to FIGS. 1 to 81 may be implemented with one of the storage devices 1300*a* and 1300*b*. At least one of the storage devices 1300*a* and 1300*b* may be a zoned storage device. At least one of the storage devices 1300*a* and 1300*b* may include logical units allocated to a zone write and logical units allocated to a random write. At least one of the storage devices 1300*a* and 1300*b* may include the zone allocator 310, the multi-level map table manager 320, the zone recovery manager 330, the zone backup manager 340, the zone migration manager 350, the zone prefetch manager 360, the zone copy manager 370, the zone garbage collection manager 380, and the read and write manager 390 described with reference to FIG. 4. At least one of the storage devices 1300*a* and 1300*b* may use multiple map tables and may perform the following: zone allocation (or open), zone recovery, zone backup, zone migration, zone prefetch, zone copy, and zone garbage collection.

The main processor 1100 may be configured to execute an operating system and applications. The operating system or applications that are executed in the main processor 1100 may open a zone in a logical unit of a zone write, which belongs to at least one of the storage devices 1300*a* and 1300*b*. The main processor 1100 may perform the sequential write or the random write on the opened zone. The main processor 1100 may perform garbage collection on opened zones. At least one of the main processor 110 and the storage devices 1300*a* and 1300*b* may selectively perform one or more operations described with reference to FIGS. 1 to 81.

In the above embodiments, components according to the present disclosure are described using the terms “first”, “second”, “third”, etc. However, the terms “first”, “second”, “third”, etc. may be used to distinguish components from each other and do not limit the present disclosure. For example, the terms “first”, “second”, “third”, etc. do not involve an order or a numerical meaning of any form.

In the above embodiments, components according to embodiments of the present disclosure are referenced using blocks. The blocks may be implemented hardware devices, such as an integrated circuit (IC), an application specific IC (ASIC), a field programmable gate array (FPGA), and a complex programmable logic device (CPLD), firmware driven in hardware devices, software such as an application, or a combination of a hardware device and software. Also, the blocks may include circuits implemented with semiconductor elements in an integrated circuit, or circuits enrolled as an intellectual property (IP).

According to the present disclosure, a storage space of a nonvolatile memory device may be managed using zones where a sequential write is performed, and various algorithms are provided with regard to zone allocation, a map table, recovery, backup, migration, prefetch, and garbage collection. Accordingly, the storage device having an improved operating speed and an operating method thereof may be provided.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A method of operating a storage device comprising a nonvolatile memory device including a plurality of memory cells and a controller, the controller configured to perform a write operation on at least one write unit included in the plurality of memory cells, and to perform an erase operation on at least one erase unit included in the plurality of memory cells, the method comprising:

based on receiving a first open zone command from an external host device and based on a number of free erase units from among a plurality of erase units included in the plurality of memory cells being greater than a threshold value, allocating, by the controller, at least two free erase units from among the free erase units to a first-type zone, and permitting a random write based on a random logical address received from the external host device for the first-type zone; and based on receiving a second open zone command and based on the number of the free erase units being smaller than or equal to the threshold value, allocating, by the controller, the at least two free erase units to a second-type zone, and permitting a zone write based on a sequential logical address received from the external host device for the second-type zone wherein a number of bits per memory cell of the first-type zone is smaller than a number of bits per memory cell of the second-type zone.

2. The method of claim 1, further comprising:

transmitting, by the controller, a response comprising information about a zone type to which the at least two free erase units are allocated to the external host device.

3. The method of claim 1, further comprising:

based on a write booster being activated, allocating, by the controller, the at least two free erase units to a zone from among the first-type zone and the second-type zone based on a number of the at least two free erase units; and based on the write booster being deactivated, allocating, by the controller, the at least two free erase units to the second-type zone.

4. The method of claim 3, further comprising:

based on the write booster being deactivated, transmitting, by the controller, a response to the external host device, wherein the response does not include information about a zone type to which the at least two free erase units are allocated.

5. The method of claim 1, further comprising:

based on at least one open zone command from among the first open zone command and the second open zone command comprising information indicating the first-type zone, allocating, by the controller, the at least two free erase units to a zone from among the first-type zone and the second-type zone based on the number of the at least two free erase units, and based on the at least one open zone command comprising information indicating the second-type zone, or based on the at least one open zone command not comprising zone type information, allocating, by the controller, the at least two free erase units to the second-type zone.

6. The method of claim 5, further comprising:

based on the at least one open zone command comprising the information indicating the first-type zone, transmitting, by the controller, a response comprising information about a zone type to which the at least two free erase units are allocated to the external host device.

7. The method of claim 5, further comprising:

based on the at least one open zone command not comprising the zone type information, transmitting, by the controller, a response to the external host device which does not include information about a zone type to which the at least two free erase units are allocated.

8. The method of claim 5, further comprising:

based on the at least one open zone command comprising the information indicating the first-type zone and the number of the free erase units being smaller than or equal to the threshold value, transmitting, by the controller, a response which includes information indicating that allocation of the first-type zone is impossible, to the external host device.

9. The method of claim 8, further comprising:

after transmitting the response, allocating, by the controller, the at least two free erase units to the second-type zone based on a new request received from the external host device.

10. The method of claim 1, wherein memory cells corresponding to the first-type zone are operated as single level cells (SLCs), and wherein memory cells corresponding to the second-type zone are operated as triple level cells (TLCs).

11. The method of claim 1, further comprising:

based on data having continuous logical addresses corresponding to a physical address of the second-type zone being written at physical addresses of the first-type zone, migrating, by the controller, the data to the physical address of the second-type zone.

12. The method of claim 11, further comprising:

migrating, by the controller, the data to sequential logical addresses in the second-type zone.

13. The method of claim 11, further comprising migrating, by the controller, the data based on at least one of receiving a close zone request from the external host device, entering a power-saving mode, or entering an idle state.

14. A method of operating a storage device comprising a nonvolatile memory device including a plurality of memory cells and a controller, the controller configured to perform a write operation on at least one write unit included in the plurality of memory cells, and to perform an erase operation on at least one erase unit included in the plurality of memory cells, the method comprises:

allocating, by the controller, a plurality of zones to a storage space of the nonvolatile memory device based on a request received from an external host device, selecting, by the controller, two or more erase units from among a plurality of erase units of the plurality of memory cells to be allocated to each zone of the plurality of zones, fixedly and sequentially managing, by the controller, logical addresses of data to be written in the plurality of zones, receiving, by the controller, a write request for a first zone from among the plurality of zones from the external host device, the write request corresponding to write data received from the external host device, and based on an amount of the write data exceeding a free capacity of the first zone, opening, by the controller, a second zone which follows the first zone in the logical addresses based on a feature of the first zone and a feature of the second zone.

15. The method of claim 14, further comprises:

based on the second zone being opened, writing, by the controller, excess data which exceeds the free capacity of the first zone in the second zone.

16. The method of claim 14, further comprises:

based on the second zone being writable, opening, by the controller, the second zone.

17. The method of claim 14, further comprises:

based on the second zone being an empty zone, opening, by the controller, the second zone.

18. The method of claim 14, further comprises:

based on the feature of the second zone being identical to the feature of the first zone, opening, by the controller, the second zone.

19. The method of claim 14, further comprises:

based on the second zone being a gap zone, opening, by the controller, a third zone which follows the second zone in the logical addresses based on the feature of the first zone and a feature of the third zone.

20. A method of operating a storage device comprising a nonvolatile memory device comprising a plurality of memory cells and a controller, the controller configured to perform a write operation on at least one write unit included in the plurality of memory cells, and to perform an erase operation on at least one erase unit included the plurality of memory cells, the method comprises:

based on a first open zone command received from an external host device and based on a number of free erase units from among a plurality of erase units included in the plurality of memory cells being greater than a threshold value, allocating, by the controller, at least two free erase units from among the free erase units to a first-type zone, based on a second open zone command and based on the number of the free erase units being smaller than or equal to the threshold value, allocating, by the controller, the at least two free erase units to a second-type zone, receiving, by the controller, a write request for a first zone from the external host device, the write request corresponding to write data received from the external host device, and based on an amount of the write data exceeding a free capacity of the first zone, opening, by the controller, a second zone based on a feature of the first zone and a feature of the second zone, wherein logical addresses corresponding to the second zone follow logical addresses corresponding to the first zone.

* * * * *